(12) United States Patent
Kusama et al.

(10) Patent No.: US 10,840,814 B2
(45) Date of Patent: Nov. 17, 2020

(54) POWER CONVERSION SYSTEM

(71) Applicant: PANASONIC INTELLECTUAL PROPERTY MANAGEMENT CO., LTD., Osaka (JP)

(72) Inventors: Fumito Kusama, Osaka (JP); Makoto Ozone, Osaka (JP); Takaaki Norisada, Osaka (JP); Yutaka Kamon, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/341,387

(22) PCT Filed: Oct. 12, 2017

(86) PCT No.: PCT/JP2017/037073
§ 371 (c)(1),
(2) Date: Apr. 11, 2019

(87) PCT Pub. No.: WO2018/070496
PCT Pub. Date: Apr. 19, 2018

(65) Prior Publication Data
US 2020/0044573 A1 Feb. 6, 2020

(30) Foreign Application Priority Data

Oct. 12, 2016 (JP) .................... 2016-200860
Nov. 8, 2016 (JP) .................... 2016-218319
(Continued)

(51) Int. Cl.
*H02M 3/335* (2006.01)
*H02M 1/08* (2006.01)
*H02M 1/00* (2006.01)

(52) U.S. Cl.
CPC ....... *H02M 3/33584* (2013.01); *H02M 1/083* (2013.01); *H02M 3/33592* (2013.01); *H02M 2001/0058* (2013.01)

(58) Field of Classification Search
CPC ............. H02M 3/33584; H02M 1/083; H02M 2001/0058; H02M 3/33592
See application file for complete search history.

(56) References Cited

U.S. PATENT DOCUMENTS

2008/0037295 A1  2/2008  Suzuki et al.
2011/0007534 A1  1/2011  Gupta et al.
(Continued)

FOREIGN PATENT DOCUMENTS

EP  2 393 194 A1  12/2011
EP  2 993 772 A1   3/2016
(Continued)

OTHER PUBLICATIONS

International Search Report and Written Opinion issued in International Patent Application No. PCT/JP2017/037073, dated Jan. 9, 2018; with partial English translation.
(Continued)

*Primary Examiner* — Adolf D Berhane
*Assistant Examiner* — Afework S Demisse
(74) *Attorney, Agent, or Firm* — McDermott Will & Emery LLP

(57) ABSTRACT

The control unit controls the converter unit not to cause transfer of power between the transformer circuit unit and the converter unit in the first time period including the reversal time period in which a reversal of polarity of the voltage across the primary winding occurs. The control unit controls the converter unit to cause transfer of power in the first direction from the transformer circuit unit to the converter unit or the second direction opposite to the first
(Continued)

direction in the second time period different from the first time period.

20 Claims, 68 Drawing Sheets

(30) Foreign Application Priority Data

Nov. 8, 2016 (JP) ................................ 2016-218320
Feb. 16, 2017 (JP) ................................ 2017-027255

(56) References Cited

U.S. PATENT DOCUMENTS

| | | |
|---|---|---|
| 2011/0273917 A1 | 11/2011 | Maitra et al. |
| 2014/0369089 A1 | 12/2014 | Sakakibara |
| 2016/0072293 A1 | 3/2016 | Jouper |
| 2016/0141972 A1* | 5/2016 | Yamada .................. H02M 1/32 363/37 |
| 2016/0276964 A1* | 9/2016 | Zushi ...................... B60L 58/21 |

FOREIGN PATENT DOCUMENTS

| | | |
|---|---|---|
| EP | 3 059 847 A1 | 8/2016 |
| JP | H07-023505 A | 1/1995 |
| JP | 2008-048485 A | 2/2008 |
| JP | 2014-117086 A | 6/2014 |
| JP | 2016-096660 A | 5/2016 |
| JP | 2016-178708 A | 10/2016 |

OTHER PUBLICATIONS

Extended European Search Report issued in corresponding European Patent Application No. 17859815.7, dated Jul. 18, 2019.

* cited by examiner

POWER CONVERSION SYSTEM

CROSS-REFERENCE OF RELATED APPLICATIONS

This application is the U.S. National Phase under 35 U.S.C. § 371 of International Patent Application No. PCT/JP2017/037073, filed on Oct. 12, 2017, which in turn claims the benefit of Japanese Application Nos. 2016-200860, filed on Oct. 12, 2016, Japanese Application No. 2016-218320, filed on Nov. 8, 2016, Japanese Application No. 2016-218319, filed on Nov. 8, 2016 and Japanese Application No. 2017-027255, filed on Feb. 16, 2017, the entire disclosures of which Applications are incorporated by reference herein.

TECHNICAL FIELD

The present disclosure generally relates to power conversion systems, and in particular relates to a power conversion system for converting power in at least one direction.

BACKGROUND ART

Recently, there has increased business of selling power obtained from distributed power supplies (e.g., solar cells, fuel cells, and storage cells) to electric companies by companies or individuals (i.e., power selling). The power selling is implemented by system cooperation connecting distributed power supplies to a commercial power system. In the system cooperation, power from the distributed power supplies is converted into power suitable for the commercial power system by power conversion devices being so-called power conditioners.

Patent Literature 1 discloses a bidirectional step-up chopper circuit (40) provided between a battery (21) and an electric double layer capacitor (22). The bidirectional step-up chopper circuit (40) includes a center-tapped transformer (41). The transformer (41) includes a primary winding which has a center tap connected to a (+) terminal of the low voltage battery (21) by way of a reactor (42) and also has opposite ends connected to a pair of step-up chopper devices (43, 45). Additionally, a secondary winding has a center tap connected to the electric double layer capacitor (22) through a voltage line (VL) and also has opposite ends connected to a pair of step-down chopper devices (46, 47).

However, the above conventional technique involves a problem that a high capacitance smoothing capacitor is required and a circuit scale becomes larger. Additionally, it involves another problem that it is difficult to stably perform a reversal of polarity of a voltage across a primary winding and thus cause loss in, and decrease in withstand voltage (voltage proof) of, switching devices.

CITATION LIST

Patent Literature

Patent Literature 1 JP H07-23505 A

SUMMARY OF INVENTION

In view of the above insufficiency, an object of the present disclosure would be to propose a power conversion system capable of stably performing a reversal of polarity of a voltage applied across a primary winding with a circuit scale downsized.

Solution to Problem

A power conversion system according to one aspect of the present disclosure is a power conversion system for transferring power between a first connection target and a second connection target in at least one direction. The power conversion system includes a first external connector, a second external connector, a transformer circuit unit, a third converter unit, a connector, and a control unit. The first external connector is connectable to the first connection target. The second external connector is connectable to the second connection target. The transformer circuit unit includes a primary winding connected to the first external connector, a secondary winding magnetically coupled with the primary winding, a first converter unit connected between the first external connector and the primary winding, and a second converter unit connected to the secondary winding. The third converter unit is connected to the second external connector. The connector includes a first connection terminal and a second connection terminal interconnecting the second converter unit and the third converter unit. The control unit is configured to control at least one of the first converter unit and the second converter unit so that positive and negative voltages are applied across the primary winding alternately and a voltage of the first connection terminal from the second connection terminal is positive. The control unit is configured to control the third converter unit not to cause transfer of power between the transformer circuit unit and the third converter unit in a first time period including a reversal time period in which a reversal of polarity of the voltage across the primary winding occurs. The control unit is configured to control the third converter unit to cause transfer of power in a first direction from the transformer circuit unit to the third converter unit or a second direction opposite to the first direction in a second time period different from the first time period.

DESCRIPTION OF EMBODIMENTS (Background to Disclosure)

Figure 1:
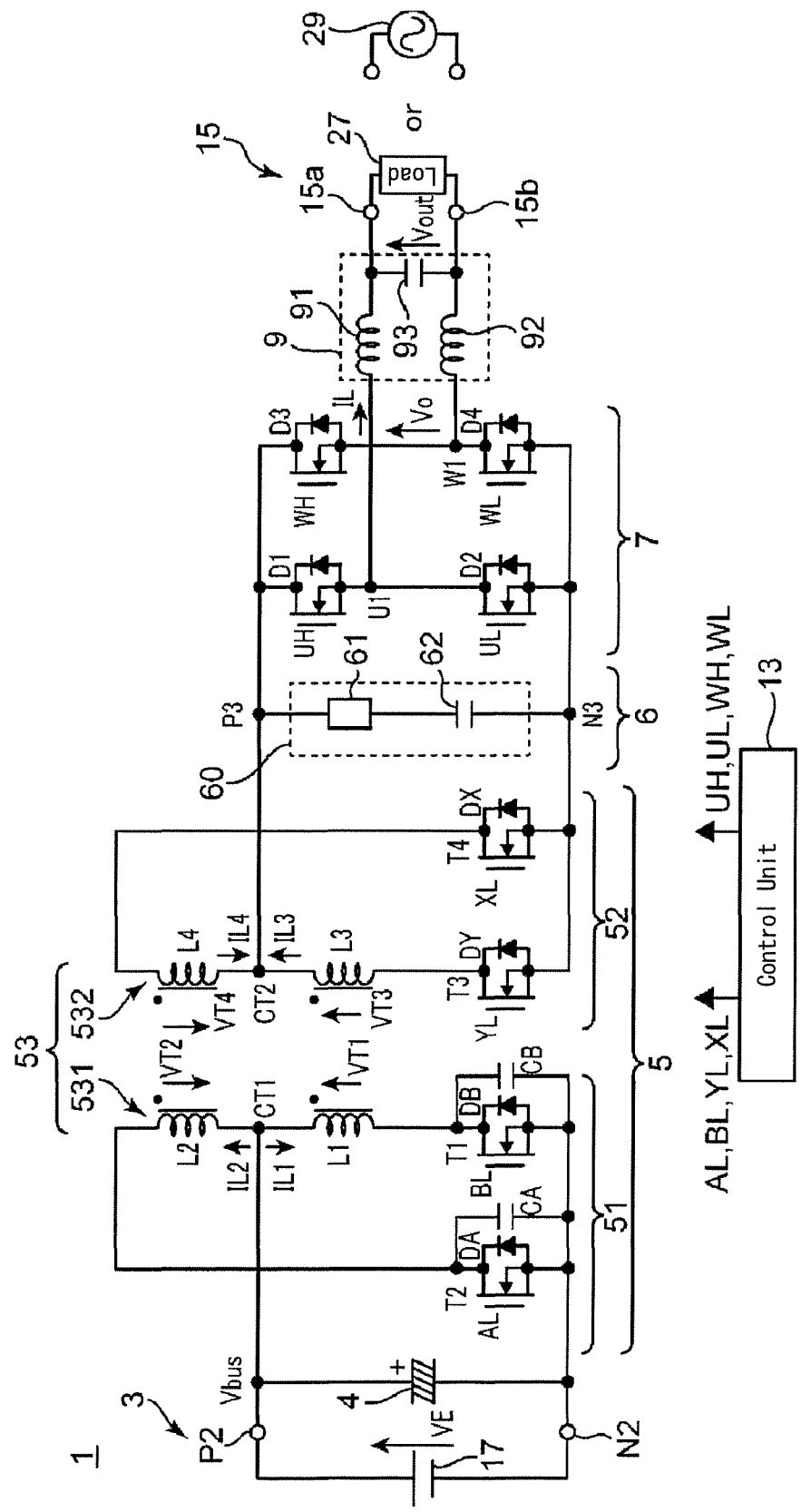
FIG. 1 is a circuit diagram of a power conversion system 1 according to Embodiment 1.

There has been proposed an insulated power conversion device for converting DC power into AC power in which a primary winding of a high frequency transformer is connected to a primary DC power supply through an inverter, a secondary winding of the high frequency transformer is connected to a high capacitance capacitor and an output inverter through a converter, and the output inverter is connected to an AC power system or an AC load (Patent Literature 1).

In such a conventional insulated power conversion device, the inverter converts a DC voltage from the DC power supply into a high frequency AC voltage which has a rectangular waveform and a high speed reversal of polarity. And the inverter supplies the high frequency AC voltage to the converter via the transformer. The high capacitance capacitor smooths the high frequency AC voltage to generate a DC voltage. Further in the conventional power conversion device, the output inverter PWM-controls the DC voltage to generate an AC voltage with desired frequency and amplitude and output it to the commercial power system.

However, the conventional power conversion device requires the high capacitance capacitor between the converter and the output inverter and this may cause increase in a circuit scale. Further, it is difficult to perform stably a reversal of polarity of a voltage across the primary winding. Thus, switch devices of the converter on the primary side see hard switching when they are turned on and off. Accordingly, there may be a problem that switching loss increases and ringing voltages applied on the devices also increase.

As described above, aforementioned Patent Literature 1 involves a problem that a high capacitance smoothing capacitor is required and a circuit scale becomes larger. Additionally, it involves another problem that it is difficult to stably perform a reversal of polarity of a voltage across a primary winding and thus cause loss in, and decrease in withstand voltage (voltage proof) of, switching devices.

Moreover, Patent Literature 1 shows the primary side circuit is current-driven, and thus the reactor (42) is connected to the center tap of the primary winding. Therefore, application of the bidirectional step-up chopper circuit (40) of Patent Literature 1 to the present disclosure may cause a large ringing voltage and it makes circuitry useless.

The present disclosure relates to an object which would be to propose a power conversion system which does not need a high capacitance smoothing capacitor and thereby can downsize a circuit scale and stably perform a reversal of polarity of a voltage across a primary winding and thereby reduce loss in, and withstand voltages of, switching devices.

(Summary 1)

An aspect of the present disclosure is a power conversion device for performing bidirectional transfer of power between a DC power supply and an AC power system or an AC load, and includes:

a transformer circuit unit including a primary winding connectable to the DC power supply, a secondary winding magnetically coupled with the primary winding, a first converter unit connected between the DC power supply and the primary winding, and a second converter unit connected to the secondary winding;

a third converter unit connected to the AC power system or the AC load;

a connector including a first connection terminal and a second connection terminal interconnecting the second converter unit and the third converter unit; and a control unit configured to control the first converter unit so that positive and negative voltages are applied across the primary winding alternately and control the second converter unit so that a voltage of the first connection terminal from the second connection terminal is positive, the control unit being configured to control the third converter unit not to cause transfer of power between the transformer circuit unit and the third converter unit in a first time period including a reversal time period in which a reversal of polarity of the voltage across the primary winding occurs, and control the third converter unit to cause transfer of power in a first direction from the transformer circuit unit to the third converter unit or a second direction opposite to the first direction in a second time period different from the first time period.

In this regard, the first to third converter units may mean so-called power converters, and examples thereof may include DC/AC converters, AC/DC converters, and DC/DC converters.

The present aspect controls the third converter unit not to cause transfer of power between the second converter unit and the third converter unit in the first time period including the reversal time period in which a reversal of polarity of the voltage across the primary winding occurs. Therefore, the present aspect enables zero current switching (ZCS) of the first converter unit and the second converter unit and thus can stably perform a reversal of polarity of the voltage across the primary winding. Consequently, it is possible to reduce loss in and withstand voltages of, switching devices.

Additionally, the present aspect does not need a high capacitance smoothing capacitor as disclosed in Patent Literature 1, and therefore can downsize a circuit scale.

Further, in the present aspect, the first converter unit is controlled to apply positive and negative voltages across the primary winding alternately. And, the second converter unit is controlled so that the voltage of the first connection terminal from the second connection terminal is positive. Therefore, in the present aspect, a voltage with constant (unchanged) polarity is inputted into the third converter unit. As a result, the third converter unit can be realized by an ordinary full bridge circuit and ordinary control can apply.

Moreover, the present aspect controls the third converter unit to cause transfer of power in the first direction from the transformer circuit unit to the third converter unit or the second direction opposite to the first direction in the second time period different from the first time period. Therefore, the present aspect can adjust amplitudes of an AC voltage and an AC current outputted from the third converter unit or an amplitude of a current returned to the DC power supply from an AC power supply by changing a ratio of the second time period to the first time period.

As shown in FIG. 1, the above aspect may further include first and second power supply terminals (P2 and N2) connectable to the DC power supply, wherein:

the primary winding may include a first center tap (CT1) connected to the first power supply terminal (P2); and the first converter unit (51) may include a first switching device (AL) connected between a first winding terminal (T2) of the primary winding and the second power supply terminal (N2) and a second switching device (BL) connected between a second winding terminal (T1) of the primary winding and the second power supply terminal (N2).

In the present aspect, the primary winding and the first converter unit are configured as center-tapped circuitry.

Figure 27:
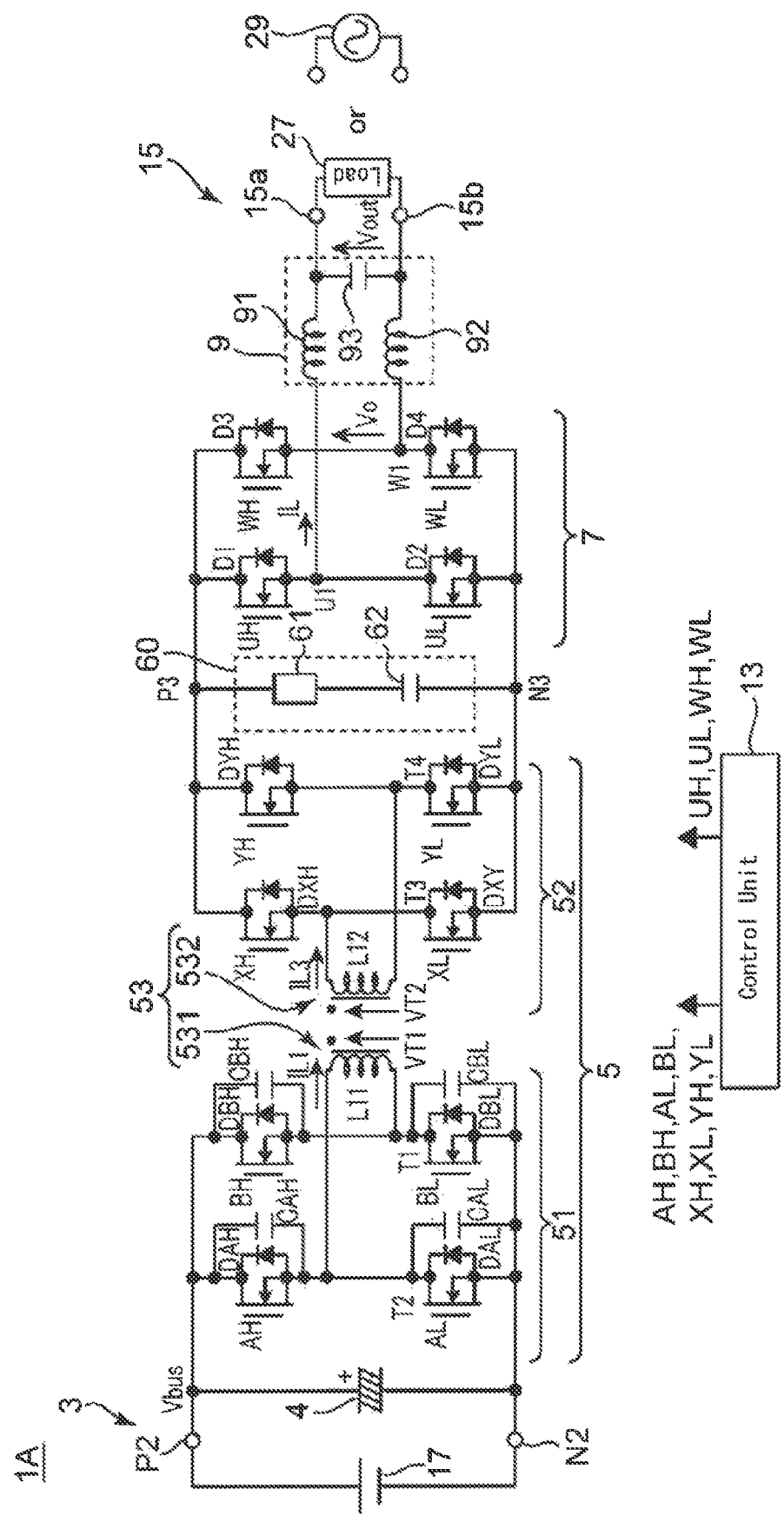
FIG. 27 is a circuit diagram of a power conversion system 1A according to Embodiment 2.

As shown in FIG. 27, the above aspect may further include first and second power supply terminals (P2 and N2) connectable to the DC power supply, wherein:

the first converter unit (51) may be configured as full bridge circuitry; and the full bridge circuitry may include a first switching device (AH) connected between the first power supply terminal (P2) and a first winding terminal (T2) of the primary winding, a second switching device (AL) connected between the first winding terminal (T2) and the second power supply terminal (N2), a third switching device (BH) connected between the first power supply terminal (P2) and a second winding terminal (T1) of the primary winding, and a fourth switching device (BL) connected between the second winding terminal (T1) and the second power supply terminal (N2).

In the present aspect, the primary winding and the first converter unit are configured as full bridge circuitry.

Figure 32:
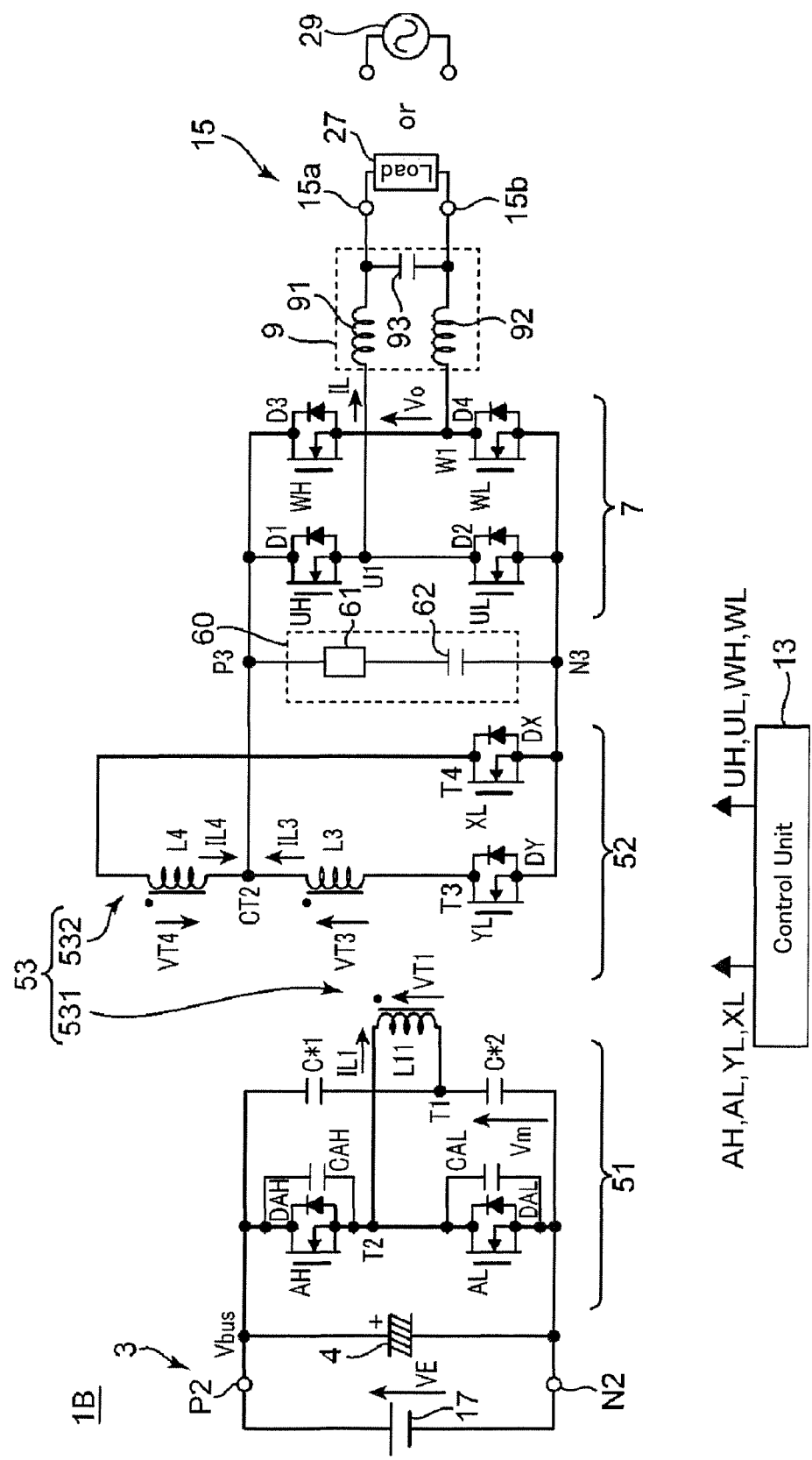
FIG. 32 is a circuit diagram of a power conversion system 1B according to Embodiment 3.

As shown in FIG. 32, the above aspect may further include first and second power supply terminals (P2 and N2) connectable to the DC power supply, wherein:

the first converter unit (51) may be configured as half bridge circuitry;

the half bridge circuitry may include a first switching device (AH) connected between the first power supply terminal (P2) and a first winding terminal (T2) of the primary winding, and a second switching device (AL) connected between the first winding terminal (T2) and the second power supply terminal (N2); and may further include at least one of a first capacitor (C*1) connected between the first power supply terminal (P2) and a second winding terminal (T1) of the primary winding, and a second capacitor (C*2) connected between the second winding terminal (T1) and the second power supply terminal (N2).

In the present aspect, the primary winding and the first converter unit are configured as half bridge circuitry.

As shown in FIG. 1, in the above aspect, the secondary winding may include a second center tap (CT2) connected to the first connection terminal (P3) and the second converter unit (52) may include a fifth switching device (XL) connected between a third winding terminal (T4) of the secondary winding and the second connection terminal (N3) and a sixth switching device (YL) connected between a fourth winding terminal (T3) of the secondary winding and the second connection terminal (N3).

In the present aspect, the secondary winding and the second converter unit are configured as center-tapped circuitry.

As shown in FIG. 27, in the above aspect, the second converter unit (52) may be configured as full bridge circuitry, and the full bridge circuitry may include a fifth switching device (YH) connected between the first connection terminal (P3) and a third winding terminal (T4) of the secondary winding, a sixth switching device (YL) connected between the third winding terminal (T4) and the second connection terminal (N3), a seventh switching device (XH) connected between a fourth winding terminal (T3) of the secondary winding and the first connection terminal (P3), and an eighth switching device (XL) connected between the fourth winding terminal (T3) and the second connection terminal (N3).

In the present aspect, the secondary winding and the second converter unit are configured as full bridge circuitry.

Figure 40:
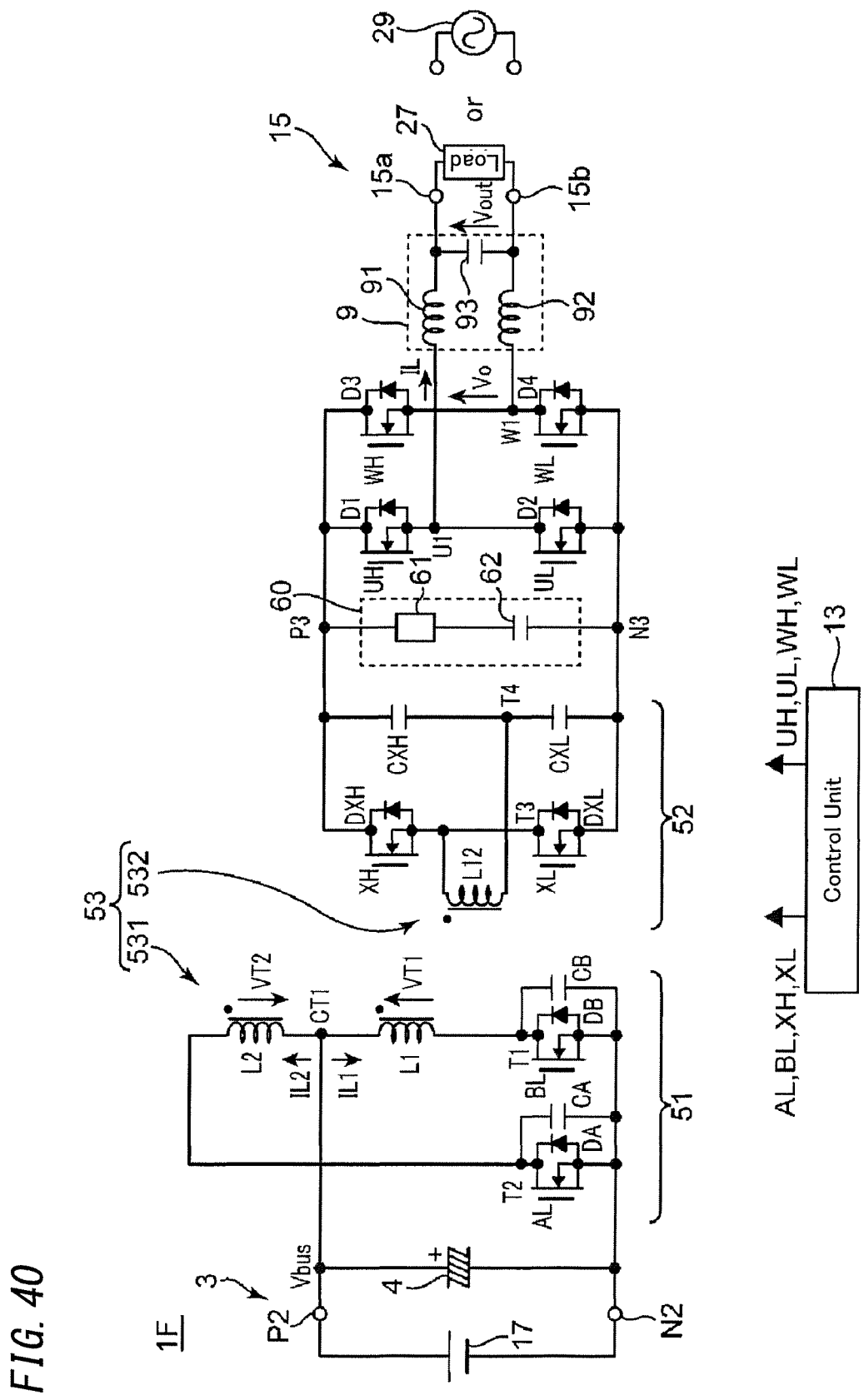
FIG. 40 is a circuit diagram of a power conversion system 1F according to Embodiment 7.

As shown in FIG. 40, in the above aspect, the second converter unit (52) may be configured as half bridge circuitry, the half bridge circuitry may include a fifth switching device (XH) connected between the first connection terminal (P3) and a fourth winding terminal (T3) of the secondary winding, and a sixth switching device (XL) connected between the fourth winding terminal (T3) and the second connection terminal (N3), and may further include at least one of a third capacitor (CXH) connected between a third winding terminal (T4) of the secondary winding and first connection terminal (P3), and a fourth capacitor (CXL) connected between the third winding terminal (T4) and the second connection terminal (N3).

In the present aspect, the secondary winding and the second converter unit are configured as half bridge circuitry.

As shown in FIG. 1, the above aspect may further include a third power supply terminal (U1) and a fourth power supply terminal (W1) which are connectable to the AC power system or the AC load, wherein the third converter unit (7) may include a ninth switching device (UH) connected between the first connection terminal (P3) and the third power supply terminal (U1), a tenth switching device (UL) connected between the third power supply terminal (U1) and the second connection terminal (N3), an eleventh switching device (WH) connected between the first connection terminal (P3) and the fourth power supply terminal (W1), and a twelfth switching device (WL) connected between the fourth power supply terminal (W1) and the second connection terminal (N3).

In the present aspect, the third converter unit is configured as a single-phase inverter.

Figure 43:
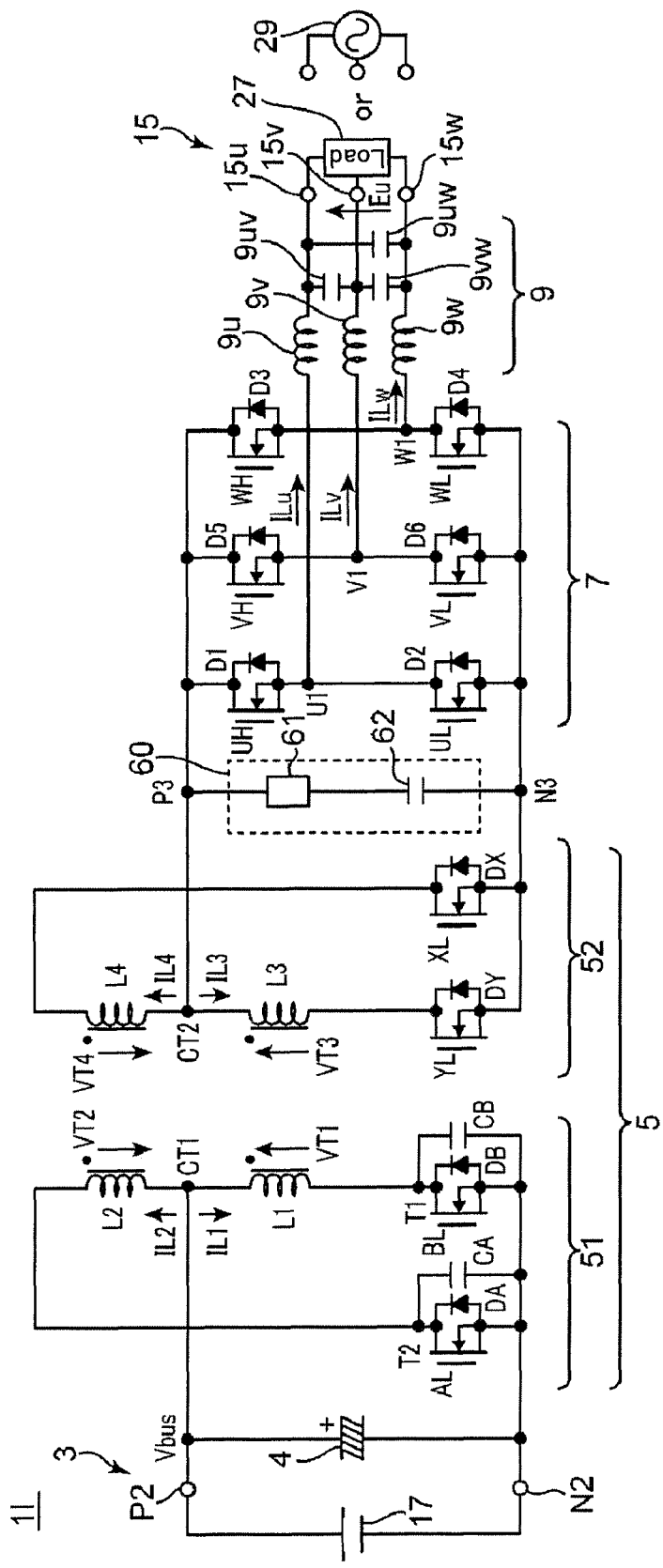
FIG. 43 is a circuit diagram of a power conversion system 1I according to Embodiment 10.

As shown in FIG. 43, the above aspect may further include third, fourth, and fifth power supply terminals (U1, V1, W1) connectable to the AC power system or the AC load, wherein: the third converter unit (7) may be configured as a three-phase inverter; and the three-phase inverter may include a ninth switching device (UH) connected between the first connection terminal (P3) and the third power supply terminal (U1), a tenth switching device (UL) connected between the third power supply terminal (U1) and the second connection terminal (N3), an eleventh switching device (VH) connected between the first connection terminal (P3) and the fourth power supply terminal (V1), a twelfth switching device (VL) connected between the fourth power supply terminal (V1) and the second connection terminal (N3), a thirteenth switching device (WH) connected between the first connection terminal (P3) and the fifth power supply terminal (W1), and a fourteenth switching device (WL) connected between the fifth power supply terminal (W1) and the second connection terminal (N3).

In the present aspect, the third converter unit is configured as a three-phase inverter.

As shown in FIG. 1, in the above aspect, the connector may include a snubber circuit (60) connected between the first and second connection terminals (P3, N3).

Accordingly, the present aspect can reduce ringing occurring in the power conversion circuit.

Figure 49:
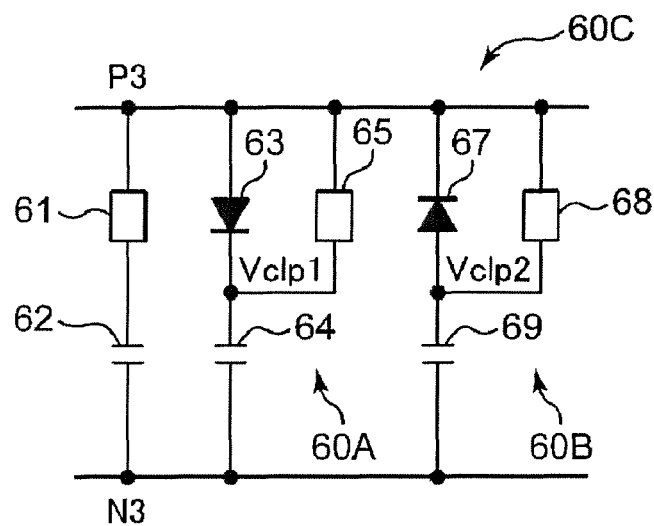
FIG. 49 is illustration of a circuit configuration of a snubber circuit 60C of a third aspect of Embodiment 11 and a waveform chart of voltage [P3–N3].
Figure 49:
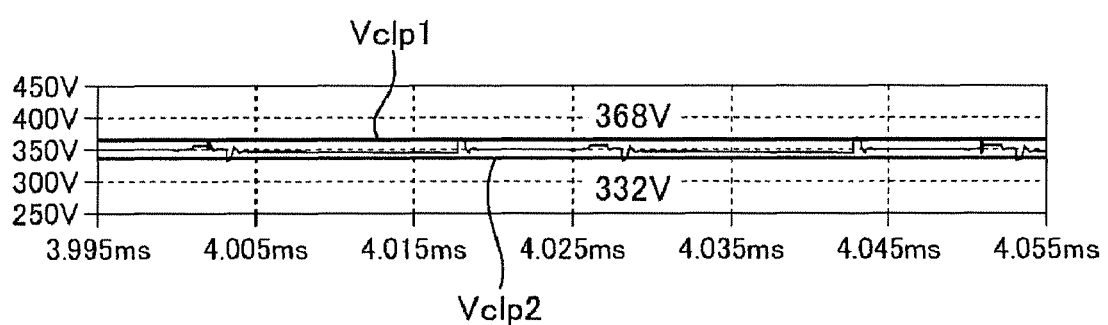

As shown in FIG. 49, in the above aspect, the snubber circuit (60) may include one or more CRD snubbers including a snubber diode (63, 67) having a first end connected to the first connection terminal (P3), a snubber capacitor (64) connected between a second end of the snubber diode (63, 67) and the second connection terminal (N3), and a snubber resistor (65, 68) connected in parallel with the snubber diode (63, 67).

According to the present aspect, ringing occurring between the first and second connection terminals is absorbed by the snubber capacitor and therefore such ringing can be reduced.

As shown in FIG. 1, in the above aspect, the control unit may be configured to control the third converter unit (7) so that the third and fourth power supply terminals (U1, W1) are short-circuited in the first time period.

The present aspect relates to one example of control in the first time period in a case where the third converter unit is configured as a single-phase inverter.

As shown in FIG. 1, in the above aspect, the control unit may be configured to, in the first time period, perform either one of: control of turning on high side switching devices including the ninth switching device (UH) and the eleventh switching device (WH) and off low side switching devices including the tenth switching device (UL) and the twelfth switching device (WL); and control of turning off the high side switching devices (UH, WH) and on the low side switching devices (UL, WL).

The present aspect relates to one example of control in the first time period in a case where the third converter unit is configured as a single-phase inverter.

As shown in FIG. 43, in the above aspect, the control unit may be configured to the third converter unit so that the third power supply terminal (U1), the fourth power supply terminal (V1), and the fifth power supply terminal (W1) are short-circuited in the first time period.

The present aspect relates to one example of control in the first time period in a case where the third converter unit is configured as a three-phase inverter.

As shown in FIG. 43, in the above aspect, the control unit may be configured to, in the first time period, perform either one of: control of turning on high side switching devices including the ninth switching device (UH), the eleventh switching device (VH), and the thirteenth switching device (WH) and off low side switching devices including the tenth switching device (UL), the twelfth switching device (VL), and the fourteenth switching device (WL); and control of turning off the high side switching devices (UH, VH, WH) and on the low side switching devices (UL, VL, WL).

The present aspect relates to one example of control in the first time period in a case where the third converter unit is configured as a three-phase inverter.

In the above aspect, the power conversion device is configured to operate in any one of a first inverter mode in which an output voltage of the third converter unit is positive, a second inverter mode in which the output voltage of the third converter unit is negative, a first converter mode in which an input voltage of the third converter unit is positive, and a second converter mode in which the input voltage of the third converter unit is negative, and the control unit may be configured to control the third converter unit in the same sequence in the first inverter mode and the first converter mode and to control the third converter unit in the same sequence in the second inverter mode and the second converter mode.

According to the present aspect, the third converter unit is driven in the same sequence in the first inverter mode and the first converter mode both. Further, the third converter unit is driven in the same sequence in the second inverter mode and the second converter mode both.

Therefore, even if the output current or the input current of the third converter unit shows polarity different from desired polarity, the first inverter mode and the first converter mode can be switched continuously and the second inverter mode and the second converter mode can be switched continuously. As a result, the present aspect is applicable for stand alone devices such as an uninterruptible power system (UPS).

In the above aspect, the control unit may be configured to control the first converter unit so that a unit time period including the first time period and the second time period repeats at a constant period (cycle) and to generate a desired output voltage, input voltage, output current, or input current by PWM control on the third converter unit to change a ratio of the second time period in each unit time period.

According to the present aspect, the ratio of the second time period in each unit time period is changed by PWM control and thus a desired voltage or current can be produced.

In the above aspect, the first, second, and third converter units each may be constituted by a plurality of switches, and the plurality of switches each may be constituted by a single switching device.

According to the present aspect, each switch is constituted by a single switching device, and therefore the number of switching devices can be reduced in contrast to a case where each switch is constituted by a plurality of switching devices.

(Summary 2)

A power conversion device according to an aspect of the present disclosure is a power conversion device for performing bidirectional transfer of DC power between a DC power supply and a DC device, and includes:

a first external connector connectable to one of the DC power supply and the DC device;

a second external connector connectable to the other of the DC power supply and the DC device;

a transformer circuit unit including a primary winding connected to the first external connector, a secondary winding magnetically coupled with the primary winding, a first converter unit connected between the first external connector and the primary winding, and a second converter unit connected to the secondary winding;

a bidirectional DCDC converter connected to the second external connector;

a connector including a first connection terminal and a second connection terminal interconnecting the second converter unit and the DCDC converter; and a control unit configured to control the first converter unit so that positive and negative voltages are applied across the primary winding alternately and control the second converter unit so that a voltage of the first connection terminal from the second connection terminal is positive, the control unit being configured to control the DCDC converter not to cause transfer of power between the transformer circuit unit and the DCDC converter in a first time period including a reversal time period in which a reversal of polarity of the voltage across the primary winding occurs, and control the DCDC converter to cause transfer of power in a first direction from the transformer circuit unit to the DCDC converter or a second direction opposite to the first direction in a second time period different from the first time period.

The present aspect controls the DCDC converter not to cause transfer of power between the second converter unit and the DCDC converter in the first time period including the reversal time period in which a reversal of polarity of the voltage across the primary winding occurs. Therefore, the present aspect enables zero current switching (ZCS) of the first converter unit and the second converter unit and thus can stably perform a reversal of polarity of the voltage across the primary winding. Consequently, it is possible to reduce loss in and withstand voltages of, switching devices.

Additionally, the present aspect does not need high capacitance smoothing capacitor as disclosed in Patent Literature 1, and therefore can downsize a circuit scale.

Further, in the present aspect, the first converter unit is controlled to apply positive and negative voltages across the primary winding alternately. And, the second converter unit is controlled so that the voltage of the first connection terminal from the second connection terminal is positive. Therefore, in the present aspect, a voltage with constant (unchanged) polarity is inputted into the DCDC converter. As a result, the DCDC converter can be realized by an ordinary DCDC converter and ordinary control can apply without substantial modification.

Moreover, the present aspect controls the DCDC converter to cause transfer of power in the first direction from the transformer circuit unit to the DCDC converter or the second direction opposite to the first direction in the second time period different from the first time period. Therefore, the present aspect can input into or output from the DCDC converter a DC voltage and a DC current with magnitudes corresponding to a ratio of the second time period to the first time period.

As shown in FIG. 1, in the above aspect, the first external connector (3) may include first and second external connection terminals (P2, N2), the primary winding (531) may include a first center tap (CT1) connected to the first external connection terminal (P2), and the first converter unit (51) may include a first switching device (BL) connected between a first winding terminal (T1) of the primary winding (531) and the second external connection terminal (N2), and a second switching device (AL) connected between a second winding terminal (T2) of the primary winding (531) and the second external connection terminal (N2).

In the present aspect, the primary winding and the first converter unit are configured as center-tapped circuitry.

Figure 50:
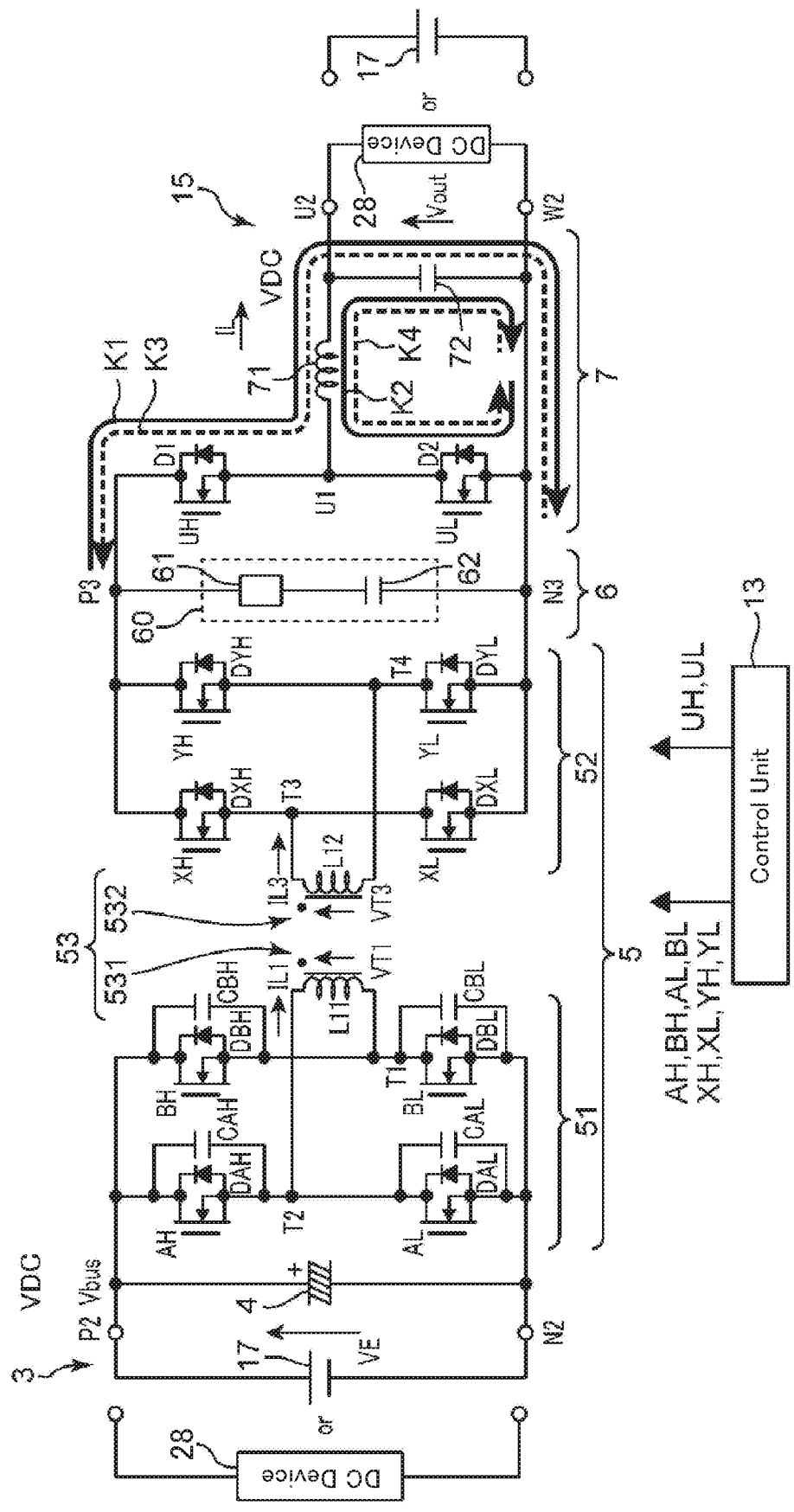
FIG. 50 is a circuit diagram of a power conversion system 1J according to Embodiment 12.

As shown in FIG. 50, in the above aspect, the first external connector (3) may include first and second external connection terminals (P2, N2), the first converter unit (51) may be configured as full bridge circuitry, and the full bridge circuitry (51) may include a first switching device (BH) connected between the first external connection terminal (P2) and a first winding terminal (T1) of the primary winding (531), a second switching device (BL) connected between the first winding terminal (T1) and the second external connection terminal (N2), a third switching device (AH) connected between the first external connection terminal (P2) and a second winding terminal (T2) of the primary winding (531), and a fourth switching device (AL) connected between the second winding terminal (T2) and the second external connection terminal (N2).

In the present aspect, the primary winding and the first converter unit are configured as full bridge circuitry.

Figure 38:
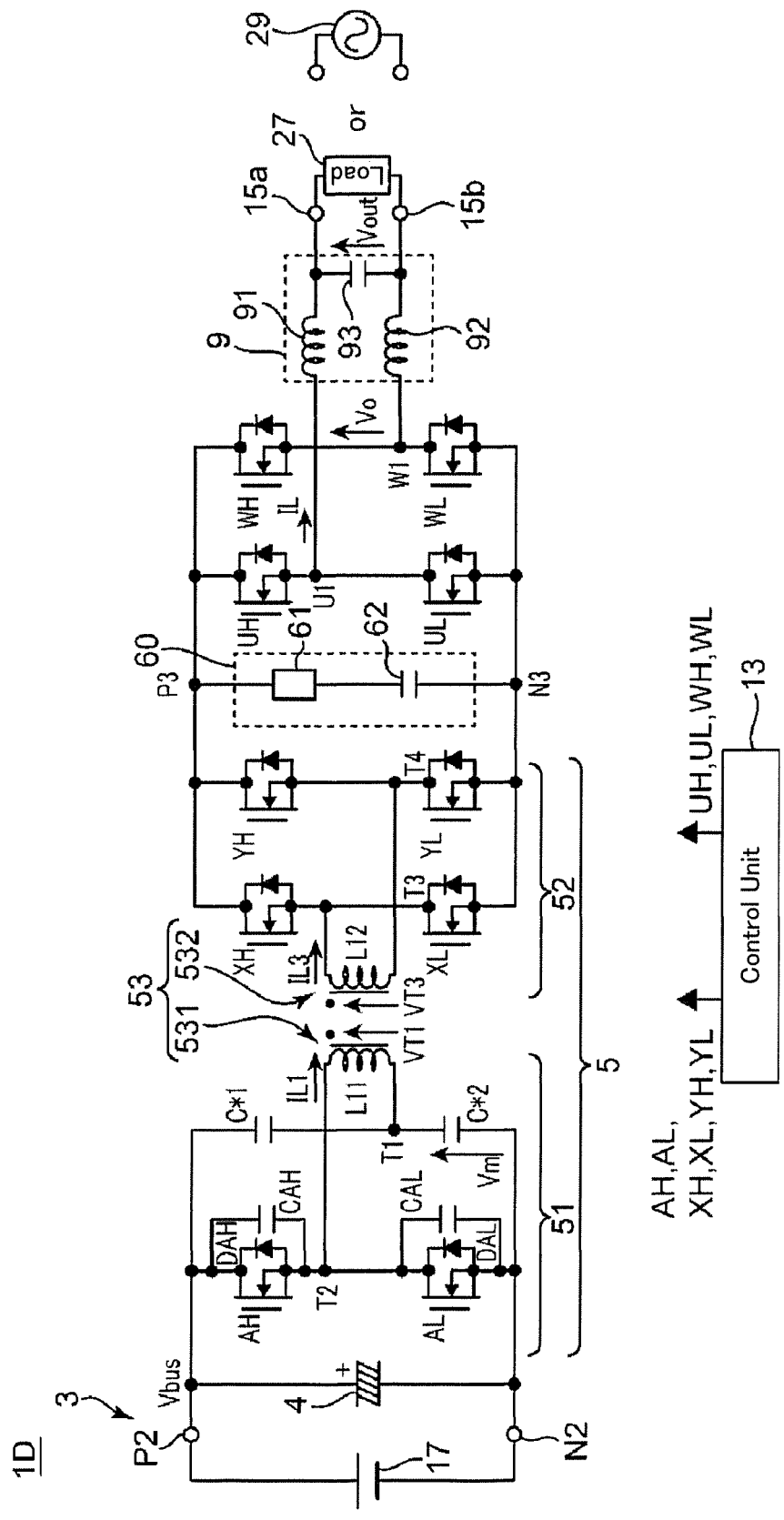
FIG. 38 is a circuit diagram of a power conversion system 1D according to Embodiment 5.

As shown in FIG. 38, in the above aspect, the first external connector (3) may include first and second external connection terminals (P2, N2), the first converter unit (51) may be configured as half bridge circuitry, and the half bridge circuitry may include, at least one of a first capacitor (C*1) connected between the first external connection terminal (P2) and a first winding terminal (T1) of the primary winding (531), and a second capacitor (C*2) connected between the first winding terminal (T1) and the second external connection terminal (N2), a first switching device (AH) connected between the first external connection terminal (P2) and a second winding terminal (T2) of the primary winding (531), and a second switching device (AL) connected between the second winding terminal (T2) and the second external connection terminal (N2).

In the present aspect, the primary winding and the first converter unit are configured as half bridge circuitry.

As shown in FIG. 1, in the above aspect, the secondary winding (532) may include a second center tap (CT2) connected to the first connection terminal (P3), and the second converter unit (52) may include a fifth switching device (YL) connected between a third winding terminal (T3) of the secondary winding (532) and the second connection terminal (N3), and a sixth switching device (XL) connected between a fourth winding terminal (T4) of the secondary winding (532) and the second connection terminal (N3).

In the present aspect, the secondary winding and the second converter unit are configured as center-tapped circuitry.

As shown in FIG. 50, in the above aspect, the second converter unit (52) may be configured as full bridge circuitry, and the full bridge circuitry may include a fifth switching device (XH) connected between a third winding terminal (T3) of the secondary winding (532) and the first connection terminal (P3), a sixth switching device (XL) connected between the third winding terminal (T3) and the second connection terminal (N3), a seventh switching device (YH) connected between the first connection terminal (P3) and a fourth winding terminal (T4) of the secondary winding (532), and an eighth switching device (YL) connected between the fourth winding terminal (T4) and the second connection terminal (N3).

In the present aspect, the secondary winding and the second converter unit are configured as full bridge circuitry.

Figure 42:
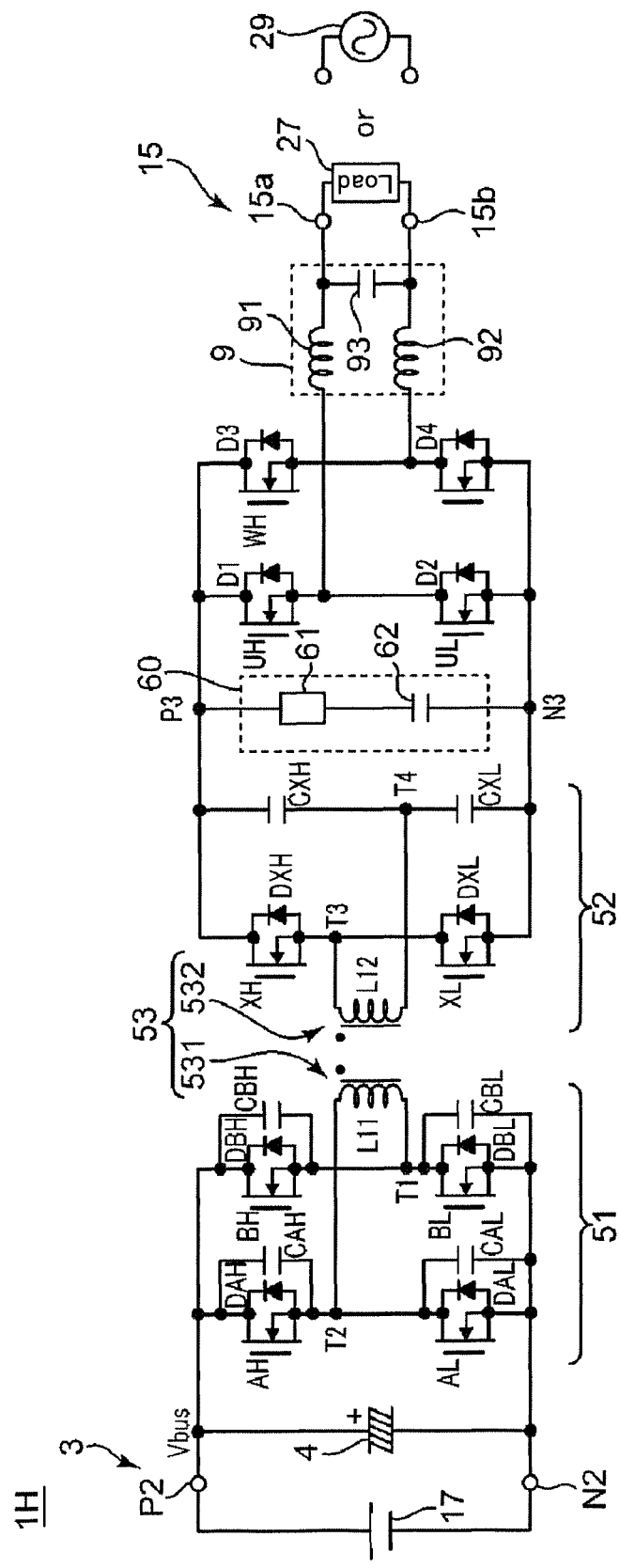
FIG. 42 is a circuit diagram of a power conversion system 1H according to Embodiment 9.

As shown in FIG. 42, in the above aspect, the second converter unit (52) may be configured as half bridge circuitry, and the half bridge circuitry may include a fifth switching device (XH) connected between the first connection terminal (P3) and a third winding terminal (T3) of the secondary winding (532), a sixth switching device (XL) connected between the third winding terminal (T3) and the second connection terminal (N3), and at least one of a third capacitor (CXH) connected between a fourth winding terminal (T4) of the secondary winding (532) and the first connection terminal (P3) and a fourth capacitor (CXL) connected between the fourth winding terminal (T4) and the second connection terminal (N3).

In the present aspect, the secondary winding and the second converter unit are configured as half bridge circuitry.

As shown in FIG. 50, in the above aspect, the second external connector (15) may include a third external connection terminal (U2), and a fourth external connection terminal (W2) connected to the second connection terminal (N3), the DCDC converter is configured as a bidirectional chopper circuit, and the bidirectional chopper circuit may include a coil (71A) having a first coil terminal connected to the third external connection terminal (U2), a ninth switching device (UH) connected between a second coil terminal (U1) of the coil (71A) and the first connection terminal (P3), and a tenth switching device (UL) connected between the second coil terminal (U1) and the second connection terminal (N3).

In the present aspect, the DCDC converter is configured as a bidirectional chopper circuit.

In the above aspect, the control unit may be configured to control the bidirectional chopper circuit so that the second coil terminal (U1) and the second connection terminal (N3) are short-circuited in the first time period.

The present aspect relates to one example of control in the first time period in a case where the DCDC converter is configured as a bidirectional chopper circuit.

In the above aspect, the control unit may be configured to, in the first time period, turn off the ninth switching device (UH) and on the tenth switching device (UL).

The present aspect relates to a detailed example of control of the bidirectional chopper circuit in the first time period.

In the above aspect, the control unit may be configured to, in the second time period, turn on the ninth switching device (UH) and off the tenth switching device (UL).

The present aspect relates to one example of control of the bidirectional chopper circuit in the second time period.

In the above aspect, the first converter unit, the second converter unit, and the DCDC converter each may include a plurality of arms, and each of the plurality of arms may include a single switch.

According to the present aspect, each arm is constituted by a single switch, and therefore the number of switches can be reduced. Note that, examples of the switch may include switching devices such as transistors, and free wheel diodes connected to the switching devices.

As shown in FIG. 50, in the above aspect, the connector may include a snubber circuit (60) connected between the first and second connection terminals (P3, N3).

Accordingly, the present aspect can reduce ringing occurring in the power conversion circuit.

As shown in FIG. 49, in the above aspect, the snubber circuit (60) may include one or more CRD snubbers including a snubber diode (63, 67) having a first end connected to the first connection terminal (P3), a snubber capacitor (64, 69) connected between a second end of the snubber diode (63, 67) and the second connection terminal (N3), and a snubber resistor (65, 68) connected in parallel with the snubber diode (63, 67).

According to the present aspect, ringing occurring between the first and second connection terminals is absorbed by the snubber capacitor and therefore such ringing can be reduced.

(Summary 3)

A power conversion device according to an aspect of the present disclosure is a power conversion device for transferring power in a single direction between a DC power supply and a device or an AC power system, and includes:

a first external connector connectable to one of the DC power supply and the device;

a second external connector connectable to either the other of the DC power supply and the device or the AC power system;

a transformer circuit unit including a primary winding connected to the first external connector, a secondary winding magnetically coupled with the primary winding, a first converter unit connected between the first external connector and the primary winding, and a second converter unit connected to the secondary winding;

a third converter unit connected to the second external connector to transfer power in a single direction;

a connector including a first connection terminal and a second connection terminal interconnecting between the second converter unit and the third converter unit; and a control unit configured to control at least one of the first and second converter units so that positive and negative voltages are applied across the primary winding alternately and that a voltage of the first connection terminal from the second connection terminal is positive, the control unit being configured to control the third converter unit not to cause transfer of power between the transformer circuit unit and the third converter unit in a first time period including a reversal time period in which a reversal of polarity of the voltage across the primary winding occurs, and control the third converter unit to cause transfer of power in a first single direction from the transformer circuit unit to the third converter unit or a second single direction opposite to the first single direction in a second time period different from the first time period.

The present aspect controls the third converter unit not to cause transfer of power between the second converter unit and the third converter unit in the first time period including the reversal time period in which a reversal of polarity of the voltage across the primary winding occurs. Therefore, the present aspect enables zero current switching (ZCS) of the first converter unit and thus can stably perform a reversal of polarity of the voltage across the primary winding. Consequently, it is possible to reduce loss in and withstand voltages of, switching devices.

Additionally, the present aspect does not need high capacitance smoothing capacitor as disclosed in Patent Literature 1, and therefore can downsize a circuit scale.

Further, the present aspect controls at least one of the first converter unit and the second converter unit so that positive and negative voltages are applied across the primary winding alternately and the voltage of the first connection terminal from the second connection terminal is positive. Therefore, in the present aspect, the third converter unit is supplied with a voltage with constant (unchanged) polarity. As a result, when the third converter unit is connected to a DC device, the third converter unit can be realized by an ordinary single direction chopper circuit, for example. And, when the third converter unit is connected to an AC device or an AC power system, the third converter unit can be realized by an ordinary full bridge circuit, for example. As a result, according to the present aspect, ordinary control can apply to the third converter unit without substantial modification.

Moreover, the present aspect controls the third converter unit to cause transfer of power in the first single direction from the transformer circuit unit to the third converter unit or the second single direction opposite to the first single direction in the second time period different from the first time period. Therefore, the present aspect can input into or output from the third converter unit a voltage or a current with a magnitude corresponding to a ratio of the second time period to the first time period.

Figure 56:
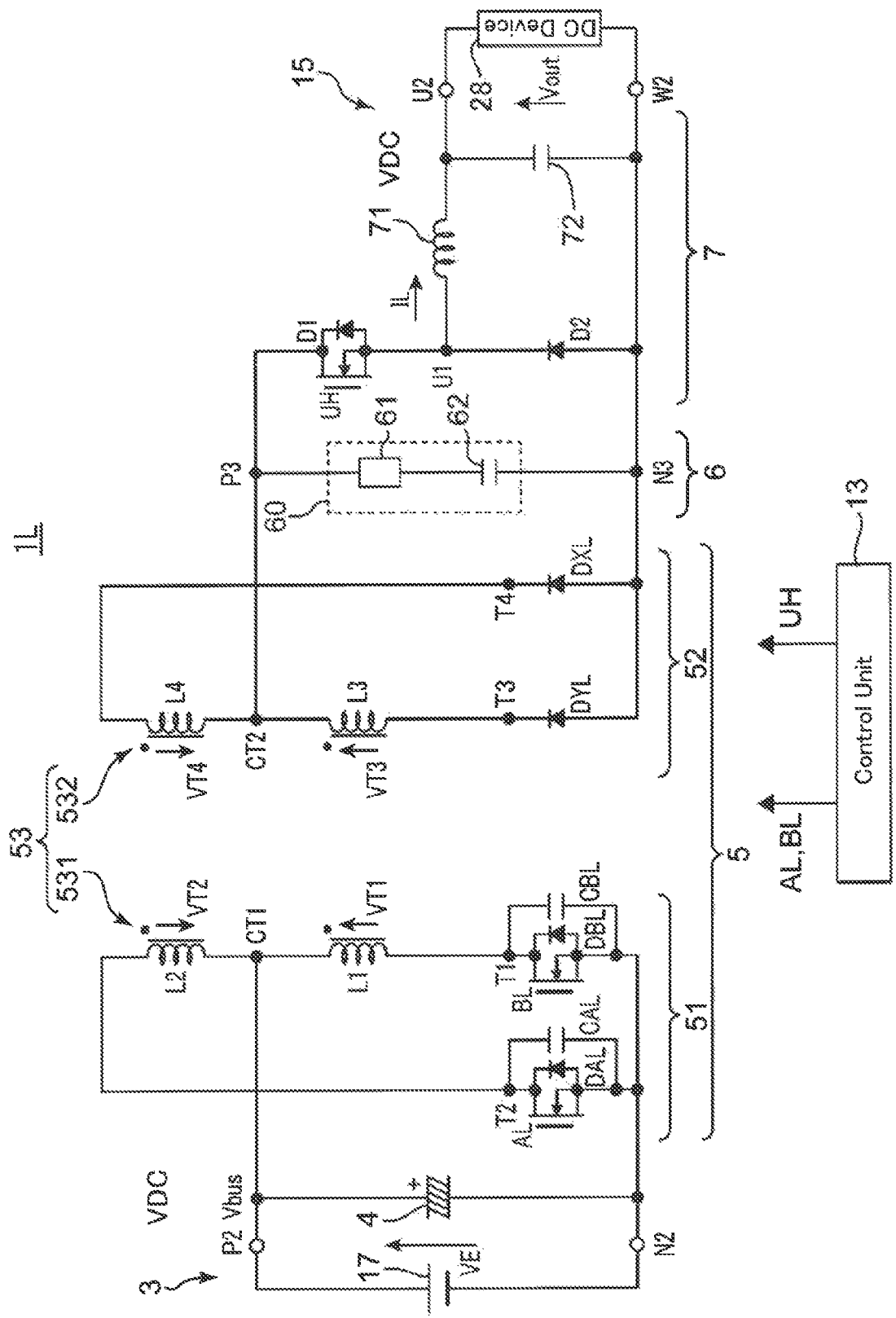
FIG. 56 is a circuit diagram of a power conversion system 1L according to Embodiment 14.

As shown in FIG. 56, in the above aspect, the first external connector (3) may include first and second external connection terminals (P2, N2), the primary winding (531) may include a first center tap (CT1) connected to the first external connection terminal (P2), and the first converter unit (51) may include a first switching device (BL) connected between a first winding terminal (T1) of the primary winding and the second external connection terminal (N2), and a second switching device (AL) connected between a second winding terminal (T2) of the primary winding and the second external connection terminal (N2).

In the present aspect, the primary winding and the first converter unit are configured as center-tapped circuitry.

Figure 53:
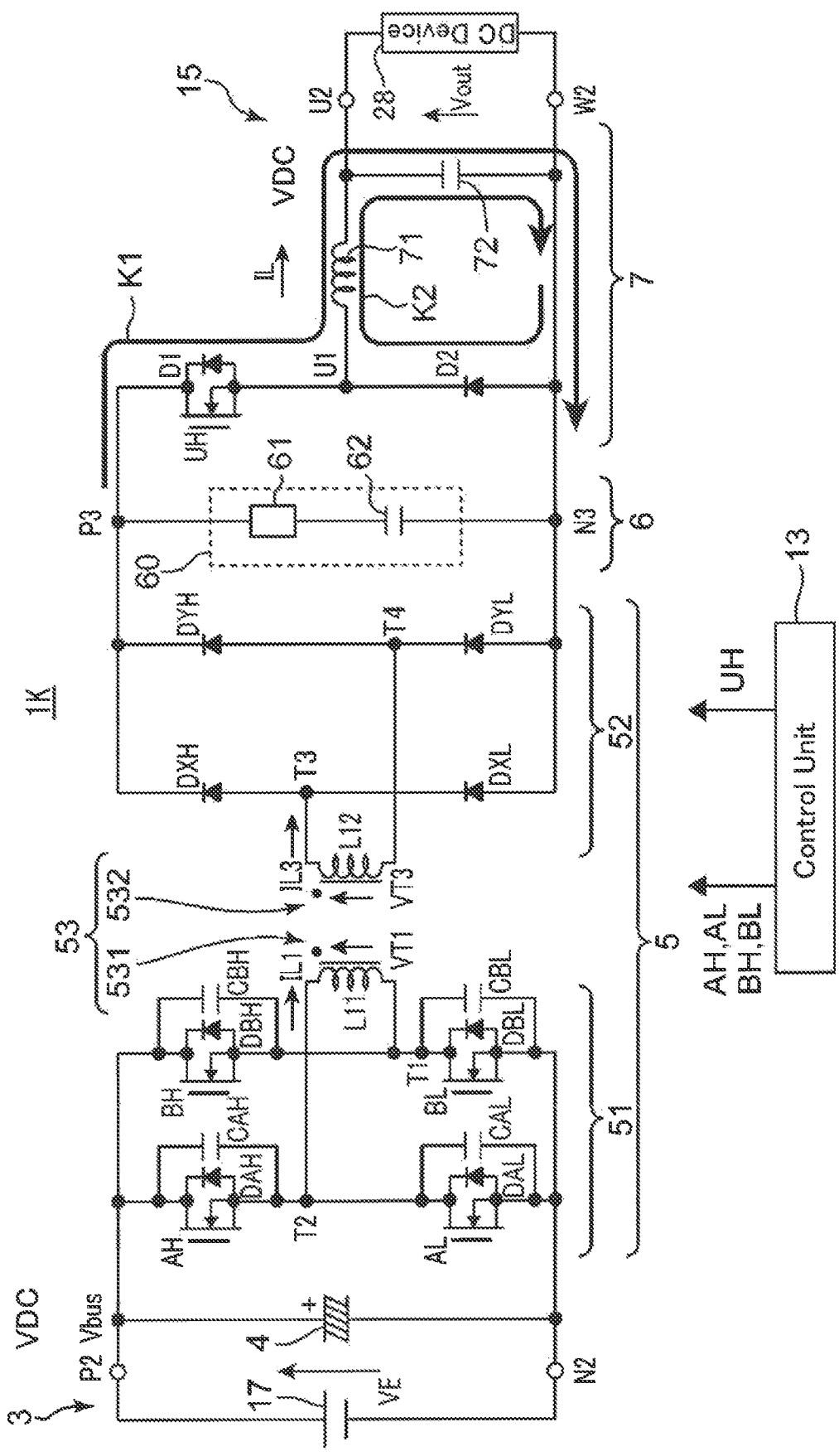
FIG. 53 is a circuit diagram of a power conversion system 1K according to Embodiment 13.

As shown in FIG. 53, in the above aspect, the first external connector (3) may include first and second external connection terminals (P2, N2), the first converter unit (51) may be configured as full bridge circuitry, and the full bridge circuitry may include a first switching device (BH) connected between the first external connection terminal (P2) and a first winding terminal (T1) of the primary winding, a second switching device (BL) connected between the first winding terminal (T1) and the second external connection terminal (N2), a third switching device (AH) connected between the first external connection terminal (P2) and a second winding terminal (T2) of the primary winding, and a fourth switching device (AL) connected between the second winding terminal (T2) and the second external connection terminal (N2).

In the present aspect, the primary winding and the first converter unit are configured as full bridge circuitry.

Figure 57:
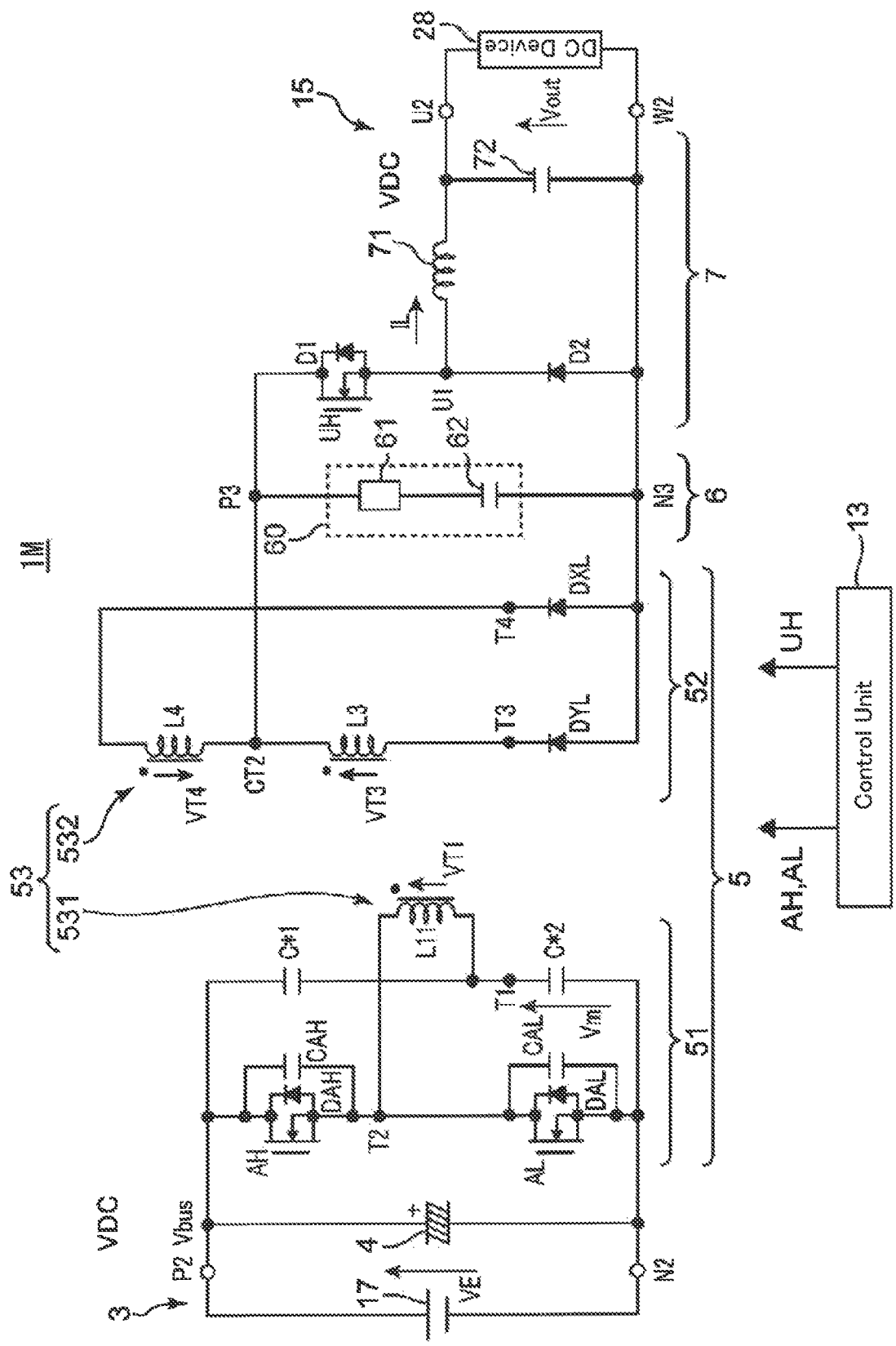
FIG. 57 is a circuit diagram of a power conversion system 1M according to Embodiment 15.

As shown in FIG. 57, in the above aspect, the first external connector (3) may include first and second external connection terminals (P2, N2), the first converter unit (51) may be configured as half bridge circuitry, and the half bridge circuitry may include at least one of a first capacitor (C*1) connected between the first external connection terminal (P2) and a first winding terminal (T1) of the primary winding and a second capacitor (C*2) connected between the first winding terminal (T1) and the second external connection terminal (N2), a first switching device (AH) connected between the first external connection terminal (P2) and a second winding terminal (T2) of the primary winding, and a second switching device (AL) connected between the second winding terminal (T2) and the second power supply terminal (N2).

In the present aspect, the primary winding and the first converter unit are configured as half bridge circuitry.

A shown in FIG. 56, in the above aspect, the secondary winding (532) may include a second center tap (CT2) connected to the first connection terminal (P3), and the second converter unit (52) may include a fifth switching device (DYL) connected between a third winding terminal (T3) of the secondary winding and the second connection terminal (N3), and a sixth switching device (DXL) connected between a fourth winding terminal (T4) of the secondary winding and the second connection terminal (N3).

In the present aspect, the secondary winding and the second converter unit are configured as center-tapped circuitry.

As shown in FIG. 53, in the above aspect, the second converter unit (52) may be configured as full bridge circuitry, and the full bridge circuitry may include a fifth switching device (DXH) connected between the first connection terminal (P3) and a third winding terminal (T3) of the secondary winding, a sixth switching device (DXL) connected between the third winding terminal (T3) and the second connection terminal (N3), a seventh switching device (DYH) connected between a fourth winding terminal (T4) of the secondary winding and the first connection terminal (P3), and an eighth switching device (DYL) connected between the fourth winding terminal (T4) and the second connection terminal (N3).

In the present aspect, the secondary winding and the second converter unit are configured as full bridge circuitry.

In the above aspect, the second converter unit (52) may be configured as half bridge circuitry, and the half bridge circuitry may include a fifth switching device (DXH) connected between the first connection terminal (P3) and a third winding terminal (T3) of the secondary winding, and a sixth switching device (DXL) connected between the third winding terminal (T3) and the second connection terminal (N3), and may further include at least one of third capacitor (CXH) connected between a fourth winding terminal (T4) of the secondary winding and the first connection terminal (P3) and a fourth capacitor (CXL) connected between the fourth winding terminal (T4) and the second connection terminal (N3).

In the present aspect, the secondary winding and the second converter unit are configured as half bridge circuitry.

As shown in FIG. 53, in the above aspect, the device may be a DC device (28), the second external connector (15) may include a third external connection terminal (U2), and a fourth external connection terminal (W2) connected to the second connection terminal (N3), the third converter unit (7) may be configured as a chopper circuit for transferring DC power in the first single direction, and the chopper circuit may include a coil (71A) having a first coil terminal connected to the third external connection terminal (U2), a ninth switching device (UH) connected between a second coil terminal (U1) of the coil and the first connection terminal (P3), and a diode (D2) having a cathode connected to the second coil terminal (U1) and an anode connected to the second connection terminal (N3).

The present aspect relates to one example of the chopper circuit for transferring power in the first single direction.

In the above aspect, the control unit may be configured to turn off the ninth switching device in the first time period and to turn on the ninth switching device in the second time period.

The present aspect relates to one example of control of the chopper circuit for transferring power in the first single direction.

Figure 60:
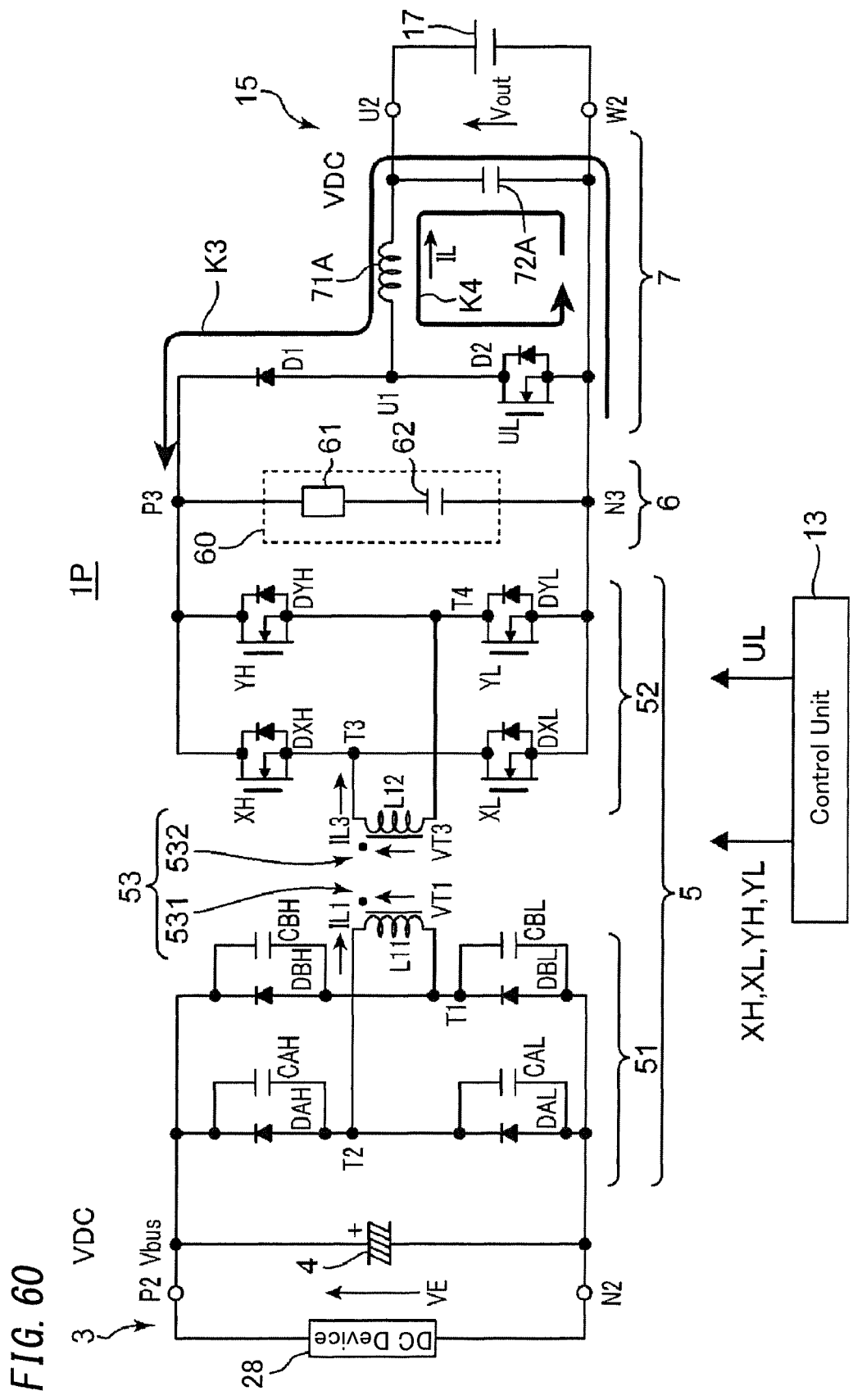
FIG. 60 is a circuit diagram of a power conversion system 1P according to Embodiment 17.

As shown in FIG. 60, in the above aspect, the device may be a DC device (28), the second external connector (15) may include a third external connection terminal (U2), and a fourth external connection terminal (W2) connected to the second connection terminal (N3), the third converter unit (7) may be configured as a chopper circuit for transferring DC power in the second single direction, and the chopper circuit may include a coil (71A) having a first coil terminal connected to the third external connection terminal (U2), a diode (D1) having an anode connected to a second coil terminal (U1) of the coil and a cathode connected to the first connection terminal (P3), and a ninth switching device (UL) connected between the second coil terminal (U1) and the second connection terminal (N3).

The present aspect relates to one example of the chopper circuit for transferring power in the second single direction.

In the above aspect, the control unit may be configured to turn on the ninth switching device in the first time period and to turn off the ninth switching device in the second time period.

The present aspect relates to one example of control of the chopper circuit for transferring power in the second single direction.

Figure 58:
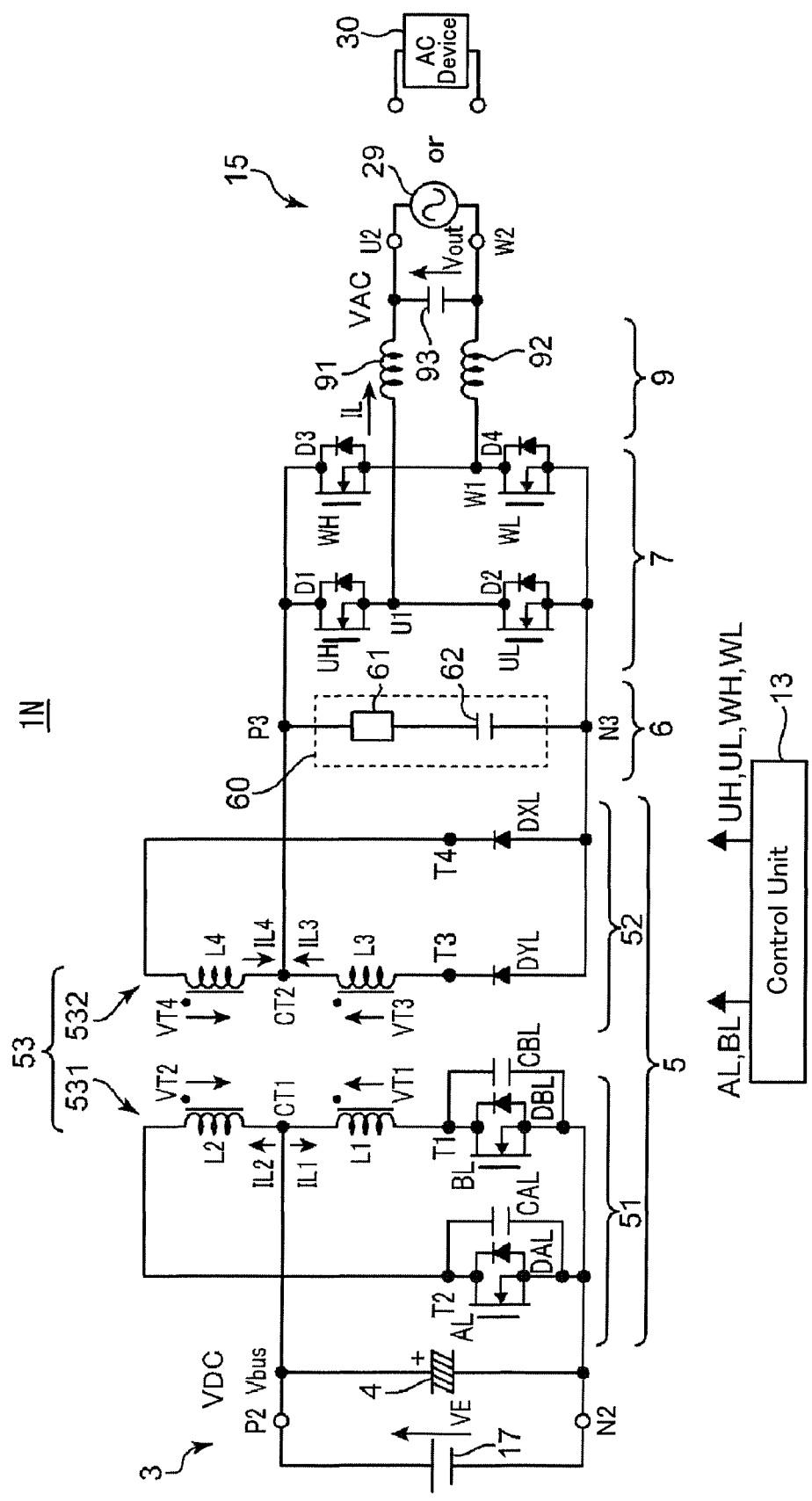
FIG. 58 is a circuit diagram of a power conversion system 1N according to Embodiment 16.

As shown in FIG. 58, in the above aspect, the device may be a single-phase AC device (30), the second external connector (15) may include a third external connection terminal (U2), and a fourth external connection terminal (W2), the third converter unit may be configured as a single-phase inverter, and the single-phase inverter may include a ninth switching device (UH) connected between the first connection terminal (P3) and the third external connection terminal (U2), a tenth switching device (UL) connected between the third external connection terminal (U2) and the second connection terminal (N3), an eleventh switching device (WH) connected between the first connection terminal (P3) and the fourth external connection terminal (W2), and a twelfth switching device (WL) connected between the fourth external connection terminal (W2) and the second connection terminal (N3).

Accordingly, the present aspect can convert DC power from the DC power supply into single-phase AC power and transfer it to the AC power system or the single-phase AC device. Or the present aspect can convert single phase AC power from the single-phase AC device into DC power and transfer it to the DC power supply.

As shown in FIG. 43, in the above aspect, the device may be a three-phase AC device (27), the second external connector (15) may include a third external connection terminal (15u), a fourth external connection terminal (15w), and a fifth external connection terminal (15v), the third converter unit may be configured as a three-phase inverter, and the three-phase inverter may include a ninth switching device (UH) connected between the first connection terminal (P3) and the third external connection terminal (15u), a tenth switching device (UL) connected between the third external connection terminal (15u) and the second connection terminal (N3), an eleventh switching device (WH) connected between the first connection terminal (P3) and the fourth external connection terminal (15w), a twelfth switching device (WL) connected between the fourth external connection terminal (15w) and the second connection terminal (N3), a thirteenth switching device (VH) connected between the first connection terminal (P3) and the fifth external connection terminal (15v), and a fourteenth switching device (VL) connected between the fifth external connection terminal (15v) and the second connection terminal (N3).

Accordingly, the present aspect can convert DC power from the DC power supply into three-phase AC power and transfer it to the AC power system or the three-phase AC device. Or the present aspect can convert AC power from the three-phase AC device into DC power and transfer it to the DC power supply.

As shown in FIG. 53, in the above aspect, the connector may include a snubber circuit (60) connected between the first and second connection terminals (P3, N3).

Accordingly, the present aspect can reduce ringing occurring in the power conversion circuit.

As shown in FIG. 49, in the above aspect, the snubber circuit (60) may include one or more CRD snubbers including a snubber diode (63, 67) having a first end connected to the first connection terminal (P3), a snubber capacitor (64, 69) connected between a second end of the snubber diode (63, 67) and the second connection terminal (N3), and a snubber resistor (65, 68) connected in parallel with the snubber diode (63, 67).

According to the present aspect, ringing occurring between the first and second connection terminals is absorbed by the snubber capacitor and therefore such ringing can be reduced.

Hereinafter, embodiments according to the present disclosure are described in detail with reference to attached drawings.

Embodiment 1

FIG. 1 is a circuit diagram of a power conversion system 1 according to Embodiment 1. The power conversion system 1 is defined as a power conversion system for performing bidirectional conversion and transfer of power between a DC power supply 17 and an AC power system 29 or an AC load 27.

The power conversion system 1 serves as a power conditioner and includes a connector 3 (one example of the first external connector), a capacitor 4, a transformer circuit unit 5, a connector 6, a conversion unit 7 (one example of the third converter unit), a filter circuit 9, and a connector 15 (one example of the second external connector). The connector 3 includes a terminal P2 (one example of the first power supply terminal) and a terminal N2 (one example of the second power supply terminal).

The transformer circuit unit 5 includes a converter unit 51 (one example of the first converter unit), a converter unit 52 (one example of the second converter unit), and a transformer 53. The connector 6 includes a terminal P3 (one example of the first connection terminal), a terminal N3 (one example of the second connection terminal), and a snubber circuit 60. The snubber circuit 60 includes a resistor 61 and a capacitor 62. The conversion unit 7 includes a single-phase inverter. The filter circuit 9 includes a pair of coils 91 and 92 and a capacitor 93. The connector 15 includes a terminal 15a and a terminal 15b.

The DC power supply 17 (one example of the first connection target) may include a secondary cell, a solar cell, a fuel cell, and/or the like, for example. The DC power supply 17 has a positive electrode connected to the terminal P2, and the DC power supply 17 has a negative electrode connected to the terminal N2. In the disclosure, "connect" means "electrically connect". Power from the DC power supply 17 is supplied to the transformer circuit unit 5 through the terminal P2 and the terminal N2. Alternatively, the DC power supply 17 may include a secondary cell, a solar cell, a fuel cell, and/or the like as well as one or more chopper circuits.

The capacitor 4 is one or more electrolytic capacitors connected between the terminal P2 and the terminal N2, and thus stabilizes a voltage between the terminal P2 and the terminal N2.

The transformer 53 is a high frequency center tapped transformer and includes a primary winding 531 and a secondary winding 532 which are magnetically coupled with each other. The primary winding 531 includes two coils L1 and L2 separated by a center tap CT1 (one example of the first center tap).

The center tap CT1 is connected to the terminal P2. The primary winding 531 has a first end serving as a terminal T1 (one example of the second winding terminal) connected to a switching device BL (one example of the second switching device). The primary winding 531 has a second end serving as a terminal T2 (one example of the first winding terminal) connected to a switching device AL (one example of the first switching device).

The secondary winding 532 includes two coils L3 and L4 separated by a center tap CT2 (one example of the second center tap). The center tap CT2 is connected to the terminal P3. The secondary winding 532 has a first end serving as a terminal T3 (one example of the fourth winding terminal) connected to a switching device YL (one example of the sixth switching device). The secondary winding 532 has a second end serving as a terminal T4 (one example of the fourth winding terminal) connected to a switching device XL (one example of the fifth switching device). The coils L1, L2, L3, and L4 are magnetically coupled so that the center tap CT1, the terminal T2, the center tap CT2, and the terminal T4 have the same polarity.

The converter unit 51 is a high frequency inverter and converts a DC voltage supplied from the DC power supply 17 into a high frequency AC voltage with a rectangular waveform of 20 kHz and supplies it to the primary winding 531 and the secondary winding 532, for example. The converter unit 51 includes the two switching devices AL and BL, two diodes DA and DB, and two capacitors CA and CB.

The switching devices AL and BL may be constituted by n-type field effect transistors, for example. The switching device AL has a drain connected to the terminal T2 and a source connected to the terminal N2. The switching device BL has a drain connected to the terminal T1 and a source connected to the terminal N2.

The diode DA has an anode connected to the source of the switching device AL, and a cathode connected to the drain of the switching device AL. The diode DB has an anode connected to the source of the switching device BL, and a cathode connected to the drain of the switching device BL.

The diodes DA and DB may serve as body diodes of the switching devices AL and BL or external diodes, respectively.

The capacitor CA is connected between the source and drain of the switching device AL. The capacitor CB is connected between the source and drain of the switching device BL. The capacitors CA and CB resonates with the primary winding 531 to realize soft switching of the switching devices AL, BL, YL, and XL. Alternatively, the capacitors CA and CB may be connected between the terminals T1 and T2 or connected in parallel with the coils L1 and L2 respectively.

The converter unit 52 converts an AC voltage which has a rectangular waveform having alternate positive and negative polarities and is applied across the secondary winding 532, into a voltage with positive polarity, and applies it between the terminal P3 and the terminal N3. The converter unit 52 includes two switching devices YL and XL and two diodes DY and DX.

The switching devices YL and XL may be constituted by n-type field effect transistors, for example. The switching device YL has a drain connected to the terminal T3 and a source connected to the terminal N3. The switching device XL has a drain connected to the terminal T4 and a source connected to the terminal N3.

The diode DY has an anode connected to the source of the switching device YL and a cathode connected to the drain of the switching device YL. The diode DX has an anode connected to the source of the switching device XL and a cathode connected to the drain of the switching device XL.

The switching devices AL, BL, YL, and XL each may be constituted by an npn type insulated gate bipolar transistor instead of a field effect transistor, for example. In this case, the diodes DA, DB, DY, and DX are provided as free wheel diodes. Further in this case, the diode DA is connected between the emitter and collector of the switching device AL to allow a current to flow through the diode DA in an opposite direction to a current flowing through the switching device AL when the switching device AL is on. This is applicable mutatis mutandis to the diodes DB, DY, and DX.

There is a control unit 13 configured to keep turning off the switching devices AL and XL while turning on the switching devices BL and YL, and is configured to keep turning on the switching devices AL and XL while turning off the switching devices BL and YL. In this regard, the control unit 13 controls the switching devices AL, BL, XL, and YL at the same duty cycle. Note that, in an example shown in FIG. 2, the duty cycle of the switching devices AL, BL, XL, and YL is substantially 50%. Here "substantially 50%" means a duty cycle obtained by subtracting a dead time (reversal time period) from a duty cycle of 50%.

The conversion unit 7 includes a single-phase inverter and generates a commercial AC voltage with a frequency of 50 Hz or 60 Hz from a positive voltage applied between the terminal P3 and the terminal N3, for example. The conversion unit 7 is a single-phase inverter including a switching device UH (one example of the ninth switching device), a switching device UL (one example of the tenth switching device), a switching device WH (one example of the eleventh switching device), a switching device WL (one example of the twelfth switching device), four diodes D1 to D4, a terminal U1 (one example of the third power supply terminal), and a terminal W1 (one example of the fourth power supply terminal), wherein the switching devices UH, UL, WH, and WL are connected in full bridge configuration.

The switching devices UH to WL are each constituted by an n-type field effect transistor. The switching device UH has a drain connected to the terminal P3 and a source connected to the terminal U1. The switching device WH has a drain connected to the terminal P3 and a source connected to the terminal W1.

The switching device UL has a drain connected to the terminal U1 and a source connected to the terminal N3. The switching device WL has a drain connected to the terminal W1 and a source connected to the terminal N3.

The diodes D1 to D4 have anodes and cathodes connected to the sources and drains of the switching devices UH to WL, respectively.

The switching devices UH, UL, WH, and WL each may be constituted by an npn type insulated gate bipolar transistor instead of a field effect transistor, for example. In this case, the diodes D1, D2, D3, and D4 are provided as free wheel diodes. Further in this case, the diode D1 is connected between the emitter and collector of the switching device UH to allow a current to flow through the diode D1 in an opposite direction to a current flowing through the switching device UH when the switching device UH is on. This is applicable mutatis mutandis to the diodes D2, D3, and D4.

The control unit 13 controls amplitude of at least one of a voltage Vout between the terminals 15a and 15b and a current IL by turning on or off the switching devices UH to WL. This will be described in detail below.

The coil 91 is connected between the terminal U1 and the terminal 15a. The coil 92 is connected between the terminal W1 and the terminal 15b. The capacitor 93 is connected between the terminal 15a and the terminal 15b. The coils 91 and 92 and the capacitor 93 constitute a filter circuit for smoothing an AC voltage with a rectangular waveform outputted from the converter unit 7. Accordingly, the AC voltage with the rectangular waveform outputted from the converter unit 7 is converted into an AC voltage with a sinusoidal waveform having amplitude corresponding to a pulse width of the AC voltage with the rectangular waveform.

To supply power from the DC power supply 17 to the AC power system 29 (to sell power) or to receive power from the AC power system 29 and charge the DC power supply 17, the terminals 15a and 15b are connected to the AC power system 29.

To supply power from the DC power supply 17 to the AC load 27 or to receive power from the AC load 27 and charge the DC power supply 17, the terminals 15a and 15b are connected to the AC load 27. The AC load 27 (one example of the second connection target) may be an electric device operating with a commercial AC voltage, for example.

The control unit 13 may be constituted by a CPU, an FPGA, an ASIC, or the like, for example, and is configured to control the converter units 51 and 52 and the converter unit 7.

The control unit 13 is configured to control the converter unit 51 so that a high frequency AC voltage is supplied to the primary winding 531 and the secondary winding 532. The control unit 13 is configured to control the converter unit 52 so that a voltage with positive polarity is applied between the terminal P3 and the terminal N3.

The control unit 13 is configured to control the converter unit 7 not to cause transfer of power between the transformer circuit unit 5 and the converter unit 7 in a first time period including a reversal time period in which a reversal of polarity of the voltage across the primary winding 531 occurs. The control unit 13 is configured to control the converter unit 7 to cause transfer of power in a first direction from the transformer circuit unit 5 to the converter unit 7 or a second direction opposite to the first direction in a second time period different from the first time period.

In detail, the control unit 13 controls the converter units 51, 52, and 7 so that the reversal time period and a circulation time period described below appear in the first time period constituting a half cycle (one example of the unit time period) of an AC voltage supplied to the primary winding 531 and a supply time period or a return time period described below appears in the second time period different from the first time period.

In more detail, the control unit 13 performs PWM control on the converter unit 7 to change a ratio of the second time period in each unit time period, thereby generating a desired voltage Vout or current IL. The desired voltage Vout or current IL means a voltage or current with the same waveform as a modulation signal used in the PWM control, for example.

Next, operation of the power conversion system 1 is described.

The power conversion system 1 operates in either an inverter mode of supplying power from the DC power supply 17 to the AC power system 29 or the AC load 27 or a converter mode of returning power from the AC power system 29 or the AC load 27 to the DC power supply 17.

The inverter mode means a mode in which a voltage drop occurs between the terminals 15a and 15b in a direction same as a direction in which a current flows through the AC power system 29 or the AC load 27. In other words, the inverter mode means a mode in which the voltage Vout and the current IL have the same polarity. The converter mode means a mode in which a voltage drop occurs between the terminals 15a and 15b in a direction opposite to a direction in which a current flows through the AC power system 29 or the AC load 27. In other words, the converter mode means a mode in which the voltage Vout and the current IL have mutually different polarities.

Figure 2:
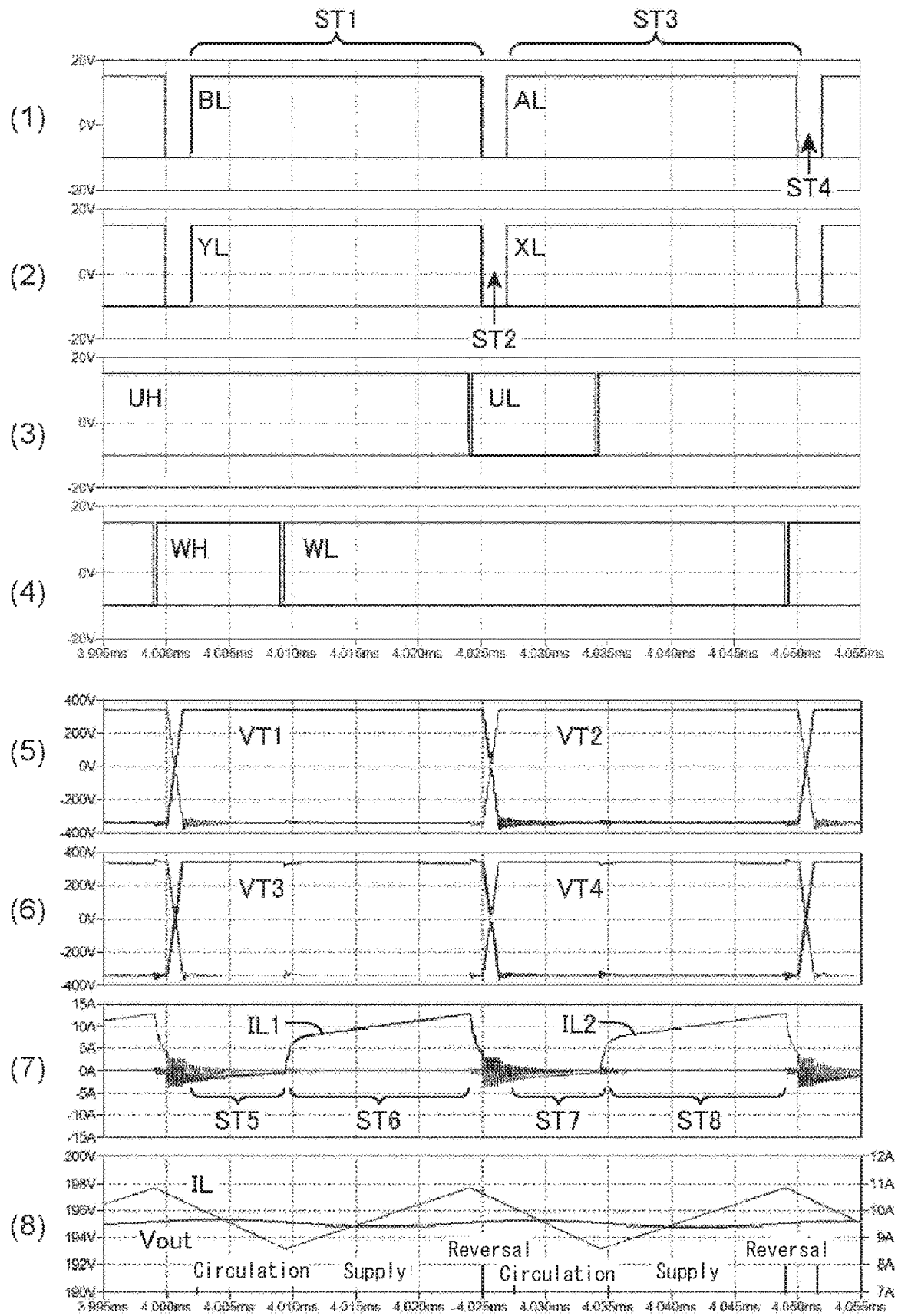
FIG. 2 is a waveform chart for illustration of operation of the power conversion system 1 in an inverter mode.

FIG. 2 is a waveform diagram for illustration of operation of the power conversion system 1 in the inverter mode. In FIG. 2, (1) represents on and off states of the switching devices BL and AL, wherein the on state means having a high level and the off state means having a low level. (2) represents on and off states of the switching devices YL and XL, wherein the on state means having a high level and the off state means having a low level. (3) represents on and off states of the switching devices UH and UL, wherein the on state means having a high level and the off state means having a low level. (4) represents on and off states of the switching devices WH and WL, wherein the on state means having a high level and the off state means having a low level.

Figure 3:
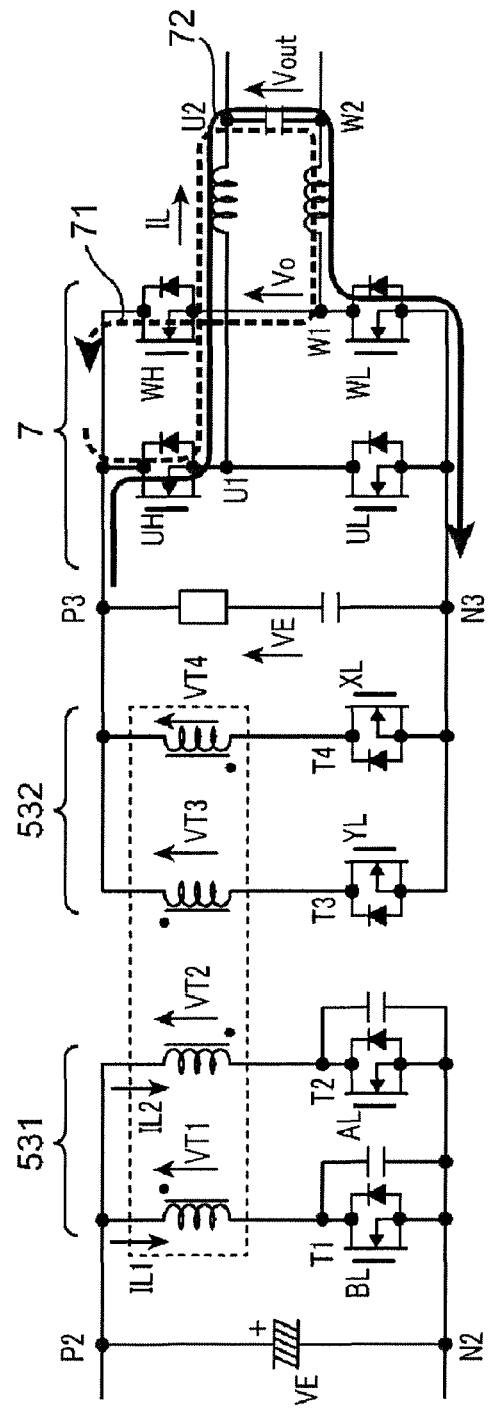
FIG. 3 is a diagram for illustration of a path of a current flowing through a converter unit 7.

Further in FIG. 2, (5) is a waveform chart for a voltage VT1 of the center tap CT1 from the terminal T1 and a voltage VT2 of the center tap CT1 from the terminal T2. (6) is a waveform chart for a voltage VT3 of the center tap CT2 from the terminal T3 and a voltage VT4 of the center tap CT2 from the terminal T4. (7) is a waveform chart for a current IL1 of the coil L1 and a current IL2 of the coil L2. (8) is a waveform chart for the current IL flowing through the coil 91 and the voltage Vout. FIG. 3 is a diagram for illustration of paths of currents flowing through the converter unit 7.

Hereinafter, the inverter mode is described with a voltage between the terminal P2 and the terminal N2 referred to as a voltage VE. Note that, the switching devices AL, BL, XL, and YL are PWM controlled at a duty cycle of substantially 50%. Hereinafter, a winding ratio of the coils L1 to L4 (high frequency transformers) are supposed to be 1:1:1:1. However, this is a mere example and the winding ratio of the coil L1 to L4 may be different from 1:1:1:1.

<Time Period ST1>

The control unit 13 turns on the switching devices BL and YL and off the switching devices AL and XL. Accordingly, VT1 is equal to VE, VT2 is equal to −VE, VT3 is equal to VE, and VT4 is equal to −VE.

In this situation, a voltage of the terminal T1 from the terminal N2 (voltage [T1–N2]) is equal to 0, and a voltage of the terminal T2 from the terminal N2 (voltage [T2–N2]) is equal to 2VE. Further, a voltage of the terminal T3 from the terminal N3 (voltage [T3–N3]) is equal to =0, and a voltage of the terminal T4 from the terminal N3 (voltage [T4–N3]) is equal to 2VE. Therefore, a voltage of the terminal P3 from the terminal N3 (voltage [P3–N3]) is equal to VE.

<Time Period ST2>

The control unit 13 turns off the switching devices AL, BL, XL, and YL while turning off the switching devices UH and WH and on the switching devices UL and WL to allow the current IL to circulate. Thereby, resonance caused by an excitation current of the coil L1 and the capacitors CA and CB causes a gradual reversal of the polarity of the voltage VT1 from a positive state to a negative state and also causes a gradual reversal of the polarity of the voltage VT2 from a negative state to a positive state. Accordingly, soft switching can be realized. Hereinafter, the reversal time period means a period of time necessary for the polarities of the switching devices BL and YL and the polarities of the switching devices AL and XL to be switched from their positive states to their negative states or be switched from their negative states to their positive states.

<Time Period ST3>

The control unit 13 turns on the switching devices AL and XL while turning off the switching devices BL and YL. Thereby, VT2 is equal to VE and therefore VT1 is equal to −VE, VT3 is equal to −VE, and VT4 is equal to VE.

In this situation, the voltage [T1–N2] is equal to 2VE, the voltage [T2–N2] is equal to 0, the voltage [T3–N3] is equal to 2VE, and the voltage [T4–N3] is equal to 0.

<Time Period ST4>

Similarly to the time period ST2, the control unit 13 turns off the switching devices AL, BL, YL, and XL to reverse the polarities of the voltages VT1 to VT4.

After that, the converter units 51 and 52 repeat operations respectively associated with the time periods ST1, ST2, ST3, and ST4. Thus, the voltage [P3–N3] is kept equal to VE and then applied across the converter unit 7. Since the converter unit 7 is supplied with the constant voltage VE, it is not necessary for the converter unit 7 to have bidirectional switch configuration but it is enough for it to have an ordinary full bridge circuit.

Note that, the converter unit 7 is connected to the DC power supply 17 through the transformer 53. Therefore, the converter unit 7 can be considered to be directly connected to the DC power supply 17 via leakage inductance of the transformer 53. Due to this, ringing may occur in the power conversion system 1 in switching of the converter unit 7. To prevent this, the snubber circuit 60 is provided. When the polarity of the voltage [P3–N3] is reversed, a direction of a current flowing through the snubber circuit 60 is reversed, too. This means that it is seriously difficult to increase a capacitance of the capacitor 62. Consequently, to suppress such ringing is difficult while the polarity of the voltage [P3–N3] is reversed.

In contrast, the power conversion system 1 does not see reversal of the polarity of the voltage [P3–N3]. The capacitor 62 can have a larger capacitance than in the case where the reversal of the polarity of the voltage [P3–N3] occurs. Thus, the power conversion system 1 can reduce such ringing.

<Time Period ST5>

The control unit 13 turns on the switching devices UH and WH and off the switching devices UL and WL in a fixing time period in which VT1 is kept equal to VE. In this situation, the fixing time period can be considered as the circulation time period in which the current IL flows through a circulation path 71 (see FIG. 3). The circulation path 71 is a closed loop in the converter unit 7 and therefore transfer of power from the DC power supply 17 to the converter unit 7 is stopped. As a result, the converter unit 7 comes into a circulating mode and then a voltage Vo which is a voltage of the terminal U1 from the terminal W1 becomes equal to 0. In this case, Vout is higher than Vo and the current IL decreases.

<Time Period ST6>

The control unit 13 turns on the switching devices UH and WL and off the switching devices UL and WH in the fixing time period in which VT1 is kept equal to VE. In this situation, the fixing time period can be considered as the supply time period in which the current IL flows through a supply path 72 (see FIG. 3). The supply path 72 allows a current to flow through the secondary winding 532, thereby power transferred from the DC power supply 17 to the converter unit 7. As a result, the converter unit 7 comes into the supplying mode and then the voltage Vo is equal to VE. In this case, Vout is lower than Vo and the current IL increases.

<Time Period ST7>

The control unit 13 turns on the switching devices UL and WL and off the switching devices UH and WH in a fixing time period in which VT2 is kept equal to VE. Similarly to the time period ST5, the converter unit 7 comes into the circulating mode and then the voltage Vo is equal to 0. In this case, Vout is higher than Vo and the current IL decreases.

<Time Period ST8>

The control unit 13 turns on the switching devices UH and WL and off the switching devices UL and WH in the fixing time period in which VT2 is kept equal to VE. Similarly to the time period ST6, the converter unit 7 comes into the supplying mode and then the voltage Vo is equal to VE. In this case, Vout is lower than Vo and the current IL increases.

As described above, the converter unit 7 operates in the circulating mode and the supplying mode exclusively in the fixing time period in which VT1 is kept equal to VE or VT2 is kept equal to VE. Therefore, the control unit 13 can generate the desired voltage Vout by changing the ratio of the circulation time period and the supply time period by PWM controlling the converter unit 7.

<Complements>

When the half cycle of the AC voltage supplied to the primary winding 531 is denoted by "T", the time period in which Vo is equal to VE is denoted by "Ton", and an amount of increase in the current IL in the time period Ton is denoted by "ΔI20", ΔI20 can be given by the following formula.

$$\Delta I20 = (VE - Vout)/L \times Ton$$

When the time period in which Vo is equal to 0 is denoted by "Toff" (=T−Ton) and an amount of decrease in the current IL in the time period Toff is denoted by "ΔI20", ΔI20 can be given by the following formula.

$$\Delta I20 = Vout/L \times (T - Ton)$$

In a stable state, ΔI20 of the individual cases are equal to each other and the voltage Vout can be given by the following formula.

$$Vout = Ton/T \times VE = D \times VE$$

D is equal to Ton/T and represents a duty cycle. It is understood from the above formula that the voltage Vout is outputted as an AC voltage with a desired waveform due to PWM control changing the duty cycle D.

Figure 4:
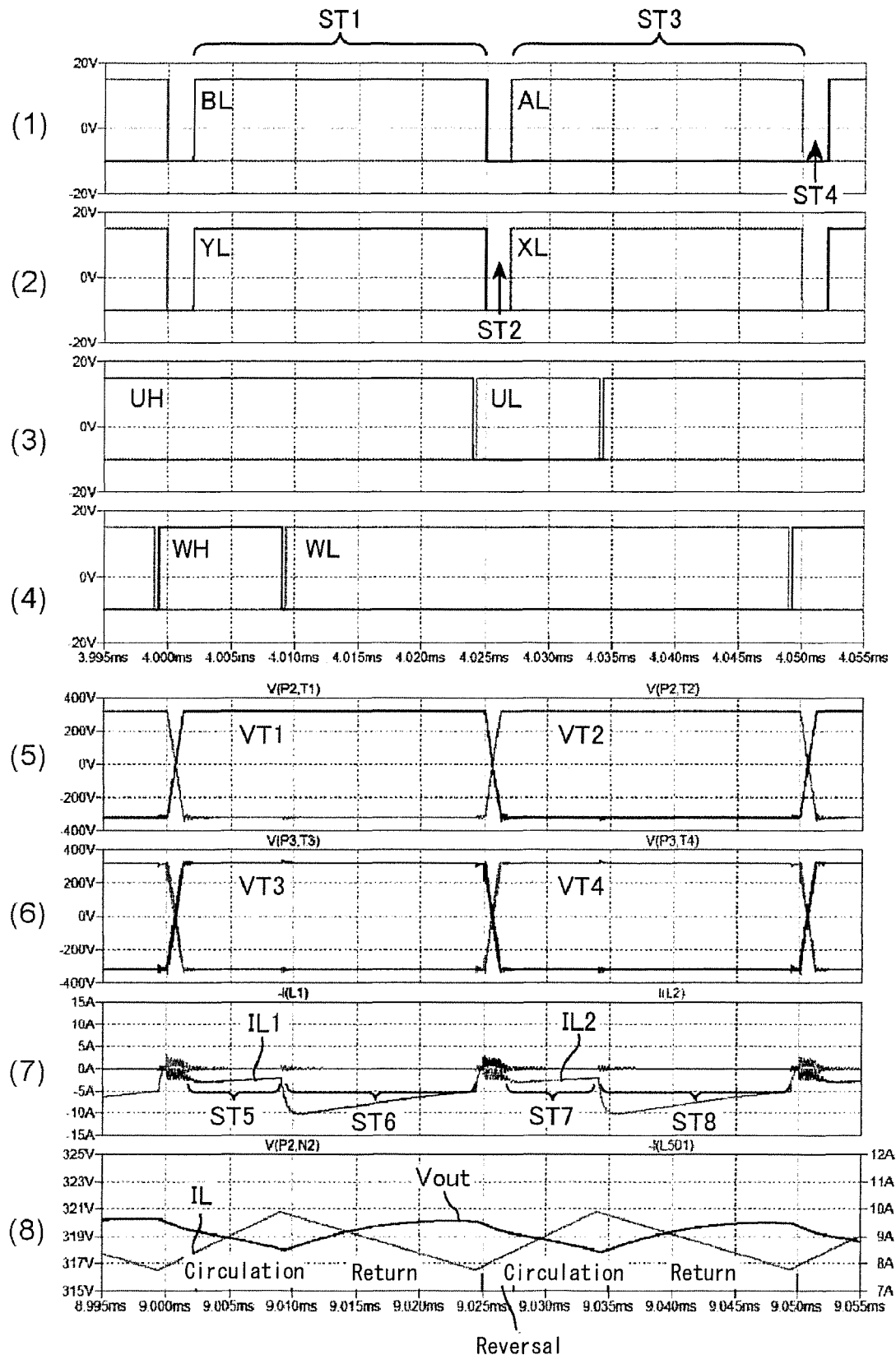
FIG. 4 is a waveform chart for illustration of operation of the power conversion system 1 in a converter mode.
Figure 5:
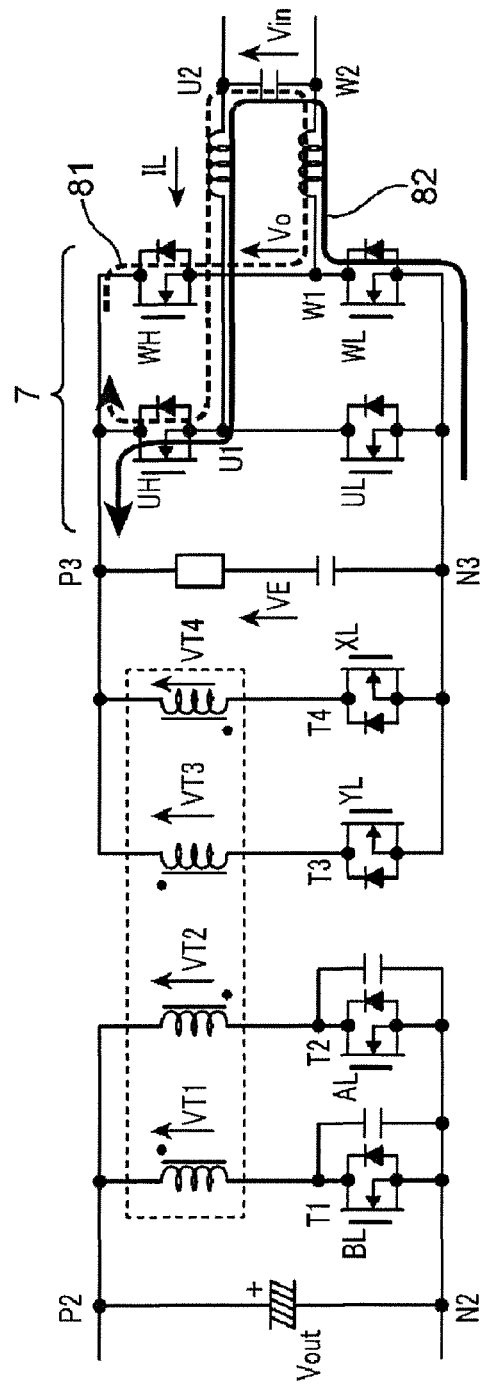
FIG. 5 is a diagram for illustration of a path of a current flowing through the converter unit 7.

Next, the converter mode is described. FIG. 4 is a waveform chart for illustration of operation of the power conversion system 1 in the converter mode. In this regard, as shown in FIG. 5, the description is made with a voltage between the terminal U2 and the terminal W2 represented by Vin and a voltage between the terminal P2 and the terminal N2 represented by Vout. FIG. 5 is a diagram for illustration of paths of current flowing through the converter unit 7.

(1) to (8) of FIG. 4 correspond to (1) to (8) of FIG. 2, respectively. Further in FIG. 5 a direction of the current IL is opposite to that in FIG. 3.

<Time Period ST1>

The control unit 13 turns on the switching devices BL and YL and off the switching devices AL and XL. Accordingly, VT1 is equal to Vout, VT2 is equal to −Vout, VT3 is equal to Vout, and VT4 is equal to −Vout.

In this situation, the voltage [T1−N2] is equal to 0 and the voltage [T2−N2] is equal to 2Vout. Additionally, the voltage [T3−N3] is equal to 0 and the voltage [T4−N3] is equal to 2Vout. Therefore, the voltage [P3−N3] is equal to Vout.

<Time Period ST2>

The control unit 13 turns off the switching devices AL, BL, XL, and YL while turning off the switching devices UH and WH and on the switching devices UL and WL to allow the current IL to circulate. Accordingly, the reversal time period is realized. The polarity of the voltage VT1 is gradually reversed from a positive state to a negative state and also the polarity of the voltage VT2 is gradually reversed from a negative state to a positive state. Accordingly, soft switching can be realized.

<Time Period ST3>

The control unit 13 turns on the switching devices AL and XL while turning off the switching devices BL and YL. Thereby, VT2 is equal to Vout and therefore VT1 is equal to −Vout, VT3 is equal to −Vout, and VT4 is equal to Vout.

In this situation, the voltage [T1−N2] is equal to 2Vout, the voltage [T2−N2] is equal to 0, the voltage [T3−N3] is equal to 2Vout, and the voltage [T4−N3] is equal to 0.

<Time Period ST4>

Similarly to the time period ST2, the control unit 13 turns off the switching devices AL, BL, YL, and XL to reverse the polarities of the voltages VT1 to VT4. After that, the control unit 13 repeats operations respectively associated with the time periods ST1 to ST4. Thus, the voltage [P3−N3] is kept equal to VE (Vout).

<Time Period ST5>

The control unit 13 turns on the switching devices UH and WH and off the switching devices UL and WL in a fixing time period in which VT1 is kept equal to Vout. In this situation, the fixing time period can be considered as the circulation time period in which the current IL flows through a circulation path 81 (see FIG. 5). The circulation path 81 is same as the circulation path 71 except a direction thereof is opposite to that of the circulation path 71. As a result, the converter unit 7 comes into the circulating mode and then the voltage Vo becomes equal to 0. In this case, Vin is higher than Vo and the current IL increases.

<Time Period ST6>

The control unit 13 turns on the switching devices UH and WL and off the switching devices UL and WH in the fixing time period in which VT1 is kept equal to Vout. In this situation, the fixing time period can be considered as the return time period in which the current IL flows through a return path 82 (see FIG. 5). The return path 82 and the supply path 72 have opposite directions. As a result, the converter unit 7 comes into a returning mode and then the voltage Vo is equal to Vout. In this case, Vin is lower than Vo and the current IL decreases.

<Time Period ST7>

The control unit 13 turns on the switching devices UL and WL and off the switching devices UH and WH in a fixing time period in which VT2 is kept equal to Vout. Similarly to the time period ST5, the converter unit 7 comes into the circulating mode and then the voltage Vo is equal to 0. In this case, Vin is higher than Vo and the current IL increases.

<Time Period ST8>

The control unit 13 turns on the switching devices UH and WL and off the switching devices UL and WH in the fixing time period in which VT2 is kept equal to Vout. Similarly to the time period ST6, the converter unit 7 comes into the returning mode and then the voltage Vo is equal to Vout. In this case, Vin is lower than Vo and the current IL decreases.

As described above, the converter unit 7 operates in the circulating mode and the returning mode exclusively in the fixing time period in which VT1 is kept equal to Vout or VT2 is kept equal to Vout. Therefore, the control unit 13 can generate the desired voltage Vout by changing the ratio of the circulation time period and the return time period by PWM controlling the converter unit 7.

<Complements>

When the half cycle of the AC voltage supplied to the primary winding 531 is denoted by "T", the time period in which Vo is equal to 0 is denoted by "Ton", and an amount of increase in the current IL in the time period Ton is denoted by "ΔI20", ΔI20 can be given by the following formula.

$$\Delta I20 = Vin/L \times Ton$$

When the time period in which Vo is equal to Vout is denoted by "Toff" (=T−Ton) and an amount of decrease in the current IL in the time period Toff is denoted by "ΔI20", ΔI20 can be given by the following formula.

$$\Delta I20 = (Vout - Vin)/L \times (T - Ton)$$

In a stable state, ΔI20 of the individual cases are equal to each other and the voltage Vout can be given by the following formula.

$$Vout = T/(T - Ton) \times Vin = 1/(1-D) \times Vin$$

When (1−D) is denoted by Doff, the above formula can be rewritten in the following formula.

$$Vout = 1/Doff \times Vin$$

It is understood from the above formula that the voltage Vin can be converted into a DC voltage by PWM control changing Doff.

Next, switching operation of the power conversion system 1 in the inverter mode is described in detail.

Figure 6:
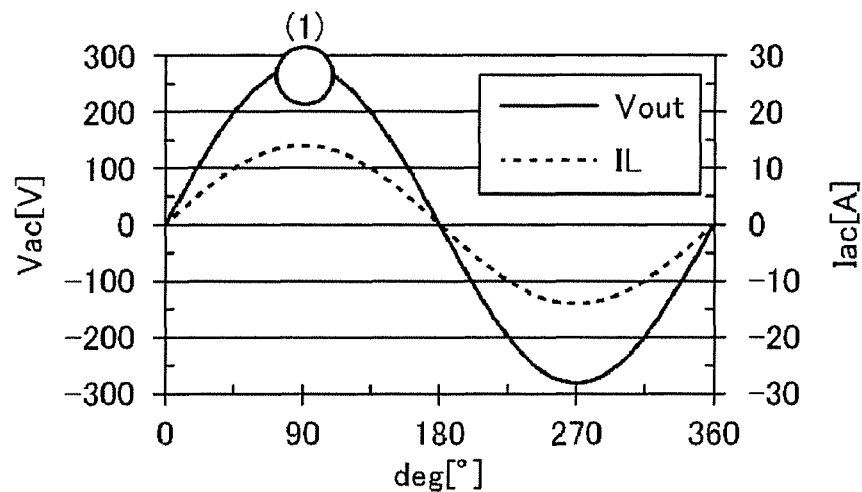
FIG. 6 is a waveform chart for illustration of operation of the power conversion system 1 in inverter mode (1).
Figure 6:
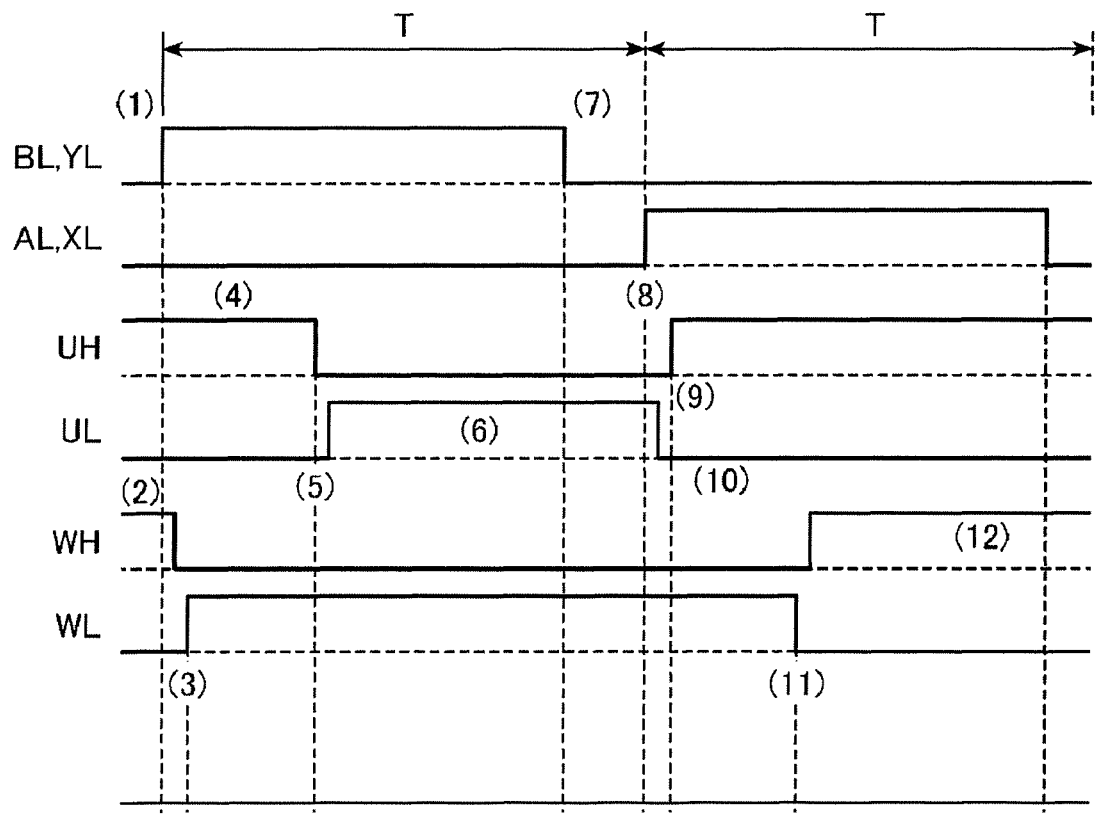
Figure 9:
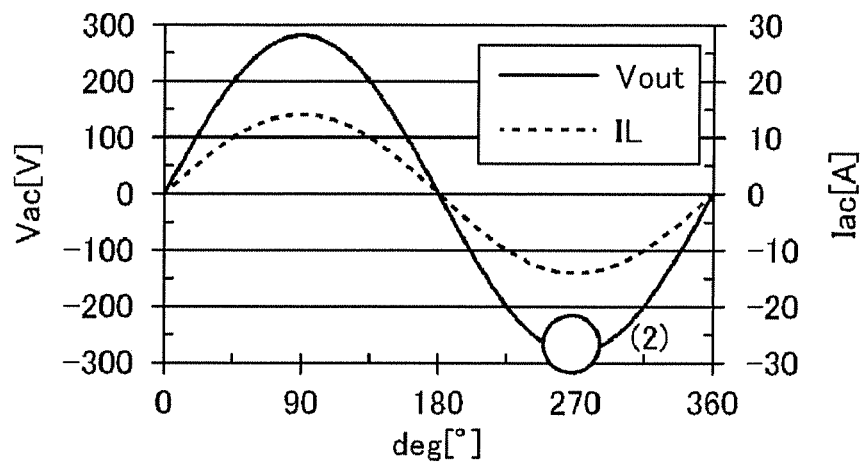
FIG. 9 is a waveform chart for illustration of operation of the power conversion system 1 in inverter mode (2).
Figure 9:
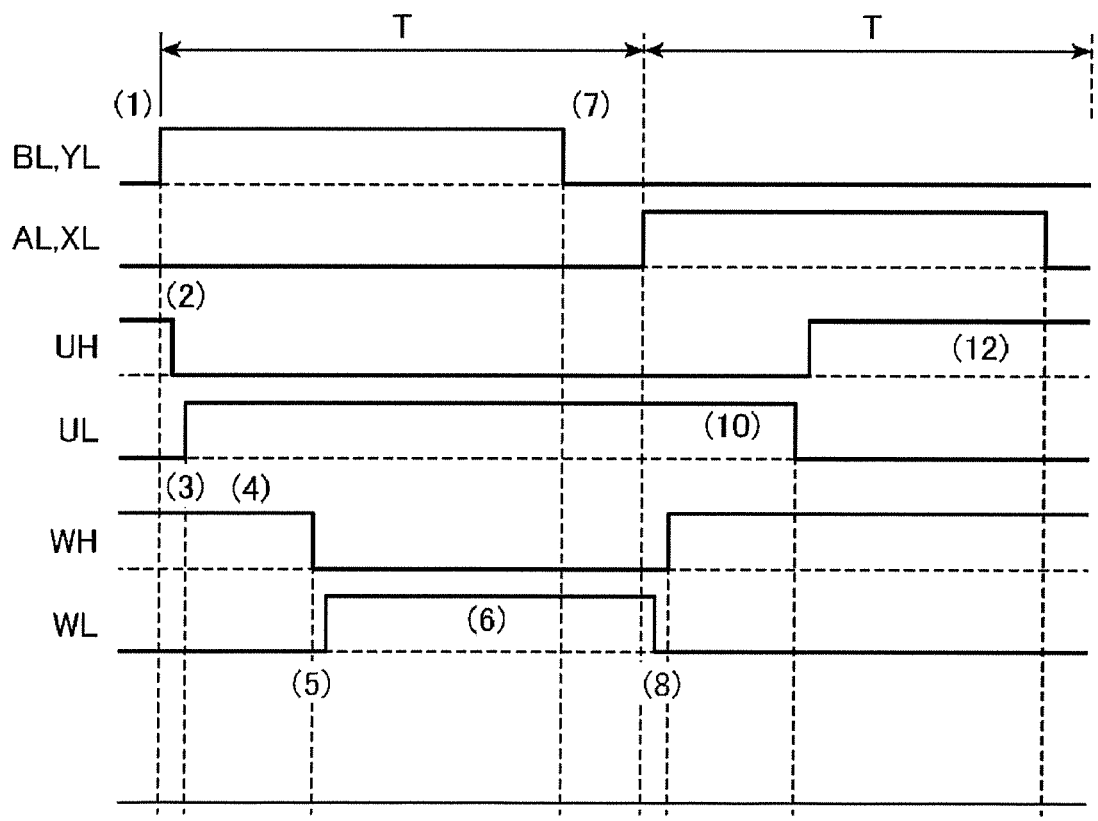

The inverter mode includes an inverter mode (1) in which the voltage Vout is positive and the current IL is positive as shown in FIG. 6, and an inverter mode (2) in which the voltage Vout is negative and the current IL is negative as shown in FIG. 9.

<Inverter Mode (1)>

FIG. 6 is a waveform chart for illustration of operation of the power conversion system 1 in the inverter mode (1). The upper side of FIG. 6 is a waveform chart for the voltage Vout and the current IL. The lower side of FIG. 6 is a waveform chart for on and off states of the individual switching devices BL, YL, AL, XL, UH, UL, WH, and WL in one period (2T) of the AC voltage supplied to the primary winding 531.

Figure 7:
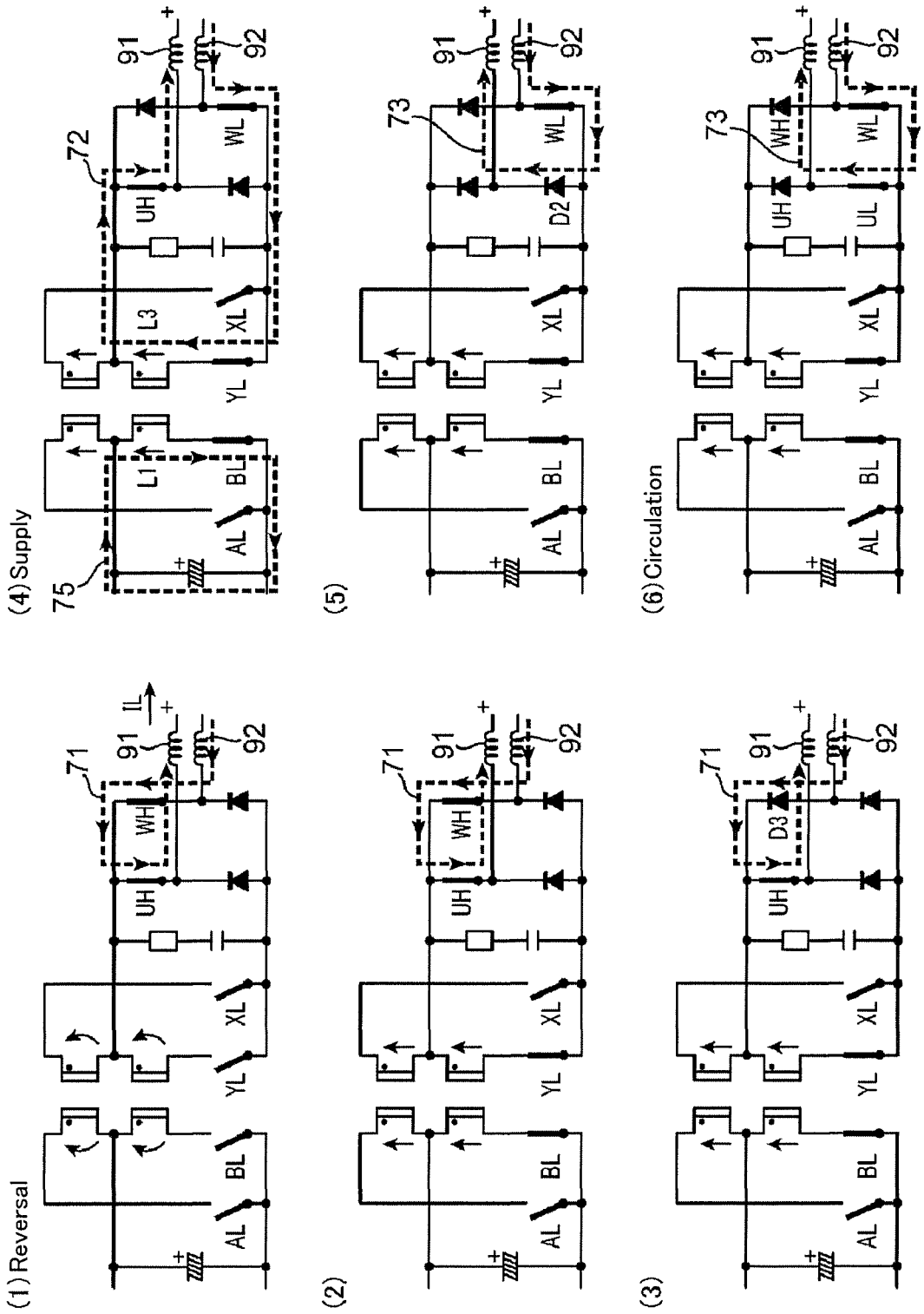
FIG. 7 is a diagram for illustration of states of switching devices in respective time periods in FIG. 6.
Figure 8:
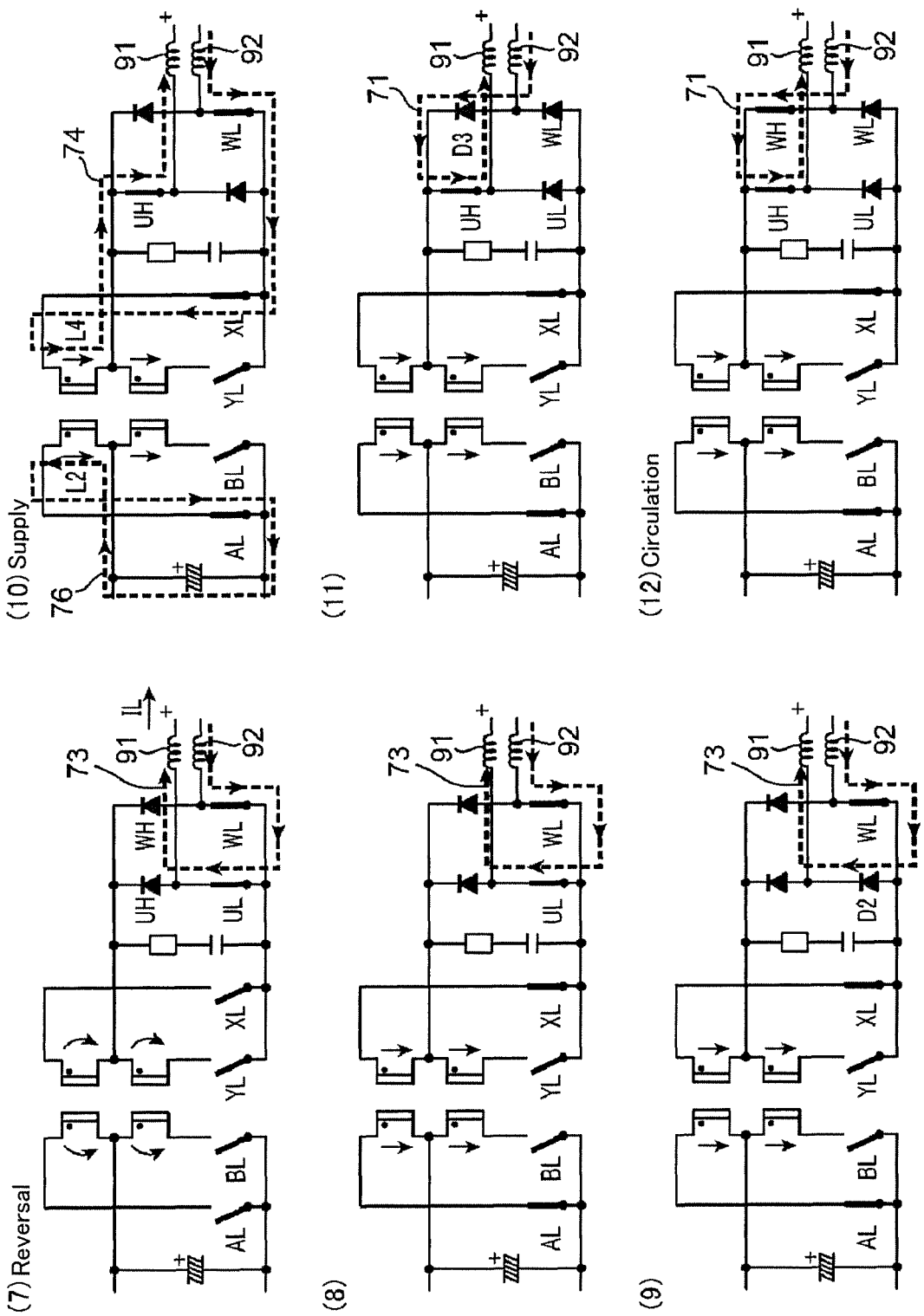
FIG. 8 is a diagram for illustration of states of the switching devices in respective time periods in FIG. 6.

FIG. 7 and FIG. 8 are diagrams for illustration of states of switching devices in individual time periods in FIG. 6. Note that, in FIG. 7 and FIG. 8, the voltage Vout is positive and therefore the coil 91 has a positive potential (+). Further, in the inverter mode, the current IL flows into a plus "+" side.

<Time Period (1)>

The time period (1) is the reversal time period. The control unit 13 turns off the switching devices AL, BL, YL, and XL, turns on the switching devices UH and WH, and turns off the switching devices UL and WL. In this situation, the current IL flows through the circulation path 71 starting from the coil 92 and arriving at the coil 91 by passing through the switching device WH and the switching device UH in this order. Consequently, transfer of power between a primary side and a secondary side of the transformer 53 is blocked.

<Time Period (2)>

The time period (2) is a transitional time period from the reversal time period to the supply time period. The control unit 13 turns on the switching devices BL and YL. In this situation, the converter unit 7 has the same state as the time period (1) and therefore the current IL flows through the circulation path 71.

<Time Period (3)>

The time period (3) is a transitional time period from the reversal time period to the supply time period. The control unit 13 turns off the switching device WH. Even when the switching device WH is turned off, the current IL flows through the circulation path 71 by way of the diode D3 connected to the switching device WH.

<Time Period (4)>

The time period (4) is the supply time period. The control unit 13 turns on the switching devices UH and WL and off the switching devices UL and WH. In this situation, the converter unit 7 comes into the supplying mode and the current IL flows through the supply path 72 starting from the coil 92 and arriving at the coil 91 by passing through the switching device WL, the switching device YL, the coil L3, and the switching device UH in this order. Further, a current on the primary side of the transformer 53 flows through a path 75 starting from the coil L1 and arriving at the DC power supply 17 by passing through the switching device BL. Consequently, transfer of power between the primary side and the secondary side of the transformer 53 is enabled.

<Time Period (5)>

The time period (5) is a transitional time period from the supply time period to the circulation time period. The control unit 13 turns off the switching device UH. In this situation, the current IL flows through a circulation path 73 starting from the coil 92 and arriving at the coil 91 by passing through the switching device WL and the diode D2 in this order. Further, the primary side and the secondary side of the transformer 53 are electrically separated and a current therefore does not flow on the primary side of the transformer 53.

<Time Period (6)>

The time period (6) is the circulation time period. The control unit 13 turns on the switching device UL. In this situation, the current IL flows through the circulation path 73. Consequently, transfer of power between the primary side and the secondary side of the transformer 53 is blocked.

<Time Period (7)>

The time period (7) is the reversal time period. The control unit 13 turns off the switching devices AL, BL, YL, and XL. In this situation, the current IL flows through the circulation path 73. Consequently, transfer of power between the primary side and the secondary side of the transformer 53 is blocked.

<Time Period (8)>

The time period (8) is a transitional time period from the reversal time period to the supply time period. The control unit 13 turns on the switching devices AL and XL. In this situation, the converter unit 7 has the same state as the time period (7) and therefore the current IL flows through the circulation path 73.

<Time Period (9)>

The time period (9) is a transitional time period from the reversal time period to the supply time period. The control unit 13 turns off the switching device UL. Even when the switching device UL is turned off, the current IL flows through the circulation path 73 by way of the diode D2 connected to the switching device UL.

<Time Period (10)>

The time period (10) is the supply time period. The control unit 13 turns on the switching devices UH and WL and off the switching devices UL and WH. In this situation, the converter unit 7 comes into the supplying mode and the current IL flows through the supply path 74 starting from the coil 92 and arriving at the coil 91 by passing through the switching device WL, the switching device XL, the coil L4, and the switching device UH in this order. Further, a current on the primary side of the transformer 53 flows through a path 76 starting from the coil L2 and arriving at the DC power supply 17 by passing through the switching device AL. Consequently, transfer of power between the primary side and the secondary side of the transformer 53 is enabled.

<Time Period (11)>

The time period (11) is a transitional time period from the supply time period to the circulation time period. The control unit 13 turns off the switching device WL. In this situation, the current IL flows through the circulation path 71 passing through the diode D3 connected to the switching device WH. Consequently, transfer of power between the primary side and the secondary side of the transformer 53 is blocked.

<Time Period (12)>

The time period (12) is the circulation time period. The control unit 13 turns on the switching device WH. In this situation, the current IL flows through the circulation path 71. Consequently, transfer of power between the primary side and the secondary side of the transformer 53 is blocked.

<Inverter Mode (2)>

Figure 10:
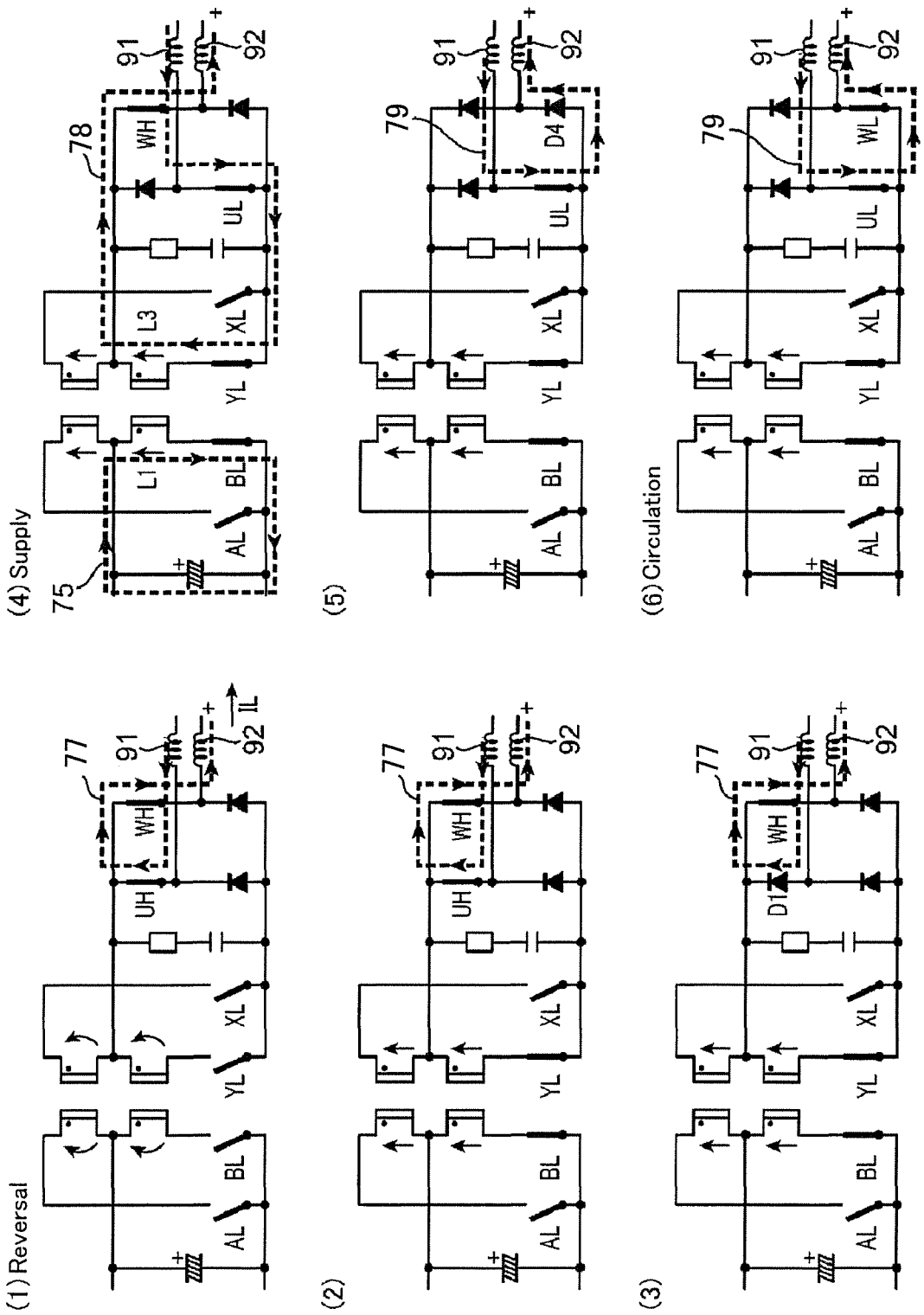
FIG. 10 is a diagram for illustration of states of the switching devices in respective time periods in FIG. 9.
Figure 11:
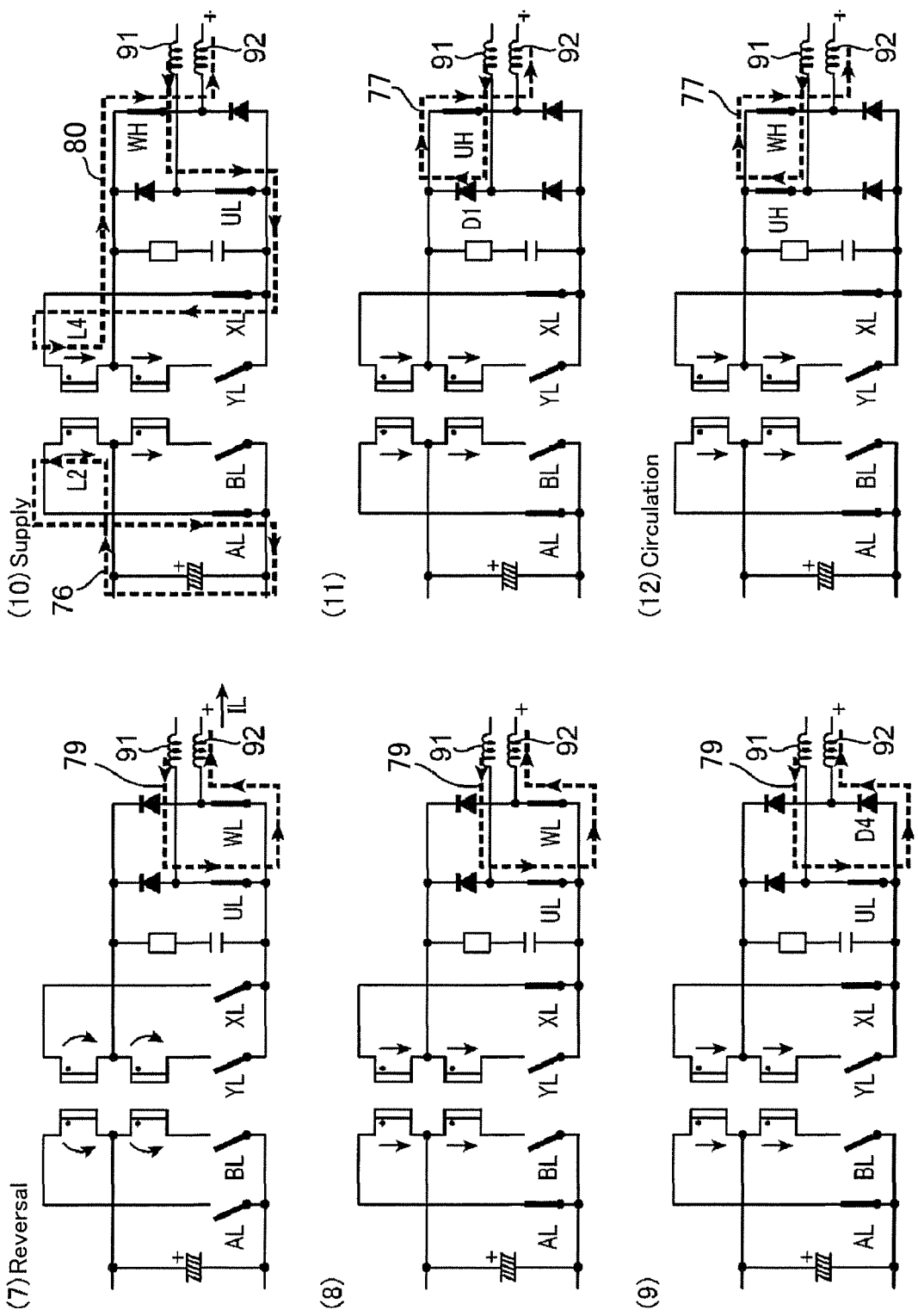
FIG. 11 is a diagram for illustration of states of the switching devices in respective time periods in FIG. 9.

FIG. 9 is a waveform chart of illustration for operation of the power conversion system 1 in the inverter mode (2). The upper side of FIG. 9 is a waveform chart for the voltage Vout and the current IL. The lower side of FIG. 9 is a waveform chart for on and off states of the individual switching devices BL, YL, AL, XL, UH, UL, WH, and WL in one period (2T) of the AC voltage supplied to the primary winding 531. FIG. 10 and FIG. 11 are diagrams for illustration of states of switching devices in individual time periods in FIG. 9. Note that, in FIG. 10 and FIG. 11, the voltage Vout is negative and therefore the coil 92 has a positive potential (+). Further, in the inverter mode, the current IL flows into the plus "+" side.

<Time Period (1)>

The time period (1) is the reversal time period. The control unit 13 turns off the switching devices AL, BL, YL, and XL, turns on the switching devices UH and WH, and turns off the switching devices UL and WL. In this situation, the current IL flows through a circulation path 77 starting from the coil 91 and arriving at the coil 92 by passing through the switching device UH and the switching device WH in this order. Consequently, transfer of power between the primary side and the secondary side of the transformer 53 is blocked.

<Time Period (2)>

The time period (2) is a transitional time period from the reversal time period to the supply time period. The control unit 13 turns on the switching devices BL and YL. In this situation, the converter unit 7 has the same state as the time period (1) and therefore the current IL flows through the circulation path 77.

<Time Period (3)>

The time period (3) is a transitional time period from the reversal time period to the supply time period. The control unit 13 turns off the switching device UH. Even when the switching device UH is turned off, the current IL flows through the circulation path 77 by way of the diode D1 connected to the switching device UH.

<Time Period (4)>

The time period (4) is the supply time period. The control unit 13 turns on the switching devices UL and WH and off the switching devices UH and WL. In this situation, the converter unit 7 comes into the supplying mode and the current IL flows through a supply path 78 starting from the coil 91 and arriving at the coil 92 by passing through the switching device UL, the switching device YL, the coil L3, and the switching device WH in this order. Further, a current on the primary side of the transformer 53 flows through the path 75 starting from the coil L1 and arriving at the DC power supply 17 by passing through the switching device BL. Consequently, transfer of power between the primary side and the secondary side of the transformer 53 is enabled.

<Time Period (5)>

The time period (5) is a transitional time period from the supply time period to the circulation time period. The control unit 13 turns off the switching device WH. In this situation, the current IL flows through a circulation path 79 starting from the coil 91 and arriving at the coil 92 by passing through the switching device UL and the diode D4 in this order. Further, the primary side and the secondary side of the transformer 53 are electrically separated and a current therefore does not flow on the primary side of the transformer 53.

<Time Period (6)>

The time period (6) is the circulation time period. The control unit 13 turns on the switching device WL. In this situation, the current IL flows through the circulation path 79. Consequently, transfer of power between the primary side and the secondary side of the transformer 53 is blocked.

<Time Period (7)>

The time period (7) is the reversal time period. The control unit 13 turns off the switching devices AL, BL, YL, and XL. In this situation, the current IL flows through the circulation path 79. Consequently, transfer of power between the primary side and the secondary side of the transformer 53 is blocked.

<Time Period (8)>

The time period (8) is a transitional time period from the reversal time period to the supply time period. The control unit 13 turns on the switching devices AL and XL. In this situation, the converter unit 7 has the same state as the time period (7) and therefore the current IL flows through the circulation path 79.

<Time Period (9)>

The time period (9) is a transitional time period from the reversal time period to the supply time period. The control unit 13 turns off the switching device WL. Even when the switching device WL is turned off, the current IL flows through the circulation path 79 by way of the diode D4 connected to the switching device WL.

<Time Period (10)>

The time period (10) is the supply time period. The control unit 13 turns on the switching devices UL and WH and off the switching devices UH and WL. In this situation, the converter unit 7 comes into the supplying mode and the current IL flows through the supply path 80 starting from the coil 91 and arriving at the coil 92 by passing through the switching device UL, the switching device XL, the coil L4, and the switching device WH in this order. Further, a current on the primary side of the transformer 53 flows through the path 76 starting from the coil L2 and arriving at the DC power supply 17 by passing through the switching device AL. Consequently, transfer of power between the primary side and the secondary side of the transformer 53 is enabled.

<Time Period (11)>

The time period (11) is a transitional time period from the supply time period to the circulation time period. The control unit 13 turns off the switching device UL. In this situation, the current IL flows through the circulation path 77 passing through the diode D1 connected to the switching device UH. Consequently, transfer of power between the primary side and the secondary side of the transformer 53 is blocked.

<Time Period (12)>

The time period (12) is the circulation time period. The control unit 13 turns on the switching device UH. In this situation, the current IL flows through the circulation path 77. Consequently, transfer of power between the primary side and the secondary side of the transformer 53 is blocked.

Figure 15:
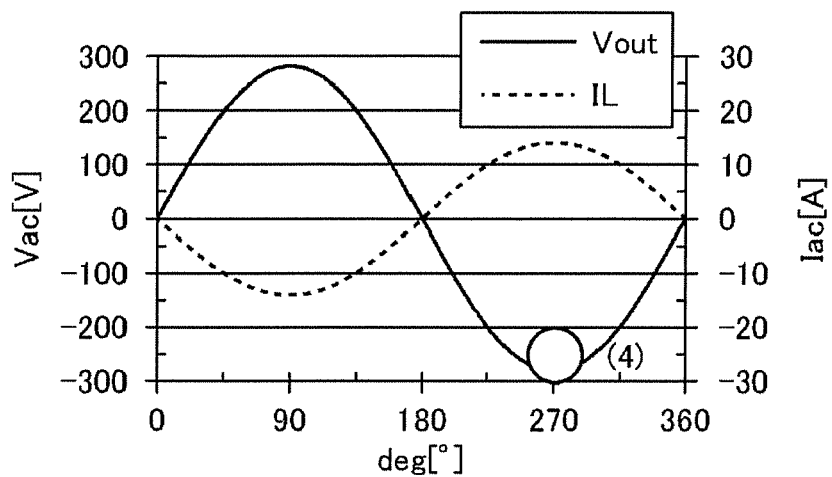
FIG. 15 is a waveform chart for illustration of operation of the power conversion system 1 in converter mode (4).
Figure 15:
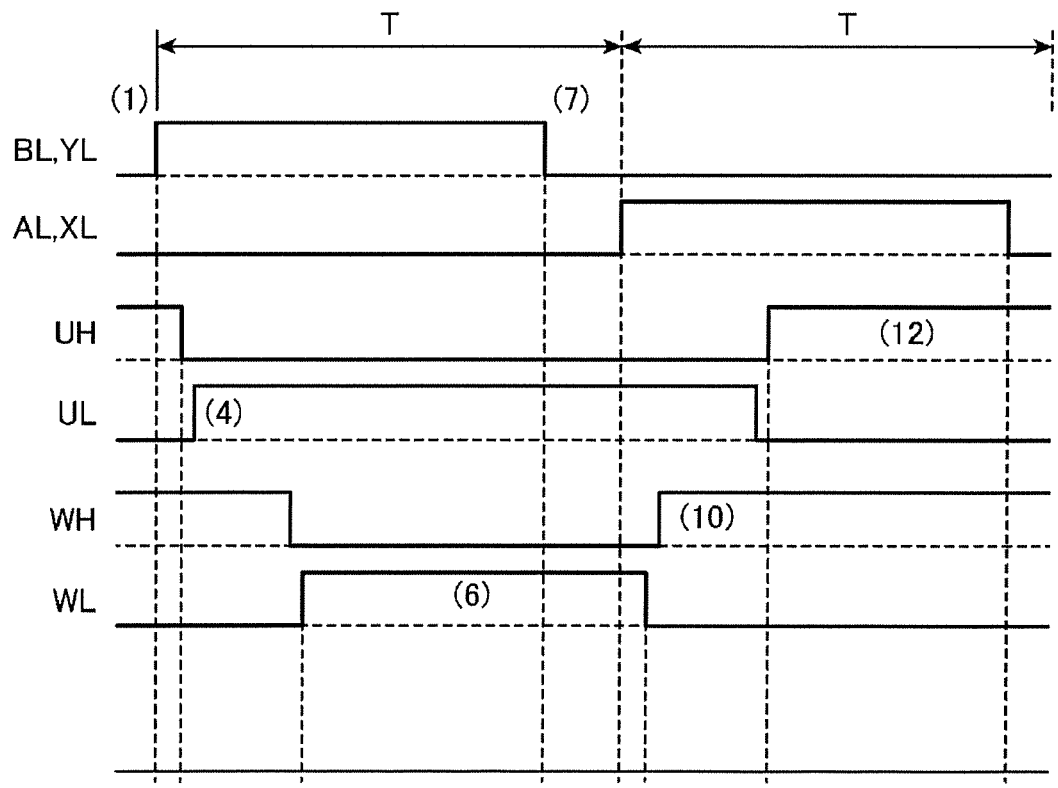

Next, switching operation of the power conversion system 1 in the converter mode is described in detail. The converter mode includes a converter mode (3) in which the voltage Vout is positive and the current IL is negative as shown in FIG. 12, and a converter mode (4) in which the voltage Vout is negative and the current IL is positive as shown in FIG. 15.

<Converter Mode (3)>

Figure 12:
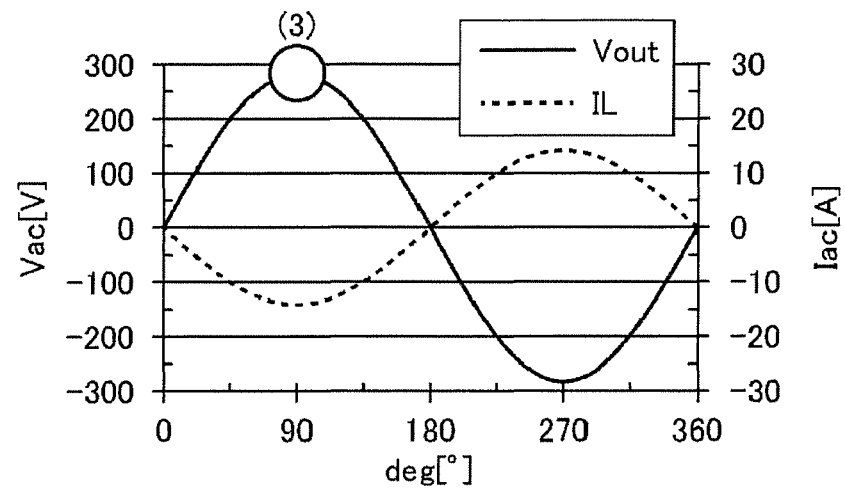
FIG. 12 is a waveform chart for illustration of operation of the power conversion system 1 in converter mode (3).
Figure 12:
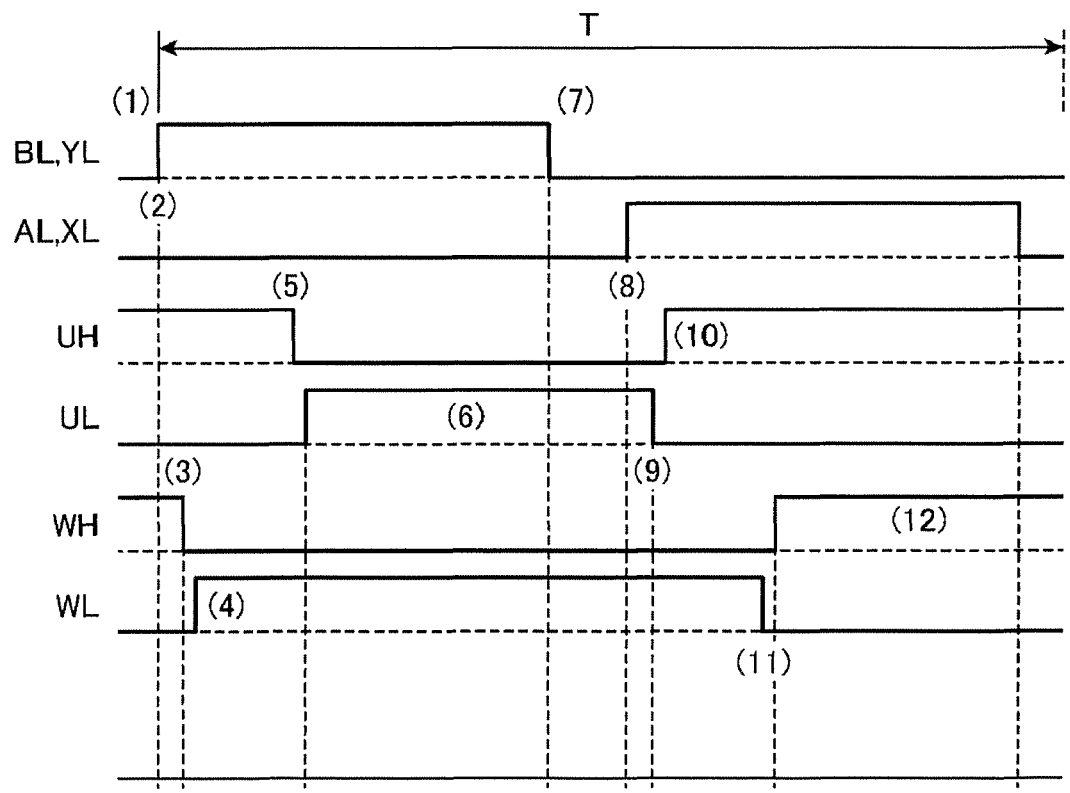
Figure 13:
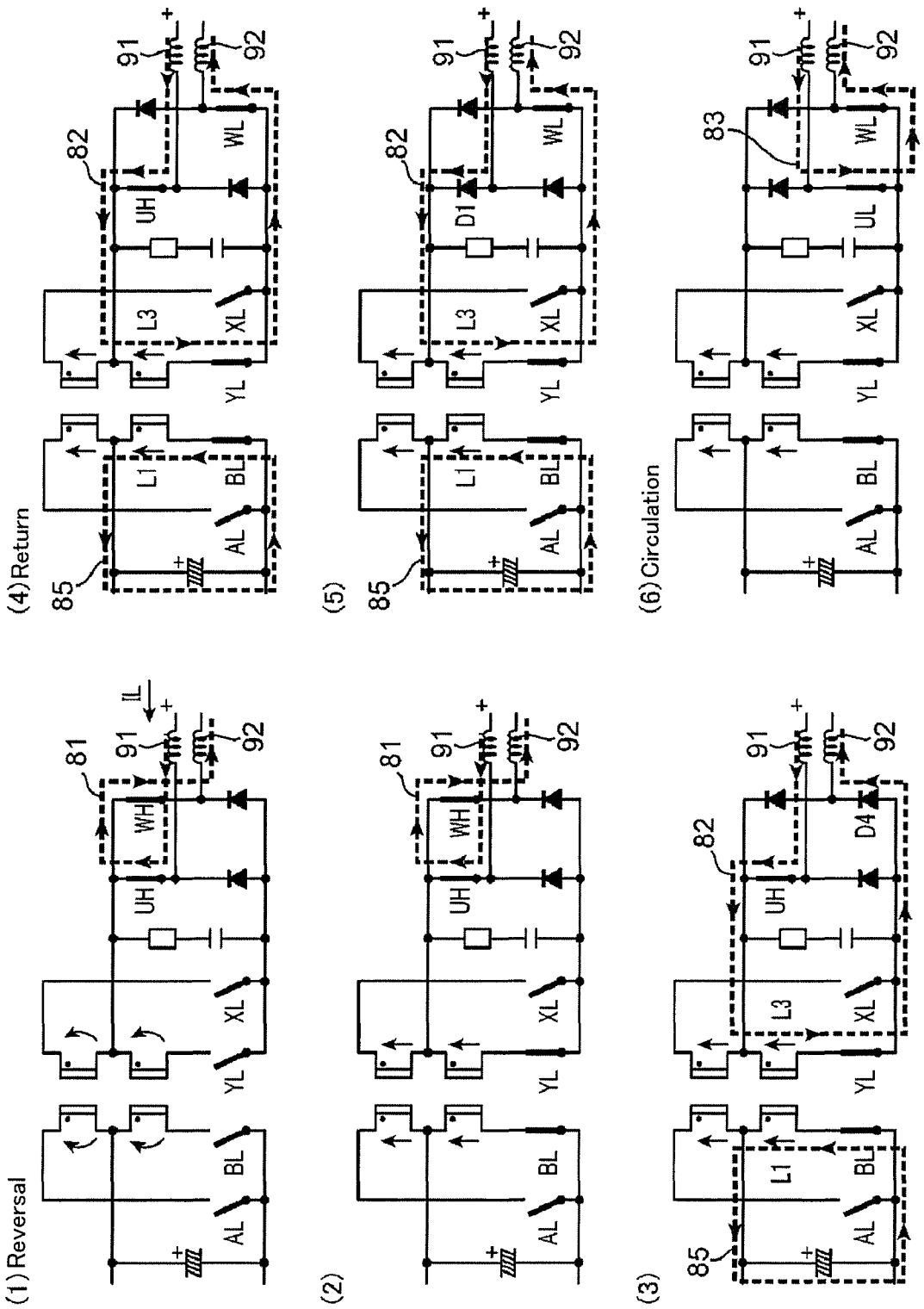
FIG. 13 is a diagram for illustration of states of the switching devices in respective time periods in FIG. 12.
Figure 14:
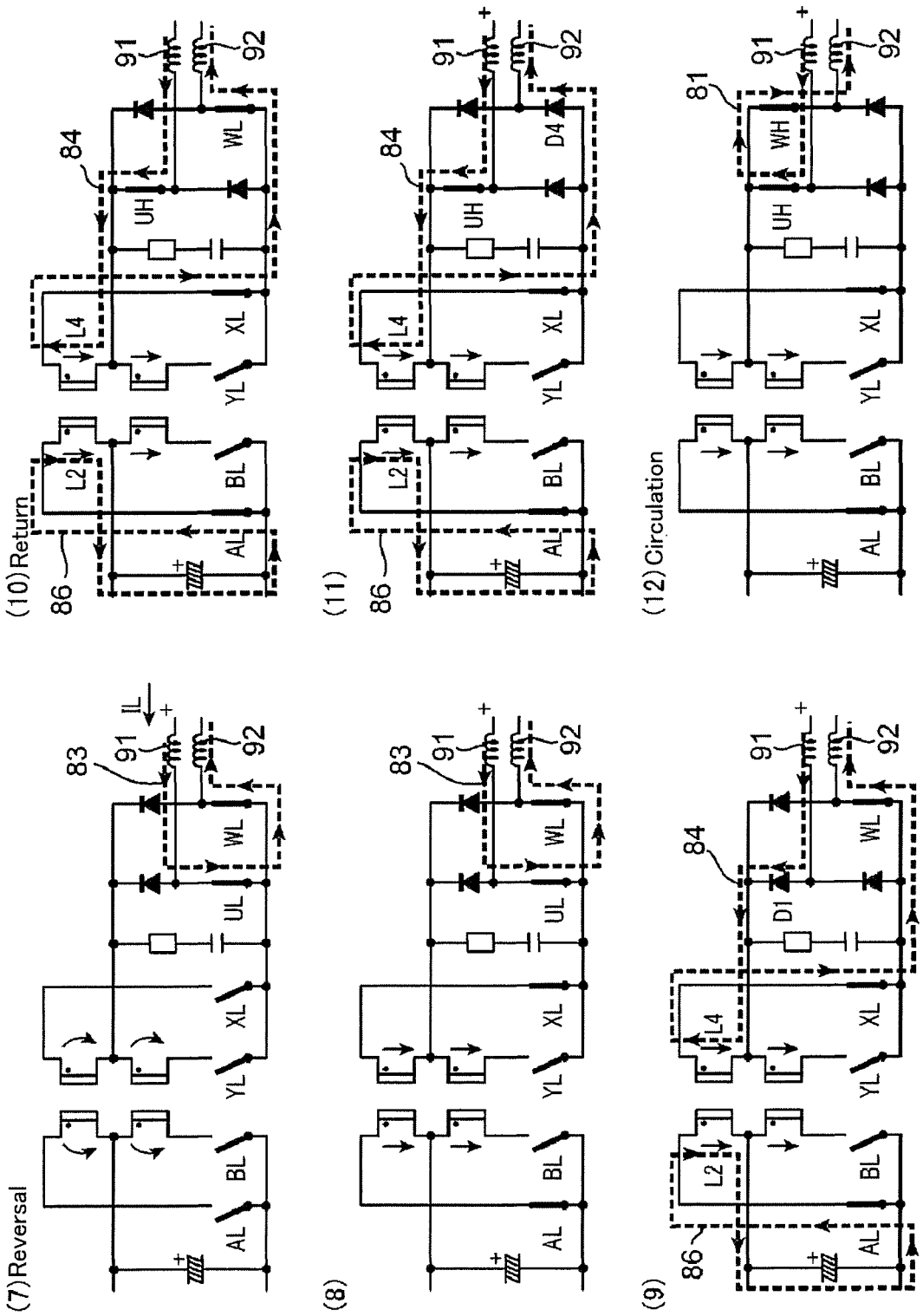
FIG. 14 is a diagram for illustration of states of the switching devices in respective time periods in FIG. 12.

FIG. 12 is a waveform chart for illustration of operation of the power conversion system 1 in the converter mode (3). The upper side of FIG. 12 is a waveform chart for the voltage Vout and the current IL. The lower side of FIG. 12 is a waveform chart for on and off states of the individual switching devices BL, YL, AL, XL, UH, UL, WH, and WL in one period (2T) of the AC voltage supplied to the primary winding 531. FIG. 13 and FIG. 14 are diagrams for illustration of states of switching devices in individual time periods in FIG. 12. Note that, in FIG. 13 and FIG. 14, the voltage Vout is positive and therefore the coil 91 has a positive potential (+). Further, in the converter mode, the current IL flows out from the plus "+" side.

<Time Period (1)>

The time period (1) is the reversal time period. The control unit 13 turns off the switching devices AL, BL, YL, and XL, turns on the switching devices UH and WH, and turns off the switching devices UL and WL. In this situation, the current IL flows through the circulation path 81 starting from the coil 91 and arriving at the coil 92 by passing through the switching device UH and the switching device WH in this order. Consequently, transfer of power between the primary side and the secondary side of the transformer 53 is blocked. The circulation path 81 and the circulation path 71 shown in FIG. 7 and FIG. 8 are same except they have opposite directions.

<Time Period (2)>

The time period (2) is a transitional time period from the reversal time period to the return time period. The control unit 13 turns on the switching devices BL and YL. In this situation, the converter unit 7 has the same state as the time period (1) and therefore the current IL flows through the circulation path 81.

<Time Period (3)>

The time period (3) is a transitional time period from the reversal time period to the return time period. The control unit 13 turns off the switching device WH. In this situation, the converter unit 7 starts the returning mode and therefore the current IL flows through the return path 82 starting from the coil 91 and arriving at the coil 92 by passing through the switching device UH, the coil L3, the switching device YL, and the diode D4 in this order. Further, a current on the primary side of the transformer 53 flows through a path 85 starting from the coil L1 and arriving at the DC power supply 17 by passing through the switching device BL. Consequently, transfer of power between the primary side and the secondary side of the transformer 53 is enabled.

<Time Period (4)>

The time period (4) is the return time period. The control unit 13 turns on the switching devices UH and WL and off the switching devices UL and WH. In this situation, the converter unit 7 comes into the returning mode and therefore the current IL flows through the return path 82 starting from the coil 91 and arriving at the coil 92 by passing through the switching device UH, the coil L3, the switching device YL, and the switching device WL in this order. Further, a current on the primary side of the transformer 53 flows through the path 85. Consequently, transfer of power between the primary side and the secondary side of the transformer 53 is enabled.

<Time Period (5)>

The time period (5) is a transitional time period from the return time period to the circulation time period. The control unit 13 turns off the switching device UH. In this situation, the converter unit 7 maintains the returning mode and therefore the current IL flows through the return path 82 starting from the coil 91 and arriving at the coil 92 by passing through the diode D1, the coil L3, the switching device YL, and the switching device WL in this order. Further, a current on the primary side of the transformer 53 flows through the path 85. Consequently, transfer of power between the primary side and the secondary side of the transformer 53 is enabled.

<Time Period (6)>

The time period (6) is the circulation time period. The control unit 13 turns on the switching device UL. In this situation, the current IL flows through a circulation path 83 starting from the coil 91 and arriving at the coil 92 by passing through the switching device UL and the switching device WL in this order. Consequently, transfer of power between the primary side and the secondary side of the transformer 53 is blocked. The circulation path 83 and the circulation path 73 are same except they have opposite directions.

<Time Period (7)>

The time period (7) is the reversal time period. The control unit 13 turns off the switching devices AL, BL, YL, and XL. In this situation, the current IL flows through the circulation path 83. Consequently, transfer of power between the primary side and the secondary side of the transformer 53 is blocked.

<Time Period (8)>

The time period (8) is a transitional time period from the reversal time period to the return time period. The control unit 13 turns on the switching devices AL and XL. In this situation, the converter unit 7 has the same state as the time period (7) and therefore the current IL flows through the circulation path 83.

<Time Period (9)>

The time period (9) is a transitional time period from the reversal time period to the return time period. The control unit 13 turns off the switching device UL. In this situation, the converter unit 7 comes into the returning mode and therefore the current IL flows through a return path 84 starting from the coil 91 and arriving at the coil 92 by passing through the diode D1, the coil L4, the switching device XL, and the switching device WL in this order. Further, a current on the primary side of the transformer 53 flows through a path 86 starting from the switching device AL and arriving at the DC power supply 17 by passing through the coil L2. Consequently, transfer of power between the primary side and the secondary side of the transformer 53 is enabled.

<Time Period (10)>

The time period (10) is the return time period. The control unit 13 turns on the switching devices UH and WL and off the switching devices UL and WH. In this situation, the converter unit 7 comes into the returning mode and therefore the current IL flows through the return path 84 starting from the coil 91 and arriving at the coil 92 by passing through the switching device UH, the coil L4, the switching device XL, and the switching device WL in this order. Further, a current on the primary side of the transformer 53 flows through the path 86. Consequently, transfer of power between the primary side and the secondary side of the transformer 53 is enabled.

<Time Period (11)>

The time period (11) is a transitional time period from the return time period to the circulation time period. The control unit 13 turns off the switching device WL. In this situation, the current IL flows through the return path 84 starting from the coil 91 and arriving at the coil 92 by passing through the switching device UH, the coil L4, the switching device XL, and the diode D4 in this order. Further, a current on the primary side of the transformer 53 flows through the path 86. Consequently, transfer of power between the primary side and the secondary side of the transformer 53 is enabled.

<Time Period (12)>

The time period (12) is the circulation time period. The control unit 13 turns on the switching device WH. In this situation, the current IL flows through the circulation path 81. Consequently, transfer of power between the primary side and the secondary side of the transformer 53 is blocked.

<Converter Mode (4)>

Figure 16:
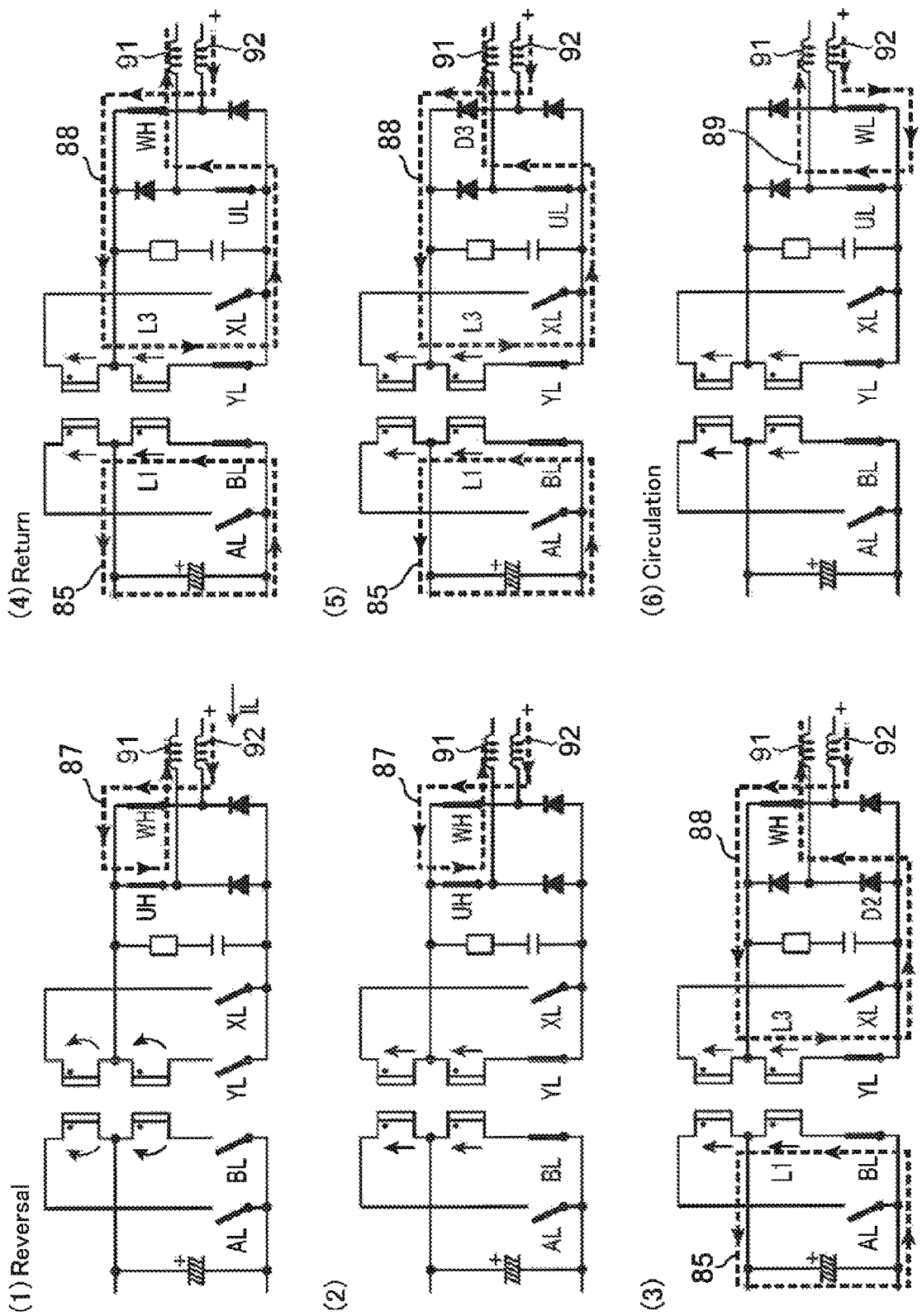
FIG. 16 is a diagram for illustration of states of the switching devices in respective time periods in FIG. 15.
Figure 17:
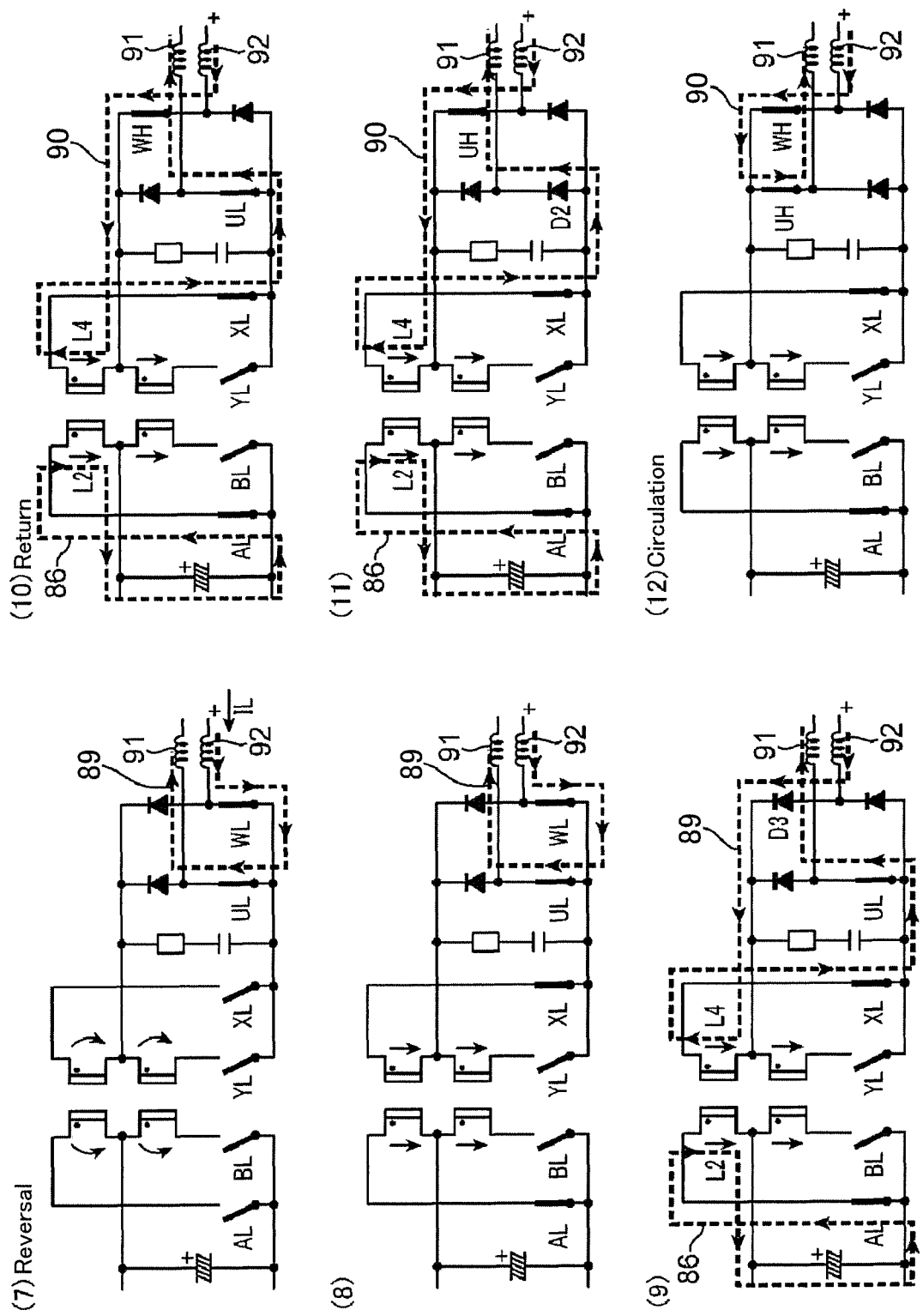
FIG. 17 is a diagram for illustration of states of the switching devices in respective time periods in FIG. 15.

FIG. 15 is a waveform chart for illustration of operation of the power conversion system 1 in the converter mode (4). The upper side of FIG. 15 is a waveform chart for the voltage Vout and the current IL. The lower side of FIG. 15 is a waveform chart for on and off states of the individual switching devices BL, YL, AL, XL, UH, UL, WH, and WL in one period (2T) of the AC voltage supplied to the primary winding 531. FIG. 16 and FIG. 17 are diagrams for illustration of states of switching devices in individual time periods in FIG. 15. Note that, in FIG. 16 and FIG. 17, the voltage Vout is negative and therefore the coil 92 has a positive potential (+). Further, in the converter mode, the current IL flows out from the plus "+" side.

<Time Period (1)>

The time period (1) is the reversal time period. The control unit 13 turns off the switching devices AL, BL, YL, and XL, turns on the switching devices UH and WH, and turns off the switching devices UL and WL. In this situation, the current IL flows through a circulation path 87 starting from the coil 92 and arriving at the coil 91 by passing through the switching device WH and the switching device UH in this order. Consequently, transfer of power between the primary side and the secondary side of the transformer 53 is blocked. The circulation path 87 and the circulation path 77 shown in FIG. 10 and FIG. 11 are same except they have opposite directions.

<Time Period (2)>

The time period (2) is a transitional time period from the reversal time period to the return time period. The control unit 13 turns on the switching devices BL and YL. In this situation, the converter unit 7 has the same state as the time period (1) and therefore the current IL flows through the circulation path 87.

<Time Period (3)>

The time period (3) is a transitional time period from the reversal time period to the return time period. The control unit 13 turns off the switching device UH. In this situation, the converter unit 7 starts the returning mode and therefore the current IL flows through a return path 88 starting from the coil 92 and arriving at the coil 91 by passing through the switching device WH, the coil L3, the switching device YL, and the diode D2 in this order. Further, a current on the primary side of the transformer 53 flows through the path 85 starting from the coil L1 and arriving at the DC power supply 17 by passing through the switching device BL. Consequently, transfer of power between the primary side and the secondary side of the transformer 53 is enabled.

<Time Period (4)>

The time period (4) is the return time period. The control unit 13 turns on the switching devices UL and WH and off the switching devices UH and WL. In this situation, the converter unit 7 comes into the returning mode and therefore the current IL flows through the return path 88 starting from the coil 92 and arriving at the coil 91 by passing through the switching device WH, the coil L3, the switching device YL, and the switching device UL in this order. Further, a current on the primary side of the transformer 53 flows through the path 85. Consequently, transfer of power between the primary side and the secondary side of the transformer 53 is enabled.

<Time Period (5)>

The time period (5) is a transitional time period from the return time period to the circulation time period. The control unit 13 turns off the switching device WH. In this situation, the converter unit 7 maintains the returning mode and therefore the current IL flows through the return path 88 starting from the coil 92 and arriving at the coil 91 by passing through the diode D3, the coil L3, the switching device YL, and the switching device UL in this order. Further, a current on the primary side of the transformer 53 flows through the path 85. Consequently, transfer of power between the primary side and the secondary side of the transformer 53 is enabled.

<Time Period (6)>

The time period (6) is the circulation time period. The control unit 13 turns on the switching device WL. In this situation, the current IL flows through a circulation path 89 starting from the coil 92 and arriving at the coil 91 by passing through the switching device WL and the switching device UL in this order. Consequently, transfer of power between the primary side and the secondary side of the transformer 53 is blocked. The circulation path 89 and the circulation path 79 shown in FIG. 10 and FIG. 11 are same except they have opposite directions.

<Time Period (7)>

The time period (7) is the reversal time period. The control unit 13 turns off the switching devices AL, BL, YL, and XL. In this situation, the current IL flows through the circulation path 89. Consequently, transfer of power between the primary side and the secondary side of the transformer 53 is blocked.

<Time Period (8)>

The time period (8) is a transitional time period from the reversal time period to the return time period. The control unit 13 turns on the switching devices AL and XL. In this situation, the converter unit 7 has the same state as the time period (7) and therefore the current IL flows through the circulation path 89.

<Time Period (9)>

The time period (9) is a transitional time period from the reversal time period to the return time period. The control unit 13 turns off the switching device WL. In this situation, the converter unit 7 comes into the returning mode and therefore the current IL flows through a return path 90 starting from the coil 92 and arriving at the coil 91 by passing through the diode D3, the coil L4, the switching device XL, and the switching device UL in this order. Further, a current on the primary side of the transformer 53 flows through the path 86. Consequently, transfer of power between the primary side and the secondary side of the transformer 53 is enabled.

<Time Period (10)>

The time period (10) is the return time period. The control unit 13 turns on the switching devices UL and WH and off the switching devices UH and WL. In this situation, the converter unit 7 comes into the returning mode and therefore the current IL flows through a return path 90 starting from the coil 92 and arriving at the coil 91 by passing through the switching device WH, the coil L4, the switching device XL, and the switching device UL in this order. Further, a current on the primary side of the transformer 53 flows through the path 86. Consequently, transfer of power between the primary side and the secondary side of the transformer 53 is enabled.

<Time Period (11)>

The time period (11) is a transitional time period from the return time period to the circulation time period. The control unit 13 turns off the switching device UL. In this situation, the current IL flows through the return path 90 starting from the coil 92 and arriving at the coil 91 by passing through the switching device WH, the coil L4, the switching device XL, and the diode D2 in this order. Further, a current on the primary side of the transformer 53 flows through the path 86. Consequently, transfer of power between the primary side and the secondary side of the transformer 53 is enabled.

<Time Period (12)>

The time period (12) is the circulation time period. The control unit 13 turns on the switching device UH. In this situation, the current IL flows through the circulation path 87. Consequently, transfer of power between the primary side and the secondary side of the transformer 53 is blocked.

Comparison among the waveform charts of FIG. 6, FIG. 9, FIG. 12, and FIG. 15 reveals that the inverter mode (1) in which the voltage Vout is positive and the converter mode (3) in which the voltage Vout is positive can adopt the same sequence for driving the switching devices BL, YL, AL, XL, UH, UL, WH, and WL. Further, the comparison also reveals that the inverter mode (2) in which the voltage Vout is negative and the converter mode (4) in which the voltage Vout is negative can adopt the same sequence for driving the switching devices BL, YL, AL, XL, UH, UL, WH, and WL.

For example, in some cases, the current IL has polarity different from desired polarity due to false detection of polarity of the current IL or disturbance of the current IL caused by noises. The power conversion system 1 uses the same sequence in the inverter mode (1) and the converter mode (3) (the same sequence in the inverter mode (2) and the converter mode (4)), and therefore the current IL flows through the same path in the both modes. As a result, even when the current IL shows polarity different from desired polarity, the power conversion system 1 can reduce such influence.

For example, it is considered that the power conversion system 1 operates so that VE is equal to 340 V and the voltage between the terminal U2 and the terminal W2 is 34 V at a timing in the inverter mode. In other words, a timing at which the power conversion system 1 operates with the duty cycle D of 0.1 in the inverter mode is considered. it is supposed that the current IL in an opposite direction occurs instantaneously at this timing. In this case, Since the inverter mode has the same sequence as the converter mode, operation of the power conversion system 1 is equivalent to operation in the converter mode with the duty cycle Doff of 0.1. Therefore, the power conversion system 1 operates to generate the voltage VE of 340 V from the voltage of 34 V between the terminal U2 and the terminal W2. Consequently, even if the current IL shows polarity different from desired polarity, the power conversion system 1 can switch between the inverter mode and the converter mode continuously. As a result, the power conversion system 1 is applicable for stand alone devices such as an uninterruptible power system (UPS).

In detail, the control unit 13 realizes the inverter mode (1) and the converter mode (3) as follows.

The control unit 13 classifies, into the first and second time periods, each of a half cycle Ta including a time period in which voltages across the coils L1 and L3 have positive polarity and a half cycle Tb including a time period in which voltages across the coils L1 and L3 have negative polarity. Note that, the order of the first and second time periods is not limited. In the first time period of the half cycle Ta, the control unit 13 turns on the switching devices UH and WH (hereinafter merely referred to as "high side devices") and off the switching devices UL and WL (hereinafter merely referred to as "low side devices") to start the circulation time period and thereafter turns off the switching devices BL, AL, YL, and XL while keeping the high side devices on and the low side devices off to start the reversal time period.

In the first time period of the half cycle Tb, the control unit 13 turns on the low side devices and off the high side devices to start the circulation time period and thereafter turns off the switching devices BL, AL, YL, and XL while keeping the low side devices on and the high side devices off to start the reversal time period.

In the second time periods of the half cycles Ta and Tb, the control unit 13 turns on the switching devices UH and WL and off the switching devices UL and WH to start the supply time period or the return time period. This is because the terminal 15a has a positive potential.

Further, the control unit 13 realizes the inverter mode (2) and the converter mode (4) as follows. In the first time period of the half cycle Ta, the control unit 13 turns on the high side devices and off the low side devices to start the circulation time period and thereafter turns off the switching devices BL, AL, YL, and XL while keeping the high side devices on and the low side devices off to start the reversal time period.

In the first time period of the half cycle Tb, the control unit 13 turns on the low side devices and off the high side devices to start the circulation time period and thereafter turns off the switching devices BL, AL, YL, and XL while keeping the low side devices on and the high side devices off to start the reversal time period.

In the second time periods of the half cycles Ta and Tb, the control unit 13 turns on the switching devices UL and WH and off the switching devices UH and WL to start the supply time period or the return time period. This is because the terminal 15b has a positive potential.

Note that, the control unit 13 turns on the high side devices and the low side devices alternately in the circulation time period and the next circulation time period. However, embodiments of the present disclosure may not be limited to such configuration. The control unit 13 may be configured to turn on the high side devices only or to turn on the low side devices only in the circulation time period and the next circulation time period. However, the former is preferable in consideration of thermal dispersion.

<Reversal Time Period>

Figure 18:
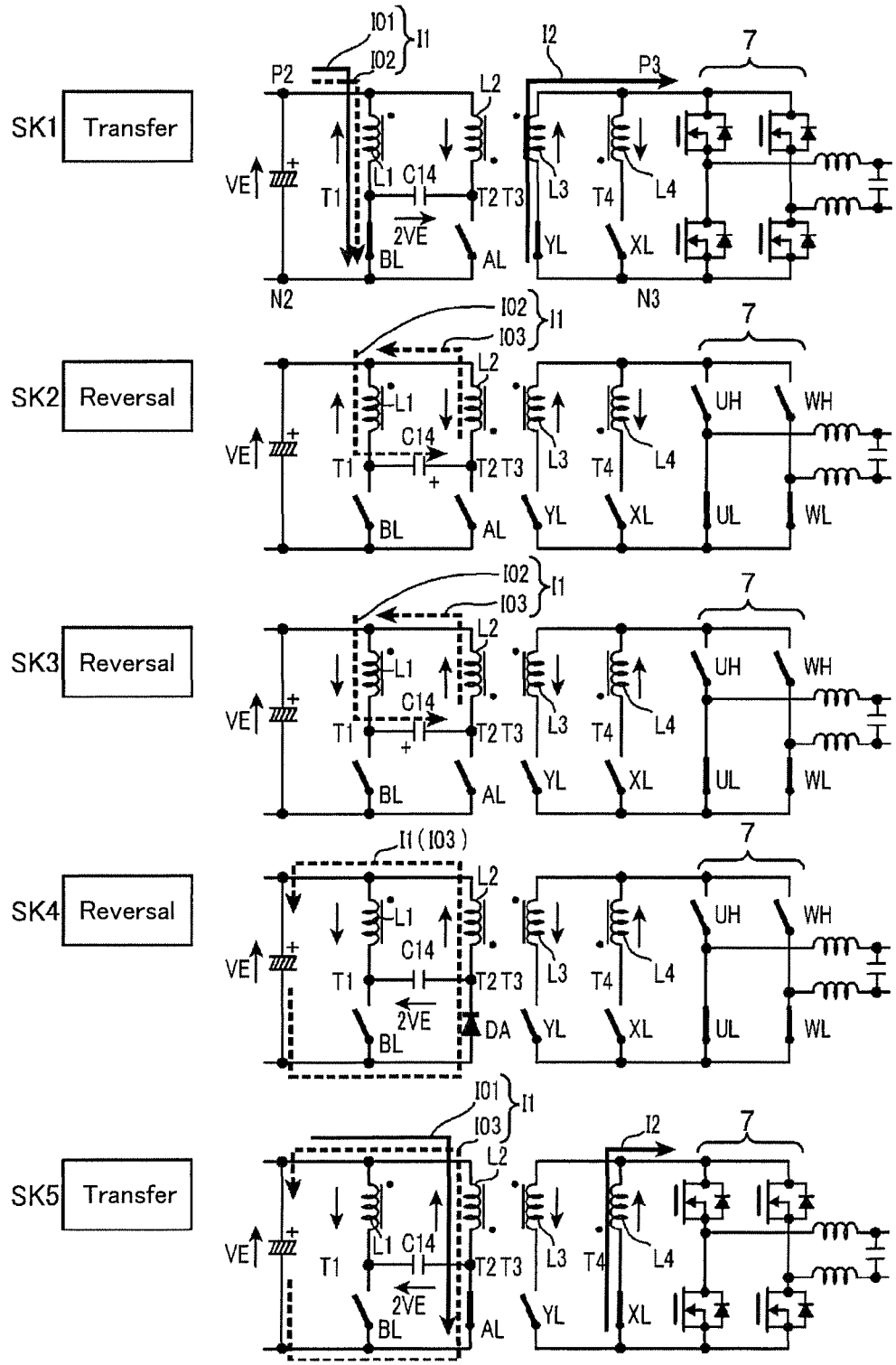
FIG. 18 is a circuit diagram for illustration of operation of the switching devices in a reversal time period.

Next, operation of switching devices in the reversal time period is described. FIG. 18 is a circuit diagram for illustration of operation of switching devices in the reversal time period. There is a capacitor C14 between the terminals T1 and T2 which represents the capacitors CA and CB shown in FIG. 1. Note that, in FIG. 18, directions of arrows of the voltages VT2 and VT4 are opposite to those in FIG. 1.

<Time Period SK1>

There is a time period SK1 which represents a transfer time period in which power is transferred between the primary side and the secondary side of the transformer 53. The control unit 13 turns on the switching devices BL and YL and off the switching devices AL and XL.

In this situation, a voltage across each of the coils L1, L2, L3, and L4 is VE. Thus, an applied voltage of the capacitor C14 from the terminal T1 becomes 2VE. Further, there is a primary coil current I1 flowing through the coil L1 and a secondary coil current I2 flowing through the coil L3. The coil current I1 includes a drive current I01 supplied from the DC power supply 17 and an excitation current I02 of the coil L1.

<Time Period SK2>

There is a time period SK2 which is the reversal time period. The control unit 13 turns off the switching devices BL, AL, YL, and XL. In this situation, since the switching devices UL and WL have been already turned on and the switching devices UH and WH have been already turned off, the converter unit 7 is in the circulating mode. Therefore, the coil current I2 does not flow. Further, supply of the drive current I01 is stopped and the coil current I1 includes the excitation current I02 (having the same magnitude as an excitation current I03 of the coil L2).

Since the switching devices AL and BL are off, the coil current I1 flows through a path starting from the coil L1 and arriving at the coil L2 by passing through the capacitor C14. Accordingly, the capacitor C14 gradually releases its electric charges.

<Time Period SK3>

There is a time period SK3 which is the reversal time period. Due to the excitation current I02, the polarity of the voltage across the capacitor C14 is reversed relative to that in the time period SK2. Consequently, the polarities of the voltages across the coils L1, L2, L3, and L4 are reversed relative to those in the time period SK2. The coil current I1 continues to flow through the path starting from the coil L1 and arriving at the coil L2 by passing through the capacitor C14, and the capacitor C14 stores electric charges (a terminal thereof end close to the terminal T1 is considered as a positive terminal).

<Time Period SK4>

There is a time period SK4 which is the reversal time period. When a voltage of the capacitor C14 from the terminal T2 becomes equal to 2VE, the diode DA is turned on. Accordingly, the coil current I1 flows through a path starting from the diode DA and arriving at a point with a potential of VE by passing through the coil L2. The excitation current I02 becomes 0 and the coil current I1 includes the excitation current I03 only.

<Time Period SK5>

There is a time period SK5 which is a transfer time period. The control unit 13 turns off the switching devices BL and YL and on the switching devices AL and XL. In this situation, a voltage across each of the coils L1, L2, L3, and L4 is −VE. Thus, an applied voltage of the capacitor C14 from the terminal T2 becomes 2VE. Further, the coil current I1 including the drive current I01 and the excitation current I03 flows through the coil L1 and the coil current I2 flows through the coil L4.

As understood from the above, the converter units 51 and 52 cause resonance of the coils L1 and L2 and the capacitor C14 to achieve reversal operation. Thus, the reversal operation by low loss switching (soft switching) can be realized.

<Snubber Circuit>

Figure 19:
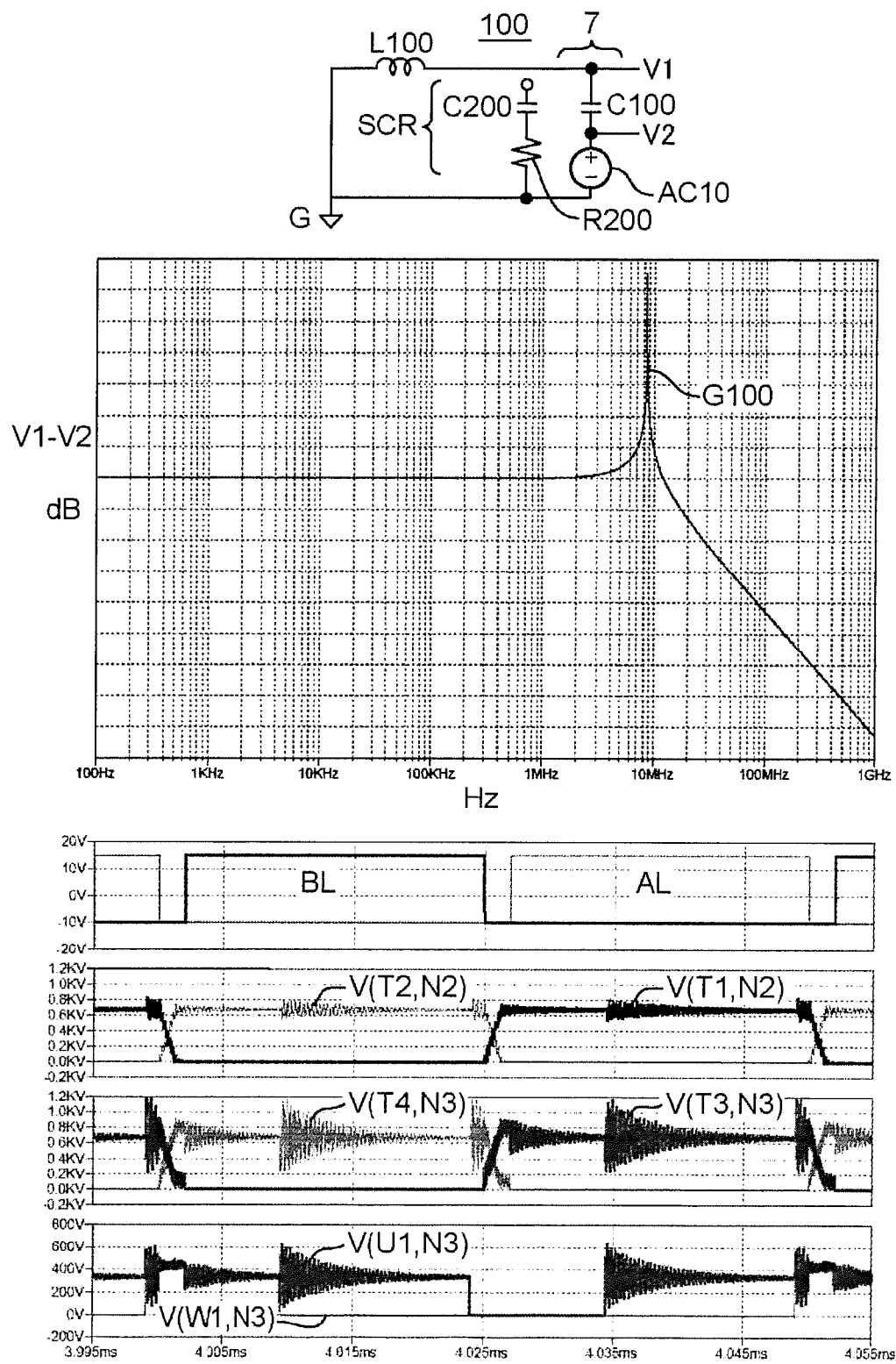
FIG. 19 is a diagram for illustration of advantageous effects of a snubber circuit 60.
Figure 20:
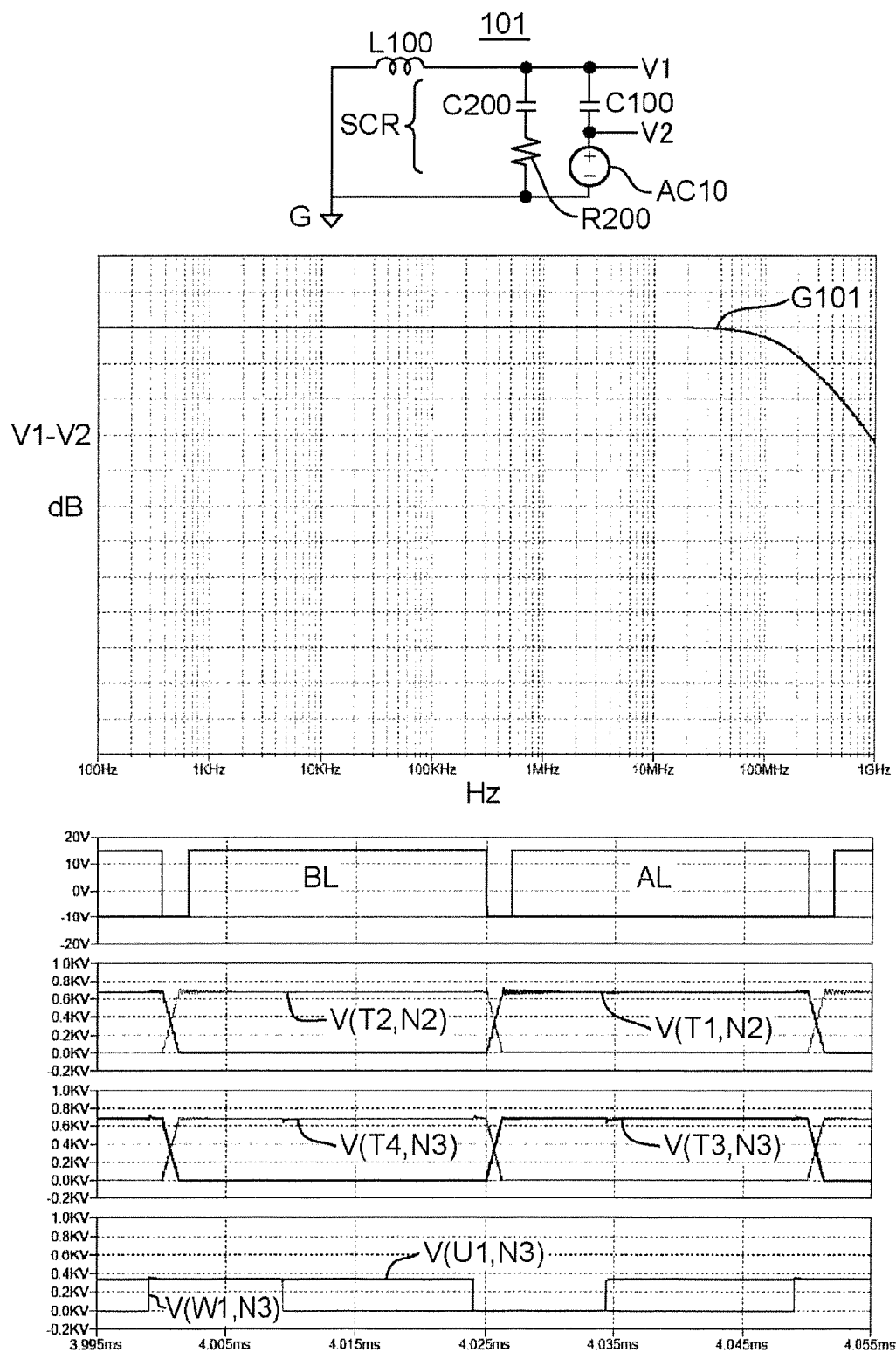
FIG. 20 is a diagram for illustration of advantageous effects of the snubber circuit 60.
Figure 21:
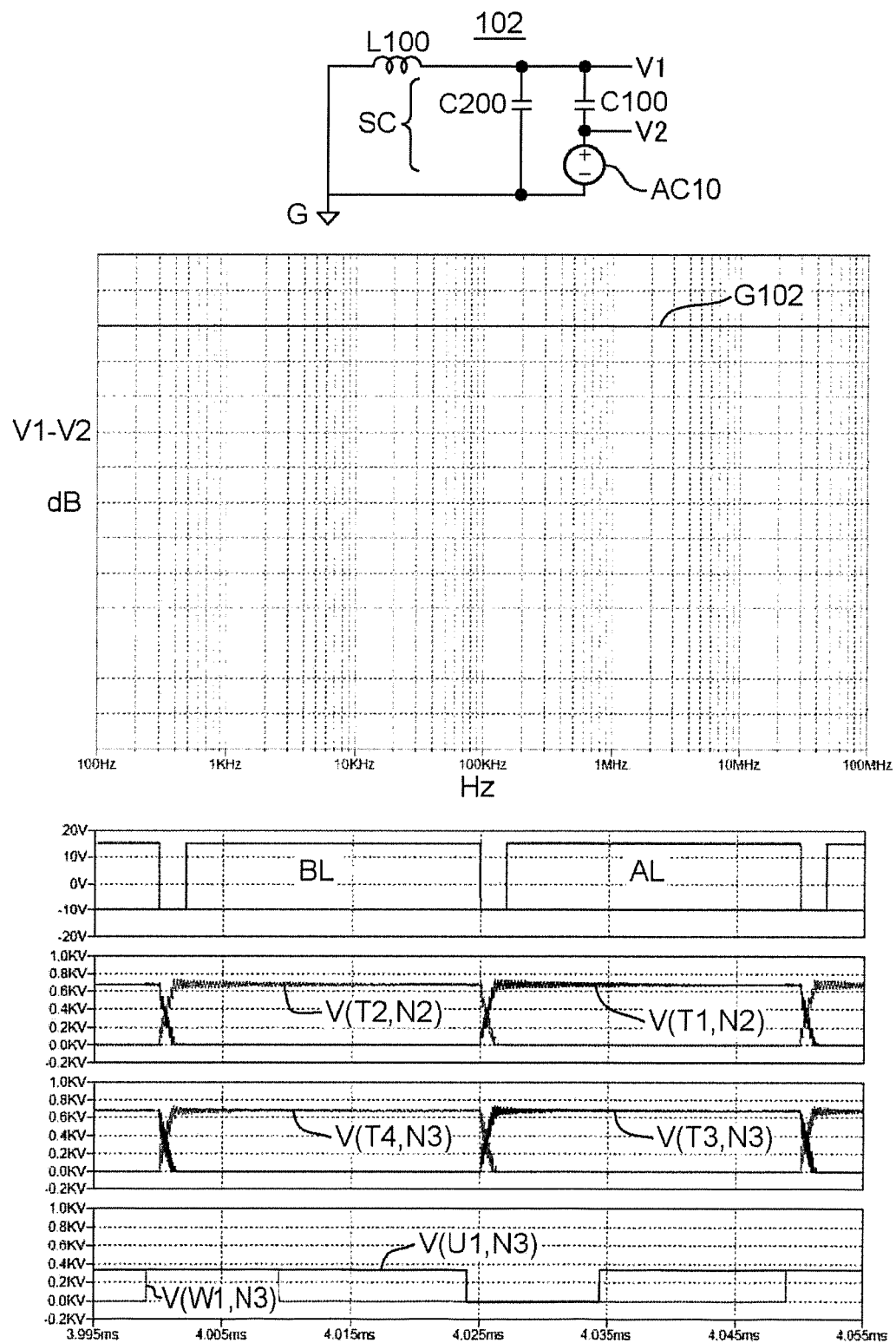
FIG. 21 is a diagram for illustration of advantageous effects of the snubber circuit 60.

Next, the snubber circuit 60 is described. FIG. 19 to FIG. 21 are diagrams for illustration of effects of the snubber circuit 60. FIG. 19 represents to a situation where the snubber circuit 60 is not provided. FIG. 20 represents to a situation where a snubber circuit SCR constituted by a capacitor and a resistor is provided as the snubber circuit 60. FIG. 21 represents to a situation where a snubber circuit SC constituted by a capacitor only is provided as the snubber circuit 60.

As to FIG. 19, FIG. 20, and FIG. 21, upper sides thereof show simulation circuits 100, 101, and 102 for observation of ringing in the power conversion system 1, middles thereof show frequency characteristics G100, G101, and G102, and lower sides thereof show waveforms of voltages across switching devices constituting the power conversion system 1.

As shown in FIG. 19, the simulation circuit 100 includes a leakage inductance L100, a capacitor C100, and an AC power supply AC10 which are connected in series with each other.

The leakage inductance L100 represents a leakage inductance of the transformer 53. The capacitor C100 represents a capacitor which is an equivalent circuit of the switching devices UH and WH in off states and on a high side of the converter unit 7. The capacitor C100 represents a capacitor which is an equivalent circuit of the switching devices UH and WH which are on the high potential side of the converter unit 7 and are in off states. The AC power supply AC10 represents an AC power supply which is an equivalent circuit of the switching devices UL and WL which are on the low potential side of the converter unit 7 and are in transition states from off states to on states.

The snubber circuit SCR is constituted by a capacitor C200 and a resistor R200 but is not incorporated in the simulation circuit 100. A voltage V1 represents a drain voltage of each the switching devices UH and WH form a ground G, and a voltage V2 represents a drain voltage of each of the switching devices UL and WL from the ground G.

The middle of FIG. 19 is a double logarithmic graph indicative of the frequency characteristic G100 of the simulation circuit 100. A vertical axis of the graph represents, in units of dB, a voltage from the voltage V2 (i.e., V1−V2). A horizontal axis of the graph represents a frequency of the AC power supply AC10.

In this simulation, an effective value of the voltage (V1−V2) was measured with a sweep of the frequency of the AC power supply AC10 from 10 Hz to 1 GHz, thereby the frequency characteristic G100 of the leakage inductance L100 and the capacitor C100 being obtained.

The frequency characteristic G100 shows a sharp peak near 10 MHz and this means that the leakage inductance L100 and the capacitor C100 exhibit large resonance The lower side of FIG. 19 is a waveform chart representing ringing occurring in the power conversion system 1 devoid of the snubber circuit SCR. In the lower side of FIG. 19, the first chart indicates on and off states of the switching devices AL and BL, the second chart indicates voltages of the terminals T1 and T2 from the terminal N2, which are denoted by V(T1, N2) and V(T2, N2), respectively, the third chart indicates voltages of the terminals T3 and T4 from the terminal N3, which are denoted by V(T3, N3) and V(T4, N3), respectively, and the fourth chart indicates voltages of the terminals U1 and W1 from the terminal N3, which are denoted by V(U1, N3) and V(W1, N3).

FIG. 19 reveals that, regarding a time period in which the switching device BL is on and the switching device AL is off, the voltage V(T2, N2) exhibits large ringing in response to switching of the converter unit 7 and the voltages V(T4, N3) and V(U1, N3) exhibit larger ringing. In summary, it is understood that large ringing appear in voltages applied across the switching devices AL, XL, and the like which are in their off states.

Additionally, it is revealed that, regarding a time period in which the switching device AL is on and the switching device BL is off, the voltage V(T1, N2) exhibits large ringing in response to switching of the converter unit 7 and the voltages V(T3, N3) and V(U1, N3) exhibit larger ringing. In summary, it is understood that large ringing appear in voltages applied across the switching devices BL, YL, and the like which are in their off states.

With reference to FIG. 20, as shown in the upper side of FIG. 20, the simulation circuit 101 is different from the simulation circuit 100 in being provided with the snubber circuit SCR. Therefore, as shown in the middle of FIG. 20, it is taught that the frequency characteristic G101 does not show overshoot and this means that the leakage inductance L100 and the capacitor C100 exhibit no resonance. Hence, as shown in the lower side of FIG. 20, it is revealed that, regarding the time period in which the switching device BL is on and the switching device AL is off, ringing appear in voltages applied across the switching devices AL, XL, and the like which are in their off states is reduced drastically relative to that of FIG. 19. It is also revealed that, regarding the time period in which the switching device AL is on and the switching device BL is off, ringing appear in voltages applied across the switching devices BL, YL, and the like which are in their off states is reduced drastically relative to that of FIG. 19.

With reference to FIG. 21, as shown in the upper side of FIG. 21, the simulation circuit 102 is provided with the snubber circuit SC. Therefore, as shown in the middle of FIG. 21, it is taught that the frequency characteristic G102 does not show overshoot for an entire range of frequencies and this means that the leakage inductance L100 and the capacitor C100 exhibit no resonance. Hence, as shown in the lower side of FIG. 21, it is revealed that, regarding the time period in which the switching device BL is on and the switching device AL is off, ringing appear in voltages applied across the switching devices AL, XL, and the like which are in their off states is reduced drastically relative to that of FIG. 19. It is also revealed that, regarding the time period in which the switching device AL is on and the switching device BL is off, ringing appear in voltages applied across the switching devices BL, YL, and the like which are in their off states is reduced drastically relative to that of FIG. 19. Notwithstanding, in FIG. 20 and FIG. 21, small ringing appears in waveforms at the timing of the reversal of the transformer voltage. This may be because the leakage inductance L100 and the capacitor C200 show resonance at the timing of the reversal of the transformer voltage.

Comparison among FIG. 20 and FIG. 21 reveals that the snubber circuit SCR has ringing reducing effect higher than that of the snubber circuit SC.

Figure 22:
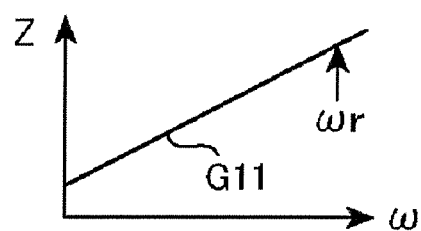
FIG. 22 is a graph for illustration of impedance properties of the power conversion system 1.
Figure 22:
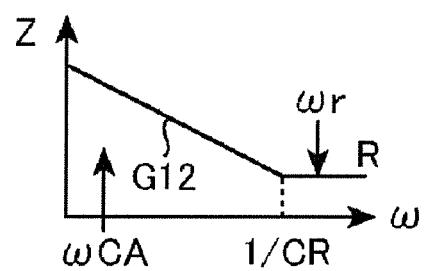
Figure 22:
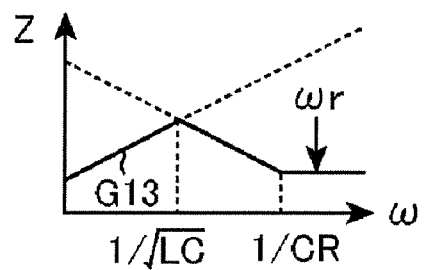

FIG. 22 show graphs illustration of impedance characteristics of the power conversion system 1. The upper side shows the impedance characteristic G11 of the leakage inductance L100, the middle shows the impedance characteristic G12 of the snubber circuit SCR, and the lower side shows the impedance characteristic G13 when the snubber circuit SCR is connected in parallel with the leakage inductance L100. Note that, each graph of FIG. 22 is a double logarithmic graph and its vertical axis represents impedance (Z) and its horizontal axis represents an angular frequency (ω).

The impedance characteristic G11 reveals that the impedance increases with constant slope as the angular frequency increases due to influence of the leakage inductance L100. When a capacitance of the capacitor C200 is denoted by "C" and a resistance of the resistor R200 is denoted by "R", the impedance characteristic G12 teaches the impedance decreases with constant slope as the angular frequency increases due to influence of the capacitor C200 in a region satisfying a relation of ω<1/CR and the impedance is kept constant regardless of increase in the angular frequency due to influence of the resistor R200 in a region satisfying a relation of ω>1/CR.

When a value of the leakage inductance L100 is denoted by "L" and a capacitance of the capacitor C200 is denoted by "C", the impedance characteristic G13 has the same characteristic as the impedance characteristics G11 which is one of the impedance characteristics G11 and G12 and is lower in impedance than the other, in a region satisfying a relation of ω<1/√(LC), and the impedance characteristic G13 has the same characteristic as the impedance characteristics G12 which is one of the impedance characteristics G11 and G12 and is lower in impedance than the other, in a region satisfying a relation of ω<1/√(LC).

Accordingly, when an angular frequency of ringing is supposed to be ωr, the snubber circuit SCR designed to satisfy a relation of 1/CR<ωr can absorb a ringing current aggressively. Thus, the snubber circuit SCR can reduce ringing. In this regard, when a value of the leakage inductance L100 is denoted by "L" and a capacitance of the capacitor C100 is denoted by "Cp", a relation of ωr=1/√(LCp) is satisfied. When a carrier frequency ωCA is set in a range of frequencies lower than 1/CR, the impedance characteristic G12 of the snubber circuit SCR shows relatively high impedance for the carrier frequency and the snubber circuit SCR does not absorb a current with a frequency near the carrier frequency. Consequently, the snubber circuit SCR can reduce power loss. Note that, the carrier frequency means a frequency of a carrier signal used in PWM control, and may be 20 kHz, for example.

<Timing Chart>
<Inverter Mode>

Figure 23:
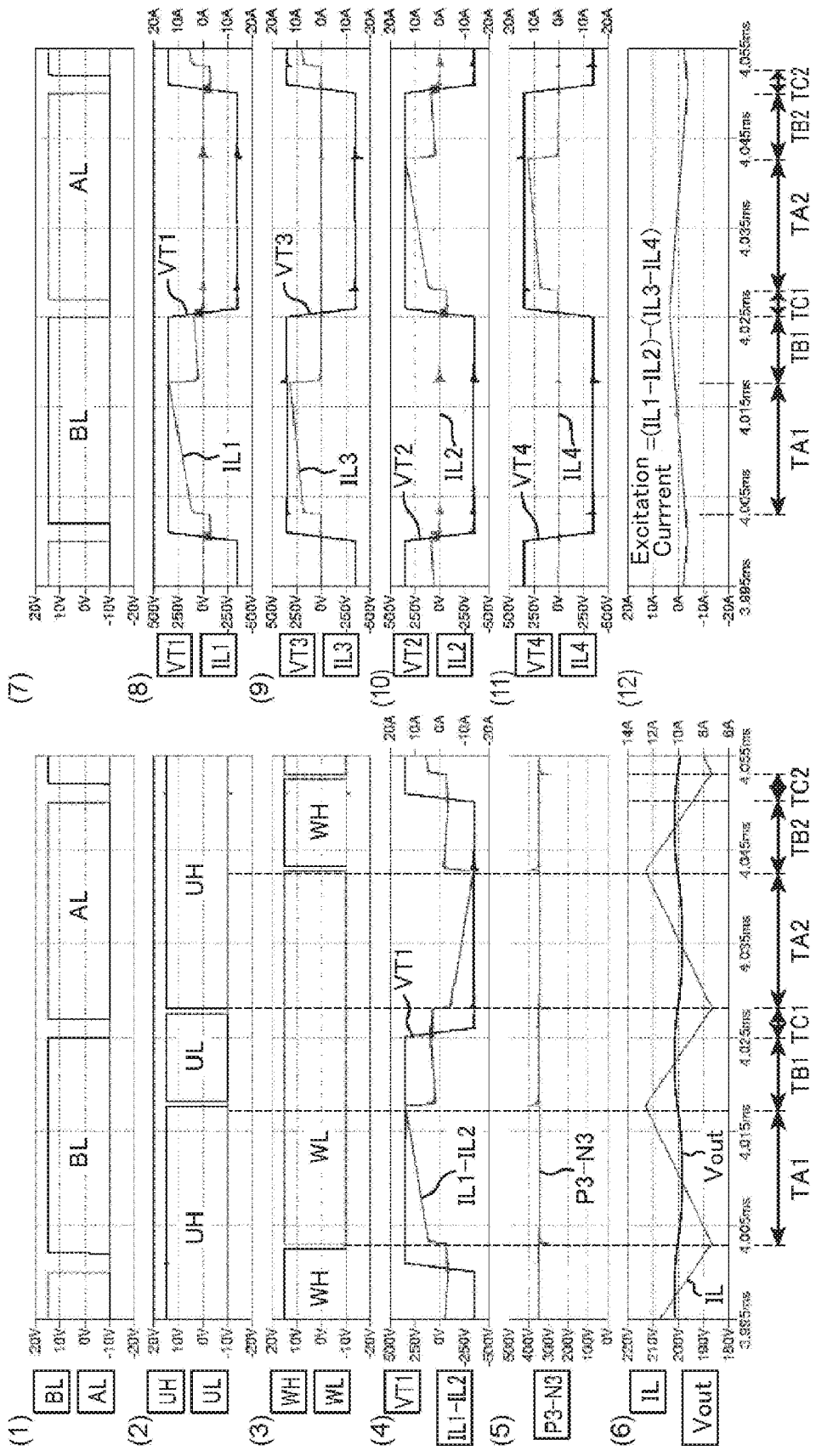
FIG. 23 is a diagram for illustration of timing charts of the power conversion system 1 in the inverter mode.

Next, timing charts of the power conversion system 1 in the inverter mode are described. FIG. 23 is a diagram for illustration of the timing charts of the power conversion system 1 in the inverter mode. In FIG. 23, (1) represents on and off states of the switching devices BL and AL, wherein the on state means having a high level and the off state means having a low level. (2) represents on and off states of the switching devices UH and UL, wherein the on state means having a high level and the off state means having a low level. (3) represents on and off states of the switching devices WH and WL, wherein the on state means having a high level and the off state means having a low level. (4) represents the voltage VT1 and a current defined by (IL1−IL2). (5) represents the voltage [P3−N3]. (6) represents the current IL and the voltage Vout.

(7) is same as (1). (8) represents the voltage VT1 and the current IL1. (9) represents the voltage VT3 and a current IL3. (10) represents the voltage VT2 and the current IL2. (11) represents the voltage VT4 and a current IL4. (12) represents the excitation current of the transformer 53. The excitation current is given by (IL1−IL2)−(IL3−IL4).

Note that, in FIG. 23, operation of the switching device YL is same as that of the switching device BL and operation of the switching device XL is same as that of the switching device AL and accordingly explanations thereof are omitted. Further, in the example of FIG. 2, when the switching device BL is turned on, the circulation time period starts earlier than the supply time period. In contrast, in the example of FIG. 23, when the switching device BL is turned on, the supply time period starts first earlier than the circulation time period.

<Supply Time Period TA1>

With reference to (1) and (7), the control unit 13 turns on the switching devices BL and YL and off the switching devices AL and XL. With reference to (2) and (3), the control unit 13 turns on the switching devices UH and WL and off the switching devices UL and WH to allow the converter unit 7 to come into the supplying mode.

Thus, (6) shows the current IL increases linearly. Further, (8), (9), (10), and (11) show the currents IL1 and IL3 increase sharply and then increase with gentle slope while the currents IL2 and IL4 are equal to 0. Further, (5) shows the voltage [P3−N3] is kept equal to a constant value.

<Circulation Time Period TB1>

The circulation time period TB1 follows after the supply time period TA1. (2) and (3) show the control unit 13 turns on the switching devices UL and WL and off the switching devices UH and WH while the switching devices BL and YL are on and the switching devices AL and XL are off to allow the converter unit 7 to come into the circulating mode.

Thus, (6) shows the current IL decreases linearly. Further, (8), (9), (10), and (11) show the currents IL1 and IL3 decrease sharply and then fluctuate around 0. In detail, the current IL3 is 0 but the current IL1 includes the excitation current only. The currents IL2 and IL4 are equal to 0. Further, (5) shows the voltage [P3−N3] is kept equal to the constant value.

<Reversal Time Period TC1>

The reversal time period TC1 follows after the circulation time period TB1. With reference to (1) and (7), the control unit 13 turns off the switching devices BL, AL, YL, and XL while keeping the converter unit 7 in the circulating mode.

Thus, (8) and (9) show the polarities of the voltages VT1 and VT3 are reversed from positive polarities to negative polarities. (10) and (11) show the polarities of the voltages VT2 and VT4 are reversed from negative polarities to positive polarities. Further, (5) shows the voltage [P3−N3] is kept equal to the constant value.

<Supply Time Period TA2>

The supply time period TA2 follows after the reversal time period TC1. With reference to (1) and (7), the control unit 13 turns off the switching devices BL and YL and on the switching devices AL and XL. In this regard, (2) and (3) show the control unit 13 turns on the switching devices UH and WL and off the switching devices UL and WH to allow the converter unit 7 to come into the supplying mode.

Thus, (6) shows the current IL increases linearly. Further, (8), (9), (10), and (11) show the currents IL1 and IL3 are equal to 0 while the currents IL2 and IL4 increase sharply and then increase with gentle slope. Further, (5) shows the voltage [P3−N3] is kept equal to the constant value.

<Circulation Time Period TB2>

The circulation time period TB2 follows after the supply time period TA2. (2) and (3) show the control unit 13 turns on the switching devices UH and WH and off the switching devices UL and WL while the switching devices BL and YL are off and the switching devices AL and XL are on to allow the converter unit 7 to come into the circulating mode.

Thus, (6) shows the current IL decreases linearly. Further, (8), (9), (10), and (11) show the currents IL1 and IL3 are equal to 0. The currents IL2 and IL4 decrease sharply and then fluctuate around 0. In detail, the current IL4 is 0 but the current IL2 includes the excitation current only. Further, (5) shows the voltage [P3−N3] is kept equal to the constant value.

<Reversal Time Period TC2>

The reversal time period TC2 follows after the circulation time period TB2. With reference to (1) and (7), the control unit 13 turns off the switching devices BL, AL, YL, and XL while keeping the converter unit 7 in the circulating mode.

Thus, (8) and (9) show the polarities of the voltages VT1 and VT3 are reversed from negative polarities to positive polarities. (10) and (11) show the polarities of the voltages VT2 and VT4 are reversed from positive polarities to negative polarities. Further, (5) shows the voltage [P3−N3] is kept equal to the constant value.

As described above, the power conversion system 1 cyclically repeats the supply time period TA1, the circulation time period TB1, the reversal time period TC1, the supply time period TA2, the circulation time period TB2, and the reversal time period TC2 to implement the inverter mode. Further, the power conversion system 1 changes a ratio of the supply time period TA1 and the supply time period TA2 in one period by PWM control to generate a desired voltage Vout.

Additionally, it is understood that throughout the whole time period, the voltage [P3−N3] is kept equal to the constant value and the polarity is not reversed.

Figure 24:
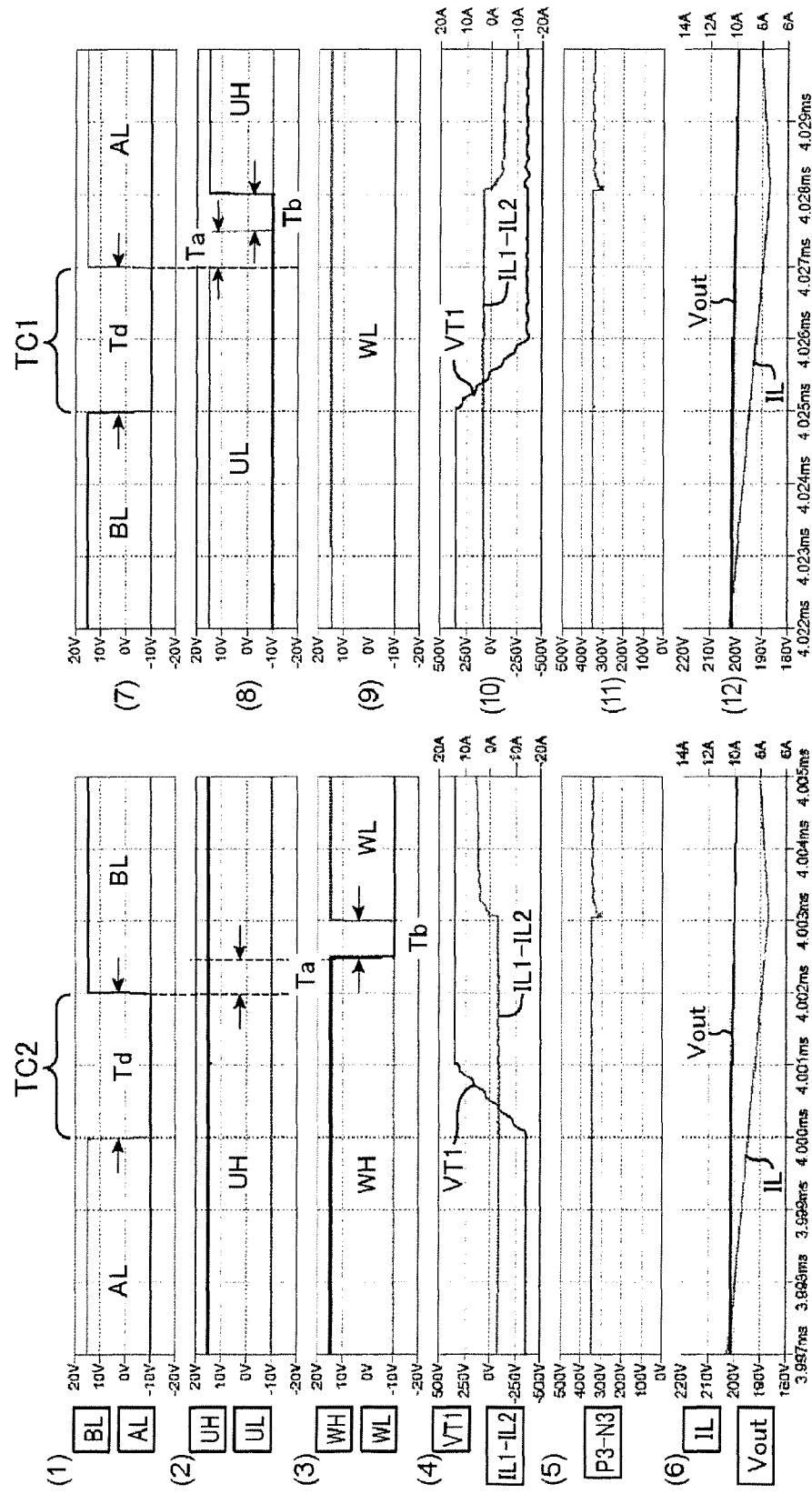
FIG. 24 is illustration for enlarged timing charts regarding reversal time periods TC1 and TC2 in FIG. 23.

FIG. 24 shows enlarged timing charts regarding the reversal time periods TC1 and TC2 in FIG. 23. In FIG. 24, (1) to (6) are enlarged charts regarding the reversal time period TC2 of (1) to (6) of FIG. 23, respectively, and (7) to (12) are enlarged charts regarding the reversal time period TC1 of (1) to (6) of FIG. 23.

(1) shows there is dead time Td after the switching device AL is turned off and before the switching device BL is turned on in the reversal time period TC2. The dead time Td may be 2 μs, for example. Further, (2) shows there is dead time Ta after the switching device BL is turned on and before the switching device WH is turned off. The dead time Ta may be 0.5 μs, for example. Further, (3) shows there is dead time Tb after the switching device WH is turned off and before the switching device WL is turned on. The dead time Tb may be 0.5 μs, for example. Accordingly, the switching devices can be protected.

(4) shows the voltage VT1 is reversed from the negative polarity to the positive polarity in the dead time Td.

(5) shows the voltage [P3−N3] is kept equal to the constant value throughout the whole time period.

(7) shows presence of the dead time Td after the switching device BL is turned off and before the switching device AL is turned on in the reversal time period TC1. Further, (8) shows presence of the dead time Ta after the switching device AL is turned on and before the switching device UL is turned off. Further, (8) shows presence of the dead time Tb after the switching device UL is turned off and before the switching device UH is turned on. (10) shows the voltage VT1 is reversed from the positive polarity to the negative polarity in the dead time Td.

(11) shows the voltage [P3−N3] is kept equal to the constant value throughout the whole time period.

<Converter Mode>

Figure 25:
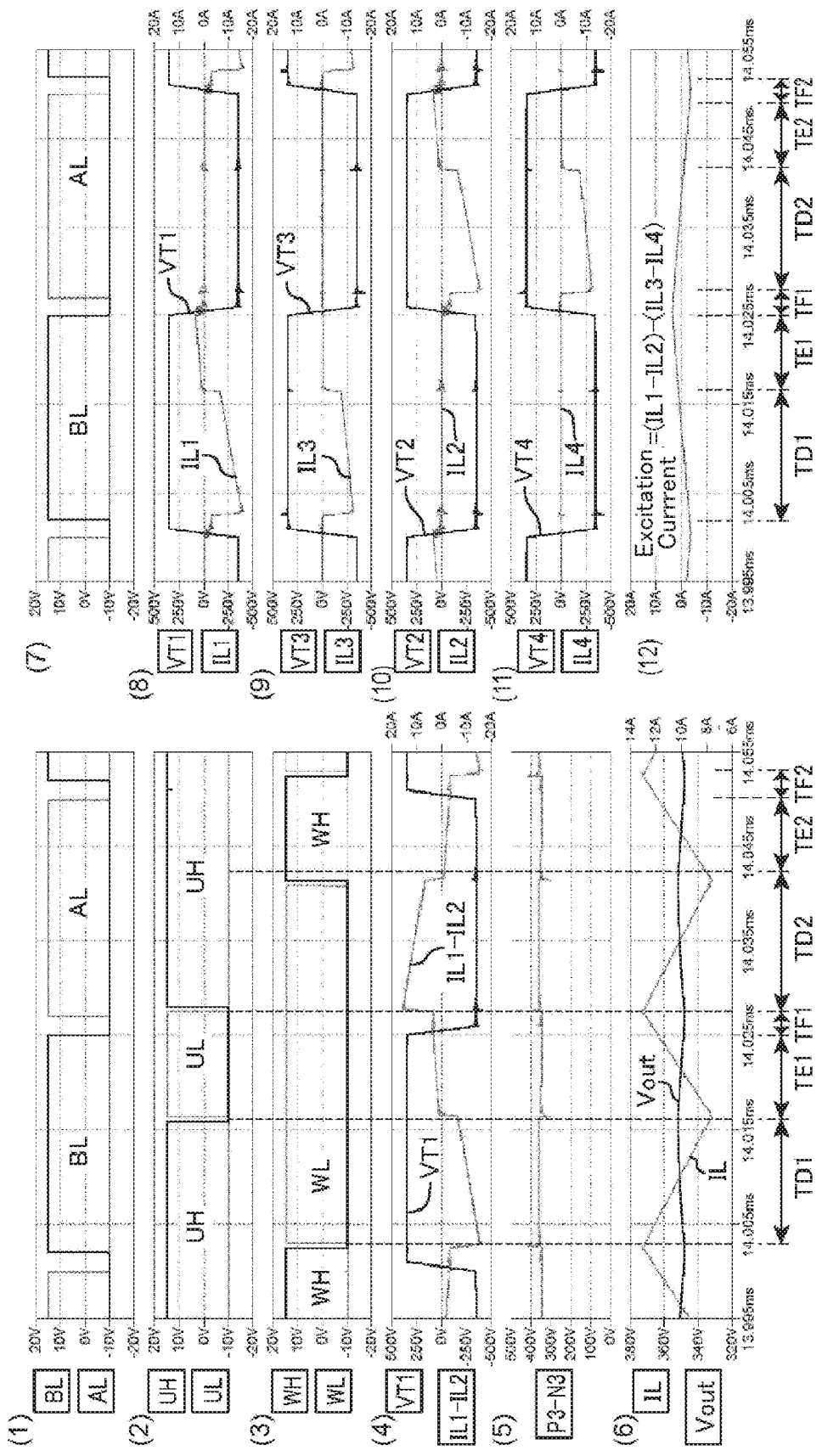
FIG. 25 is a diagram for illustration of timing charts of the power conversion system 1 in the converter mode.

Next, timing charts of the power conversion system 1 in the converter mode are described. FIG. 25 is a diagram for illustration of the timing charts of the power conversion system 1 in the converter mode. (1) to (12) of FIG. 25 show waveforms corresponding to those of (1) to (12) of FIG. 23, respectively.

<Return Time Period TD1>

With reference to (1) and (7), the control unit 13 turns on the switching devices BL and YL and off the switching devices AL and XL. With reference to (2) and (3), the control unit 13 turns on the switching devices UH and WL and off the switching devices UL and WH to allow the converter unit 7 to come into the returning mode. In this regard, the current IL is positive when it flows in a direction opposite to the arrow in FIG. 1.

Thus, (6) shows the current IL decreases linearly. Further, (8), (9), (10), and (11) show the currents IL1 and IL3 decrease sharply and then increase with gentle slope while the currents IL2 and IL4 are equal to 0. Further, (5) shows the voltage [P3−N3] is kept equal to a constant value.

<Circulation Time Period TE1>

The circulation time period TE1 follows after the return time period TD1. (2) and (3) show the control unit 13 turns on the switching devices UL and WL and off the switching devices UH and WH while the switching devices BL and YL are on and the switching devices AL and XL are off to allow the converter unit 7 to come into the circulating mode.

Thus, (6) shows the current IL increases linearly. Further, (8), (9), (10), and (11) show the currents IL1 and IL3 increase sharply and then fluctuate around 0. In detail, the current IL3 is 0 but the current IL1 includes the excitation current only. The currents IL2 and IL4 are equal to 0. Further, (5) shows the voltage [P3−N3] is kept equal to the constant value.

<Reversal Time Period TF1>

The reversal time period TF1 follows after the circulation time period TE1. With reference to (1) and (7), the control unit 13 turns off the switching devices BL, AL, YL, and XL while keeping the converter unit 7 in the circulating mode.

Thus, (8) and (9) show the polarities of the voltages VT1 and VT3 are reversed from positive polarities to negative polarities. (10) and (11) show the polarities of the voltages VT2 and VT4 are reversed from negative polarities to positive polarities. Further, (5) shows the voltage [P3–N3] is kept equal to the constant value.

<Return Time Period TD2>

The return time period TD2 follows after the reversal time period TF1. With reference to (1) and (7), the control unit 13 turns off the switching devices BL and YL and on the switching devices AL and XL. In this regard, (2) and (3) show the control unit 13 turns on the switching devices UH and WL and off the switching devices UL and WH to allow the converter unit 7 to come into the returning mode.

Thus, (6) shows the current IL decreases linearly. Further, (8), (9), (10), and (11) show the currents IL1 and IL3 are equal to 0 while the currents IL2 and IL4 decrease sharply and then increase with gentle slope. Further, (5) shows the voltage [P3–N3] is kept equal to the constant value.

<Circulation Time Period TE2>

The circulation time period TE2 follows after the return time period TD2. (2) and (3) show the control unit 13 turns off the switching devices UL and WL and on the switching devices UH and WH while the switching devices BL and YL are off and the switching devices AL and XL are on to allow the converter unit 7 to come into the circulating mode.

Thus, (6) shows the current IL increases linearly. Further, (8), (9), (10), and (11) show the currents IL1 and IL3 are equal to 0. The currents IL2 and IL4 increase sharply and then fluctuate around 0. In detail, the current IL4 fluctuates around 0 but the current IL2 includes the excitation current only. Further, (5) shows the voltage [P3–N3] is kept equal to the constant value.

<Reversal Time Period TF2>

The reversal time period TF2 follows after the circulation time period TE2. With reference to (1) and (7), the control unit 13 turns off the switching devices BL, AL, YL, and XL while keeping the converter unit 7 in the circulating mode.

Thus, (8) and (9) show the polarities of the voltages VT1 and VT3 are reversed from negative polarities to positive polarities. (10) and (11) show the polarities of the voltages VT2 and VT4 are reversed from positive polarities to negative polarities. Further, (5) shows the voltage [P3–N3] is kept equal to the constant value.

As described above, the power conversion system 1 cyclically repeats the return time period TD1, the circulation time period TE1, the reversal time period TF1, the return time period TD2, the circulation time period TE2, and the reversal time period TF2 to implement the converter mode. Further, the power conversion system 1 changes a ratio of the return time period TD1 and the return time period TD2 in one period by PWM control to return a desired voltage Vout to the DC power supply 17.

Figure 26:
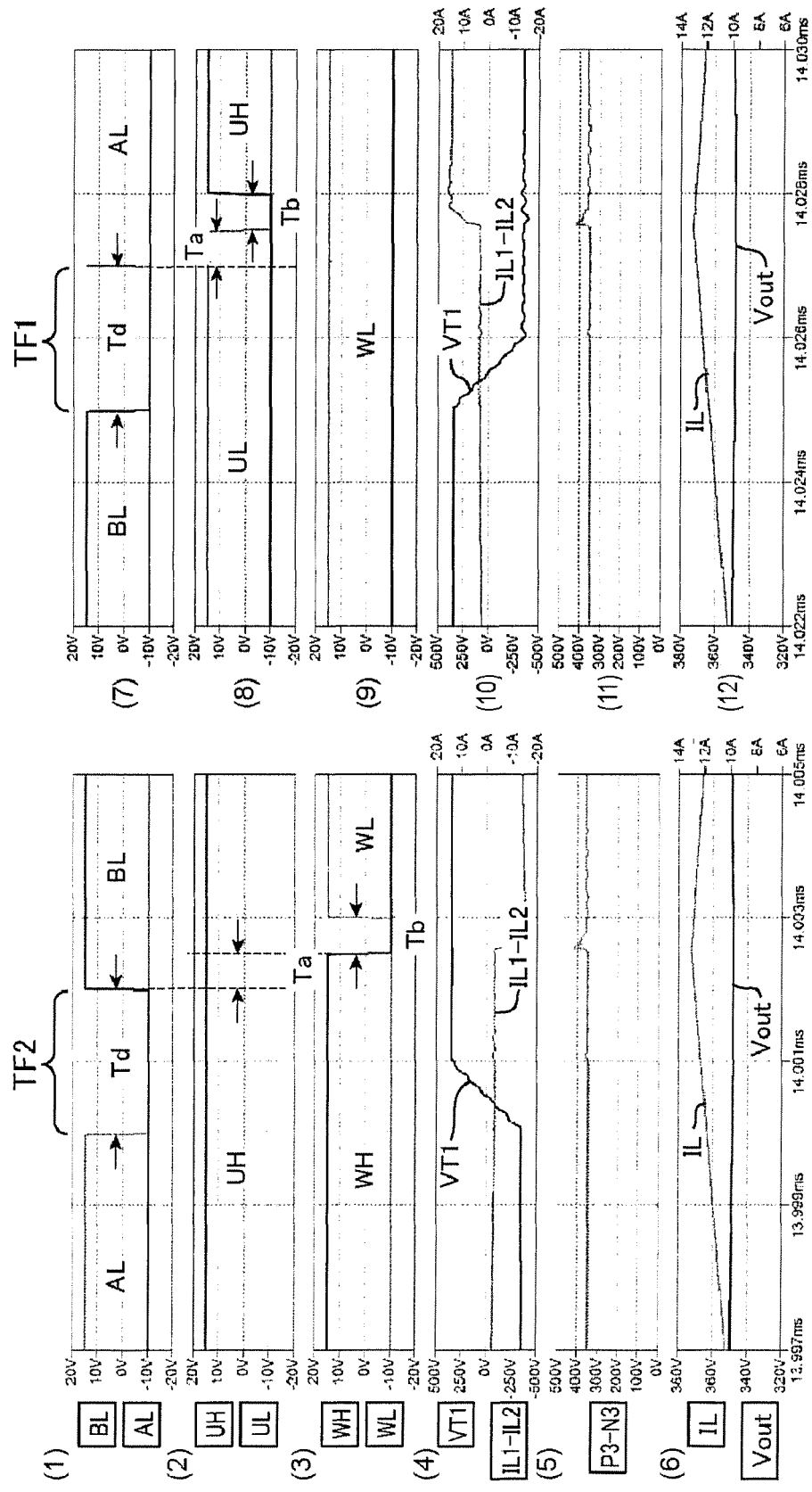
FIG. 26 is illustration for enlarged timing charts regarding reversal time periods TF1 and TF2 in FIG. 25.

FIG. 26 shows enlarged timing charts regarding the reversal time periods TF1 and TF2 in FIG. 25. (1) to (12) of FIG. 26 show waveforms corresponding to those of (1) to (12) of FIG. 24, respectively.

FIG. 26 shows the dead time Td, Ta, and Tb is provided in the converter mode similarly to FIG. 25.

As described above, the power conversion system 1 controls the converter unit 51 so that positive and negative voltages are alternately applied across each of the coils L1 and L2, and also controls the converter unit 52 so that the voltage [P3–N3] is positive. Therefore, a voltage with constant (unchanged) polarity is inputted into the converter unit 7. As a result, the converter unit 7 can be realized by an ordinary full bridge circuit and ordinary control can apply.

Additionally, in the view point of the equivalent circuit of the transformer 53, the power conversion system 1 has the converter unit 7 directly connected with the capacitor 4 (see FIG. 1) via the leakage inductance of the transformer 53 in the second time period (the circulation time period and the reversal time period).

The power conversion system 1 allows transfer of power between the primary and secondary sides in this second time period only. Therefore, at the timing of transfer of power, the capacitor 4 and the converter unit 7 are always connected directly.

Therefore, it is unnecessary to situate a smoothing capacitor between the terminal P3 and the terminal N3, and accordingly the circuit scale can be downsized.

Additionally, to provide the snubber circuit 60 for addressing ringing, use of a capacitor with a relatively small capacitance is enough.

Further, the power conversion system 1 has the reversal time period for reversing the polarities of the coils L1 and L2 in the time period in which the converter unit 7 is set into the circulating mode. Therefore, even when the power conversion system 1 operates in any one of the converter mode and the inverter mode, it can perform reversal operation due to resonance of the excitation current and the capacitors CA and CB for resonance, regardless of the load current. Consequently, the power conversion system 1 can stably perform reversal of the polarities of voltages applied across the coils L1 and L2.

Embodiment 2

FIG. 27 is a circuit diagram of a power conversion system 1A according to Embodiment 2. The power conversion system 1A according to Embodiment 2 is characterized in that the converter unit 51 and the primary winding 531 are configured as full bridge (FB) circuitry and the converter unit 52 and the secondary winding 532 are also configured as full bridge (FB) circuitry (i.e., FB-FB). The converter unit 51 includes four switching devices AH, AL, BH, and BL connected in a full bridge arrangement.

The switching device AH has a drain connected to the terminal P2 and a source connected to the terminal T2. The switching device AL has a drain connected to the terminal T2 and a source connected to the terminal N2. The switching device BH has a drain connected to the terminal P2 and a source connected to the terminal T1. The switching device BL has a drain connected to the terminal T1 and a source connected to the terminal N2.

There are diodes DAH, DAL, DBH, and DBL connected to the switching devices AH, AL, BH, and BL so that anodes and cathodes of the diodes DAH, DAL, DBH, and DBL are connected to the sources and drains of the switching devices AH, AL, BH, and BL, respectively.

Further, there are capacitors CAH, CAL, CBH, and CBL connected between drains and sources of the switching devices AH, AL, BH, and BL, respectively. The capacitors CAH, CAL, CBH, and CBL have the same function as the capacitor C14 shown in FIG. 14, and cause soft switching of the converter unit 51 by resonating with the coil L11. Note that, a set of the capacitors CAH and CBH and a set of the capacitors CAL and CBL each may be connected between the terminals T1 and T2. Or, providing the capacitors CAL and CBL only is sufficient, or providing the capacitors CAH and CBH only is also sufficient.

In Embodiment 2, the primary winding 531 has no center tap and therefore includes the coil L11 only. Additionally, the secondary winding 532 has no center tap and therefore includes the coil L12 only. The primary windings 531 and 532 are magnetically coupled with each other so that the terminals T2 and T3 have the same polarity.

The converter unit 52 includes four switching devices XH, XL, YH, and YL connected in a full bridge arrangement.

The switching device XH has a drain connected to the terminal P3 and a source connected to the terminal T3. The switching device XL has a drain connected to the terminal T3 and a source connected to the terminal N3. The switching device YH has a drain connected to the terminal P3 and a source connected to the terminal T4. The switching device YL has a drain connected to the terminal T4 and a source connected to the terminal N3.

There are diodes DXH, DXL, DYH, and DYL connected to the switching devices XH, XL, YH, and YL so that anodes and cathodes of the diodes DXH, DXL, DYH, and DYL are connected to the sources and drains of the switching devices XH, XL, YH, and YL, respectively.

<Timing Chart>
<Inverter Mode>

Figure 28:
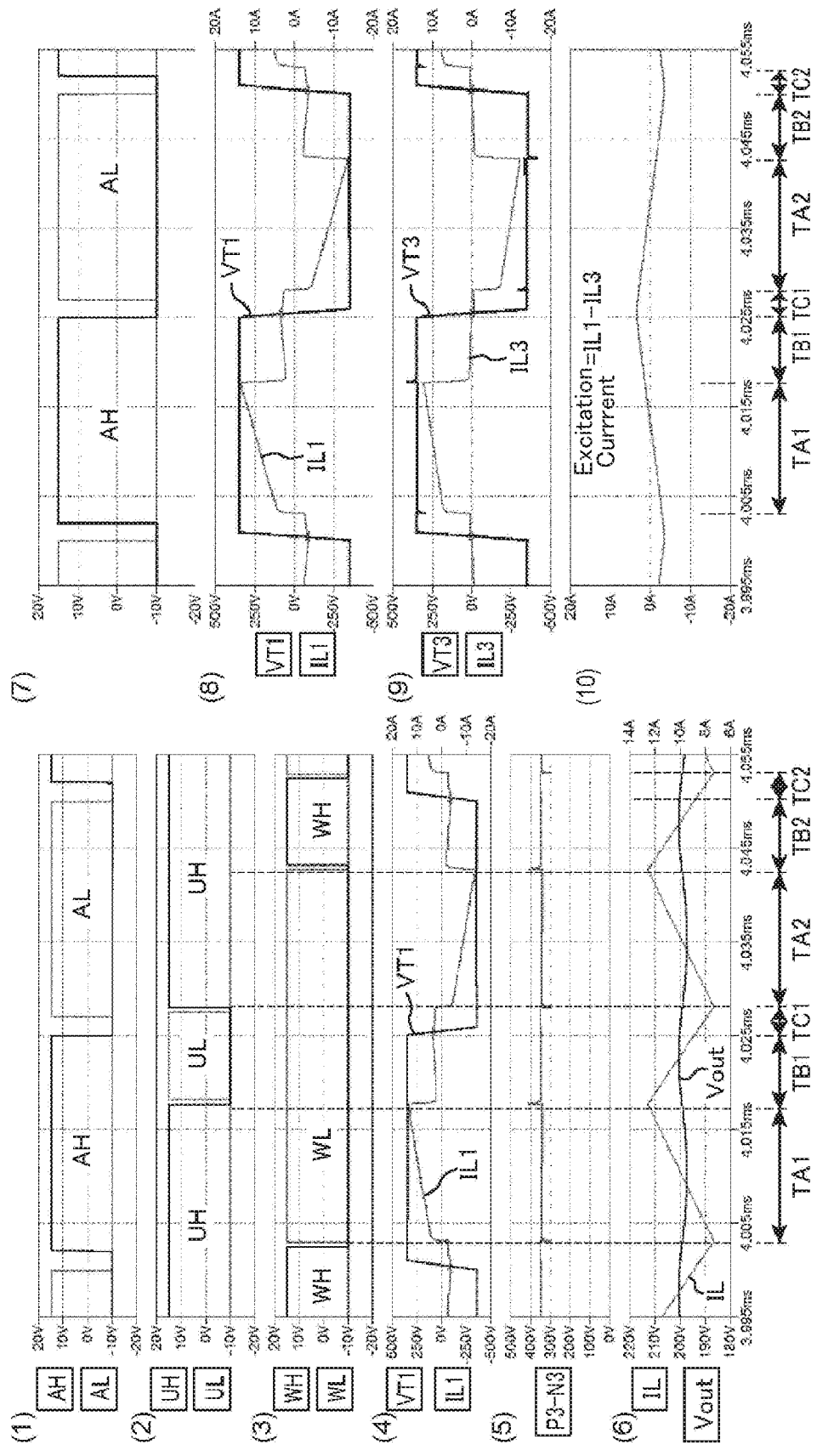
FIG. 28 is a diagram for illustration of timing charts of the power conversion system 1A in the inverter mode.

Next, timing charts of the power conversion system 1A in the inverter mode are described. FIG. 28 is a diagram for illustration of the timing chart of the power conversion system 1A in the inverter mode.

In FIG. 28, (1) represents on and off states of the switching devices AH and AL, wherein the on state means having a high level and the off state means having a low level. (2) represents on and off states of the switching devices UH and UL, wherein the on state means having a high level and the off state means having a low level. (3) represents on and off states of the switching devices WH and WL, wherein the on state means having a high level and the off state means having a low level. (4) represents the voltage VT1 and the current IL1. (5) represents the voltage [P3–N3]. (6) represents the current IL and the voltage Vout.

(7) is same as (1). (8) represents the voltage VT1 and the current IL1. (9) represents the voltage VT3 and the current IL3. (10) represents the excitation current equal to (IL1–IL3). Note that, in FIG. 28, operations of the switching devices BL, XH, and YL are same as that of the switching device AH and operations of the switching devices BH, XL, and YH are same as that of the switching device AL, and hence illustration thereof is omitted.

<Supply Time Period TA1>

With reference to (1) and (7), the control unit 13 turns on the switching devices AH, BL, XH and YL and off the switching devices AL, BH, XL, and YH. With reference to (2) and (3), the control unit 13 turns on the switching devices UH and WL and off the switching devices UL and WH to allow the converter unit 7 to come into the supplying mode.

<Circulation Time Period TB1>

The circulation time period TB1 follows after the supply time period TA1. (2) and (3) show the control unit 13 turns on the switching devices UL and WL and off the switching devices UH and WH while the switching devices AH, BL, XH and YL are on and the switching devices AL, BH, XL, and YH are off to allow the converter unit 7 to come into the circulating mode.

<Reversal Time Period TC1>

The reversal time period TC1 follows after the circulation time period TB1. With reference to (1) and (7), the control unit 13 turns off the switching devices AH, AL, BH, BL, XH, XL, WH, and WL while keeping the converter unit 7 in the circulating mode.

<Supply Time Period TA2>

The supply time period TA2 follows after the reversal time period TC1. With reference to (1) and (7), the control unit 13 turns off the switching devices AH, BL, XH, and YH and on the switching devices AL, BH, XL, and YL. In this regard, (2) and (3) show the control unit 13 turns on the switching devices UH and WL and off the switching devices UL and WH to allow the converter unit 7 to come into the supplying mode.

<Circulation Time Period TB2>

The circulation time period TB2 follows after the supply time period TA2. (2) and (3) show the control unit 13 turns on the switching devices UH and WH and off the switching devices UL and WL while the switching devices AL, BH, XL and YH are on and the switching devices AH, BL, XH, and YL are off to allow the converter unit 7 to come into the circulating mode.

<Reversal Time Period TC2>

The reversal time period TC2 follows after the circulation time period TB2. With reference to (1) and (7), the control unit 13 turns off the switching devices AH, AL, BH, BL, XH, XL, YH, and YL while keeping the converter unit 7 in the circulating mode.

Figure 29:
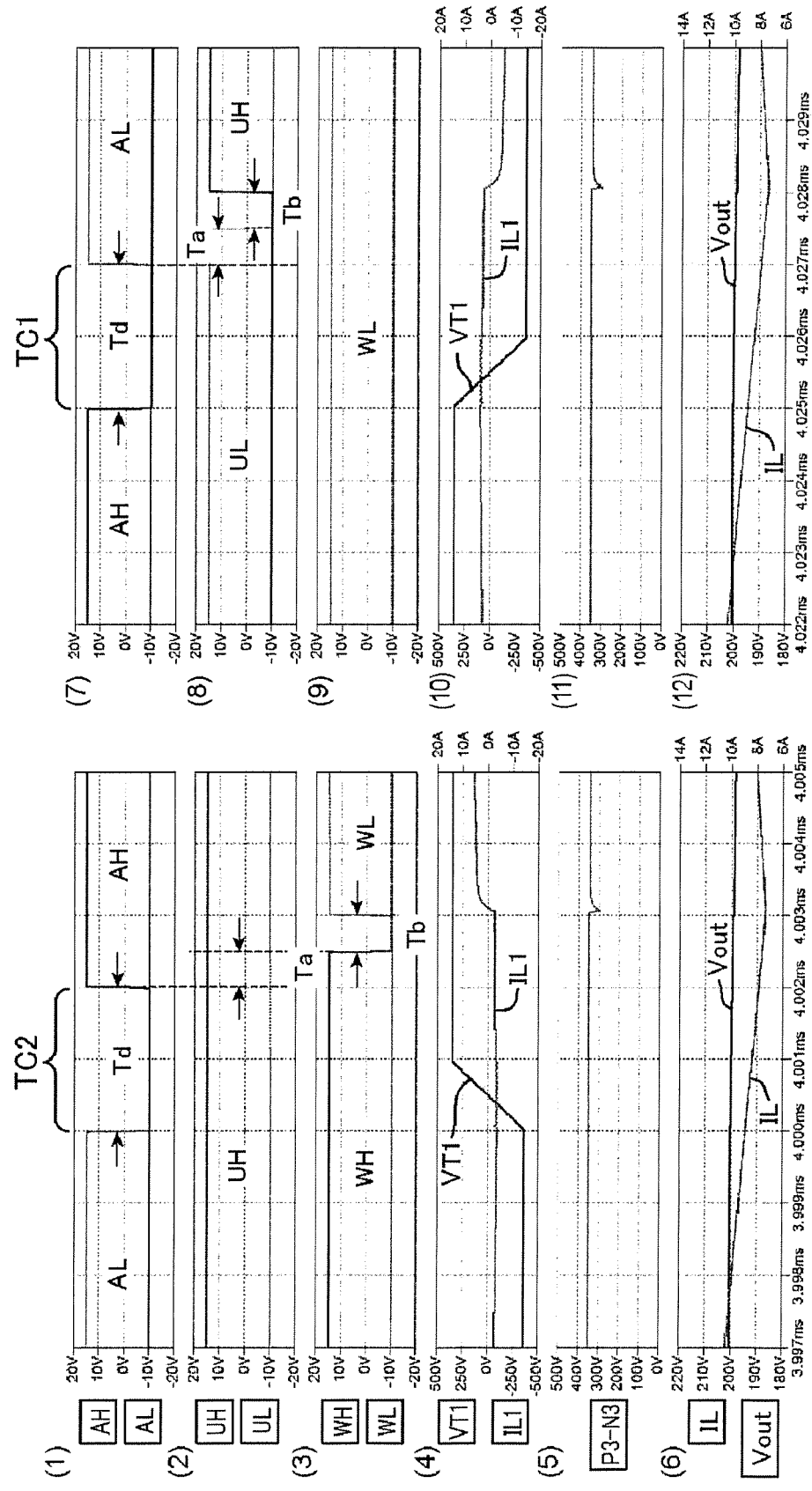
FIG. 29 is illustration for enlarged timing charts regarding reversal time periods TC1 and TC2 in FIG. 28.

FIG. 29 shows enlarged timing charts regarding the reversal time periods TC1 and TC2 in FIG. 28. Details of FIG. 29 are same as those of FIG. 24 and therefore explanations thereof are omitted.

As described above, the power conversion system 1A cyclically repeats the supply time period TA1, the circulation time period TB1, the reversal time period TC1, the supply time period TA2, the circulation time period TB2, and the reversal time period TC2 to implement the inverter mode. Further, the power conversion system 1A changes a ratio of the supply time period TA1 and the supply time period TA2 in one period by PWM control to generate a desired voltage Vout.

<Converter Mode>

Figure 30:
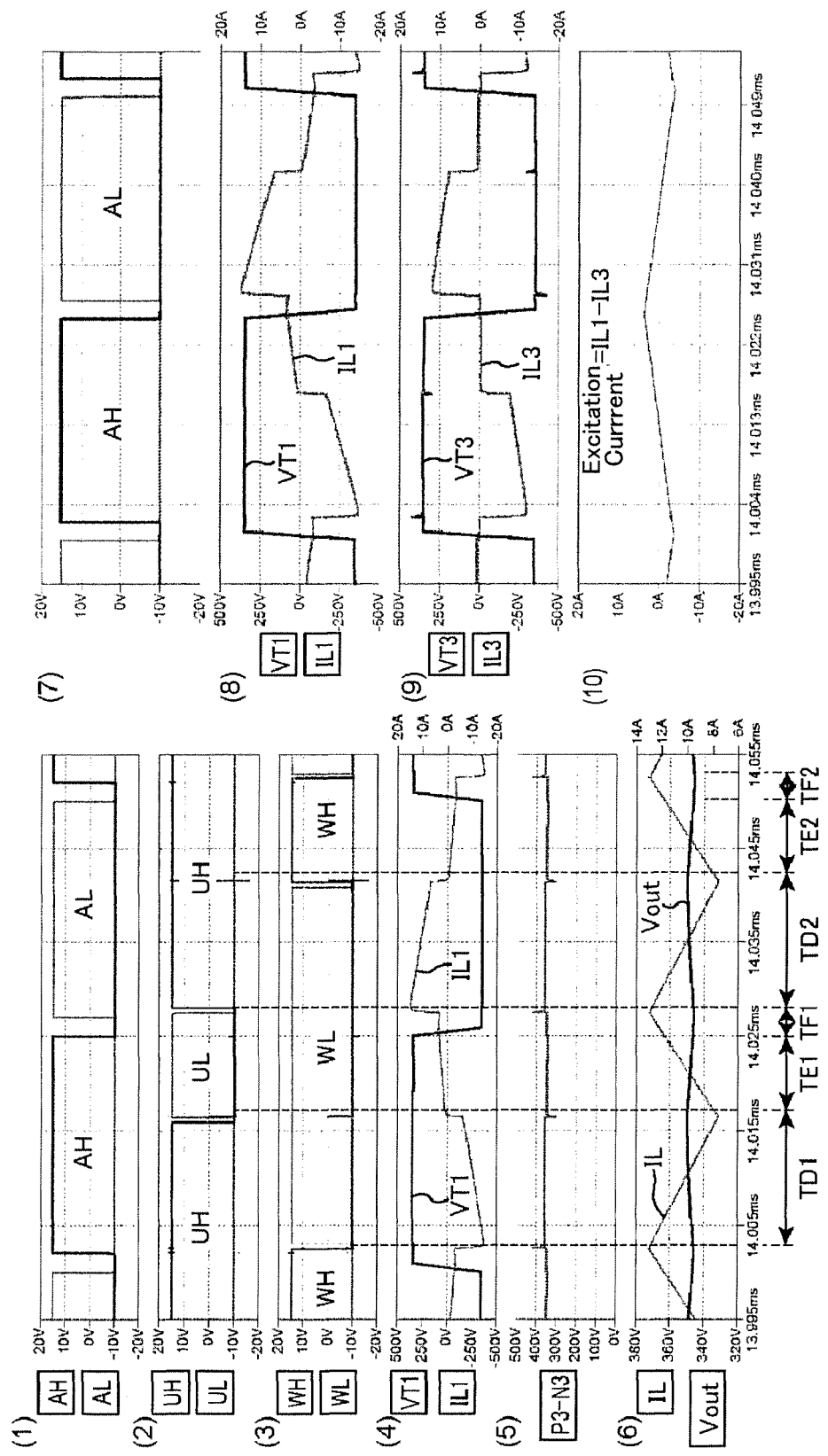
FIG. 30 is a diagram for illustration of timing charts of the power conversion system 1A in the converter mode.

Next, timing charts of the power conversion system 1A in the converter mode are described. FIG. 30 is a diagram for illustration of the timing chart of the power conversion system 1A in the converter mode. (1) to (10) of FIG. 30 show waveforms corresponding to those of (1) to (10) of FIG. 29, respectively. In this regard, the current IL is positive when it flows in a direction opposite to the arrow in FIG. 27.

<Return Time Period TD1>

With reference to (1) and (7), the control unit 13 turns on the switching devices AH, BL, XH, and YL and off the switching devices AL, BH, XL, and YH. With reference to (2) and (3), the control unit 13 turns on the switching devices UH and WL and off the switching devices UL and WH to allow the converter unit 7 to come into the returning mode.

<Circulation Time Period TE1>

The circulation time period TE1 follows after the return time period TD1. (2) and (3) show the control unit 13 turns on the switching devices UL and WL and off the switching devices UH and WH while the switching devices AH, BL, XH, and YL are on and the switching devices AL, BH, XL, and YH are off to allow the converter unit 7 to come into the circulating mode.

<Reversal Time Period TF1>

The reversal time period TF1 follows after the circulation time period TE1. With reference to (1) and (7), the control unit 13 turns off the switching devices AH, AL, BH, BL, XH, XL, YH, and YL while keeping the converter unit 7 in the circulating mode.

<Return Time Period TD2>

The return time period TD2 follows after the reversal time period TF1. With reference to (1) and (7), the control unit 13 turns on the switching devices AL, BH, XL, and YH and off the switching devices AH, BL, XH, and YL. In this regard, (2) and (3) show the control unit 13 turns on the switching devices UH and WL and off the switching devices UL and WH to allow the converter unit 7 to come into the returning mode.

<Circulation Time Period TE2>

The circulation time period TE2 follows after the return time period TD2. (2) and (3) show the control unit 13 turns off the switching devices UL and WL and on the switching devices UH and WH while the switching devices AL, BH, XL, and YH are on and the switching devices AH, BL, XH, and YL are off to allow the converter unit 7 to come into the circulating mode.

<Reversal Time Period TF2>

The reversal time period TF2 follows after the circulation time period TE2. With reference to (1) and (7), the control unit 13 turns off the switching devices AH, AL, BH, BL, XH, XL, YH, and YL while keeping the converter unit 7 in the circulating mode.

Figure 31:
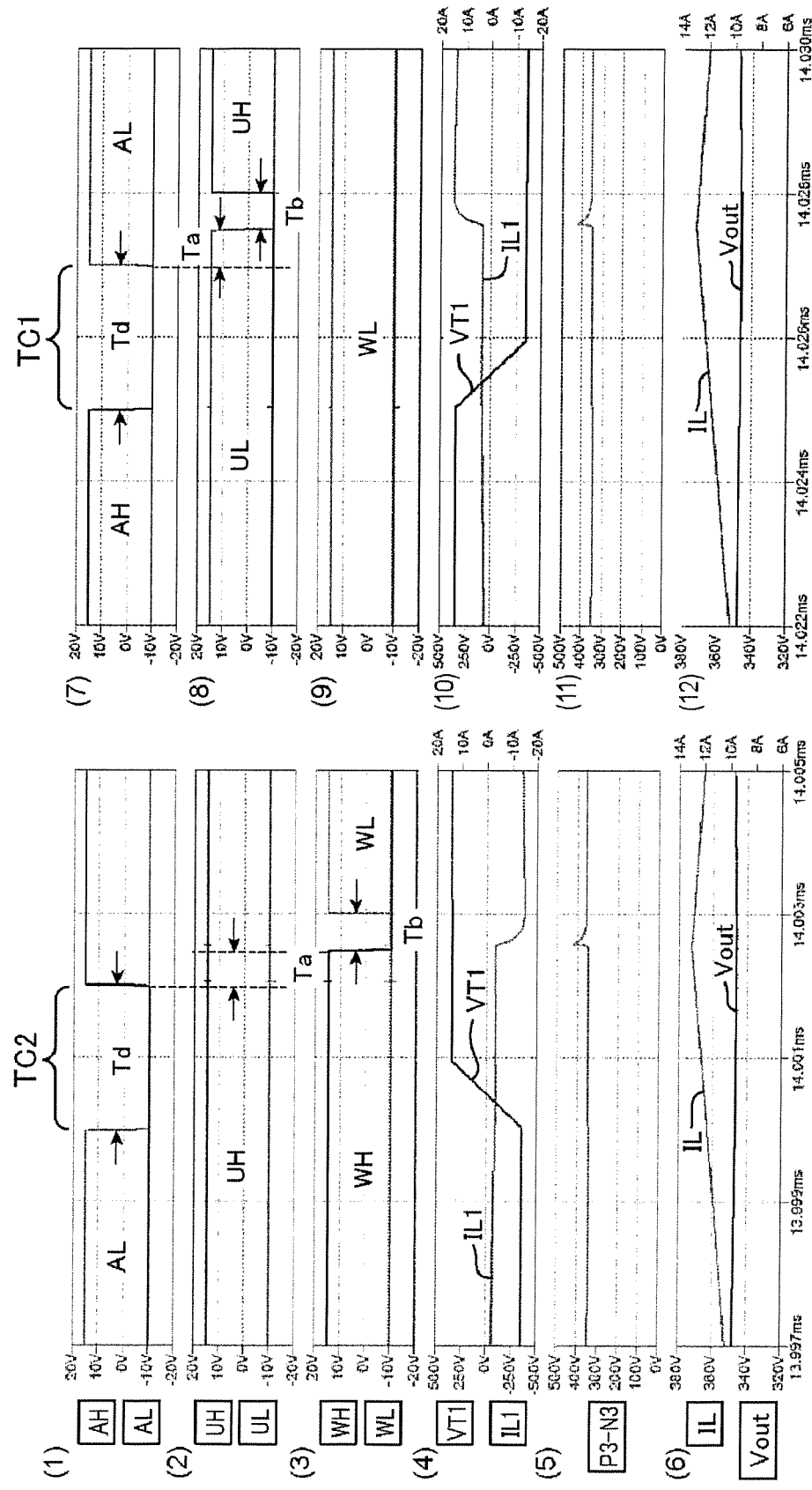
FIG. 31 is illustration for enlarged timing charts regarding reversal time periods TF1 and TF2 in FIG. 30.

FIG. 31 shows enlarged timing charts regarding the reversal time periods TF1 and TF2 in FIG. 30. Details of FIG. 30 are same as those of FIG. 26 and therefore explanations thereof are omitted.

As described above, the power conversion system 1A cyclically repeats the return time period TD1, the circulation time period TE1, the reversal time period TF1, the return time period TD2, the circulation time period TE2, and the reversal time period TF2 to implement the converter mode. Further, the power conversion system 1A changes a ratio of the return time period TD1 and the return time period TD2 in one period by PWM control to return a desired voltage Vout to the DC power supply 17.

To sum up, the power conversion system 1A is constituted by FB-FB circuitry but can offer the same advantageous effects as the power conversion system 1.

Embodiment 3

FIG. 32 is a circuit diagram of a power conversion system 1B according to Embodiment 3. The power conversion system 1B according to Embodiment 3 is characterized in that the converter unit 51 and the primary winding 531 are configured as half bridge (HB) circuitry and the converter unit 52 and the secondary winding 532 are configured as center tap (CNT) circuitry (i.e., HB-CNT).

The converter unit 51 includes two switching devices AH and AL connected in a half bridge arrangement. The switching device AH has a drain connected to the terminal P2 and a source connected to the terminal T2. The switching device AL has a drain connected to the terminal T2 and a source connected to the terminal N2.

There are diodes DAH and DAL connected to the switching devices AH and AL so that anodes and cathodes of the diodes DAH and DAL are connected to the sources and drains of the switching devices AH and AL, respectively. A capacitor C*1 and a capacitor C*2 are capacitors for generating a DC voltage Vm divided from the voltage VE of the DC power supply 17. The capacitor C*1 is connected between the terminal P2 and the terminal T1 and the capacitor C*2 is connected between the terminal T1 and the terminal N2.

There is a capacitor CAH connected between the drain and source of the switching device AH, and also there is a capacitor CAL connected between the drain and source of the switching device AL. The capacitors CAH and CAL have the same function as the capacitor C14 shown in FIG. 18, and cause soft switching of the converter unit 51 by resonating with the coil L11. Note that, the capacitors CAH and CAL each may be connected between the terminals T1 and T2.

In Embodiment 3, the primary winding 531 has no center tap and therefore includes the coil L11 only. The coil L11 is connected between the terminal T2 and the terminal T1. The coils L11, L3, and L4 are magnetically coupled with each other so that the terminal T2, the center tap CT2, and the terminal T4 have the same polarity.

The configurations of the converter unit 52 and the secondary winding 532 are CNT configuration as already shown in FIG. 1 and accordingly explanations thereof are omitted.

<Timing Chart>

<Inverter Mode>

Figure 33:
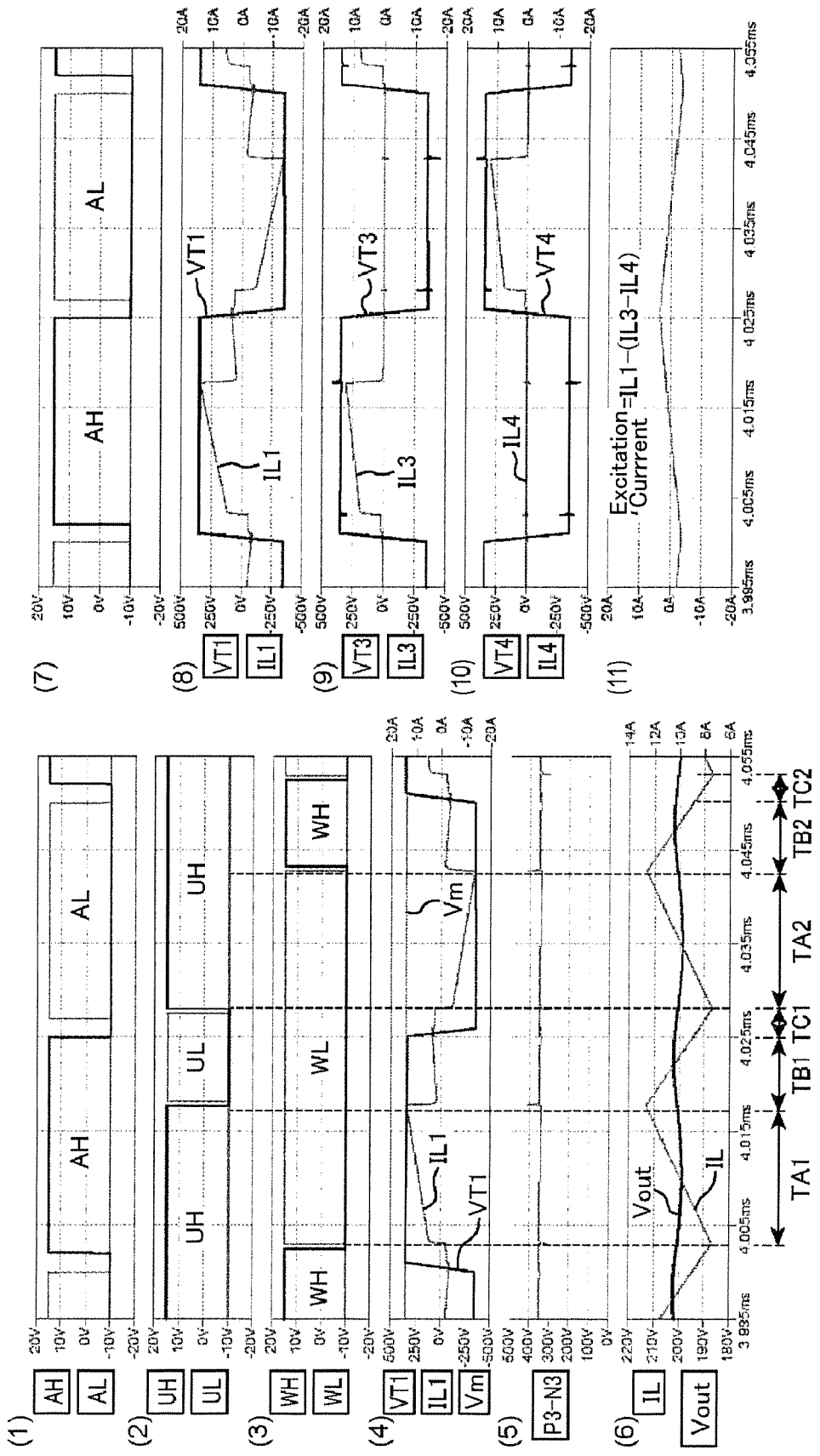
FIG. 33 is a diagram for illustration of timing charts of the power conversion system 1B in the inverter mode.

Next, timing charts of the power conversion system 1B in the inverter mode are described. FIG. 33 is a diagram for illustration of the timing chart of the power conversion system 1B in the inverter mode.

Waveforms shown in (1) to (9) of FIG. 33 are same as the waveforms shown in (1) to (9) of FIG. 28 except for (4) of FIG. 33 further including the DC voltage Vm. The DC voltage Vm indicates the voltage of the terminal T2 from the terminal N2 which is given by (T2−N2) and fluctuates around a constant value throughout a whole time period. Waveforms shown in (10) of FIG. 33 represent waveforms of the voltage VT4 and the current IL4. A waveform shown in (11) of FIG. 33 represents an excitation current given by IL1−(IL3−IL4).

Note that, in FIG. 33, operation of the switching device YL is same as that of the switching device AH and operation of the switching device XL is same as that of the switching device AL, and hence illustration thereof is omitted.

<Supply Time Period TA1>

With reference to (1) and (7), the control unit 13 turns on the switching devices AH and YL and off the switching devices AL and XL. With reference to (2) and (3), the control unit 13 turns on the switching devices UH and WL and off the switching devices UL and WH to allow the converter unit 7 to come into the supplying mode.

<Circulation Time Period TB1>

The circulation time period TB1 follows after the supply time period TA1. (2) and (3) show the control unit 13 turns on the switching devices UL and WL and off the switching devices UH and WH while the switching devices AH and YL are on and the switching devices AL and XL are off to allow the converter unit 7 to come into the circulating mode.

<Reversal Time Period TC1>

The reversal time period TC1 follows after the circulation time period TB1. With reference to (1) and (7), the control unit 13 turns off the switching devices AH, AL, YL, and XL while keeping the converter unit 7 in the circulating mode.

<Supply Time Period TA2>

The supply time period TA2 follows after the reversal time period TC1. With reference to (1) and (7), the control unit 13 turns on the switching devices AL, and XL and off the switching devices AH and YL. In this regard, (2) and (3) show the control unit 13 turns on the switching devices UH and WL and off the switching devices UL and WH to allow the converter unit 7 to come into the supplying mode.

<Circulation Time Period TB2>

The circulation time period TB2 follows after the supply time period TA2. (2) and (3) show the control unit 13 turns on the switching devices UH and WH and off the switching devices UL and WL while the switching devices AL and XL are on and the switching devices AH and YL are off to allow the converter unit 7 to come into the circulating mode.

<Reversal Time Period TC2>

The reversal time period TC2 follows after the circulation time period TB2. With reference to (1) and (7), the control unit 13 turns off the switching devices AH, AL, XL, and YL while keeping the converter unit 7 in the circulating mode.

Figure 34:
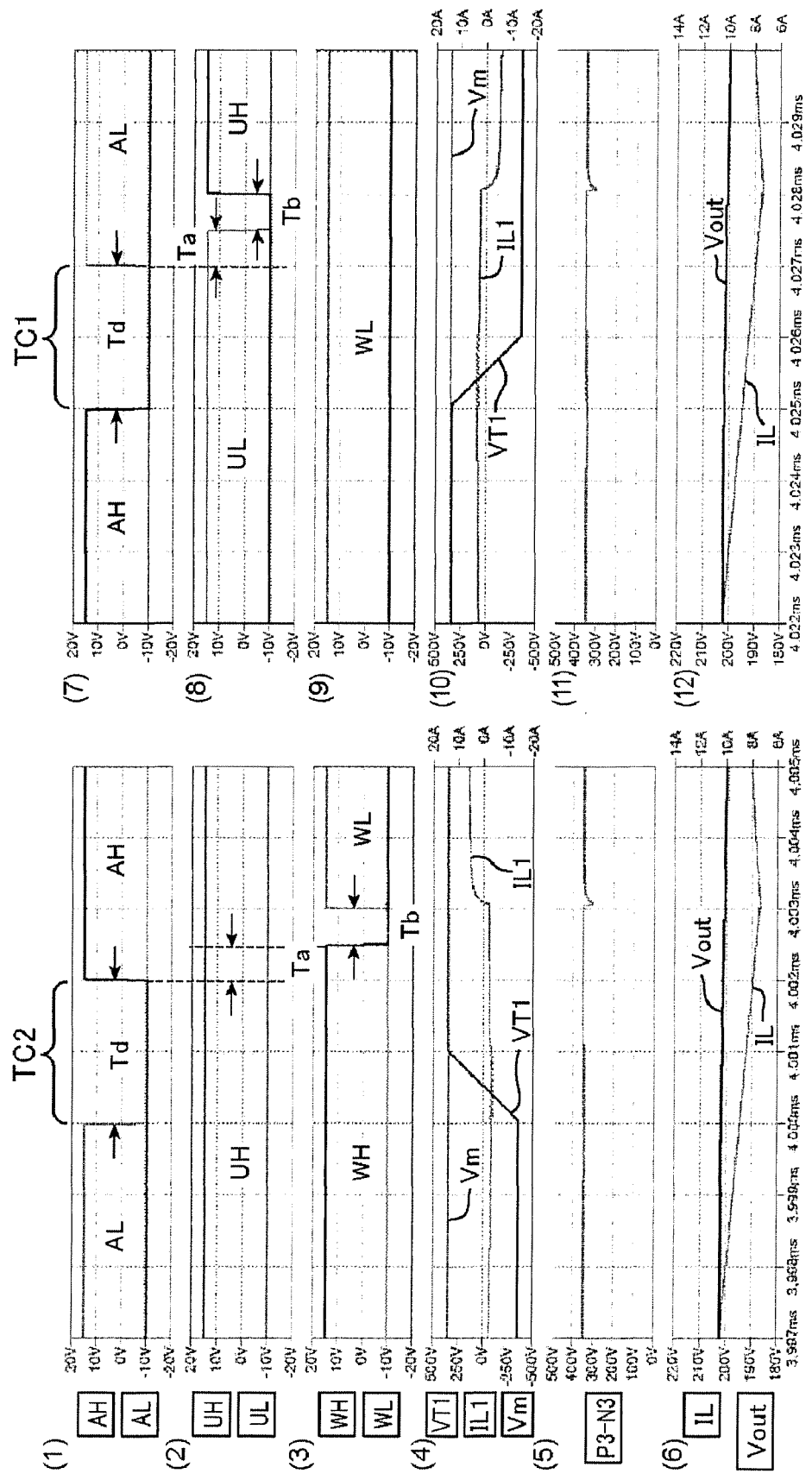
FIG. 34 is illustration for enlarged timing charts regarding reversal time periods TC1 and TC2 in FIG. 30.

FIG. 34 shows enlarged timing charts regarding the reversal time periods TC1 and TC2 in FIG. 33. Details of FIG. 34 are same as those of FIG. 24 and therefore explanations thereof are omitted.

As described above, the power conversion system 1B cyclically repeats the supply time period TA1, the circulation time period TB1, the reversal time period TC1, the supply time period TA2, the circulation time period TB2, and the reversal time period TC2 to implement the inverter mode. Further, the power conversion system 1B changes a ratio of the supply time period TA1 and the supply time period TA2 in one period by PWM control to generate a desired voltage Vout.

<Converter Mode>

Figure 35:
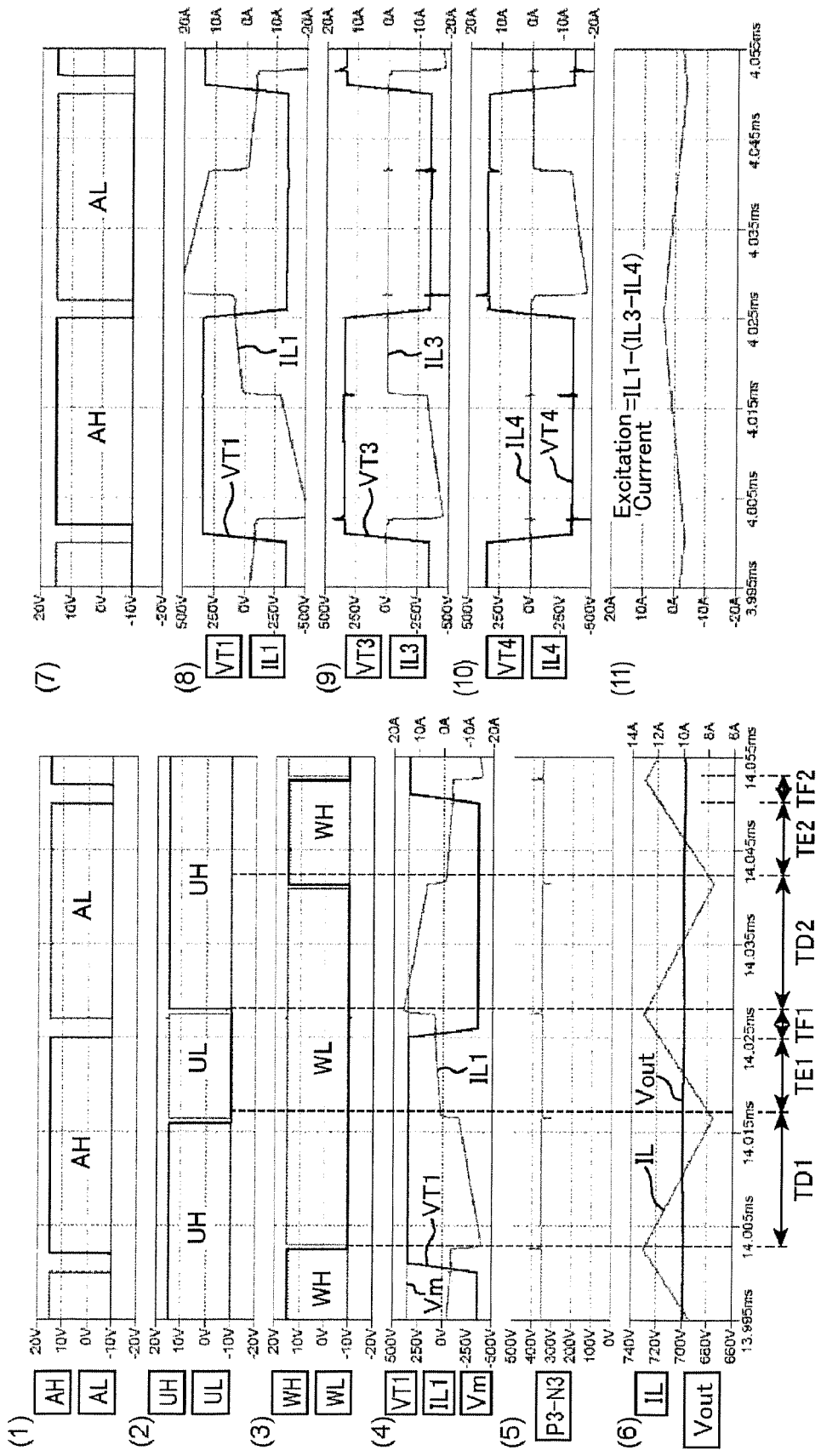
FIG. 35 is a diagram for illustration of timing charts of the power conversion system 1B in the converter mode.

Next, timing charts of the power conversion system 1B in the converter mode are described. FIG. 35 is a diagram for illustration of the timing chart of the power conversion system 1B in the converter mode. Waveforms shown in (1) to (9) of FIG. 35 are same as the waveforms shown in (1) to (9) of FIG. 30 except for (4) of FIG. 35 further including the DC voltage Vm. Waveforms shown in (10) of FIG. 35 represent waveforms of the voltage VT4 and the current IL4. A waveform shown in (11) of FIG. 35 represents an excitation current given by IL1−(IL3−IL4). In this regard, the current IL is positive when it flows in a direction opposite to the arrow in FIG. 32.

Note that, in FIG. 35, operations of the switching device YL is same as that of the switching device AH and operation of the switching device XL is same as that of the switching device AL, and hence illustration thereof is omitted.

<Return Time Period TD1>

With reference to (1) and (7), the control unit 13 turns on the switching devices AH and YL and off the switching devices AL and XL. With reference to (2) and (3), the control unit 13 turns on the switching devices UH and WL and off the switching devices UL and WH to allow the converter unit 7 to come into the returning mode.

<Circulation Time Period TE1>

The circulation time period TE1 follows after the return time period TD1. (2) and (3) show the control unit 13 turns on the switching devices UL and WL and off the switching devices UH and WH while the switching devices AH and YL are on and the switching devices AL and XL are off to allow the converter unit 7 to come into the circulating mode.

<Reversal Time Period TF1>

The reversal time period TF1 follows after the circulation time period TE1. With reference to (1) and (7), the control unit 13 turns off the switching devices AH, AL, XL, and YL while keeping the converter unit 7 in the circulating mode.

<Return Time Period TD2>

The return time period TD2 follows after the reversal time period TF1. With reference to (1) and (7), the control unit 13 turns on the switching devices AL and YL and off the switching devices AH and XL. In this regard, (2) and (3) show the control unit 13 turns on the switching devices UH and WL and off the switching devices UL and WH to allow the converter unit 7 to come into the returning mode.

<Circulation Time Period TE2>

The circulation time period TE2 follows after the return time period TD2. (2) and (3) show the control unit 13 turns off the switching devices UL and WL and on the switching devices UH and WH while the switching devices AL and YL are on and the switching devices AH and XL are off to allow the converter unit 7 to come into the circulating mode.

<Reversal Time Period TF2>

The reversal time period TF2 follows after the circulation time period TE2. With reference to (1) and (7), the control unit 13 turns off the switching devices AH, AL, YL, and XL while keeping the converter unit 7 in the circulating mode.

Figure 36:
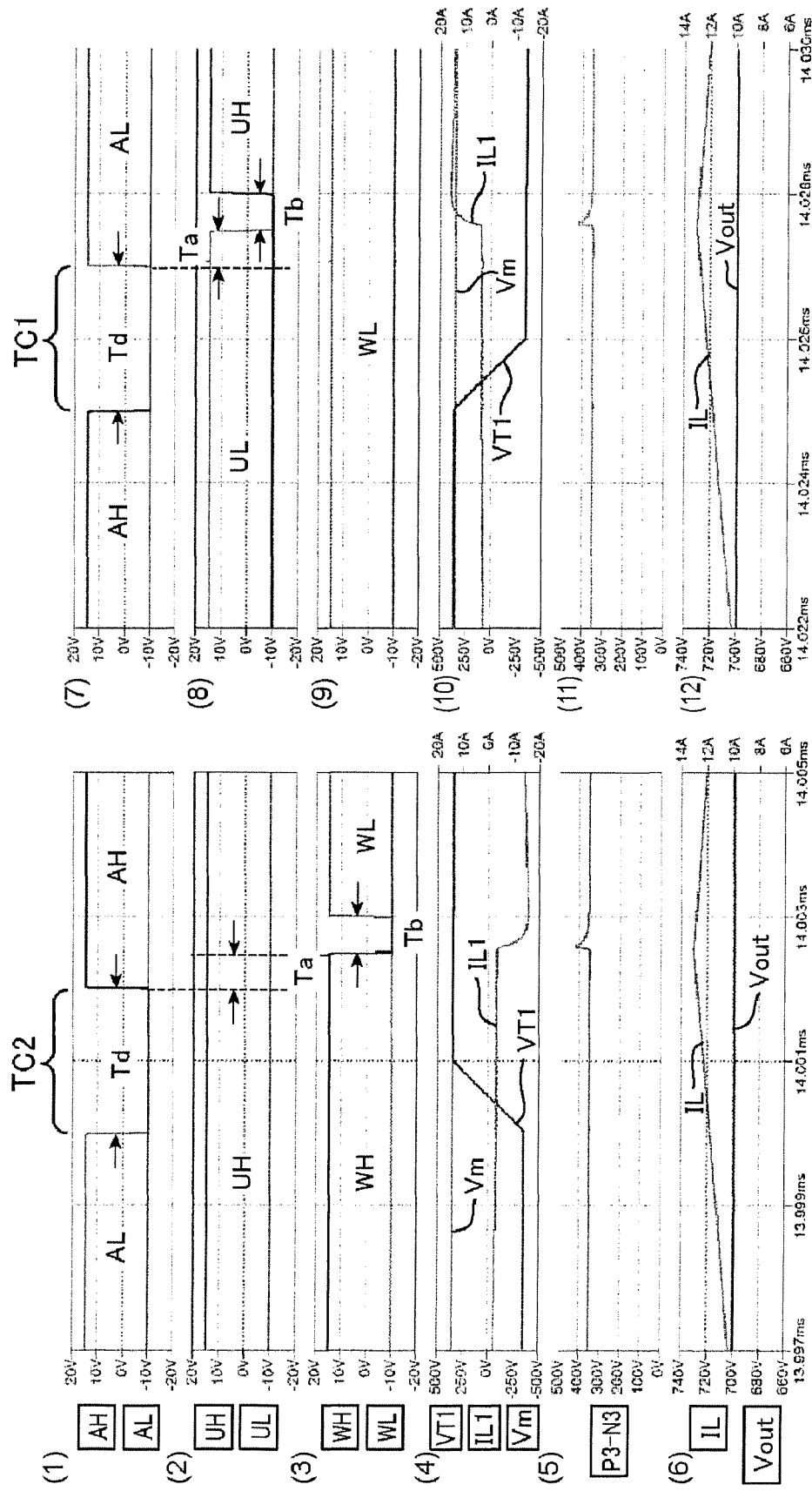
FIG. 36 is illustration for enlarged timing charts regarding reversal time periods TF1 and TF2 in FIG. 35.

FIG. 36 shows enlarged timing charts regarding the reversal time periods TF1 and TF2 in FIG. 35. Details of FIG. 36 are same as those of FIG. 26 and therefore explanations thereof are omitted.

As described above, the power conversion system 1B cyclically repeats the return time period TD1, the circulation time period TE1, the reversal time period TF1, the return time period TD2, the circulation time period TE2, and the reversal time period TF2 to implement the converter mode. Further, the power conversion system 1B changes a ratio of the return time period TD1 and the return time period TD2 in one period by PWM control to return a desired voltage Vout to the DC power supply 17.

To sum up, the power conversion system 1B is constituted by HB-CNT circuitry but can offer the same advantageous effects as the power conversion system 1.

Embodiment 4

Figure 37:
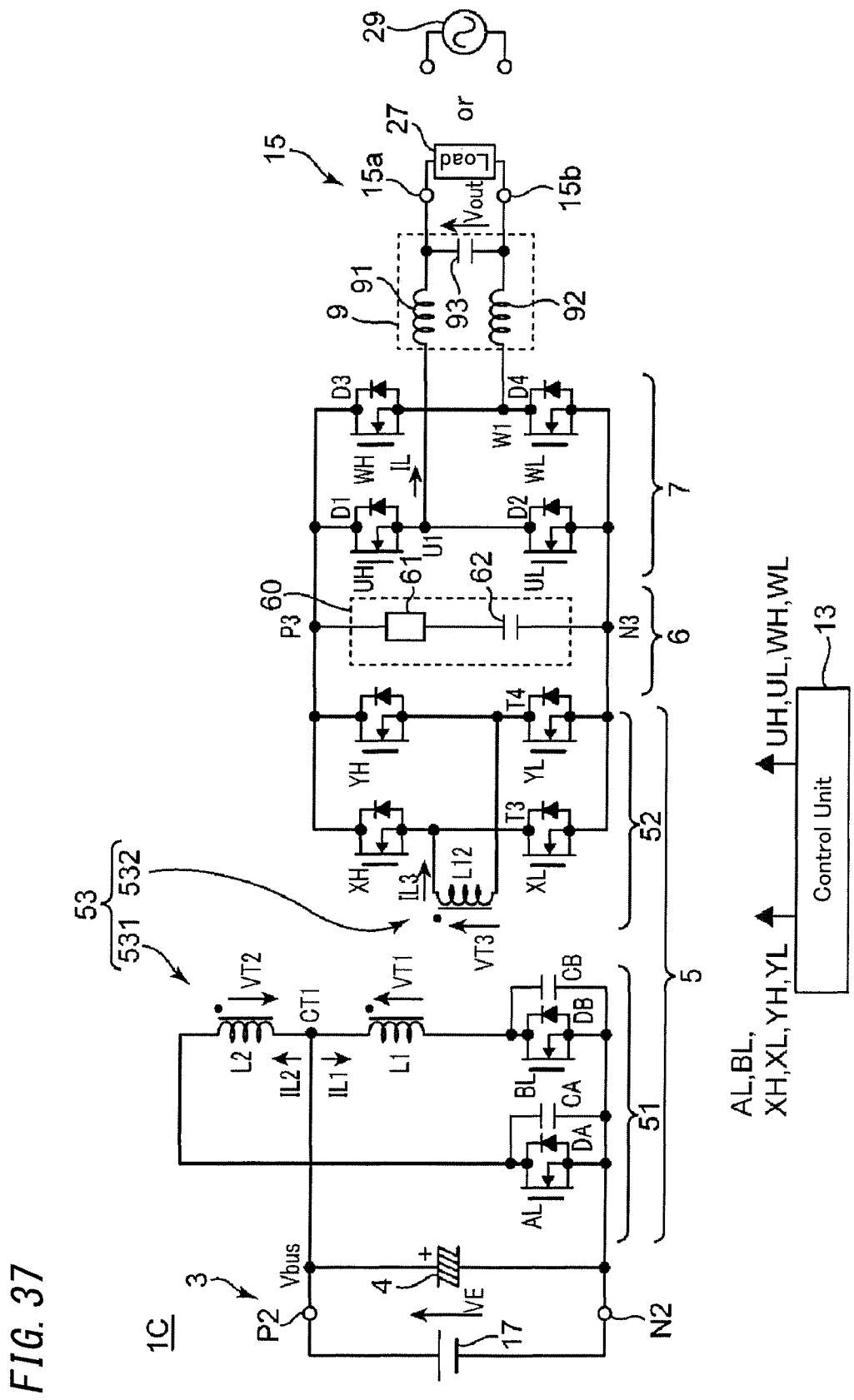
FIG. 37 is a circuit diagram of a power conversion system 1C according to Embodiment 4.

FIG. 37 is a circuit diagram of a power conversion system 1C according to Embodiment 4. The power conversion system 1C according to Embodiment 4 is characterized in that the converter unit 51 and the primary winding 531 are configured as center tap (CNT) circuitry and the converter unit 52 and the secondary winding 532 are configured as full bridge (FB) circuitry (i.e., CNT-FB).

The configurations of the converter unit 51 and the primary winding 531 are CNT circuitry as already shown in FIG. 1 and accordingly explanations thereof are omitted.

The configurations of the converter unit 52 and the secondary winding 532 are FB circuitry as already shown in FIG. 27 and accordingly explanations thereof are omitted.

To sum up, the power conversion system 1C is constituted by CNT-FB circuitry but can offer the same advantageous effects as the power conversion system 1.

Embodiment 5

FIG. 38 is a circuit diagram of a power conversion system 1D according to Embodiment 5. The power conversion system 1D according to Embodiment 5 is characterized in that the converter unit 51 and the primary winding 531 are configured as half bridge (HB) circuitry and the converter unit 52 and the secondary winding 532 are configured as full bridge (FB) circuitry (i.e., HB-FB).

The configurations of the converter unit 51 and the primary winding 531 are HB circuitry as already shown in FIG. 37 and accordingly explanations thereof are omitted.

The configurations of the converter unit 52 and the secondary winding 532 are FB circuitry as already shown in FIG. 27 and accordingly explanations thereof are omitted.

To sum up, the power conversion system 1D is constituted by HB-FB circuitry but can offer the same advantageous effects as the power conversion system 1.

Embodiment 6

Figure 39:
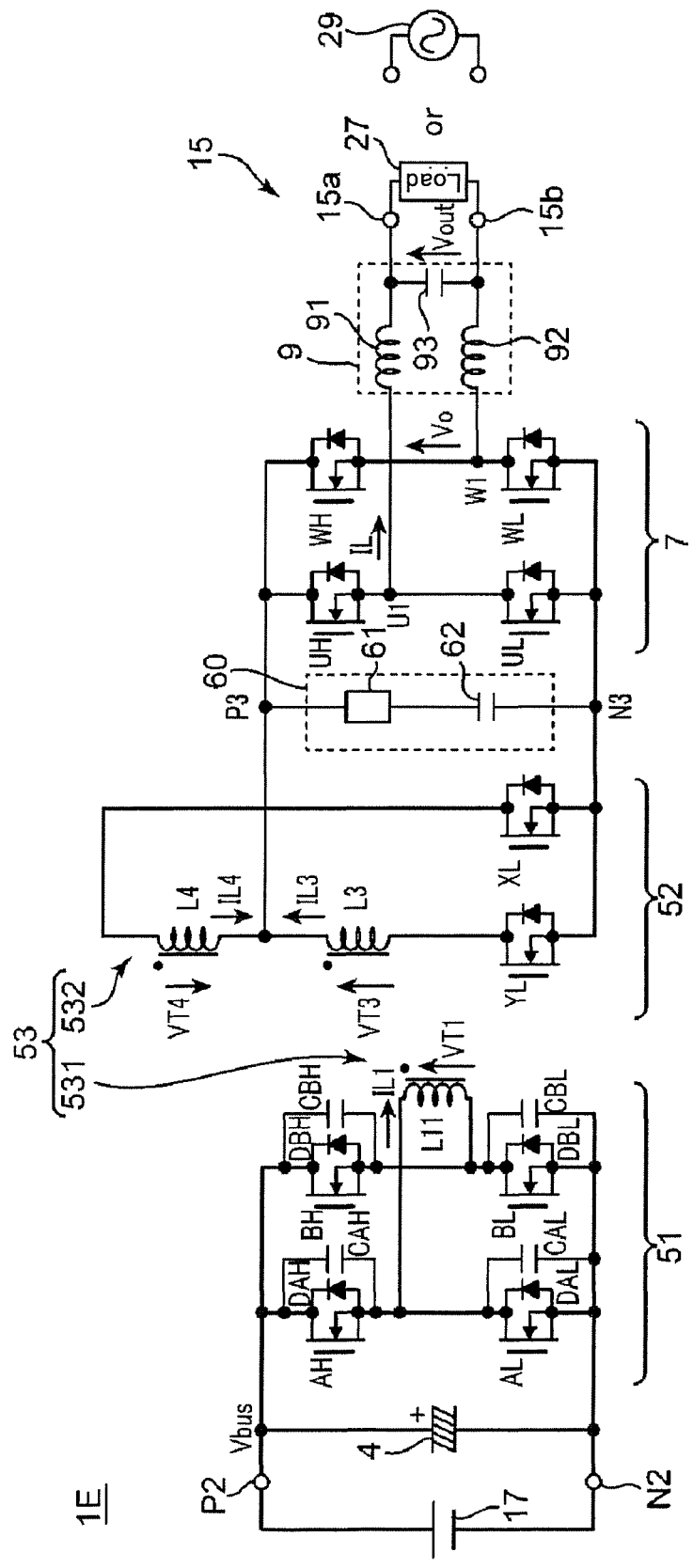
FIG. 39 is a circuit diagram of a power conversion system 1E according to Embodiment 6.

FIG. 39 is a circuit diagram of a power conversion system 1E according to Embodiment 6. The power conversion system 1E according to Embodiment 6 is characterized in that the converter unit 51 and the primary winding 531 are configured as full bridge (FB) circuitry and the converter unit 52 and the secondary winding 532 are configured as center tap (CNT) circuitry (i.e., FB-CNT).

The configurations of the converter unit 51 and the primary winding 531 are FB circuitry as already shown in FIG. 27 and accordingly explanations thereof are omitted.

The configurations of the converter unit 52 and the secondary winding 532 are CNT circuitry as already shown in FIG. 1 and accordingly explanations thereof are omitted.

To sum up, the power conversion system 1E is constituted by FB-CNT circuitry but can offer the same advantageous effects as the power conversion system 1.

Embodiment 7

FIG. 40 is a circuit diagram of a power conversion system 1F according to Embodiment 7. The power conversion system 1F according to Embodiment 7 is characterized in that the converter unit 51 and the primary winding 531 are configured as center tap (CNT) circuitry and the converter unit 52 and the secondary winding 532 are configured as half bridge (HB) circuitry (i.e., CNT-HB).

The configurations of the converter unit 51 and the primary winding 531 are CNT circuitry as already shown in FIG. 1 and accordingly explanations thereof are omitted.

The converter unit 52 includes two switching devices XH and XL connected in a half bridge arrangement. The switching device XH has a drain connected to the terminal P3 and a source connected to the terminal T3. The switching device XL has a drain connected to the terminal T3 and a source connected to the terminal N3.

There are diodes DXH and DXL connected to the switching devices XH and XL so that anodes and cathodes of the diodes DXH and DXL are connected to the sources and drains of the switching devices XH and XL, respectively.

There is a capacitor CXH connected between the terminal P3 and the terminal T4, and also there is a capacitor CXL connected between the terminal T4 and the terminal N3. The capacitor CXH and the capacitor CXL are capacitors for generating a DC voltage divided from a voltage between the terminal P3 and the terminal N3.

In Embodiment 7, the secondary winding 532 has no center tap and therefore includes the coil L12 only. The coil L12 is connected between the terminal T3 and the terminal T4.

The coils L1, L2, and L12 are magnetically coupled with each other so that the center tap CT1, the terminal T2, and the terminal T3 have the same polarity.

To sum up, the power conversion system 1F is constituted by CNT-HB circuitry but can offer the same advantageous effects as the power conversion system 1.

Embodiment 8

Figure 41:
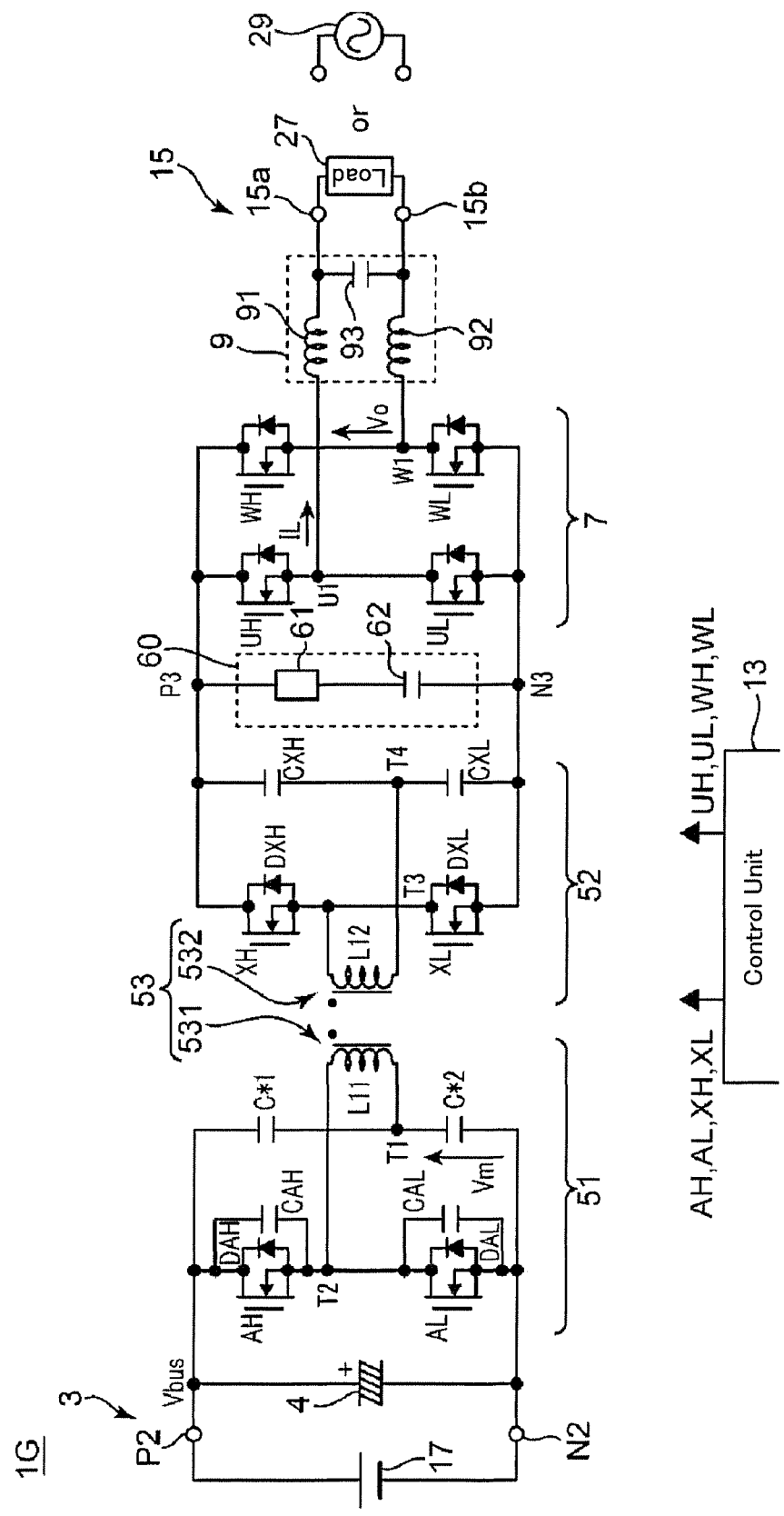
FIG. 41 is a circuit diagram of a power conversion system 1G according to Embodiment 8.

FIG. 41 is a circuit diagram of a power conversion system 1G according to Embodiment 8. The power conversion system 1G according to Embodiment 8 is characterized in that the converter unit 51 and the primary winding 531 are configured as half bridge (HB) circuitry and the converter unit 52 and the secondary winding 532 are configured as half bridge (HB) circuitry (i.e., HB-HB).

The configurations of the converter unit 51 and the primary winding 531 are HB circuitry as already shown in FIG. 32 and accordingly explanations thereof are omitted.

The configurations of the converter unit 52 and the primary winding 532 are HB circuitry as already shown in FIG. 40 and accordingly explanations thereof are omitted.

To sum up, the power conversion system 1G is constituted by HB-HB circuitry but can offer the same advantageous effects as the power conversion system 1.

Embodiment 9

FIG. 42 is a circuit diagram of a power conversion system 1H according to Embodiment 9. The power conversion system 1H according to Embodiment 9 is characterized in that the converter unit 51 and the primary winding 531 are configured as full bridge (FB) circuitry and the converter unit 52 and the secondary winding 532 are configured as half bridge (HB) circuitry (i.e., FB-HB).

The configurations of the converter unit 51 and the primary winding 531 are FB circuitry as already shown in FIG. 27 and accordingly explanations thereof are omitted.

The configurations of the converter unit 52 and the primary winding 532 are HB circuitry as already shown in FIG. 40 and accordingly explanations thereof are omitted.

To sum up, the power conversion system 1H is constituted by FB-HB circuitry but can offer the same advantageous effects as the power conversion system 1.

Embodiment 10

FIG. 43 is a circuit diagram of a power conversion system 1I according to Embodiment 10. The power conversion system 1I according to Embodiment 10 is based on the power conversion system 1 shown in FIG. 1 but is characterized in that the converter unit 7 is configured as a three-phase inverter.

As shown in FIG. 43, the converter unit 7 is different from that shown in FIG. 1 in that the switching devices VH and VL are added. The switching device VH has a drain connected to the terminal P3 and a source connected to a terminal V1. The switching device VL has a drain connected to the terminal V1 and a source connected to the terminal N3.

There are diodes D5 and D6 connected to the switching devices VH and VL so that anodes and cathodes of the diodes D5 and D6 are connected to the sources and drains of the switching devices VH and VL, respectively. The filter circuit 9 includes coils $9u$, $9v$, and $9w$ and capacitors $9uv$, $9vw$, and $9uw$.

The coil $9u$ is connected between a terminal $15u$ and the terminal U1, the coil $9v$ is connected between a terminal $15v$ and the terminal V1, and the coil $9w$ is connected between a terminal $15w$ and the terminal W1.

The capacitor $9uv$ is connected between the terminal $15u$ and the terminal $15v$, the capacitor $9vw$ is connected between the terminal $15v$ and the terminal $15w$, and the capacitor $9uw$ is connected between the terminal $15u$ and the terminal $15w$. The AC load 27 is an electric appliance operating with a three-phase AC voltage.

<Timing Chart>

Figure 44:
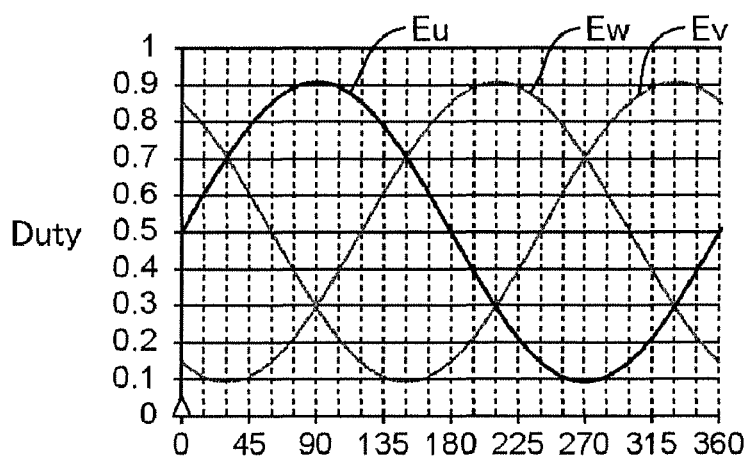
FIG. 44 is a diagram for illustration of timing charts of the power conversion system 1I in the inverter mode in a condition where a phase is 0 degrees.
Figure 44:
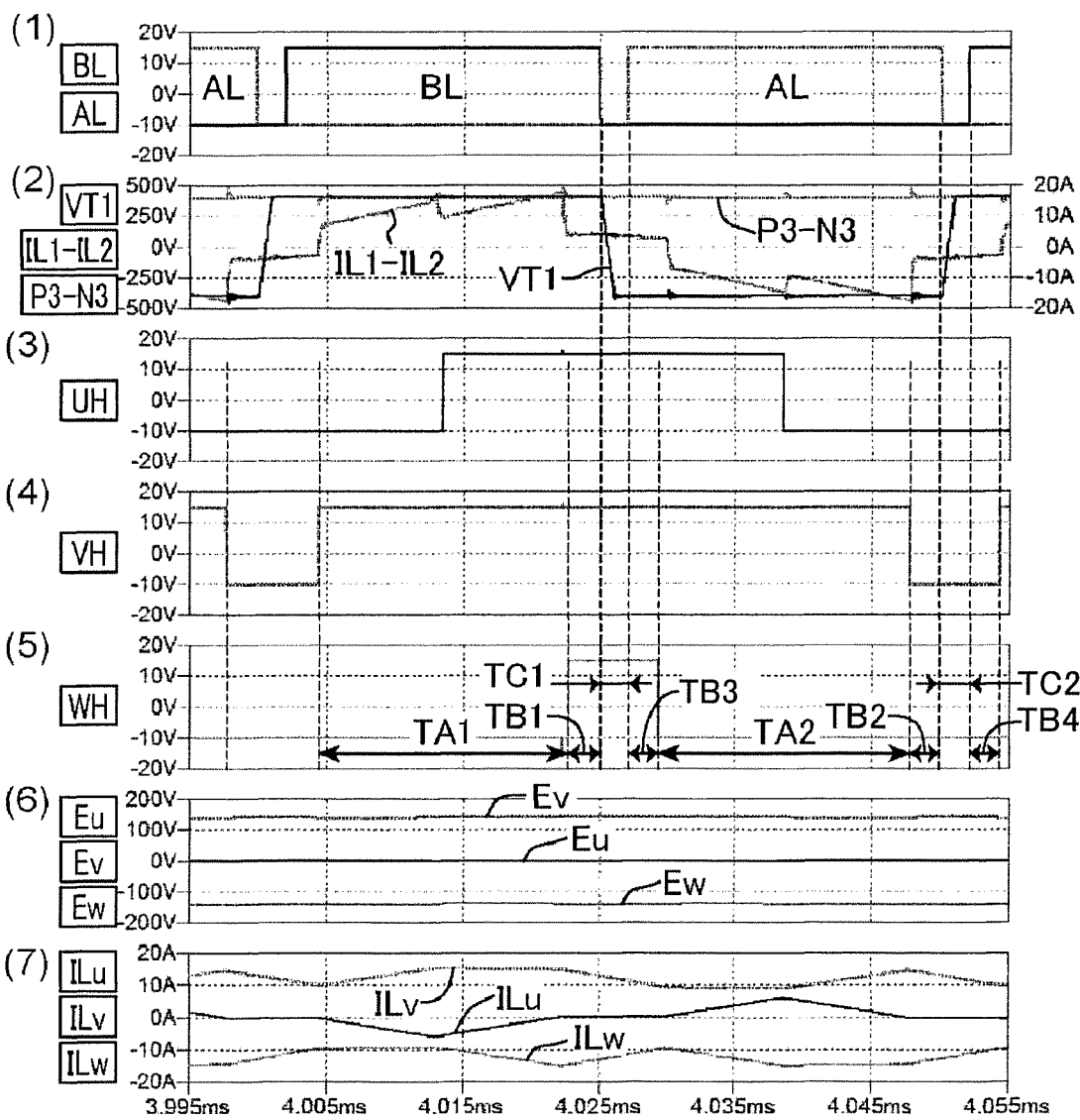

Next, timing charts of the power conversion system 1I in the inverter mode are described. FIG. 44 is illustration for the timing charts of the power conversion system 1I in the inverter mode in a condition where the phase is 0 degrees.

In FIG. 44, (A) shows schematic waveforms of voltages Eu, Ev, and Ew and has a vertical axis representing a duty cycle and a horizontal axis representing a phase. The voltages Eu, Ev, and Ew represent voltages of the terminals $15u$, $15v$, and $15w$ from the ground voltage, that is, phase voltages. The voltage Eu is used as a reference for a phase. The voltage Ev has a phase advanced by 120 degrees relative to the voltage Eu and the voltage Ew has a phase delayed by 120 degrees relative to the voltage Eu.

In FIG. 44, (1) represents on and off states of the switching devices BL and AL, wherein the on state means having a high level and the off state means having a low level. Similarly to Embodiment 1, the switching devices YL and XL are turned on and off in synchronization with the switching devices BL and AL, respectively, and therefore illustration thereof is omitted. (2) represents, the voltage VT1, a current given by (IL1−IL2), and the voltage [P3−N3].

(3), (4), and (5) represent on and off states of the switching devices UH, VH, and WH, wherein the on state means having a high level and the off state means having a low level. Note that, the switching devices UL, VL, and WL have on and off states which are reversed relative to the switching devices UH, VH, and WH, respectively, and accordingly illustration thereof is omitted. On time periods of the switching devices UH, VH, and WH depend on duty cycles. The on time periods of the switching devices UH, VH, and WH are symmetrical about intermediate times of the reversal time periods TC1 and TC2, and are prolonged with increases in duty cycles.

(6) represents waveforms of the voltages Eu, Ev, and Ew. (7) represents waveforms of currents ILu, ILv, and ILw.

<Inverter Mode>

<Supply Time Period TA1>

The control unit 13 turns on the switching device VH while the switching devices BL and YL are on and the switching devices AL and XL are off. Thus, all of the switching devices UH, VH, and WH are no longer off and thus the converter unit 7 comes into the supplying mode.

In the instance shown in FIG. 44, the phase is 0 degrees as shown in (A), the duty cycles of the voltages Eu, Ev, and Ew are "0.5", "0.85", and "0.15", respectively. Accordingly, the control unit 13 turns on the switching devices in the order of the switching devices VH, UH, and WH. The currents ILu, ILv, and ILw are changed in response to the switching devices UH, VH, and WH being turned on, respectively.

<Circulation Time Period TB1>

The control unit 13 turns on the switching device WH. Therefore, all of the switching devices UH, VH, and WH are on and then the converter unit 7 comes into the circulating mode.

<Reversal Time Period TC1>

The control unit 13 turns off the switching devices AL, BL, XL, and YL while the converter unit 7 is made in the circulating mode. Consequently, the polarity of the voltage VT1 is reversed from positive polarity to negative polarity.

<Circulation Time Period TB3>

The control unit 13 turns on the switching devices AL and XL and off the switching devices BL and YL. Therefore, the reversal time period TC1 ends. The converter unit 7 continues the circulating mode and thus the circulation time period TB3 starts.

<Supply Time Period TA2>

When time to turn off the switching device WH comes, the control unit 13 turns off the switching device WH. Consequently, all of the switching devices UH, VH, and WH are no longer on and thus the converter unit 7 is no longer in the circulating mode.

After that, the control unit 13 turns off the switching devices UH and VH sequentially depending on the corresponding duty cycles. The currents ILu, ILv, and ILw are changed in response to the switching devices UH, VH, and WH being turned off, respectively.

<Circulation Time Period TB2>

The control unit 13 turns off the switching device VH. As a result, all of the switching devices UH, VH, and WH are off and thus the converter unit 7 comes into the circulating mode.

<Reversal Time Period TC2>

The control unit 13 turns off the switching devices AL, BL, XL, and YL while the converter unit 7 is made in the circulating mode. Consequently, the polarity of the voltage VT1 is reversed from negative polarity to positive polarity.

<Circulation Time Period TB4>

The control unit 13 turns off the switching devices AL and XL and on the switching devices BL and YL. Therefore, the reversal time period TC2 ends. The converter unit 7 continues the circulating mode and thus the circulation time period TB4 starts.

As described above, the power conversion system 1I cyclically repeats the supply time period TA1, the circulation time period TB1, the reversal time period TC1, the circulation time period TB3, the supply time period TA2, the circulation time period TB2, the reversal time period TC2, and the circulation time period TB4 to implement the inverter mode. Further, the power conversion system 1I provides the reversal time periods TC1 and TC2 when the converter unit 7 is in the circulating mode, and therefore it can perform reversal operation due to resonance of the excitation current and the capacitors CA and CB for resonance, regardless of the load current. Consequently, the reversal operation can be performed stably.

<Converter Mode>

Figure 45:
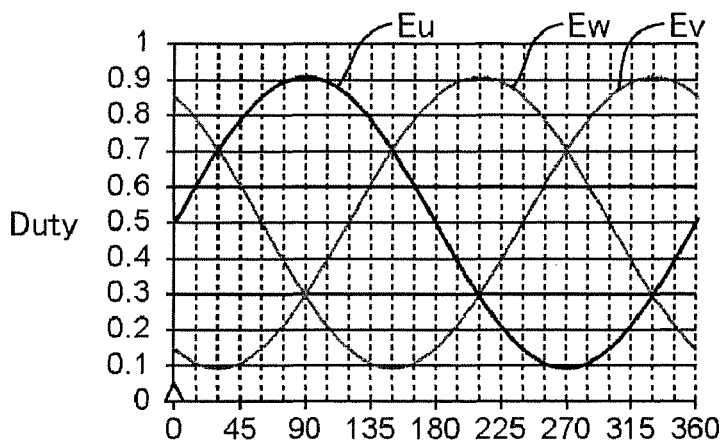
FIG. 45 is a diagram for illustration of timing charts of the power conversion system 1I in the converter mode in a condition where a phase is 0 degrees.
Figure 45:
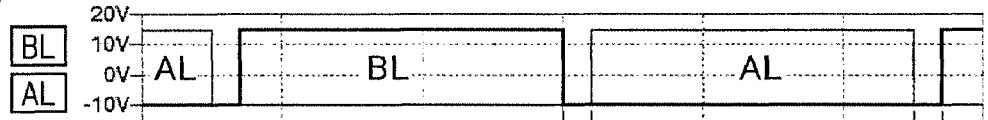
Figure 45:
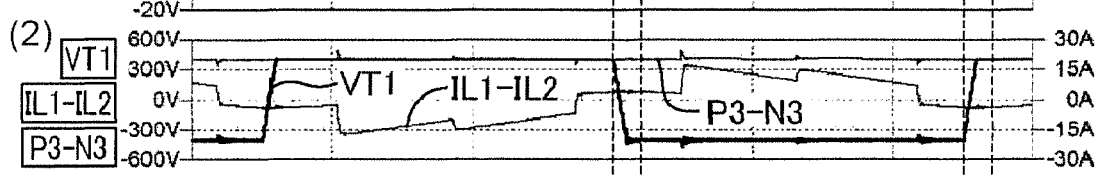
Figure 45:
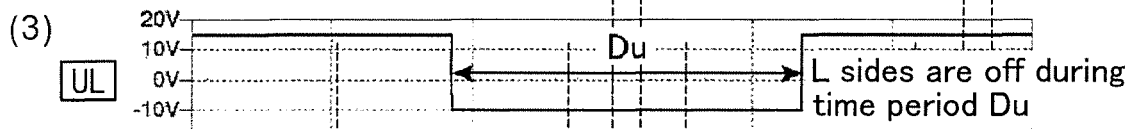
Figure 45:
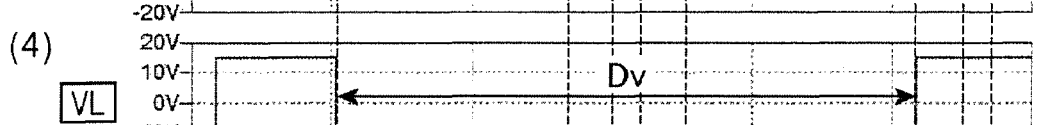
Figure 45:
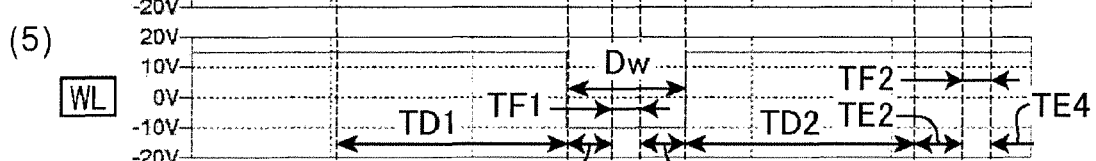
Figure 45:
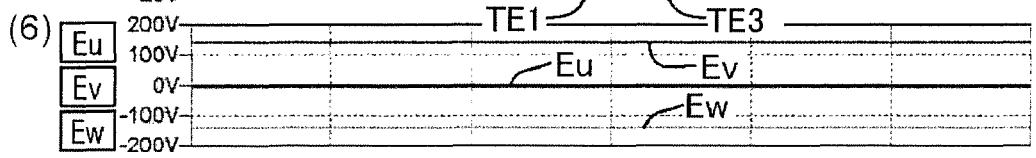
Figure 45:
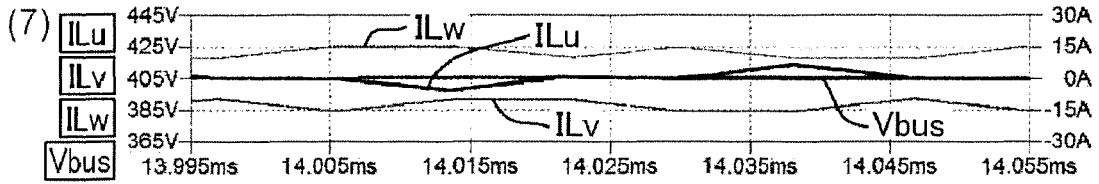

Next, timing charts of the power conversion system 1I in the converter mode are described. FIG. 45 is illustration for the timing charts of the power conversion system 1I in the converter mode in a condition where the phase is 0 degrees. (A) and (1) to (7) of FIG. 45 are the same as those of FIG. 44 except for (3) to (5) representing not the switching devices UH, VH, and WH but the switching devices UL, VL, and WL. Off time periods of the switching devices UL, VL, and WL depend on duty cycles. The off time periods of the switching devices UL, VL, and WL are symmetrical about intermediate times of the reversal time periods TF1 and TF2, and are prolonged with increases in duty cycles. In this regard, the currents ILu, ILv, and ILw are positive when they flow in a direction of the arrow in FIG. 45.

<Return Time Period TD1>

The control unit 13 turns off the switching device VL while the switching devices BL and YL are on and the switching devices AL and XL are off. Thus, all of the switching devices UL, VL, and WL are no longer on and thus the converter unit 7 is no longer in the circulating mode.

In the instance shown in FIG. 45, the phase is 0 degrees as shown in (A), the duty cycles of the voltages Eu, Ev, and Ew are "0.5", "0.85", and "0.15", respectively. Accordingly, the control unit 13 turns off the switching devices in the order of the switching devices VL, UL, and WL. The currents ILu, ILv, and ILw are changed in response to the switching devices UL, VL, and WL being turned off, respectively.

<Circulation Time Period TE1>

The control unit 13 turns off the switching device WL. Therefore, all of the switching devices UL, VL, and WL are off and then the converter unit 7 comes into the circulating mode.

<Reversal Time Period TF1>

The control unit 13 turns off the switching devices AL, BL, XL, and YL while the converter unit 7 is made in the circulating mode. Consequently, the polarity of the voltage VT1 is reversed from positive polarity to negative polarity.

<Circulation Time Period TE3>

The control unit 13 turns on the switching devices AL and XL and off the switching devices BL and YL. Therefore, the reversal time period TF1 ends. The converter unit 7 continues the circulating mode and thus the circulation time period TE3 starts.

<Return Time Period TD2>

When time to turn on the switching device WL comes, the control unit 13 turns on the switching device WL. Consequently, all of the switching devices UL, VL, and WL are no longer off and thus the converter unit 7 is no longer in the circulating mode.

After that, the control unit 13 turns on the switching devices UL and VL sequentially depending on the corresponding duty cycles. The currents ILu, ILv, and ILw are changed in response to the switching devices UL, VL, and WL being turned on, respectively.

<Circulation Time Period TE2>

The control unit 13 turns on the switching device VL. As a result, all of the switching devices UL, VL, and WL are on and thus the converter unit 7 comes into the circulating mode.

<Reversal Time Period TF2>

The control unit 13 turns off the switching devices AL, BL, XL, and YL while the converter unit 7 is made in the circulating mode. Consequently, the polarity of the voltage VT1 is reversed from negative polarity to positive polarity.

<Circulation Time Period TE4>

The control unit 13 turns off the switching devices AL and XL and on the switching devices BL and YL. Therefore, the reversal time period TF2 ends. The converter unit 7 continues the circulating mode and thus the circulation time period TE4 starts.

As described above, the power conversion system 1I cyclically repeats the return time period TD1, the circulation time period TE1, the reversal time period TF1, the circulation time period TE3, the return time period TD2, the circulation time period TE2, the reversal time period TF2, and the circulation time period TE4 to implement the converter mode. Further, the power conversion system 1I provides the reversal time periods TF1 and TF2 when the converter unit 7 is in the circulating mode, and therefore it can perform reversal operation stably. Furthermore, the voltage between the terminal P3 and the terminal N3 can be kept at an almost constant voltage, and therefore the voltage between the terminal P3 and the terminal N3 can be regarded as a DC voltage. Application of conventional PWM control to the converter unit 7 can allow three-phase inverter operation.

Similarly to a case where the converter unit 7 according to Embodiment 1 is constructed by use of the single-phase inverter, the power conversion system 1 can switch between the inverter mode and the converter mode continuously even if the current IL shows polarity different from desired polarity. As a result, the power conversion system 1I is applicable for stand alone devices such as an uninterruptible power system (UPS).

Embodiment 11

Figure 46:
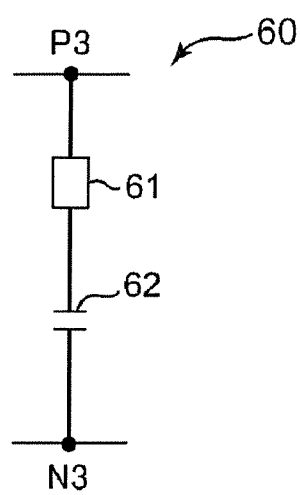
FIG. 46 is illustration of a circuit configuration of the snubber circuit 60 and a waveform chart of voltage [P3–N3].
Figure 46:
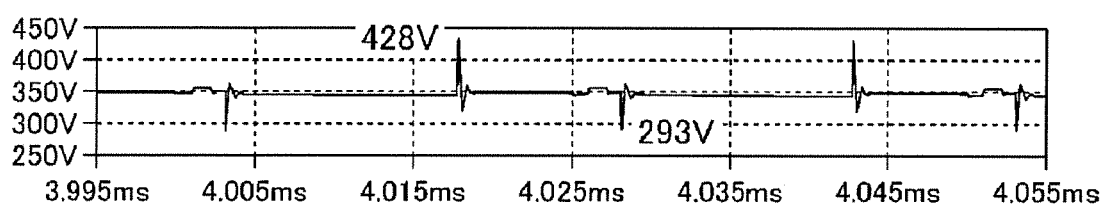
Figure 47:
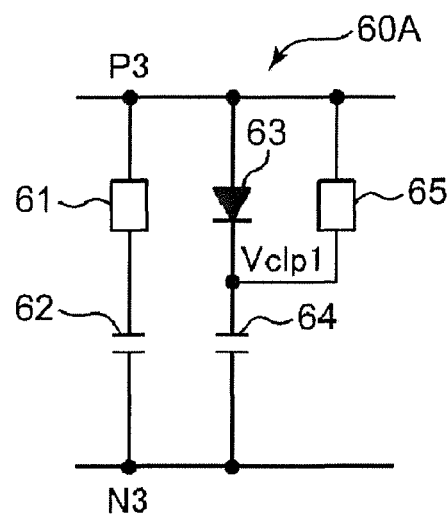
FIG. 47 is illustration of a circuit configuration of a snubber circuit 60A of a first aspect of Embodiment 11 and a waveform chart of voltage [P3–N3].
Figure 47:
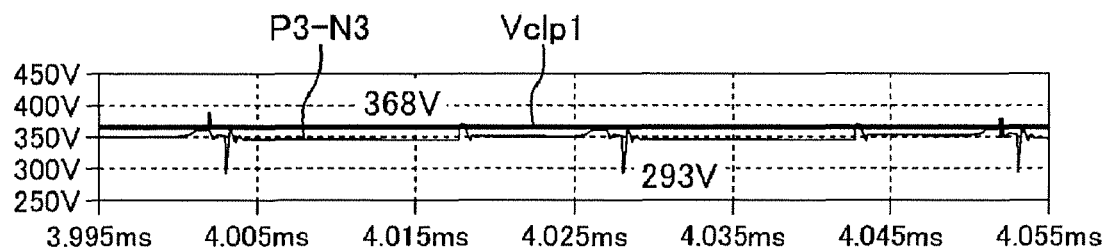
Figure 48:
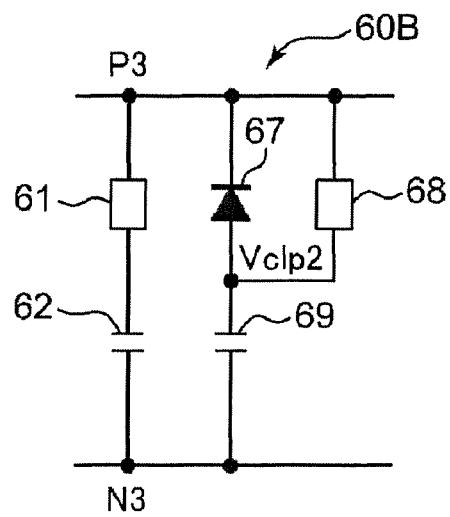
FIG. 48 is illustration of a circuit configuration of a snubber circuit 60B of a second aspect of Embodiment 11 and a waveform chart of voltage [P3–N3].
Figure 48:
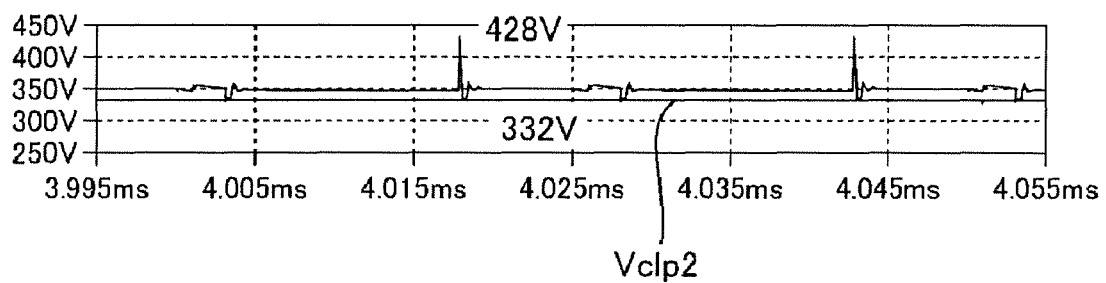

Embodiment 11 is different from Embodiments 1 to 10 in configuration of the snubber circuit 60. FIG. 46 shows circuit configuration of the snubber circuit 60 same as that in Embodiment 1 and a waveform chart of the voltage [P3–N3]. FIG. 47 shows circuit configuration of a snubber circuit 60A as a first aspect of Embodiment 11 and waveform charts of the voltage [P3–N3] and a voltage Vclp1. FIG. 48 shows circuit configuration of a snubber circuit 60B as a second aspect of Embodiment 11 and waveform charts of the voltage [P3–N3] and a voltage Vclp2. FIG. 49 shows circuit configuration of a snubber circuit 60C as a third aspect of Embodiment 11 and waveform charts of the voltage [P3–N3] and the voltages Vclp1 and Vclp2.

When the snubber circuit 60 is constructed by a CR snubber circuit including the resistor 61 and the capacitor 62 as shown in FIG. 46, ringing of the voltage [P3–N3] can be more reduced as the capacitor 62 is made lager. In contrast, this may increase loss in the resistor 61. In the instance shown in FIG. 46, the voltage [P3–N3] has a steady voltage of 350 V, and shows ringing in a range between an upper peak of 428 V and a lower peak of 293 V.

In consideration of this, in Embodiment 11, the snubber circuits 60A to 60C are constructed by use of CRD snubber circuits including capacitors, resistors, and diodes.

As shown in FIG. 47, the snubber circuit 60A includes, in addition to the resistor 61 and the capacitor 62, a diode 63, a capacitor 64, and a resistor 65. The diode 63 has an anode connected to the terminal P3 and a cathode connected to the terminal N3 via the capacitor 64. The resistor 65 is connected in parallel with the diode 63.

The capacitor 64 generates a voltage higher than the steady voltage (350 V) of the voltage [P3–N3] at a junction between the diode 63 and the capacitor 64. Further, the capacitor 64 absorbs ringing by storing electric charges when ringing occurs. The diode 63 is a clamp diode for clamping the voltage Vclp1. The resistor 65 is a discharge resistor for decreasing the voltage Vclp1 to a desired voltage.

As to the snubber circuit 60A, when ringing causes a voltage of the terminal P3 to exceed the voltage Vclp1, the diode 63 is turned on to allow a current to flow into the capacitor 64, thereby ringing absorbed. Therefore, the snubber circuit 60A can reduce an upper (higher) side of ringing on the voltage [P3–N3] with low loss. In the instance shown in FIG. 47, a positive (upward) peak of ringing on the voltage [P3–N3] is clamped to 368 V. Accordingly, the upper side of the ringing can be reduced relative to the snubber circuit 60.

Similarly to the snubber circuit 60A, the snubber circuit 60B includes a diode 67, a capacitor 69, and a resistor 68 but the diode 67 is connected in a direction opposite to a direction of the diode 63. In detail, the diode 67 has a cathode connected to the terminal P3 and an anode connected to the terminal N3 via the capacitor 69.

In the snubber circuit 60B, the capacitor 69 generates the voltage Vclp2 which is a DC voltage lower than the steady voltage (350 V) of the voltage [P3–N3]. Further, the capacitor 69 absorbs ringing by storing electric charges when ringing occurs. The diode 67 is a clamp diode for clamping the voltage Vclp2. The resistor 68 is a resistor for decreasing the voltage Vclp2 to a desired voltage.

As to the snubber circuit 60B, when ringing causes a voltage of the terminal P3 to fall below the voltage Vclp2, the diode 67 is turned on to allow a current to flow into the capacitor 69, thereby ringing absorbed.

Therefore, the snubber circuit 60B can reduce a lower side of ringing on the voltage [P3–N3] with low loss. In the instance shown in FIG. 48, a negative (downward) peak of ringing on the voltage [P3–N3] is clamped to 332 V.

Accordingly, effects of reducing the lower side of the ringing can be improved relative to the snubber circuit 60.

The snubber circuit 60C includes a combination of the snubber circuits 60, 60A, and 60B. The snubber circuit 60C includes the snubber circuits 60A and 60B and therefore the positive (upward) peak and the negative (downward) peak of ringing on the voltage [P3–N3] are clamped to 368 V and 332 V, respectively. Accordingly, effects of reducing the upper and lower sides of the ringing can be improved relative to the snubber circuit 60.

Note that, as to the snubber circuits 60A to 60C, the resistors 61, 63, and R3 have 6.4 Ω, 180Ω, and 330Ω, respectively, for example. Further, the capacitors 62, 64, and 69 have 10 nF, 1 μF, and 1 μF, respectively, for example. Additionally, in the snubber circuits 60A to 60C, the resistor 61 and the capacitor 62 function to remove ringing in a range from the voltage Vclp1 to the voltage Vclp2. Note that, in the snubber circuits 60A to 60C, the resistor 61 and the capacitor 62 may be omitted.

To sum up, according to Embodiment 11, it is possible to propose a power conversion system offering effects of improved reduction of ringing with lowered loss.

Embodiment 12

FIG. 50 is a circuit diagram of a power conversion system 1J according to Embodiment 12. The power conversion system 1J is a power conversion system for bidirectional conversion and transfer of power between the DC power supply 17 and a DC device 28.

The power conversion system 1J is a power conditioner including the connector 3 (one example of the first external connector), the capacitor 4, the transformer circuit unit 5, the connector 6, a DCDC converter 7 (one example of the third converter unit), and the connector 15 (one example of the second external connector). The connector 3 includes the terminal P2 (one example of the first the first external connection terminal) and the terminal N2 (one example of the second external connection terminal).

The connector 3 is connected to one of the DC power supply 17 and the DC device 28 (one example of the first connection target). The connector 15 is connected to the other of the DC device 28 and the DC power supply 17 (one example of the second connection target). In summary, when the DC power supply 17 is connected to the connector 3, the DC device 28 is connected to the connector 15. When the DC device 28 is connected to the connector 3, the DC power supply 17 is connected to the connector 15.

The transformer circuit unit 5 includes the converter unit 51 (one example of the first converter unit), the converter unit 52 (one example of the second converter unit), and the transformer 53. The connector 6 includes the terminal P3 (one example of the first connection terminal), the terminal N3 (one example of the second connection terminal), and the snubber circuit 60. The snubber circuit 60 includes the resistor 61 and the capacitor 62. The DCDC converter 7 includes a bidirectional chopper circuit. The connector 15 includes the terminal U2 (one example of the third external connection terminal) and the terminal W2 (one example of the fourth external connection terminal). The terminal U2 is connected to a coil 71A and the terminal W2 is connected to the terminal N3.

The DC power supply 17 may include a secondary cell, a solar cell, a fuel cell, and/or the like, for example. When the DC power supply 17 is connected to the connector 3, positive and negative electrodes thereof are connected to the terminal P2 and the terminal N2, respectively. In the disclosure, "connect" means "electrically connect". While the DC power supply 17 is connected to the connector 3, power is supplied from the DC power supply 17 to the transformer circuit unit 5 by way of the terminal P2 and the terminal N2.

In contrast, when the DC power supply 17 is connected to the connector 15, the positive and negative electrodes thereof are connected to the terminal U2 and the terminal W2, respectively. While the DC power supply 17 is connected to the connector 15, power is supplied from the DC power supply 17 to the transformer circuit unit 5 by way of the terminal U2 and the terminal W2.

The capacitor 4 is one or more electrolytic capacitors connected between the terminal P2 and the terminal N2, and thus stabilizes a voltage between the terminal P2 and the terminal N2.

The transformer 53 is a high frequency transformer and includes the primary winding 531 and the secondary winding 532 which are magnetically coupled with each other. The primary winding 531 includes the coil L11. The primary winding 531 includes the terminal T1 (one example of the first winding terminal) and the terminal T2 (one example of the second winding terminal).

The secondary winding 532 includes the coil L12. The secondary winding 532 includes the terminal T3 (one example of the third winding terminal) and the terminal T4 (one example of the fourth winding terminal).

The coils L11 and L12 are magnetically coupled with each other to allow the terminals T2 and T3 to have the same polarity. In the following, a winding ratio of the coils L11 and L12 is supposed to be 1:1. However, this is an only example, and the winding ratio of the coils L11 and L12 may be different from 1:1.

The converter unit 51 is a high frequency inverter and converts a DC voltage supplied from the DC power supply 17 into a high frequency AC voltage with a rectangular waveform of 20 kHz and supplies it to the primary winding 531 and the secondary winding 532, for example. The converter unit 51 includes four switching devices AH, AL, BH, and BL, four diodes DAH, DAL, and DBH, and DBL, and four capacitors CAH, CAL, CBH, and CBL.

The switching devices AH, AL, BH, and BL may be constituted by n-type field effect transistors, for example. The switching device AH (one example of the third switching device) has the drain connected to the terminal P2 and the source connected to the terminal T2. The switching device AL (one example of the fourth switching device) has the drain connected to the terminal T2 and the source connected to the terminal N2. The switching device BH (one example of the first switching device) has the drain connected to the terminal P2 and the source connected to the terminal T1. The switching device BL (one example of the second switching device) has the drain connected to the terminal T1 and the source connected to the terminal N2. In summary, the converter unit 51 is constituted by full bridge (FB) circuitry in which four switching devices are connected in a full bridge arrangement.

The diodes DAH, DAL, DBH, and DBL have the anodes connected to the sources of the switching devices AH, AL, BH, and BL and the cathodes connected to the drains of the switching devices AH, AL, BH, and BL, respectively.

The diodes DAH, DAL, DBH, and DBL may serve as body diodes of the switching devices AH, AL, BH, and BL or external diodes. Further in this case, the diode DAH is connected between the emitter and collector of the switching device AH to allow a current to flow through the diode DAH in an opposite direction to a current flowing through the switching device AH when the switching device AH is on. This is applicable mutatis mutandis to the diodes DAL, DBH, and DBL.

The capacitors CAH, CAL, CBH, and CBL are connected between the sources and drains of the switching devices AH, AL, BH, and BL, respectively. The capacitors CAH, CAL, CBH, and CBL cause soft switching of the switching devices AH, AL, BH, and BL by resonating with the primary winding 531. Note that, a set of the capacitors CAH and CBH and a set of the capacitors CAL and CBL each may be connected between the terminals T1 and T2. Or, providing the capacitors CAL and CBL only is sufficient, or providing the capacitors CAH and CBH only is also sufficient.

The converter unit 52 converts an AC voltage which has a rectangular waveform having alternating positive and negative polarities and is applied across the secondary winding 532, into a voltage with positive polarity and applies it between the terminal P3 and the terminal N3. The converter unit 52 includes four switching devices XH, XL, YH, and YL and four diodes DXH, DXL, DYH, and DYL.

The switching devices XH, XL, YH, and YL may be constituted by n-type field effect transistors, for example. The switching device XH (one example of the fifth switching device) has the drain connected to the terminal P3 and the source connected to the terminal T3. The switching device XL (one example of the sixth switching device) has the drain connected to the terminal T3 and the source connected to the terminal N3. The switching device YH (one example of the seventh switching device) has the drain connected to the terminal P3 and the source connected to the terminal T4. The switching device YL (one example of the eighth switching device) has the drain connected to the terminal T4 and the source connected to the terminal N3. In summary, the converter unit 52 is constituted by full bridge (FB) circuitry in which four switching devices are connected in a full bridge arrangement.

The diodes DXH, DXL, DYH, and DYL have the anodes connected to the sources of the switching devices XH, XL, YH, and YL and the cathodes connected to the drains of the switching devices XH, XL, YH, and YL, respectively.

The switching devices XH, XL, YH, and YL each may be constituted by an npn type insulated gate bipolar transistor instead of a field effect transistor, for example. In this case, the diodes DXH, DXL, DYH, and DYL are provided as free wheel diodes. Further in this case, the diode DXH is connected between the emitter and collector of the switching device XH to allow a current to flow through the diode DXH in an opposite direction to a current flowing through the switching device XH when the switching device XH is on. This is applicable mutatis mutandis to the diodes DXL, DYH, and DYL.

The control unit 13 is configured to keep turning off the switching devices AL, BH, XL, and YH while turning on the switching devices AH, BL, XH, and YL, and is configured to keep turning on the switching devices AL, BH, XL, and YH while turning off the switching devices AH, BL, XH, and YL. In this regard, the control unit 13 controls the switching devices AH, AL, BH, BL, XH, XL, YH, and YL at the same duty cycle. Note that, in an example shown in FIG. 51, the duty cycle of the switching devices AH, AL, BH, BL, XH, XL, YH, and YL is substantially 50%. Here "substantially 50%" means a duty cycle obtained by subtracting a dead time (the reversal time period in which all of the switching devices AH, AL, BH, BL, XH, XL, YH, and YL are off) from a duty cycle of 50%.

The DCDC converter 7 includes the switching device UH (one example of the ninth switching device), the switching device UL (one example of the tenth switching device), the two diodes D1 and D2, the coil 71A, and a capacitor 72A.

The DCDC converter 7 lowers a positive voltage applied between the terminal P3 and the terminal N3 and supplies a resultant voltage to the connector 15 in a first transferring mode described below. The DCDC converter 7 raises a DC voltage supplied from the connector 15 and applies a resultant voltage between the terminal P3 and the terminal N3 in a second transferring mode described below.

The coil 71A is connected between the terminal U2 and the terminal U1. The capacitor 72A is connected between the terminal U2 and the terminal W2. Note that, the capacitor 72A may be included in the DC device 28 or the DC power supply 17.

The switching devices UH and UL may be constituted by n-type field effect transistors, for example. The switching device UH has the drain connected to the terminal P3 and the source connected to the terminal U1. The switching device UL has the drain connected to the terminal U1 and the source connected to the terminal N3.

The diodes D1 and D2 have the anodes connected to the sources of the switching devices UH and UL and the cathodes connected to the drains of the switching devices UH and UL, respectively.

The switching devices UH and UL each may be constituted by an npn type insulated gate bipolar transistor instead of a field effect transistor, for example. In this case, the diodes D1 and D2 are provided as free wheel diodes. Further in this case, the diode D1 is connected between the emitter and collector of the switching device UH to allow a current to flow through the diode D1 in an opposite direction to a current flowing through the switching device UH when the switching device UH is on. This is applicable mutatis mutandis to the diode D2.

In a case where the DC device 28 is connected to the connector 15, the control unit 13 turns on or off the switching device UH and the switching device UL in such a manner that one of the switching device UH and the switching device UL is on and the other is off, thereby controlling at least one of magnitudes of the voltage Vout which is a DC voltage outputted from or inputted into the terminals U2 and W2 and a current Ibus flowing through the terminal P2. This is described in detail later.

The DC device 28 may be an electric appliance operating with DC power, or a charger for charging the DC power supply 17, for example. When the DC device 28 is connected to the connector 15, the positive and negative electrodes thereof are connected to the terminal U2 and the terminal W2, respectively. In contrast, when the DC device 28 is connected to the connector 3, the positive and negative electrodes thereof are connected to the terminal P2 and the terminal N2, respectively.

The control unit 13 may be constituted by a CPU, an FPGA, an ASIC, or the like, for example, and is configured to control the converter units 51 and 52 and the DCDC converter 7.

The control unit 13 is configured to control the converter unit 51 so that a high frequency AC voltage is supplied to the primary winding 531 and the secondary winding 532. The control unit 13 is configured to control the converter unit 52 so that a voltage with positive polarity is applied between the terminal P3 and the terminal N3.

The control unit 13 is configured to control the DCDC converter 7 not to cause transfer of power between the transformer circuit unit 5 and the DCDC converter 7 in the first time period including the reversal time period in which a reversal of polarity of the voltage across the primary winding 531 occurs. The control unit 13 is configured to control the DCDC converter 7 to cause transfer of power in the first direction from the transformer circuit unit 5 to the DCDC converter 7 or the second direction opposite to the first direction in the second time period different from the first time period.

In detail, the control unit 13 controls the converter units 51 and 52 and the DCDC converter 7 so that the reversal time period and the circulation time period described below appear in the first time period constituting a half cycle (one example of the unit time period) of an AC voltage supplied to the primary winding 531 and a first transfer time period or a second transfer time period described below appears in the second time period different from the first time period.

In more detail, the control unit 13 determines a duty cycle of the DCDC converter 7 so that the voltage Vout or the current Ibus has a desired value, and controls the switching devices UH and UL at the duty cycle determined.

Next, operation of the power conversion system 1J is described.

The power conversion system 1J operates in either the first transferring mode (step-down mode) of supplying DC power from the connector 3 to the connector 15 or the second transferring mode (step-up mode) of supplying DC power from the connector 15 to the connector 3.

The first transferring mode is a mode in which a voltage drop occurs between the terminals U2 and W2 in a direction same as a direction in which a current flows therethrough. In other words, the first transferring mode means a mode in which the voltage Vout and the current IL have the same polarity. The second transferring mode means a mode in which a voltage drop occurs between the terminals U2 and W2 in a direction opposite to a direction in which a current flows therethrough. In other words, the second transferring mode means a mode in which the voltage Vout and the current IL have mutually different polarities.

<Timing Chart>
<First Transferring Mode>

Figure 51:
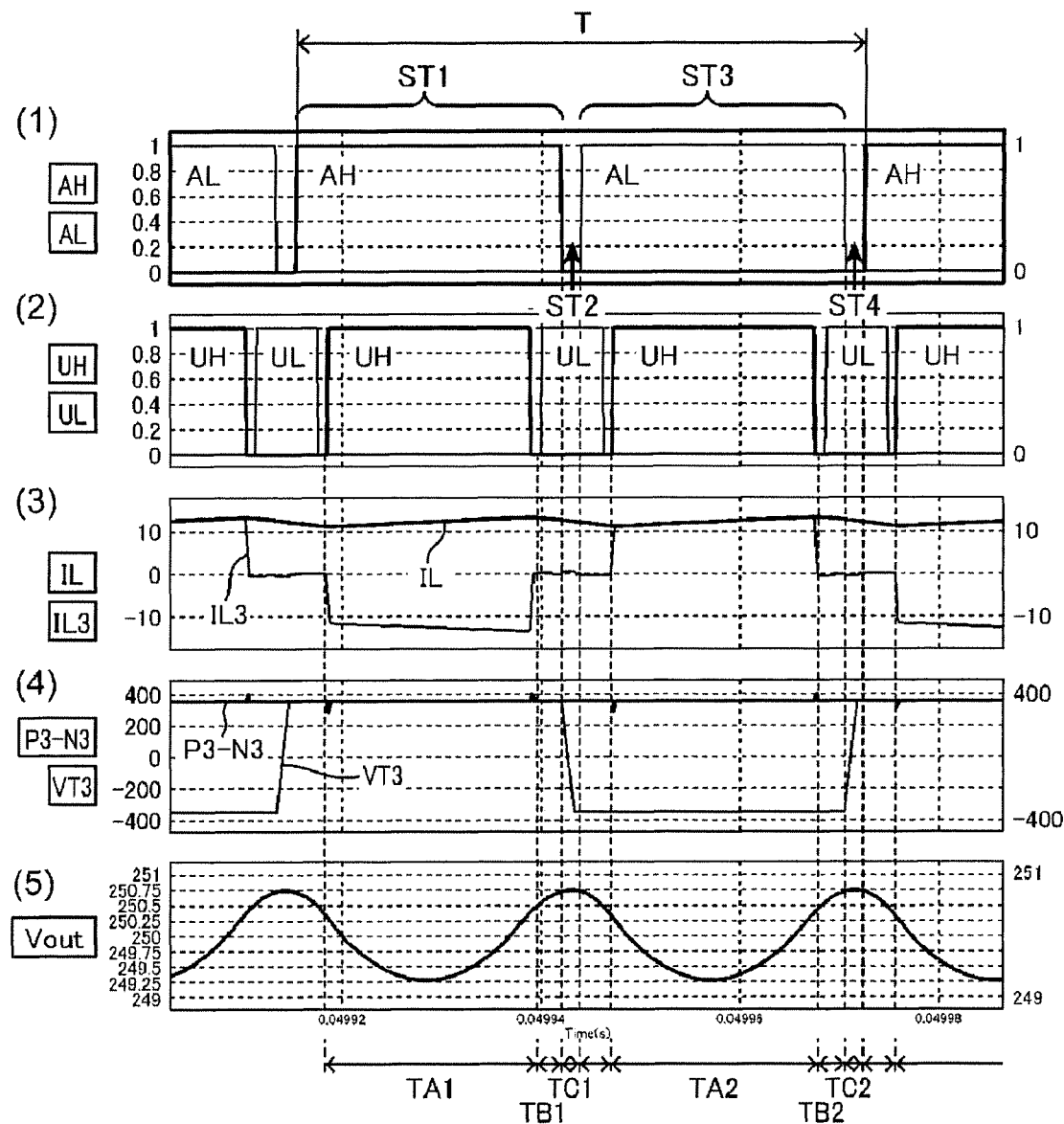
FIG. 51 is a diagram for illustration of timing charts of the power conversion system 1J in a first transferring mode.

Next, timing charts of the power conversion system 1J in the first transferring mode are described. FIG. 51 is a diagram for illustration of the timing charts of the power conversion system 1J in the first transferring mode. In the following description, it is supposed that the DC power supply 17 is connected to the connector 3 and the DC device 28 is connected to the connector 15.

In FIG. 51, (1) represents on and off states of the switching devices AL and AH, wherein the on state means having a high level and the off state means having a low level. Note that, the switching devices BH, XL, and YH are turned on or off at the same timing of the switching device AL and the switching devices BL, XH, and YL are turned on or off at the same timing of the switching device AH.

(2) represents on and off states of the switching devices UH and UL, wherein the on state means having a high level and the off state means having a low level. (3) represents the current IL flowing through the coil 71A and the current IL3 flowing through the coil L12. (4) represents the voltage of the terminal P3 from the terminal N3 (voltage [P3−N3]) and the voltage of the coil L12 from the terminal T4 (voltage VT3). (5) represents the voltage of the terminal U2 from the terminal W2 (voltage Vout). In the following description, the voltage of the terminal P2 from the terminal N2 is referred to as VE. Additionally, a period T means a period (one cycle) of the AC voltage supplied to the primary winding 531.

Hereinafter, sequences regarding the converter units 51 and 52 are described in relation to the time periods ST1 to ST4 and sequences regarding the DCDC converter 7 are described in relation to time periods designated by TA1, TB1, TC1, TB3, TA2, TB2, TC2, and TB4.

<Time Period ST1>

The control unit 13 turns on the switching devices AH, BL, XH, and YL and off the switching devices AL, BH, XL, and YH. Consequently, the voltage VT1 is equal to VE and the voltage VT3 is equal to VE.

<Time Period ST2>

The control unit 13 turns off the switching devices AH, AL, BH, BL, XH, XL, YH, and YL while turning off the switching device UH and on the switching device UL to allow the current IL to circulate. Due to resonance between the excitation current of the coil L11 and the capacitors CAH, CAL, CBH, and CBL, the polarities of the voltages VT1 and VT3 are gradually reversed from positive states to negative states. Accordingly, soft switching can be realized. This time period in which the polarities are reversed is referred to as the reversal time period.

<Time Period ST3>

The control unit 13 turns on the switching devices AL, BH, XL, and YH while the switching devices AH, BL, XH, and YL are off. As a result, the voltages VT1 and VT3 are equal to −VE.

<Time Period ST4>

Similarly to the time period ST2, the control unit 13 turns off the switching devices AH, AL, BH, BL, XH, XL, YH, and YL to reverse the polarities of the voltages VT1 and VT3.

Hereinafter, the converter units 51 and 52 repeat operations associated with the time periods ST1, ST2, ST3, and ST4. By doing so, the voltage [P3−N3] is kept equal to VE and is supplied to the DCDC converter 7.

Note that, the DCDC converter 7 is connected to the DC power supply 17 or the DC device 28 through the transformer 53. Therefore, the DCDC converter 7 can be considered to be directly connected to the DC power supply 17 or the DC device 28 via leakage inductance of the transformer 53. Due to this, ringing may occur in the power conversion system 1J in switching of the DCDC converter 7. To prevent this, the snubber circuit 60 is provided. When the polarity of the voltage [P3−N3] is reversed, a direction of a current flowing through the snubber circuit 60 is reversed, too. This means that it is seriously difficult to increase a capacitance of the capacitor 62. Consequently, to suppress such ringing is difficult while the polarity of the voltage [P3−N3] is reversed.

In contrast, the power conversion system 1J does not see reversal of the polarity of the voltage [P3−N3]. The capacitor 62 can have a larger capacitance than in the case where the reversal of the polarity of the voltage [P3−N3] occurs. Thus, the power conversion system 1J can reduce such ringing.

<First Transfer Time Period TA1>

The control unit 13 turns on the switching device UH and off the switching device UL while the switching devices AH, BL, XH, and YL are on and the switching devices AL, BH, XL, and YH are off. Due to this, the first transfer time period in which the current IL flows through a transfer path K1 (see FIG. 50) starts. In the first transfer path K1, a current flows through the secondary winding 532 and therefore power is transferred from the connector 3 to the DCDC converter 7. As a result, the DCDC converter 7 comes into the first transferring mode.

In this regard, (3) shows the current IL increases linearly. Further, (3) shows the current IL3 decreases sharply and then decreases with gentle slope.

<Circulation Time Period TB1>

The circulation time period TB1 follows after the first transfer time period TA1. The control unit 13 turns off the switching device UH and on the switching device UL while the switching devices AH, BL, XH, and YL are on and the switching devices AL, BH, XL, and YH are off. Due to this, the circulation time period in which the current IL flows through a circulation path K2 (see FIG. 50) starts. The circulation path K2 is a closed loop in the DCDC converter 7 and therefore transfer of power from the connector 3 to the DCDC converter 7 is stopped. As a result, the DCDC converter 7 comes into the circulating mode.

In this regard, (3) shows the current IL decreases linearly. Further, (3) shows the current IL3 increases sharply and then fluctuates around 0.

<Reversal Time Period TC1>

The reversal time period TC1 follows after the circulation time period TB1. The reversal time period TC1 is same as the time period ST2 as described above. The control unit 13 turns off the switching devices AH, AL, BH, BL, XH, XL, YH, and YL while keeping the DCDC converter 7 in the circulating mode.

<Circulation Time Period TB3>

The circulation time period TB3 follows after the reversal time period TC1. The control unit 13 turns on the switching devices AL, BH, XL, and YH while the switching device UH is off and the switching device UL is on (the DCDC converter 7 is made in the circulating mode). The DCDC converter 7 continues the circulating mode throughout the circulation time period TB1, the reversal time period TC1, and the circulation time period TB3 to stop transfer of power from the connector 3 to the DCDC converter 7.

<First Transfer Time Period TA2>

The first transfer time period TA2 follows after the circulation time period TB3. The control unit 13 turns on the switching device UH and off the switching device UL while the switching devices AL, BH, XL, and YH are on and the switching devices AH, BL, XH, and YL are off. Thus, the DCDC converter 7 comes into the first transferring mode.

In this regard, (3) shows the current IL increases linearly. Further, (3) shows the current IL3 increases sharply and then increases with gentle slope.

<Circulation Time Period TB2>

The circulation time period TB2 follows after the first transfer time period TA2. The control unit 13 turns on the switching device UL and off the switching device UH while the switching devices AL, BH, XL, and YH are on and the switching devices AH, BL, XH, and YL are off to make the DCDC converter 7 come into the circulating mode.

In this regard, (3) shows the current IL decreases linearly. Further, (3) shows the current IL3 decreases sharply and then fluctuates around 0.

<Reversal Time Period TC2>

The reversal time period TC2 follows after the circulation time period TB2. The reversal time period TC2 is same as the time period ST4 as described above. The control unit 13 turns off the switching devices AH, AL, BH, BL, XH, XL, YH, and YL while keeping the DCDC converter 7 in the circulating mode.

<Circulation Time Period TB4>

The circulation time period TB4 follows after the reversal time period TC2. The control unit 13 turns on the switching devices AH, BL, XH, and YL while keeping the DCDC converter 7 in the circulating mode. The DCDC converter 7 continues the circulating mode throughout the circulation time period TB2, the reversal time period TC2, and the circulation time period TB4 to stop transfer of power from the connector 3 to the DCDC converter 7.

As described above, the power conversion system 1J cyclically repeats the first transfer time period TA1, the circulation time period TB1, the reversal time period TC1, the circulation time period TB3, the first transfer time period TA2, the circulation time period TB2, the reversal time period TC2, and the circulation time period TB4 to implement the first transferring mode. Further, the control unit 13 controls a duty cycle of the DCDC converter 7 to allow the DCDC converter 7 to output the voltage Vout with a desired value. The duty cycle is defined as a ratio of the first transfer time periods TA1 and TA2 in a unit period. The unit period means a half period (half cycle) of the period (cycle) T. (5) shows a slight ripple in a range from about 249 V to about 251 V is observed in the voltage Vout but the voltage Vout has an average of about 250 V. Therefore, the connector 15 is supplied with a DC voltage of about 250 V. The control unit 13 adjusts the value of the voltage Vout by changing the duty cycle.

<Second Transferring Mode>

Figure 52:
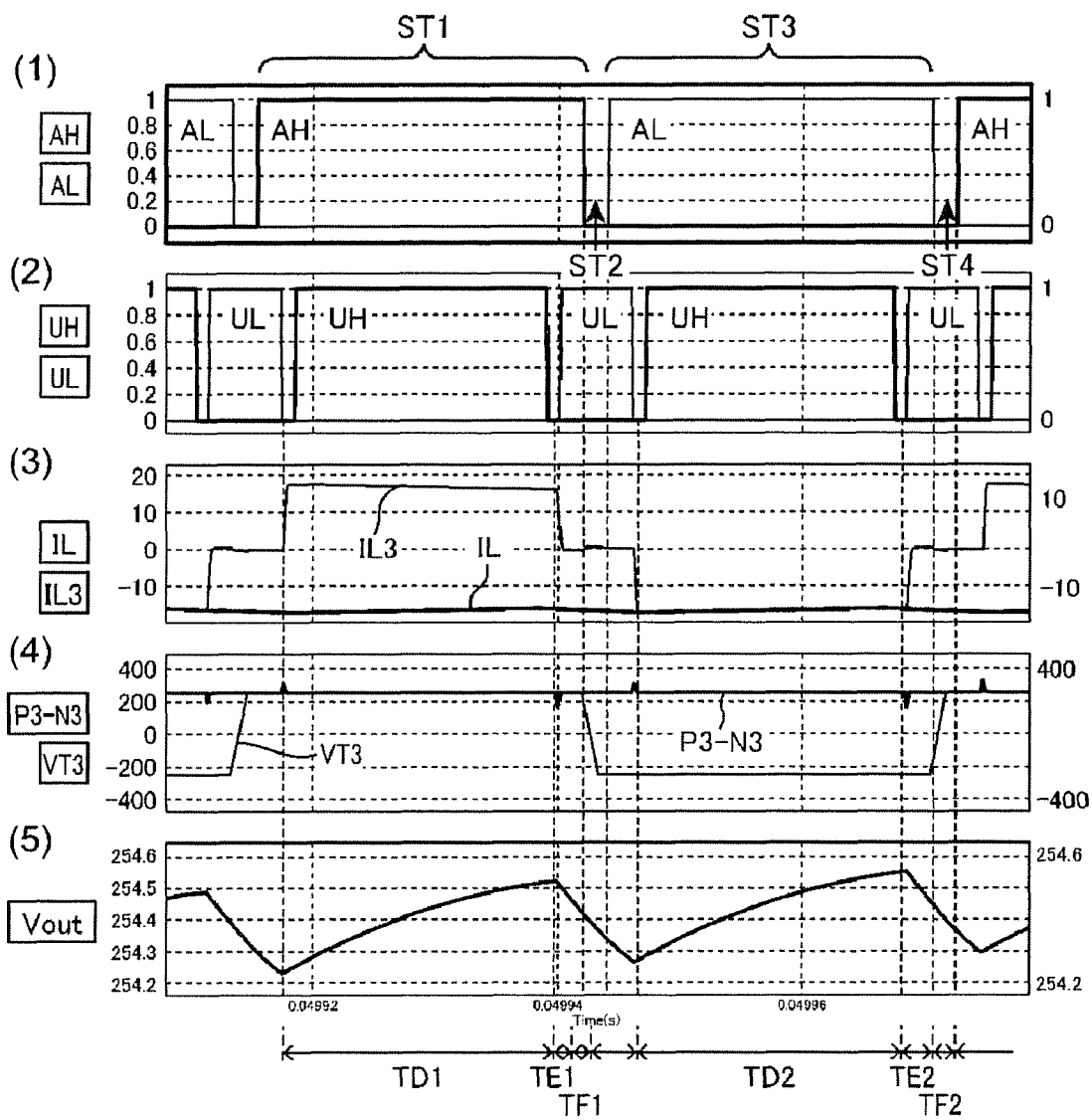
FIG. 52 is a diagram for illustration of timing charts of the power conversion system 1J in a second transferring mode.

FIG. 52 is a diagram for illustration of the timing charts of the power conversion system 1J in the second transferring mode. In the following description, it is supposed that the DC power supply 17 is connected to the connector 3 and the DC device 28 is connected to the connector 15. (1) to (4) of FIG. 52 are same as (1) to (4) of FIG. 51 and (5) represents the voltage Vout. Note that, the switching devices BH, XL, and YH are turned on or off at the same timing of the switching device AL and the switching devices BL, XH, and YL are turned on or off at the same timing of the switching device AH.

Hereinafter, sequences regarding the converter units 51 and 52 are described in relation to the time periods ST1 to ST4 and sequences regarding the DCDC converter 7 are described in relation to time periods designated by TD1, TE1, TF1, TE3, TD2, TE2, TF2, and TE4.

<Time Period ST1> to <Time Period ST4>

The sequences in relation to <Time Period ST1> to <Time Period ST4> of FIG. 52 are same as those in relation to <Time Period ST1> to <Time Period ST4> of FIG. 51 and therefore explanations thereof are omitted.

<Second Transfer Time Period TD1>

The control unit 13 turns on the switching device UH and off the switching device UL while the switching devices AH, BL, XH, and YL are on and the switching devices AL, BH, XL, and YH are off. Due to this, the second transfer time period in which the current IL flows through a transfer path K3 (see FIG. 50) starts. In the transfer path K3, a current flows through the secondary winding 532 and therefore power is transferred from the DCDC converter 7 to the connector 3. As a result, the DCDC converter 7 comes into the second transferring mode.

In this regard, (3) shows the current IL increases linearly. Further, (3) shows the current IL3 increases sharply and then decreases with gentle slope.

<Circulation Time Period TE1>

The circulation time period TE1 follows after the second transfer time period TD1. The control unit 13 turns off the switching device UH and on the switching device UL while the switching devices AH, BL, XH, and YL are on and the switching devices AL, BH, XL, and YH are off. Due to this, the circulation time period in which the current IL flows through a circulation path K4 (see FIG. 50) starts. The circulation path K4 is a closed loop in the DCDC converter 7 and therefore transfer of power from the DCDC converter 7 to the connector 3 is stopped. As a result, the DCDC converter 7 comes into the circulating mode.

In this regard, (3) shows the current IL decreases linearly. Further, (3) shows the current IL3 decreases sharply and then fluctuates around 0.

<Reversal Time Period TF1>

The reversal time period TF1 follows after the circulation time period TE1. The reversal time period TF1 is same as the time period ST2 as described above. The control unit 13 turns off the switching devices AH, AL, BH, BL, XH, XL, YH, and YL while keeping the DCDC converter 7 in the circulating mode.

<Circulation Time Period TE3>

The circulation time period TE3 follows after the reversal time period TF1. The control unit 13 turns on the switching devices AL, BH, XL, and YH while the switching device UH is off and the switching device UL is on (the DCDC converter 7 is made in the circulating mode). The DCDC converter 7 continues the circulating mode throughout the circulation time period TE1, the reversal time period TF1, and the circulation time period TE3 to stop transfer of power from the DCDC converter 7 to the connector 3.

<Second Transfer Time Period TD2>

The second transfer time period TD2 follows after the circulation time period TE3. (1) and (2) show the control unit 13 turns on the switching device UH and off the switching device UL while the switching devices AL, BH, XL, and YH are on and the switching devices AH, BL, XH, and YL are off. Thus, the DCDC converter 7 comes into the second transferring mode.

In this regard, (3) shows the current IL increases linearly. Further, (3) shows the current IL3 decreases sharply and then increases with gentle slope.

<Circulation Time Period TE2>

The circulation time period TE2 follows after the second transfer time period TD2. The control unit 13 turns on the switching device UL and off the switching device UH while the switching devices AL, BH, XL, and YH are on and the switching devices AH, BL, XH, and YL are off to make the DCDC converter 7 come into the circulating mode.

In this regard, (3) shows the current IL decreases linearly. Further, (3) shows the current IL3 increases sharply and then fluctuates around 0.

<Reversal Time Period TF2>

The reversal time period TF2 follows after the circulation time period TE2. The reversal time period TF2 is same as the time period ST4 as described above. The control unit 13 turns off the switching devices AH, AL, BH, BL, XH, XL, YH, and YL while keeping the DCDC converter 7 in the circulating mode.

<Circulation Time Period TE4>

The circulation time period TE4 follows after the reversal time period TF2. The control unit 13 turns on the switching devices AH, BL, XH, and YL while keeping the DCDC converter 7 in the circulating mode. The DCDC converter 7 continues the circulating mode throughout the circulation time period TE2, the reversal time period TF2, and the circulation time period TE4 to stop transfer of power from the DCDC converter 7 to the connector 3.

As described above, the power conversion system 1J cyclically repeats the second transfer time period TD1, the circulation time period TE1, the reversal time period TF1, the circulation time period TE3, the second transfer time period TD2, the circulation time period TE2, the reversal time period TF2, and the circulation time period TE4 to implement the second transferring mode. Further, the control unit 13 controls a duty cycle of the DCDC converter 7 to output a voltage Vout with a desired value to the connector 3. The duty cycle is defined as a ratio of the second transfer time periods TD1 and TD2 in a unit period. The unit period means a half period (half cycle) of the period (cycle) T. (5) shows a slight ripple in a range from about 254.2 V to about 254.6 V is observed in the voltage Vbus but the voltage Vbus has an average of about 254 V. Therefore, the connector 3 is supplied with a DC voltage of about 254 V. The control unit 13 adjusts the value of the voltage Vbus by changing the duty cycle.

Comparison among the waveform charts of FIG. 51 and FIG. 52 reveals that the first transferring mode and the second transferring mode can adopt the same sequence for driving the switching devices AH, AL, BH, BL, XH, XL, YH, and YL.

For example, in some cases, the current IL has polarity different from desired polarity due to false detection of polarity of the current IL or disturbance of the current IL caused by noises. The power conversion system 1J uses the same sequence the first transferring mode and the second transferring mode, and therefore the current IL flows through the same path in the both modes. As a result, even when the current IL shows polarity different from desired polarity, the power conversion system 1J can reduce such influence. Consequently, even if the current IL shows polarity different from desired polarity, the power conversion system 1J can switch between the first transferring mode and the second transferring mode continuously. As a result, the power conversion system 1J is applicable for stand alone devices such as an uninterruptible power system (UPS).

As described above, the power conversion system 1J controls the converter unit 51 so that positive and negative voltages are alternately applied across each of the coils L11 and L12, and also controls the converter unit 52 so that the voltage [P3–N3] is positive. Therefore, a voltage with constant (unchanged) polarity is inputted into the DCDC converter 7. As a result, the DCDC converter 7 can be realized by an ordinary DCDC converter and ordinary control can apply without substantial modification.

Additionally, in the view point of the equivalent circuit of the transformer 53, the power conversion system 1J has the DCDC converter 7 directly connected with the capacitor 4 (see FIG. 50) via the leakage inductance of the transformer 53 in the second time period (the first and second transfer time periods).

The power conversion system 1J allows transfer of power between the primary and secondary sides in this second time period only. Therefore, at the timing of transfer of power, the capacitor 4 and the DCDC converter 7 are always connected directly.

Therefore, it is unnecessary to situate a smoothing capacitor between the terminal P3 and the terminal N3, and accordingly the circuit scale can be downsized.

Additionally, to provide the snubber circuit 60 for addressing ringing, use of a capacitor with a relatively small capacitance is enough.

Further, the power conversion system 1J has the reversal time period for reversing the polarities of the coils L11 and L12 in the time period in which the DCDC converter 7 is set into the circulating mode. Therefore, even when the power conversion system 1J operates in any one of the second transferring mode and the first transferring mode, it can perform reversal operation due to resonance of the excitation current and the capacitors CAH, CAL, CBH and CBL for resonance, regardless of the load current. Consequently, the power conversion system 1J can stably perform reversal of the polarities of voltages applied across the coils L11 and L12.

Embodiment 12 relates to an example in which the converter units 51 and 52 both are constituted by full bridge (FB) circuitry. However, each of the converter units 51 and 52 may be constituted by center tap (CNT) circuitry, or half bridge (HB) circuitry. In summary, the transformer circuit unit 5 may be constituted by a combination of these.

Any of the snubber circuits 60A to 60C shown in FIG. 47 to FIG. 49 can be used instead of the snubber circuit 60.

Embodiment 13

FIG. 53 is a circuit diagram of a power conversion system 1K according to Embodiment 13. The power conversion system 1K is a power conversion system for conversion and transfer of power in a first single direction from the connector 3 (one example of the first external connector) to the connector 15 (one example of the second external connector).

The power conversion system 1K is a power conditioner including the connector 3, the capacitor 4, the transformer circuit unit 5, the converter unit 7, and the connector 15. The connector 3 includes the terminal P2 (one example of the first external connection terminal) and the terminal N2 (one example of the second external connection terminal).

The transformer circuit unit 5 includes the converter unit 51 (one example of the first converter unit), the converter unit 52 (one example of the second converter unit), and the transformer 53. The connector 6 includes the terminal P3 (one example of the first connection terminal), the terminal N3 (one example of the second connection terminal), and the snubber circuit 60. The snubber circuit 60 includes the resistor 61 and the capacitor 62. The converter unit 7 (one example of the third converter unit) includes a chopper circuit for transferring power in the first single direction. The connector 15 includes the terminal U2 (one example of the third external connection terminal) and the terminal W2 (one example of the fourth external connection terminal). The terminal U2 is connected to the coil 71A and the terminal W2 is connected to the terminal N3.

The DC power supply 17 (one example of the first connection target) may include a secondary cell, a solar cell, a fuel cell, and/or the like, for example. The positive electrode of the DC power supply 17 is connected to the terminal P2 and the negative electrode of the DC power supply 17 is connected to the terminal N2. In the disclosure, "connect" means "electrically connect". Power is supplied from the DC power supply 17 to the transformer circuit unit 5 by way of the terminal P2 and the terminal N2.

The capacitor 4 is one or more electrolytic capacitors connected between the terminal P2 and the terminal N2, and thus stabilizes a voltage between the terminal P2 and the terminal N2.

The transformer 53 is a high frequency transformer and includes the primary winding 531 and the secondary winding 532 which are magnetically coupled with each other. The primary winding 531 includes the coil L11. The primary winding 531 includes the terminal T1 (one example of the first winding terminal) and the terminal T2 (one example of the second winding terminal). The secondary winding 532 includes the coil L12. The secondary winding 532 includes the terminal T3 (one example of the third winding terminal) and the terminal T4 (one example of the fourth winding terminal).

The coils L11 and L12 are magnetically coupled with each other to allow the terminals T2 and T3 to have the same polarity. In the following, a winding ratio of the coils L11 and L12 is supposed to be 1:1. However, this is an only example, and the winding ratio of the coils L11 and L12 may be different from 1:1.

The converter unit 51 is a high frequency inverter and converts a DC voltage supplied from the DC power supply 17 into a high frequency AC voltage with a rectangular waveform of 20 kHz and supplies it to the primary winding 531 and the secondary winding 532, for example. The converter unit 51 includes the four switching devices AH, AL, BH, and BL, the four diodes DAH, DAL, and DBH, and DBL, and the four capacitors CAH, CAL, CBH, and CBL.

The switching devices AH, AL, BH, and BL may be constituted by n-type field effect transistors, for example. The switching device AH (one example of the third switching device) has the drain connected to the terminal P2 and the source connected to the terminal T2. The switching device AL (one example of the fourth switching device) has the drain connected to the terminal T2 and the source connected to the terminal N2. The switching device BH (one example of the first switching device) has the drain connected to the terminal P2 and the source connected to the terminal T1. The switching device BL (one example of the second switching device) has the drain connected to the terminal T1 and the source connected to the terminal N2. In summary, the converter unit 51 is constituted by full bridge (FB) circuitry in which four switching devices are connected in a full bridge arrangement.

The diodes DAH, DAL, DBH, and DBL have the anodes connected to the sources of the switching devices AH, AL, BH, and BL and the cathodes connected to the drains of the switching devices AH, AL, BH, and BL, respectively.

The diodes DAH, DAL, DBH, and DBL may serve as body diodes of the switching devices AH, AL, BH, and BL or external diodes. Further in this case, the diode DAH is connected between the emitter and collector of the switching device AH to allow a current to flow through the diode DAH in an opposite direction to a current flowing through the switching device AH when the switching device AH is on. This is applicable mutatis mutandis to the diodes DAL, DBH, and DBL.

The capacitors CAH, CAL, CBH, and CBL are connected between the sources and drains of the switching devices AH, AL, BH, and BL, respectively. The capacitors CAH, CAL, CBH, and CBL cause soft switching of the switching devices AH, AL, BH, and BL by resonating with the primary winding 531. Note that, a set of the capacitors CAH and CBH and a set of the capacitors CAL and CBL each may be connected between the terminals T1 and T2. Or, providing the capacitors CAL and CBL only is sufficient, or providing the capacitors CAH and CBH only is also sufficient.

The converter unit 52 converts an AC voltage which has a rectangular waveform having alternating positive and negative polarities and is applied across the secondary winding 532, into a voltage with positive polarity and applies it between the terminal P3 and the terminal N3. The converter unit 52 includes the four diodes DXH, DXL, DYH, and DYL.

The diode DXH (one example of the fifth switching device) has the cathode connected to the terminal P3 and the anode connected to the terminal T3. The diode DXL (one example of the sixth switching device) has the cathode connected to the terminal T3 and the anode connected to the terminal N3. The diode DYH (one example of the seventh switching device) has the cathode connected to the terminal P3 and the anode connected to the terminal T4. The diode DYL (one example of the eighth switching device) has the cathode connected to the terminal T4 and the anode connected to the terminal N3. In summary, the converter unit 52 is constituted by full bridge (FB) circuitry in which four switching devices are connected in a full bridge arrangement. Alternatively, the converter unit 52 may be constituted by half bridge circuitry in which two switching devices are connected in a half bridge arrangement.

The control unit 13 is configured to keep turning off the switching devices AL and BH while turning on the switching devices AH and BL, and is configured to keep turning on the switching devices AL and BH while turning off the switching devices AH and BL. In this regard, the control unit 13 controls the switching devices AH, AL, BH, and BL at the same duty cycle. Note that, in an example shown in FIG. 54, the duty cycle of the switching devices AH, AL, BH, and BL is substantially 50%. Here "substantially 50%" means a duty cycle obtained by subtracting a dead time (the reversal time period in which all of the switching devices AH, AL, BH, and BL are off) from a duty cycle of 50%.

The converter unit 7 includes the switching device UH (one example of the ninth switching device), the two diodes D1 and D2, the coil 71A, and the capacitor 72A.

The converter unit 7 lowers a positive voltage applied between the terminal P3 and the terminal N3 and supplies a resultant voltage to the DC device 28.

The coil 71A is connected between the terminal U2 and the terminal U1. The capacitor 72A is connected between the terminal U2 and the terminal W2.

The switching device UH may be constituted by an n-type field effect transistor, for example. The switching device UH has the drain connected to the terminal P3 and the source connected to the terminal U1.

The diode D1 has the cathode connected to the drain of the switching device UH and the anode connected to the source of the switching device UH. The diode D2 has the cathode connected to the terminal U1 and the anode connected to the terminal N3.

The switching device UH may be constituted by an npn type insulated gate bipolar transistor instead of a field effect transistor, for example. In this case, the diode D1 is provided as a free wheel diode. Further in this case, the diode D1 is connected between the emitter and collector of the switching device UH to allow a current to flow through the diode D1 in an opposite direction to a current flowing through the switching device UH when the switching device UH is on.

The control unit 13 turns on and off the switching device UH, thereby controlling at least one of magnitudes of the voltage Vout which is a DC voltage outputted from the terminals U2 and W2 and the current Ibus flowing through the terminal P2. This is described in detail later.

The DC device 28 (one example of the second connection target) may be an electric appliance operating with DC power, or a charger for charging the DC power supply 17, for example.

The control unit 13 may be constituted by a CPU, an FPGA, an ASIC, or the like, for example, and is configured to control the converter unit 51 and the converter unit 7.

The control unit 13 is configured to control the converter unit 51 so that a high frequency AC voltage is supplied to the primary winding 531 and the secondary winding 532 and that a voltage with positive polarity is applied between the terminal P3 and the terminal N3.

The control unit 13 is configured to control the converter unit 7 not to cause transfer of power between the transformer circuit unit 5 and the converter unit 7 in the first time period including the reversal time period in which a reversal of polarity of the voltage across the primary winding 531 occurs. The control unit 13 is configured to control the converter unit 7 to cause transfer of power in the first single direction from the transformer circuit unit 5 to the converter unit 7 in the second time period different from the first time period.

In detail, the control unit 13 controls the converter unit 51 and the converter unit 7 so that the reversal time period and the circulation time period described below appear in the first time period constituting a half cycle (one example of the unit time period) of an AC voltage supplied to the primary winding 531.

In more detail, the control unit 13 determines a duty cycle of the converter unit 7 so that the voltage Vout or the current Ibus has a desired value, and controls the switching device UH at the duty cycle determined.

In the power conversion system 1K, a voltage drop occurs between the terminals U2 and W2 in a direction same as a direction in which a current flows through the DC device 28. In other words, the power conversion system 1K operates to allow the voltage Vout and the current IL to have the same polarity.

<Timing Chart>

Figure 54:
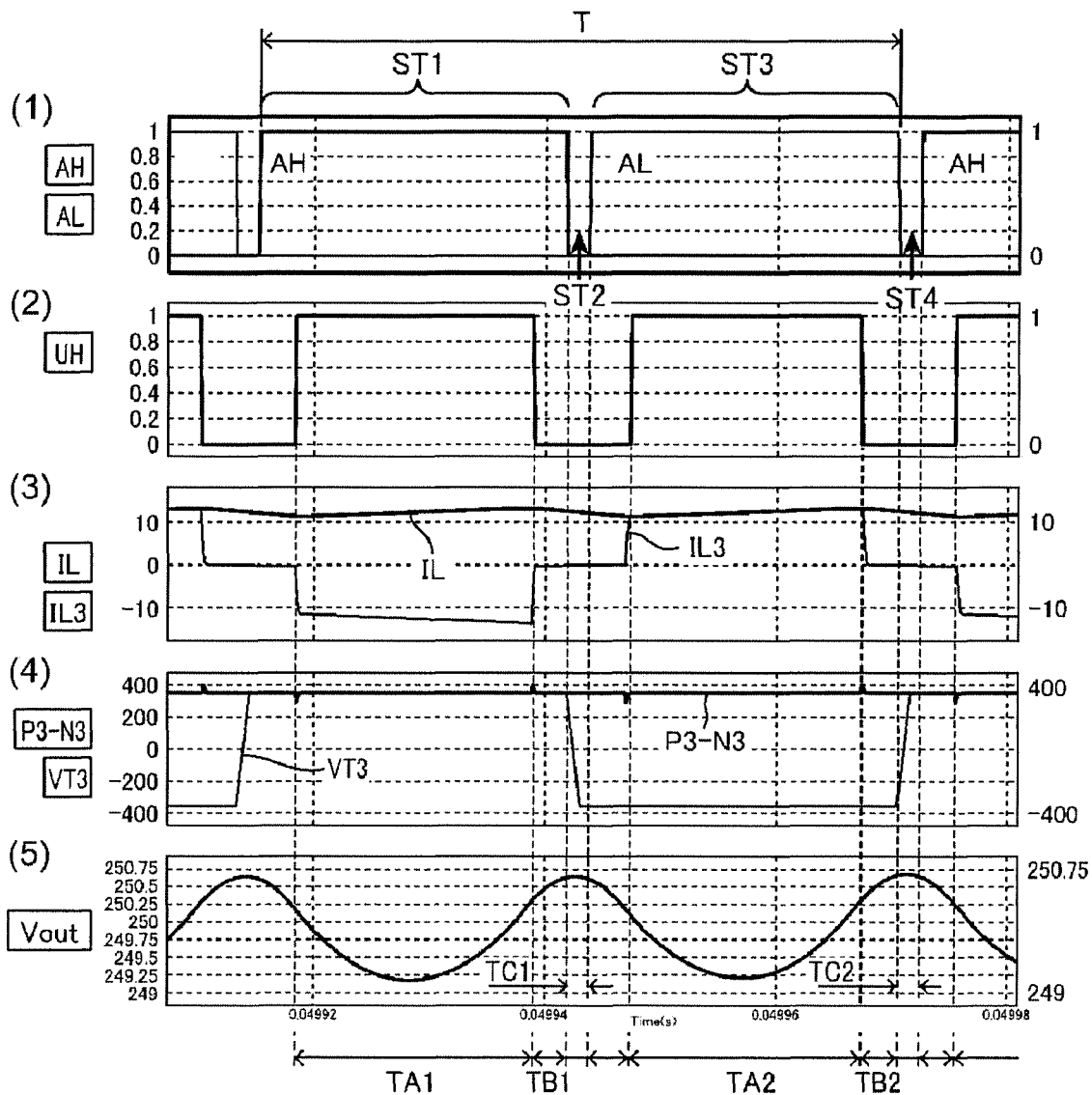
FIG. 54 is a diagram for illustration of timing charts of the power conversion system 1K.

Next, timing charts of the power conversion system 1K are described. FIG. 54 is a diagram for illustration of the timing charts of the power conversion system 1K. In FIG. 54, (1) represents on and off states of the switching devices AL and AH, wherein the on state means having a high level and the off state means having a low level. Note that, the switching devices BH and XL are turned on or off at the same timing of the switching device AL and the switching devices BL and XH are turned on or off at the same timing of the switching device AH.

(2) represents on and off states of the switching device UH, wherein the on state means having a high level and the off state means having a low level. (3) represents the current IL flowing through the coil 71A and the current IL3 flowing through the coil L12. (4) represents the voltage of the terminal P3 from the terminal N3 (voltage [P3-N3]) and the voltage of the coil L12 from the terminal T4 (voltage VT3). (5) represents the voltage of the terminal U2 from the terminal W2 (voltage Vout). In the following description, the voltage of the terminal P2 from the terminal N2 is referred to as VE. Additionally, the period T means a period (one cycle) of the AC voltage supplied to the primary winding 531.

Hereinafter, sequences regarding the converter units 51 and 52 are described in relation to the time periods ST1 to ST4 and sequences regarding the converter unit 7 are described in relation to time periods designated by TA1, TB1, TC1, TB3, TA2, TB2, TC2, and TB4.

<Time Period ST1>

The control unit 13 turns on the switching devices AH and BL and off the switching devices AL and BH. Consequently, the voltage VT1 is equal to VE and the voltage VT3 is equal to VE. Further in this regard, the diodes DXH and DYL are on and the diodes DXL and DYH are off. Consequently, the voltage [P3-N3] is equal to VE.

<Time Period ST2>

The control unit 13 turns off the switching devices AH, AL, BH, and BL while turning off the switching device UH to allow the current IL to circulate. Due to resonance between the excitation current of the coil L11 and the capacitors CAH, CAL, CBH, and CBL, the polarities of the voltages VT1 and VT3 are gradually reversed from positive states to negative states. Accordingly, soft switching can be realized. This time period in which the polarities are reversed is referred to as the reversal time period.

<Time Period ST3>

The control unit 13 turns on the switching devices AL and BH while the switching devices AH and BL are off. As a result, the voltages VT1 and VT3 are equal to −VE. Further in this regard, the diodes DXH and DYL are off and the diodes DXL and DYH are on. Consequently, the voltage [P3−N3] is equal to VE.

<Time Period ST4>

Similarly to the time period ST2, the control unit 13 turns off the switching devices AH, AL, BH, and BL to reverse the polarities of the voltages VT1 and VT3.

Hereinafter, the converter units 51 and 52 repeat operations associated with the time periods ST1, ST2, ST3, and ST4. By doing so, the voltage [P3−N3] is kept equal to VE and is supplied to the converter unit 7.

Note that, the converter unit 7 is connected to the DC power supply 17 through the transformer 53. Therefore, the converter unit 7 can be considered to be directly connected to the DC power supply 17 via leakage inductance of the transformer 53. Due to this, ringing may occur in the power conversion system 1K in switching of the converter unit 7. To prevent this, the snubber circuit 60 is provided. When the polarity of the voltage [P3−N3] is reversed, a direction of a current flowing through the snubber circuit 60 is reversed, too. This means that it is seriously difficult to increase a capacitance of the capacitor 62. Consequently, to suppress such ringing is difficult while the polarity of the voltage [P3−N3] is reversed.

In contrast, the power conversion system 1K does not see reversal of the polarity of the voltage [P3−N3]. The capacitor 62 can have a larger capacitance than in the case where the reversal of the polarity of the voltage [P3−N3] occurs. Thus, the power conversion system 1K can reduce such ringing.

<First Transfer Time Period TA1>

The control unit 13 turns on the switching device UH while the switching devices AH and BL are on and the switching devices AL and BH are off. Due to this, the first transfer time period in which the current IL flows through the first transfer path K1 (see FIG. 53) starts. In the first transfer path K1, a current flows through the secondary winding 532 and therefore power is transferred in the first single direction. As a result, the converter unit 7 comes into the first transferring mode of transferring power in the first single direction. In this regard, the connector 3 is connected to the DC power supply 17 and the connector 15 is connected to the DC device 28 and therefore the first transfer time period means a time period in which power is transferred from the DC power supply 17 to the DC device 28.

In this regard, (3) shows the current IL increases linearly. Further, (3) shows the current IL3 decreases sharply and then decreases with gentle slope.

<Circulation Time Period TB1>

The circulation time period TB1 follows after the first transfer time period TA1. The control unit 13 turns off the switching device UH while the switching devices AH and BL are on and the switching devices AL and BH are off. Due to this, the circulation time period in which the current IL flows through the circulation path K2 (see FIG. 53) starts. The circulation path K2 is a closed loop in the converter unit 7 and therefore transfer of power from the DC power supply 17 to the converter unit 7 is stopped. As a result, the converter unit 7 comes into the circulating mode.

In this regard, (3) shows the current IL decreases linearly. Further, (3) shows the current IL3 increases sharply and then fluctuates around 0.

<Reversal Time Period TC1>

The reversal time period TC1 follows after the circulation time period TB1. The reversal time period TC1 is same as the time period ST2 as described above. The control unit 13 turns off the switching devices AH, AL, BH, and BL while keeping the converter unit 7 in the circulating mode.

<Circulation Time Period TB3>

The circulation time period TB3 follows after the reversal time period TC1. The control unit 13 turns on the switching devices AL and BH while the switching device UH is off (the converter unit 7 is made in the circulating mode). The converter unit 7 continues the circulating mode throughout the circulation time period TB1, the reversal time period TC1, and the circulation time period TB3 to stop transfer of power from the DC power supply 17 to the converter unit 7.

<First Transfer Time Period TA2>

The first transfer time period TA2 follows after the circulation time period TB3. The control unit 13 turns on the switching device UH while the switching devices AL and BH are on and the switching devices AH and BL are off. Thus, the converter unit 7 comes into the first transferring mode.

In this regard, (3) shows the current IL increases linearly. Further, (3) shows the current IL3 increases sharply and then increases with gentle slope.

<Circulation Time Period TB2>

The circulation time period TB2 follows after the first transfer time period TA2. The control unit 13 turns off the switching device UH while the switching devices AL and BH are on and the switching devices AH and BL are off to make the converter unit 7 come into the circulating mode.

In this regard, (3) shows the current IL decreases linearly. Further, (3) shows the current IL3 decreases sharply and then fluctuates around 0.

<Reversal Time Period TC2>

The reversal time period TC2 follows after the circulation time period TB2. The reversal time period TC2 is same as the time period ST4 as described above. The control unit 13 turns off the switching devices AH, AL, BH, and BL while keeping the converter unit 7 in the circulating mode.

<Circulation Time Period TB4>

The circulation time period TB4 follows after the reversal time period TC2. The control unit 13 turns on the switching devices AH and BL while keeping the converter unit 7 in the circulating mode. The converter unit 7 continues the circulating mode throughout the circulation time period TB2, the reversal time period TC2, and the circulation time period TB4 to stop transfer of power from the DC power supply 17 to the converter unit 7.

As described above, the power conversion system 1K cyclically repeats the first transfer time period TA1, the circulation time period TB1, the reversal time period TC1, the circulation time period TB3, the first transfer time period TA2, the circulation time period TB2, the reversal time period TC2, and the circulation time period TB4 to supply power to the DC device 28. Further, the control unit 13 controls a duty cycle of the converter unit 7 to allow the converter unit 7 to output the voltage Vout with a desired value. The duty cycle is defined as a ratio of the first transfer time periods TA1 and TA2 in a unit period. The unit period means a half period (half cycle) of the period (cycle) T. (5) shows a slight ripple in a range from about 249 V to about 250.75 V is observed in the voltage Vout but the voltage Vout has an average of about 250 V. Therefore, the DC device 28 is supplied with a DC voltage of about 250 V. The control unit 13 adjusts the value of the voltage Vout by changing the duty cycle.

Figure 55:
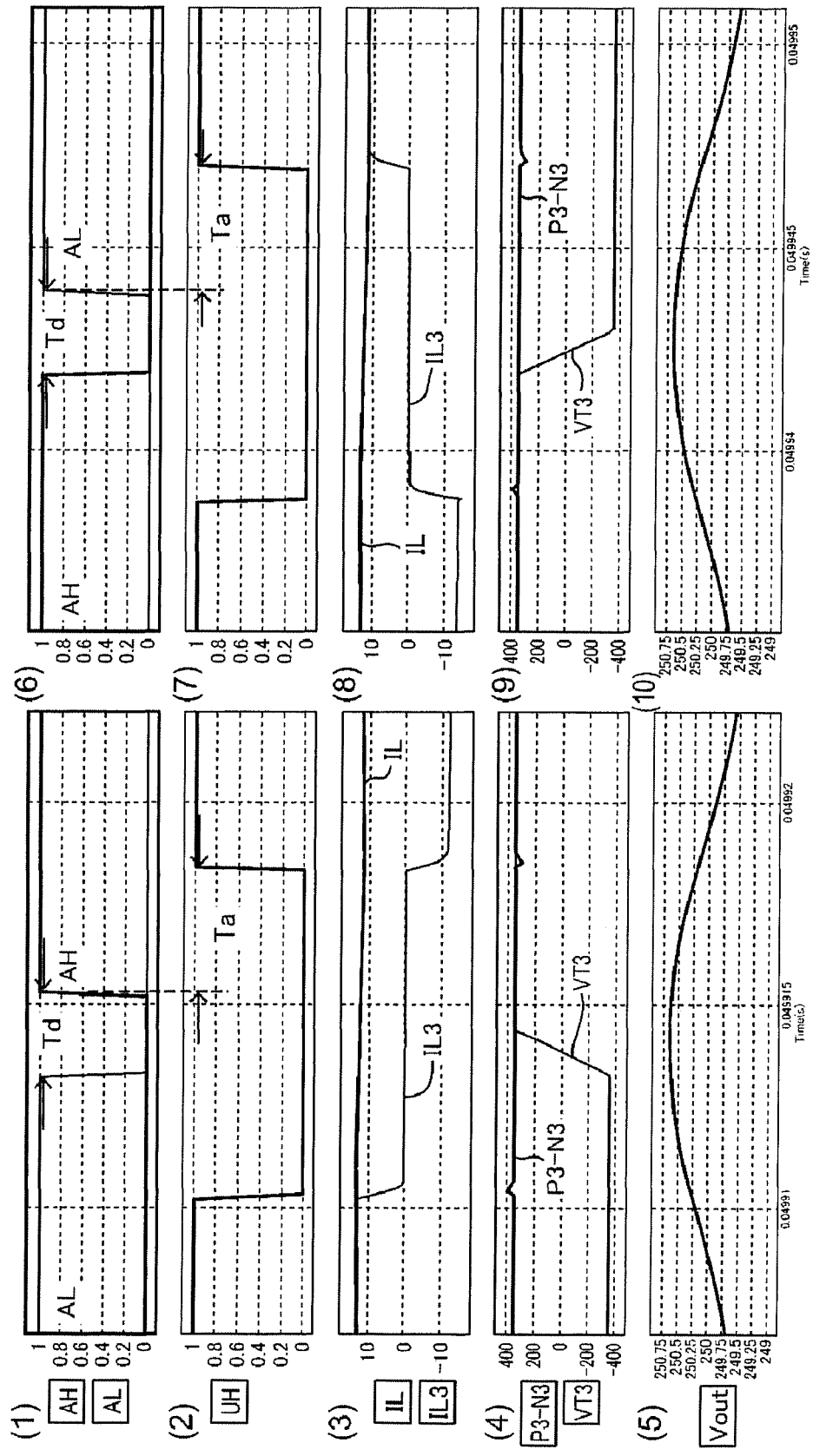
FIG. 55 is illustration for enlarged timing charts regarding reversal time periods TC1 and TC2 in FIG. 53.

FIG. 55 shows enlarged timing charts regarding the reversal time periods TC1 and TC2 in FIG. 54. In FIG. 55, (1) to (5) are enlarged charts regarding the reversal time period TC2 of (1) to (5) of FIG. 54, respectively, and (6) to (10) are enlarged charts regarding the reversal time period TC1 of (1) to (5) of FIG. 54.

(1) shows there is dead time Td after the switching device AL is turned off and before the switching device AH is turned on in the reversal time period TC2. The dead time Td may be 2 μs, for example. Further, (2) shows there is dead time Ta after the switching device AH is turned on and before the switching device UH is turned on. The dead time Ta may be 0.5 μs, for example. Accordingly, the switching devices can be protected.

(4) shows the voltage VT3 is reversed from the negative polarity to the positive polarity in the dead time Td.

(4) shows the voltage [P3–N3] is kept equal to the constant value throughout the whole time period.

(6) shows presence of the dead time Td after the switching device AH is turned off and before the switching device AL is turned on in the reversal time period TC1. Further, (7) shows presence of the dead time Ta after the switching device AL is turned on and before the switching device UH is turned on. (9) shows the voltage VT3 is reversed from the positive polarity to the negative polarity in the dead time Td.

(9) shows the voltage [P3–N3] is kept equal to the constant value throughout the whole time period.

As described above, the power conversion system 1K controls the converter unit 51 so that positive and negative voltages are alternately applied across each of the coils L11 and L12, and also the voltage [P3–N3] is positive. Therefore, a voltage with constant (unchanged) polarity is inputted into the converter unit 7. As a result, the converter unit 7 can be realized by an ordinary chopper circuit and ordinary control can apply without substantial modification.

Additionally, in the view point of the equivalent circuit of the transformer 53, the power conversion system 1K has the converter unit 7 directly connected with the capacitor 4 (see FIG. 53) via the leakage inductance of the transformer 53 in the second time period (the first transfer time period).

The power conversion system 1K allows transfer of power between the primary and secondary sides in this second time period only. Therefore, at the timing of transfer of power, the capacitor 4 and the converter unit 7 are always connected directly.

Therefore, it is unnecessary to situate a smoothing capacitor between the terminal P3 and the terminal N3, and accordingly the circuit scale can be downsized.

Additionally, to provide the snubber circuit 60 for addressing ringing, use of a capacitor with a relatively small capacitance is enough.

Further, the power conversion system 1K has the reversal time period for reversing the polarities of the coils L11 and L12 in the time period in which the converter unit 7 is set into the circulating mode. Therefore, even when the power conversion system 1K can perform reversal operation due to resonance of the excitation current and the capacitors CAH, CAL, CBH and CBL for resonance, regardless of the load current. Consequently, the power conversion system 1K can stably perform reversal of the polarities of voltages applied across the coils L11 and L12.

Embodiment 14

FIG. 56 is a circuit diagram of a power conversion system 1L according to Embodiment 14. The power conversion system 1L according to Embodiment 14 is characterized in that the converter unit 51 and the primary winding 531 are designed as center-tapped (CNT) circuitry and the converter unit 52 and the secondary winding 532 are designed as center-tapped (CNT) circuitry (i.e., CNT-CNT). Hereinafter, components of Embodiment 14 which are common to Embodiment 13 are designated by the same references to avoid redundant explanations. The power conversion system 1L according to Embodiment 14 is also a power conversion system for transfer of power in the first single direction similarly to Embodiment 13.

The transformer 53 is a high frequency center tapped transformer and includes the primary winding 531 and the secondary winding 532 which are magnetically coupled with each other. The primary winding 531 includes the two coils L1 and L2 separated by the center tap CT1 (one example of the first center tap).

The center tap CT1 is connected to the terminal P2. The primary winding 531 has a first end serving as the terminal T1 connected to the switching device BL (one example of the first switching device). The primary winding 531 has a second end serving as the terminal T2 (one example of the second winding terminal) connected to the switching device AL (one example of the second switching device).

The secondary winding 532 includes the two coils L3 and L4 separated by the center tap CT2 (one example of the second center tap). The center tap CT2 is connected to the terminal P3. The secondary winding 532 has a first end serving as the terminal T3 (one example of the third winding terminal) connected to the diode DYL (one example of the fifth switching device). The secondary winding 532 has a second end serving as the terminal T4 (one example of the fourth winding terminal) connected to the diode DXL (one example of the sixth switching device). The coils L1, L2, L3, and L4 are magnetically coupled so that the center tap CT1, the terminal T2, the center tap CT2, and the terminal T4 have the same polarity.

Hereinafter, a winding ratio of the coils L1 to L4 (high frequency transformers) are supposed to be 1:1:1:1. However, this is a mere example and the winding ratio of the coil L1 to L4 may be different from 1:1:1:1.

The converter unit 51 includes the two switching devices AL and BL, the two diodes DAL and DBL, and the two capacitors CAL and CBL. Connection relation between these components constituting the converter unit 51 is same as that between components designated by the same references in FIG. 53 and therefore explanation thereof is omitted.

The converter unit 52 includes the two diodes DYL and DXL. The diode DYL has the cathode connected to the terminal T3 and the anode connected to the terminal N3. The diode DXL has the cathode connected to the terminal T4 and the anode connected to the terminal N3.

Next, operations of the converter units 51 and 52 of the power conversion system 1L are described. <Time Period ST1> to <Time Period ST4> described below correspond to <Time Period ST1> to <Time Period ST4> described in relation to Embodiment 13. In the following description, the voltages VT1, VT2, VT3, and VT4 shown in FIG. 56 indicate voltages of the coils L1, L2, L3, and L4 from the terminals T1, T2, T3, and T4, respectively. Note that, operation of the converter unit 7 of the power conversion system 1L is same as that of Embodiment 13 and therefore explanation thereof is omitted.

<Time Period ST1>

The control unit 13 turns on the switching device BL and off the switching device AL. Accordingly, VT1 is equal to VE, VT2 is equal to −VE, VT3 is equal to VE, and VT4 is equal to −VE.

In this situation, a voltage of the terminal T1 from the terminal N2 (voltage [T1−N2]) is equal to 0, and a voltage of the terminal T2 from the terminal N2 (voltage [T2−N2]) is equal to 2VE. Further, the diode DYL is turned on and the diode DXL is turned off. Hence, a voltage of the terminal T3 from the terminal N3 (voltage [T3−N3]) is equal to =0, and a voltage of the terminal T4 from the terminal N3 (voltage [T4−N3]) is equal to 2VE. Therefore, a voltage of the terminal P3 from the terminal N3 (voltage [P3−N3]) is equal to VE.

<Time Period ST2>

The control unit 13 turns off the switching devices AL and BL while turning off the switching device UH to allow the current IL to circulate. Thereby, resonance caused by the excitation current of the coil L1 and the capacitors CAL and CBL causes gradual reversals of the polarities of the voltages VT1 and VT3 from positive states to negative states and also causes gradual reversals of the polarities of the voltages VT2 and VT4 from negative states to positive states. Accordingly, soft switching can be realized.

<Time Period ST3>

The control unit 13 turns on the switching device AL while turning off the switching device BL. Thereby, VT2 is equal to VE. Additionally. VT1 is equal to −VE, VT3 is equal to −VE, and VT4 is equal to VE.

In this situation, the diode DXL is turned on and the diode DYL is turned off. Hence, the voltage [T1−N2] is equal to 2VE, the voltage [T2−N2] is equal to 0, the voltage [T3−N3] is equal to 2VE, and the voltage [T4−N3] is equal to 0. Accordingly, the voltage [P3−N3] is equal to VE.

<Time Period ST4>

Similarly to the time period ST2, the control unit 13 turns off the switching devices AL and BL to reverse the polarities of the voltages VT1 to VT4.

After that, the converter units 51 and 52 repeat operations respectively associated with the time periods ST1, ST2, ST3, and ST4. Thus, the voltage [P3−N3] is kept equal to VE and then applied across the converter unit 7.

As described above, the power conversion system 1L is constituted by CNT-CNT circuitry but can offer the same advantageous effects as the power conversion system 1K.

Embodiment 15

FIG. 57 is a circuit diagram of a power conversion system 1M according to Embodiment 15. The power conversion system 1M according to Embodiment 15 is characterized in that the converter unit 51 and the primary winding 531 are designed as half bridge (HB) circuitry and the converter unit 52 and the secondary winding 532 are designed as center-tapped (CNT) circuitry (i.e., HB-CNT). Hereinafter, components of Embodiment 15 which are common to Embodiments 13 and 14 are designated by the same references to avoid redundant explanations. The power conversion system 1M according to Embodiment 15 is also a power conversion system for transfer of power in the first single direction similarly to Embodiments 13 and 14.

The converter unit 51 includes the two switching devices AH and AL connected in a half bridge arrangement. The switching device AH (one example of the first switching device) has the drain connected to the terminal P2 and the source connected to the terminal T2. The switching device AL (one example of the second switching device) has the drain connected to the terminal T2 and the source connected to the terminal N2.

The diodes DAH and DAL are connected to the switching devices AH and AL so that anodes and cathodes of the diodes DAH and DAL are connected to the sources and drains of the switching devices AH and AL, respectively. The capacitor C*1 and the capacitor C*2 are capacitors for generating the DC voltage Vm divided from the voltage VE of the DC power supply 17. The capacitor C*1 is connected between the terminal P2 and the terminal T1 and the capacitor C*2 is connected between the terminal T1 and the terminal N2.

The capacitor CAH is connected between the drain and source of the switching device AH and the capacitor CAL is connected between the drain and source of the switching device AL. The capacitors CAH and CAL have the same function as the capacitor C14 shown in FIG. 5, and cause soft switching of the converter unit 51 by resonating with the coil L11. Note that, the capacitors CAH and CAL each may be connected between the terminals T1 and T2.

In Embodiment 15, the primary winding 531 has no center tap and therefore includes the coil L11 only. The coil L11 is connected between the terminal T2 and the terminal T1. The coils L11, L3, and L4 are magnetically coupled with each other so that the terminal T2, the center tap CT2, and the terminal T4 have the same polarity.

The converter unit 52 and the secondary winding 532 have the same CNT configurations as those in FIG. 56 and therefore explanation thereof are omitted.

Next, operations of the converter units 51 and 52 of the power conversion system 1M are described. <Time Period ST1> to <Time Period ST4> described below correspond to <Time Period ST1> to <Time Period ST4> described in relation to Embodiment 13. In the following description, the voltages VT1, VT2, VT3, and VT4 shown in FIG. 7 indicate voltages of the coils L11, L3, and L4 from the terminals T1, T3, and T4, respectively. Note that, operation of the converter unit 7 of the power conversion system 1M is same as that of Embodiment 13 and therefore explanation thereof is omitted.

<Time Period ST1>

The control unit 13 turns on the switching device AH and off the switching device AL. Thus, the diode DYL is turned on and the diode DXL is turned off. Accordingly, VT1 is equal to VE, VT3 is equal to VE, and VT4 is equal to −VE. Hence, the voltage of the terminal P3 from the terminal N3 (voltage [P3−N3]) is equal to VE.

<Time Period ST2>

The control unit 13 turns off the switching devices AH and AL while turning off the switching device UH to allow the current IL to circulate. Thereby, resonance caused by the excitation current of the coil L11 and the capacitors CAH and CAL causes gradual reversals of the polarities of the voltages VT1 and VT3 from positive states to negative states. Accordingly, soft switching can be realized.

<Time Period ST3>

The control unit 13 turns on the switching device AL while turning off the switching device AH. In this regard, the diode DYL is turned off and the diode DXL is turned on. Thereby, VT1 is equal to −VE, VT3 is equal to −VE, and VT4 is equal to VE. Hence, the voltage of the terminal P3 from the terminal N3 (voltage [P3−N3]) is equal to VE.

<Time Period ST4>

Similarly to the time period ST2, the control unit 13 turns off the switching devices AH and AL to reverse the polarities of the voltages VT1, VT3, and VT4.

After that, the converter units 51 and 52 repeat operations respectively associated with the time periods ST1, ST2, ST3, and ST4. Thus, the voltage [P3–N3] is kept equal to VE and then applied across the converter unit 7.

As described above, the power conversion system 1M is constituted by HB-CNT circuitry but can offer the same advantageous effects as the power conversion system 1K.

Embodiment 13 relates to an example in which the converter units 51 and 52 both are constituted by full bridge (FB) circuitry. Embodiment 14 relates to an example in which the converter units 51 and 52 both are constituted by center tapped (CNT) circuitry. Embodiment 15 relates to an example in which the converter unit 51 is constituted by half bridge (HB) circuitry and the converter unit 52 is constituted by center tapped circuitry. However, a combination of the converter units 51 and 52 is not limited to any of the aforementioned combinations. For example, the converter unit 51 may be constituted by center tapped circuitry and the converter unit 52 may be constituted by full bridge circuitry. Or, the converter units 51 and 52 both are constituted by half bridge circuitry.

Any of the snubber circuits 60A to 60C shown in FIG. 47 to FIG. 49 can be used instead of the snubber circuit 60.

Embodiment 16

FIG. 58 is a circuit diagram of a power conversion system 1N according to Embodiment 16. The power conversion system 1N according to Embodiment 16 is characterized in that the converter unit 7 is constituted by a single-phase inverter. In the present embodiment, the converter units 51 and 52 each have the same CNT circuitry as those in FIG. 56 and therefore explanation thereof is omitted.

The filter circuit 9 is provided between the converter unit 7 and the connector 15. The filter circuit 9 includes the pair of coils 91 and 92 and the capacitor 93.

The conversion unit 7 includes a single-phase inverter and generates a commercial AC voltage with a frequency of 50 Hz or 60 Hz from a positive voltage applied between the terminal P3 and the terminal N3, for example. The conversion unit 7 is a single-phase inverter including the switching device UH (one example of the ninth switching device), the switching device UL (one example of the tenth switching device), the switching device WH (one example of the eleventh switching device), the switching device WL (one example of the twelfth switching device), the four diodes D1 to D4, the terminal U1, and the terminal W1, wherein the switching devices UH, UL, WH, and WL are connected in full bridge configuration.

The switching devices UH to WL are each constituted by an n-type field effect transistor. The switching device UH has the drain connected to the terminal P3 and the source connected to the terminal U1. The switching device WH has the drain connected to the terminal P3 and the source connected to the terminal W1.

The switching device UL has the drain connected to the terminal U1 and the source connected to the terminal N3. The switching device WL has the drain connected to the terminal W1 and the source connected to the terminal N3.

The diodes D1 to D4 have the anodes and the cathodes connected to the sources and drains of the switching devices UH to WL, respectively.

The switching devices UH, UL, WH, and WL each may be constituted by an npn type insulated gate bipolar transistor instead of a field effect transistor, for example. In this case, the diodes D1, D2, D3, and D4 are provided as free wheel diodes. Further in this case, the diode D1 is connected between the emitter and collector of the switching device UH to allow a current to flow through the diode D1 in an opposite direction to a current flowing through the switching device UH when the switching device UH is on. This is applicable mutatis mutandis to the diodes D2, D3, and D4.

The control unit 13 controls amplitude of at least one of the voltage Vout between the terminals U2 and W2 and the current Ibus flowing through the terminal P2 by turning on or off the switching devices UH to WL. This will be described in detail below.

The coil 91 is connected between the terminal U1 and the terminal U2. The coil 92 is connected between the terminal W1 and the terminal W2. The capacitor 93 is connected between the terminal U2 and the terminal W2. The coils 91 and 92 and the capacitor 93 constitute a filter circuit for smoothing an AC voltage with a rectangular waveform outputted from the converter unit 7. Accordingly, the AC voltage with the rectangular waveform outputted from the converter unit 7 is converted into an AC voltage with a sinusoidal waveform having amplitude corresponding to a pulse width of the AC voltage with the rectangular waveform.

To supply power from the DC power supply 17 to the AC power system 29 (to sell power), the terminals U2 and W2 are connected to the AC power system 29.

To supply power from the DC power supply 17 to an AC device 30, the terminals U2 and W2 are connected to the AC device 30. The AC device 30 may be an electric device operating with a commercial AC voltage, for example.

The control unit 13 may be constituted by a CPU, an FPGA, an ASIC, or the like, for example, and is configured to control the converter unit 51 and the converter unit 7.

The control unit 13 is configured to control the converter unit 51 so that a high frequency AC voltage is supplied to the primary winding 531 and the secondary winding 532 and that a voltage with positive polarity is applied between the terminal P3 and the terminal N3.

In detail, the control unit 13 controls the converter units 51 and 7 so that the reversal time period and the circulation time period appear in the first time period constituting a half cycle (one example of the unit time period) of an AC voltage supplied to the primary winding 531 and the first transfer time period described below appears in the second time period different from the first time period.

In more detail, the control unit 13 performs PWM control on the converter unit 7 to change a ratio of the second time period in each unit time period, thereby generating a desired voltage Vout or current IL. The desired voltage Vout or current IL means a voltage or current with the same waveform as a modulation signal used in the PWM control, for example.

<Timing Chart>

Figure 59:
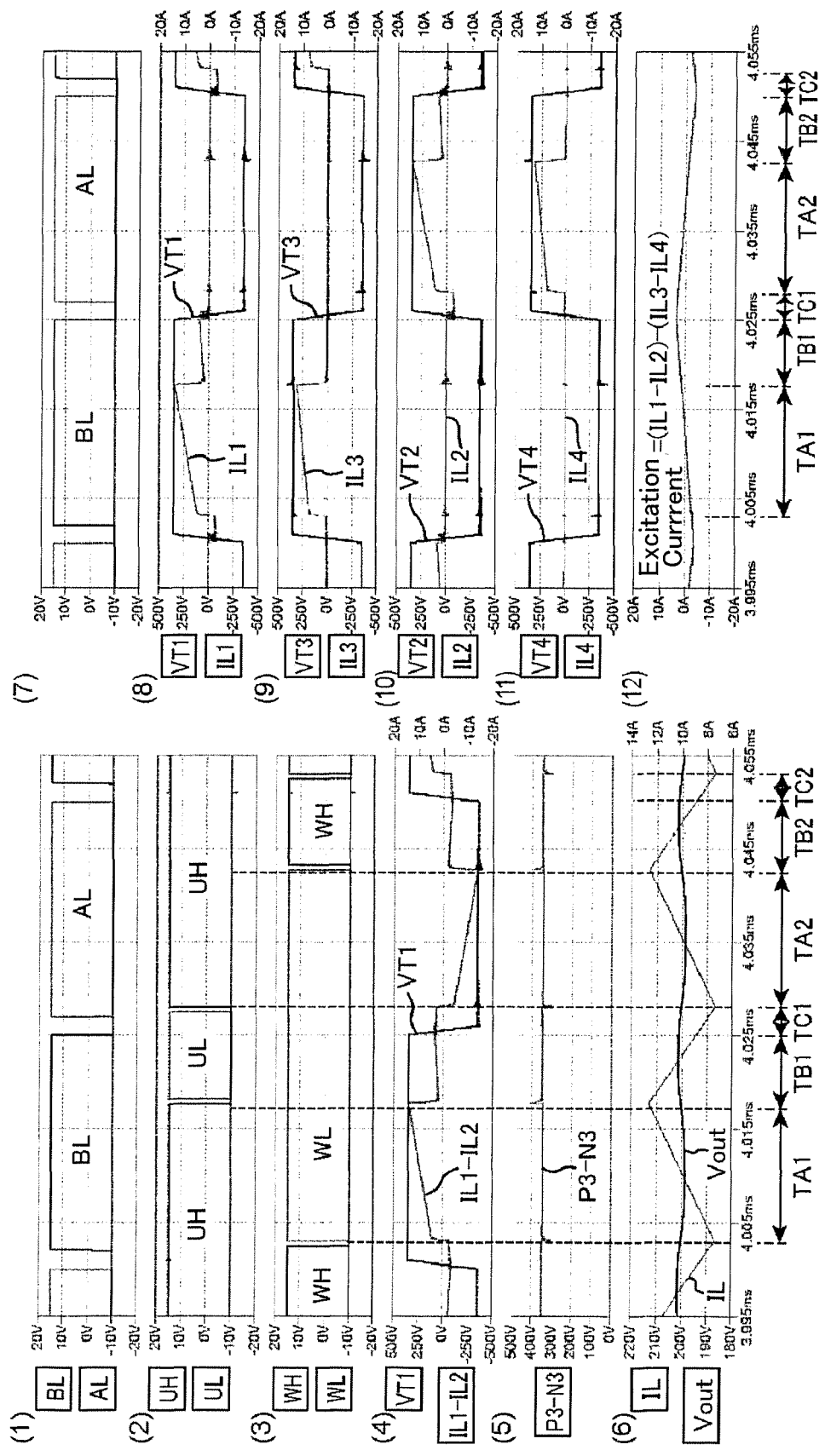
FIG. 59 is a diagram for illustration of timing charts of the power conversion system 1N.

Next, timing charts of the power conversion system 1N are described. FIG. 59 is a diagram for illustration of the timing charts of the power conversion system IN. In FIG. 59, (1) represents on and off states of the switching devices BL and AL, wherein the on state means having a high level and the off state means having a low level. (2) represents on and off states of the switching devices UH and UL, wherein the on state means having a high level and the off state means having a low level. (3) represents on and off states of the switching devices WH and WL, wherein the on state means having a high level and the off state means having a low level. (4) represents the voltage VT1 and a current defined by (IL1–IL2). (5) represents the voltage [P3–N3]. (6) represents the current IL and the voltage Vout.

(7) is same as (1). (8) represents the voltage VT1 and the current IL1. (9) represents the voltage VT3 and the current IL3. (10) represents the voltage VT2 and the current IL2. (11) represents the voltage VT4 and the current IL4. (12) represents the excitation current of the transformer 53. The excitation current is given by (IL1−IL2)−(IL3−IL4).

<First Transfer Time Period TA1>

With reference to (1) and (7), the control unit 13 turns on the switching device BL and off the switching device AL. Thus, VT1 is equal to VE, VT2 is equal to −VE, VT3 is equal to VE, and VT4 is equal to −VE. And, the diode DYL is turned on and the diode DXL is turned off. In this regard, with reference to (2) and (3), the control unit 13 turns on the switching devices UH and WL and off the switching devices UL and WH to allow the converter unit 7 to come into the first transferring mode.

Thus, (6) shows the current IL increases linearly. Further, (8), (9), (10), and (11) show the currents IL1 and IL3 increase sharply and then increase with gentle slope while the currents IL2 and IL4 are equal to 0. Further, (5) shows the voltage [P3−N3] is kept equal to a constant value.

<Circulation Time Period TB1>

The circulation time period TB1 follows after the first transfer time period TA1. (2) and (3) show the control unit 13 turns on the switching devices UL and WL and off the switching devices UH and WH while the switching device BL is on and the switching device AL is off to allow the converter unit 7 to come into the circulating mode.

Thus, (6) shows the current IL decreases linearly. Further, (8), (9), (10), and (11) show the currents IL1 and IL3 decrease sharply and then fluctuate around 0. In detail, the current IL3 is 0 but the current IL1 includes the excitation current. The currents IL2 and IL4 are equal to 0. Further, (5) shows the voltage [P3−N3] is kept equal to the constant value.

<Reversal Time Period TC1>

The reversal time period TC1 follows after the circulation time period TB1. With reference to (1) and (7), the control unit 13 turns off the switching devices BL and AL while keeping the converter unit 7 in the circulating mode.

Thus, (8) and (9) show the polarities of the voltages VT1 and VT3 are reversed from positive polarities to negative polarities. (10) and (11) show the polarities of the voltages VT2 and VT4 are reversed from negative polarities to positive polarities. Further, (5) shows the voltage [P3−N3] is kept equal to the constant value.

<First Transfer Time Period TA2>

The first transfer time period TA2 follows after the reversal time period TC1. With reference to (1) and (7), the control unit 13 turns off the switching device BL and on the switching device AL. Thus, VT1 is equal to −VE, VT2 is equal to VE, VT3 is equal to −VE, and VT4 is equal to VE. And, the diode DYL is turned off and the diode DXL is turned on. In this regard, (2) and (3) show the control unit 13 turns on the switching devices UH and WL and off the switching devices UL and WH to allow the converter unit 7 to come into the first transferring mode.

Thus, (6) shows the current IL increases linearly. Further, (8), (9), (10), and (11) show the currents IL1 and IL3 are equal to 0 while the currents IL2 and IL4 increase sharply and then increase with gentle slope. Further, (5) shows the voltage [P3−N3] is kept equal to the constant value.

<Circulation Time Period TB2>

The circulation time period TB2 follows after the first transfer time period TA2. (2) and (3) show the control unit 13 turns on the switching devices UH and WH and off the switching devices UL and WL while the switching device BL is off and the switching device AL is on, thereby allowing the converter unit 7 to come into the circulating mode.

Thus, (6) shows the current IL decreases linearly. Further, (8), (9), (10), and (11) show the currents IL1 and IL3 are kept equal to substantially 0. The currents IL2 and IL4 decrease sharply and then fluctuate around 0. In detail, the current IL4 is 0 but the current IL2 includes the excitation current only. Further, (5) shows the voltage [P3−N3] is kept equal to the constant value.

<Reversal Time Period TC2>

The reversal time period TC2 follows after the circulation time period TB2. With reference to (1) and (7), the control unit 13 turns off the switching devices AL and BL while keeping the converter unit 7 in the circulating mode.

Thus, (8) and (9) show the polarities of the voltages VT1 and VT3 are reversed from negative polarities to positive polarities. (10) and (11) show the polarities of the voltages VT2 and VT4 are reversed from positive polarities to negative polarities. Further, (5) shows the voltage [P3−N3] is kept equal to the constant value.

As described above, the power conversion system IN cyclically repeats the first transfer time period TA1, the circulation time period TB1, the reversal time period TC1, the first transfer time period TA2, the circulation time period TB2, and the reversal time period TC2 to supply power to the AC power system 29 or the AC device 30. Further, the power conversion system IN changes a ratio of the first transfer time period TA1 and the first transfer time period TA2 in one period by PWM control to generate a desired voltage Vout.

Additionally, it is understood that throughout the whole time period, the voltage [P3−N3] is kept equal to the constant value and the polarity is not reversed.

Embodiment 16 relates to an example in which the converter unit 7 is constituted by a single-phase inverter. However, the converter unit 7 may not be limited to a single-phase inverter but may be a three-phase inverter.

Further, Embodiment 16 relates to an example in which power is supplied from the DC power supply 17 to the AC power system 29 (i.e., in the first direction) but may be modified so that power is supplied from the AC power system 29 to the DC power supply 17 (i.e., in the second direction).

Embodiment 17

FIG. 60 is a circuit diagram of a power conversion system 1P according to Embodiment 17. The power conversion system 1P is a power conversion system for conversion and transfer of power in a second single direction from the connector 15 to the connector 3. Note that, configuration shown in FIG. 60 is different from that in FIG. 53 in that the connector 15 is connected to the DC power supply 17 (one example of the second connection target) and the connector 3 is connected to the DC device 28 (one example of the first connection target). In detail, the terminal P2 (one example of the first external connection terminal) is connected to the positive electrode of the DC device 28 and the terminal N2 (one example of the second external connection terminal) is connected to the negative electrode of the DC device 28. Further, the terminal U2 (one example of the third external connection terminal) is connected to the positive electrode of the DC power supply 17 and the terminal W2 (one example of the fourth external connection terminal) is connected to the negative electrode of the DC power supply 17.

Similarly to the power conversion system 1K according to Embodiment 13, the power conversion system 1P according to Embodiment 17 is characterized in that the converter unit 51 and the primary winding 531 are configured as full bridge (FB) circuitry and the converter unit 52 and the secondary winding 532 are also configured as full bridge (FB) circuitry (i.e., FB-FB). Hereinafter, components of Embodiment 17 which are common to Embodiments 13 to 16 are designated by the same references to avoid redundant explanations.

The configurations of the converter unit 51 and the primary winding 531 are FB circuitry as already shown in FIG. 53 but are different in that the switching devices AH, AL, BH, and BL are omitted as understood from FIG. 60. In detail, the diode DAH has the anode connected to the terminal T2 and the cathode connected to the terminal P2. The diode DAL has the anode connected to the terminal N2 and the cathode connected to the terminal T2. The diode DBH has the anode connected to the terminal T1 and the cathode connected to the terminal P2. The diode DBL has the anode connected to the terminal N2 and the cathode connected to the terminal T1.

The configurations of the converter unit 52 and the secondary winding 532 are FB circuitry as already shown in FIG. 50 but are different in that the switching devices XH, XL, YH, and YL are added as understood from FIG. 60. In detail, the switching device XH has the source connected to the terminal T3 and the drain connected to the terminal P3. The switching device XL has the source connected to the terminal N3 and the drain connected to the terminal T3. The switching device YH has the source connected to the terminal T4 and the drain connected to the terminal P3. The switching device YL has the source connected to the terminal N3 and the drain connected to the terminal T4.

The converter unit 7 includes a chopper circuit for transferring power in the second single direction. In detail, the converter unit 7 includes the switching device UL (one example of the ninth switching device), the two diodes D1 and D2, the coil 71A, and the capacitor 72A.

The converter unit 7 raises the voltage Vout supplied from the DC device 28 and applies a resultant voltage between the terminal P3 and the terminal N3.

The coil 71A is connected between the terminal U2 and the terminal U1. The capacitor 72A is connected between the terminal U2 and the terminal W2.

The switching device UL may be constituted by an n-type field effect transistor, for example. The switching device UL has the drain connected to the terminal U1 and the source connected to the terminal N3.

The diode D2 has the cathode connected to the drain of the switching device UL and the anode connected to the source of the switching device UL. The diode D1 has the cathode connected to the terminal P3 and the anode connected to the terminal U1.

The switching device UL may be constituted by an npn type insulated gate bipolar transistor instead of a field effect transistor, for example. In this case, the diode D2 is provided as a free wheel diode. Further in this case, the diode D2 is connected between the emitter and collector of the switching device UL to allow a current to flow through the diode D2 in an opposite direction to a current flowing through the switching device UL when the switching device UL is on.

The control unit 13 turns on and off the switching device UL, thereby controlling at least one of magnitudes of a current Tout flowing through the terminal U2 and the voltage Vbus between the terminal P2 and the terminal N2. This is described in detail later.

The control unit 13 is configured to control the converter unit 7 not to cause transfer of power between the transformer circuit unit 5 and the converter unit 7 in the first time period including the reversal time period in which a reversal of polarity of the voltage across the primary winding 531 occurs. The control unit 13 is configured to control the converter unit 7 to cause transfer of power in the second single direction from the converter unit 7 to the transformer circuit unit 5 in the second time period different from the first time period.

In detail, the control unit 13 controls the converter units 51 and 52 and the converter unit 7 so that the reversal time period and the circulation time period described below appear in the first time period constituting a half cycle (one example of the unit time period) of an AC voltage supplied to the primary winding 531.

In more detail, the control unit 13 determines a duty cycle of the converter unit 7 so that the voltage Vbus or the current Iout has a desired value, and controls the switching device UL at the duty cycle determined.

In the power conversion system 1P, a voltage drop occurs between the terminals U2 and W2 in a direction opposite to a direction in which a current flows through the DC power supply 17. In other words, the power conversion system 1P operates to allow the voltage Vout and the current IL to have different polarities.

<Timing Chart>

Figure 61:
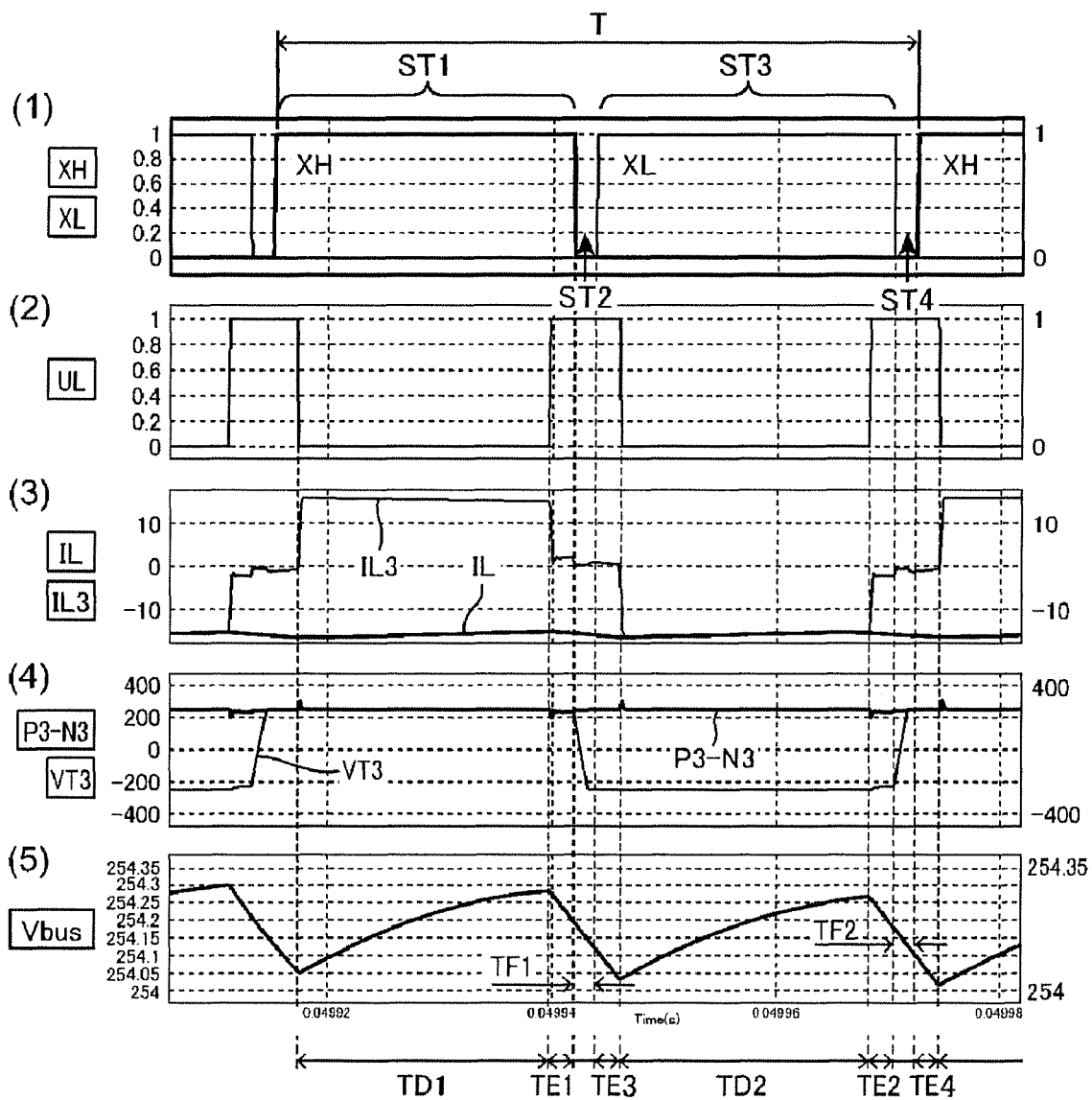
FIG. 61 is a diagram for illustration of timing charts of the power conversion system 1P.

Next, timing charts of the power conversion system 1P are described. FIG. 61 is a diagram for illustration of the timing charts of the power conversion system 1P. In FIG. 61, (1) represents on and off states of the switching devices XH and XL, wherein the on state means having a high level and the off state means having a low level. Note that, the switching device YL is turned on or off at the same timing of the switching device XH and the switching device YH is turned on or off at the same timing of the switching device XL. (2) represents on and off states of the switching device UL, wherein the on state means having a high level and the off state means having a low level. (3) represents the current IL flowing through the coil 71A and the current IL3 flowing through the coil L12. (4) represents the voltage of the terminal P3 from the terminal N3 (voltage [P3−N3]) and the voltage of the coil L12 from the terminal T4 (voltage VT3). (5) represents the voltage Vbus. In the following description, the voltage of the terminal P2 from the terminal N2 is referred to as VE. Additionally, the period T means a period (one cycle) of the AC voltage supplied to the primary winding 531. Note that, the voltage VE means the voltage Vout raised by the converter unit 7.

Hereinafter, sequences regarding the converter units 51 and 52 are described in relation to the time periods ST1 to ST4 and sequences regarding the converter unit 7 are described in relation to time periods designated by TD1, TE1, TF1, TE3, TD2, TE2, TF2, and TE4.

<Time Period ST1>

The control unit 13 turns on the switching devices XH and YL and off the switching devices XL and YH. Thus, the diodes DAH and DBL are turned on and the diodes DAL and DBH are turned off. Consequently, the voltage VT1 is equal to VE and the voltage VT3 is equal to VE. As a result, the voltage [P3−N3] is equal to VE.

<Time Period ST2>

The control unit 13 turns off the switching devices XH, XL, YH, and YL while turning on the switching device UL to allow the current IL to circulate. Due to resonance between the excitation current of the coil L11 and the capacitors CAH, CAL, CBH, and CBL, the polarities of the voltages VT1 and VT3 are gradually reversed from positive states to negative states.

Accordingly, soft switching can be realized. This time period in which the polarities are reversed is referred to as the reversal time period.

<Time Period ST3>

The control unit 13 turns on the switching devices XL and YH while the switching devices XH and YL are off. Thus, the diodes DAH and DBL are turned off and the diodes DAL and DBH are turned on. As a result, the voltages VT1 and VT3 are equal to −VE. Consequently, the voltage [P3−N3] is equal to VE.

<Time Period ST4>

Similarly to the time period ST2, the control unit 13 turns off the switching devices XH, XL, YH, and YL to reverse the polarities of the voltages VT1 and VT3.

Hereinafter, the converter units 51 and 52 repeat operations associated with the time periods ST1, ST2, ST3, and ST4. By doing so, the voltage [P3−N3] is kept equal to VE.

<Second Transfer Time Period TD1>

The control unit 13 turns off the switching device UL while the switching devices XH and YL are on and the switching devices XL and YH are off. Due to this, the second transfer time period in which the current IL flows through the second transfer path K3 (see FIG. 60) starts. In the second transfer path K3, a current flows through the secondary winding 532 and therefore power is transferred in the second single direction. As a result, the converter unit 7 comes into the second transferring mode of transferring power in the second single direction. In this regard, the connector 3 is connected to the DC device 28 and the connector 15 is connected to the DC power supply 17 and therefore the second transfer time period means a time period in which power is transferred from the DC power supply 17 to the DC device 28.

In this regard, (3) shows the current IL increases linearly. Further, (3) shows the current IL3 increases sharply and then decreases with gentle slope.

<Circulation Time Period TE1>

The circulation time period TE1 follows after the second transfer time period TD1. The control unit 13 turns on the switching device UL while the switching devices XH and YL are on and the switching devices XL and YH are off. Due to this, the circulation time period in which the current IL flows through the circulation path K4 (see FIG. 60) starts. The circulation path K4 is a closed loop in the converter unit 7 and therefore transfer of power from the converter unit 7 to the DC power supply 17 is stopped. As a result, the converter unit 7 comes into the circulating mode.

In this regard, (3) shows the current IL decreases linearly. Further, (3) shows the current IL3 increases sharply and then fluctuates around 0.

<Reversal Time Period TF1>

The reversal time period TF1 follows after the circulation time period TE1. The reversal time period TF1 is same as the time period ST2 as described above. The control unit 13 turns off the switching devices XH, XL, YH, and YL while keeping the converter unit 7 in the circulating mode.

<Circulation Time Period TE3>

The circulation time period TE3 follows after the reversal time period TF1. The control unit 13 turns on the switching devices XL and YH while the switching device UL is on (the converter unit 7 is made in the circulating mode). The converter unit 7 continues the circulating mode throughout the circulation time period TE1, the reversal time period TF1, and the circulation time period TE3 to stop transfer of power from the converter unit 7 to the DC power supply 17.

<Second Transfer Time Period TD2>

The second transfer time period TD2 follows after the circulation time period TE3. The control unit 13 turns off the switching device UL while the switching devices XL and YH are on and the switching devices XH and YL are off. Thus, the converter unit 7 comes into the second transferring mode.

In this regard, (3) shows the current IL increases linearly. Further, (3) shows the current IL3 decreases sharply and then increases with gentle slope.

<Circulation Time Period TE2>

The circulation time period TE2 follows after the second transfer time period TD2. The control unit 13 turns on the switching device UL while the switching devices XL and YH are on and the switching devices XH and YL are off to make the converter unit 7 come into the circulating mode.

In this regard, (3) shows the current IL decreases linearly. Further, (3) shows the current IL3 increases sharply and then fluctuates around 0.

<Reversal Time Period TF2>

The reversal time period TF2 follows after the circulation time period TE2. The reversal time period TF2 is same as the time period ST4 as described above. The control unit 13 turns off the switching devices XH, XL, YH, and YL while keeping the converter unit 7 in the circulating mode.

<Circulation Time Period TE4>

The circulation time period TE4 follows after the reversal time period TF2. The control unit 13 turns on the switching devices XH and YL while keeping the converter unit 7 in the circulating mode. The converter unit 7 continues the circulating mode throughout the circulation time period TE2, the reversal time period TF2, and the circulation time period TE4 to stop transfer of power from the converter unit 7 to the DC power supply 17.

As described above, the power conversion system 1P cyclically repeats the second transfer time period TD1, the circulation time period TE1, the reversal time period TF1, the circulation time period TE3, the second transfer time period TD2, the circulation time period TE2, the reversal time period TF2, and the circulation time period TE4 to supply power to the DC device 28. Further, the control unit 13 controls a duty cycle of the converter unit 7 to set the voltage Vbus to a desired value. The duty cycle is defined as a ratio of the second transfer time periods TD1 and TD2 in a unit period. The unit period means a half period (half cycle) of the period (cycle) T. (5) shows a slight ripple in a range from about 254 V to about 254.35 V is observed in the voltage Vbus but the voltage Vbus has an average of about 254.175 V. Therefore, the DC device 28 is supplied with a DC voltage of about 254.175 V. The control unit 13 adjusts the value of the voltage Vbus by changing the duty cycle.

Figure 62:
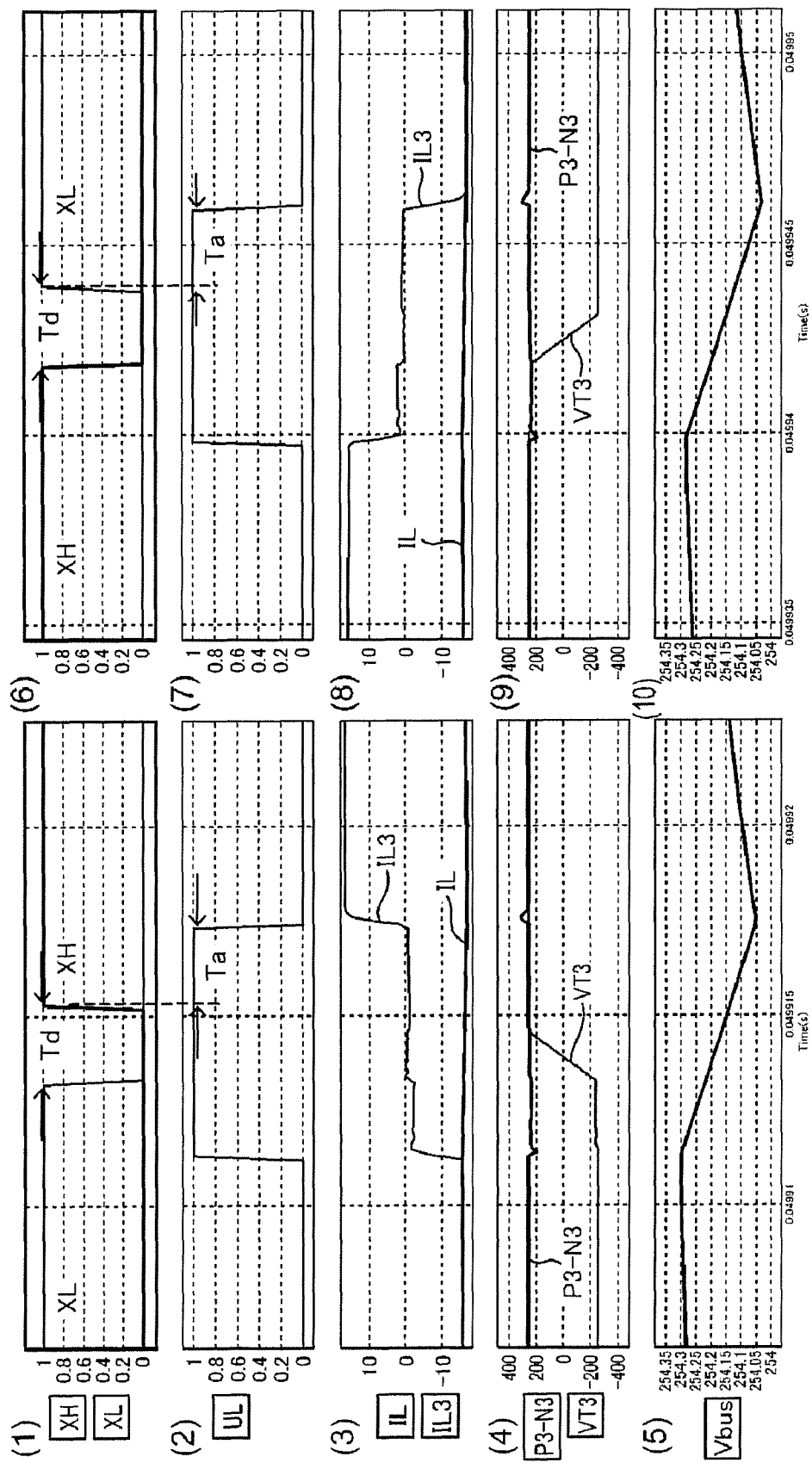
FIG. 62 is illustration for enlarged timing charts regarding reversal time periods TF1 and TF2 in FIG. 61.

FIG. 62 shows enlarged timing charts regarding the reversal time periods TF1 and TF2 in FIG. 61. In FIG. 62, (1) to (5) are enlarged charts regarding the reversal time period TF2 of (1) to (5) of FIG. 61, respectively, and (6) to (10) are enlarged charts regarding the reversal time period TF1 of (1) to (5) of FIG. 61.

(1) shows the dead time Td provided after the switching device XL is turned off and before the switching device XH is turned on in the reversal time period TF2. The dead time Td may be 2 μs, for example. Further, (2) shows the dead time Ta provided after the switching device XH is turned on and before the switching device UL is turned off. The dead time Ta may be 0.5 μs, for example. Accordingly, the switching devices can be protected.

(4) shows the voltage VT3 is reversed from the negative polarity to the positive polarity in the dead time Td.

(4) shows the voltage [P3–N3] is kept equal to the constant value throughout the whole time period.

(6) shows presence of the dead time Td after the switching device XH is turned off and before the switching device XL is turned on in the reversal time period TF1. Further, (7) shows presence of the dead time Ta after the switching device XL is turned on and before the switching device UL is turned off. (9) shows the voltage VT3 is reversed from the positive polarity to the negative polarity in the dead time Td.

(9) shows the voltage [P3–N3] is kept equal to the constant value throughout the whole time period.

As described above, the power conversion system 1P according to Embodiment 17 transfers power in the second single direction but can offer the same advantageous effects as Embodiment 13.

Embodiment 18

Figure 63:
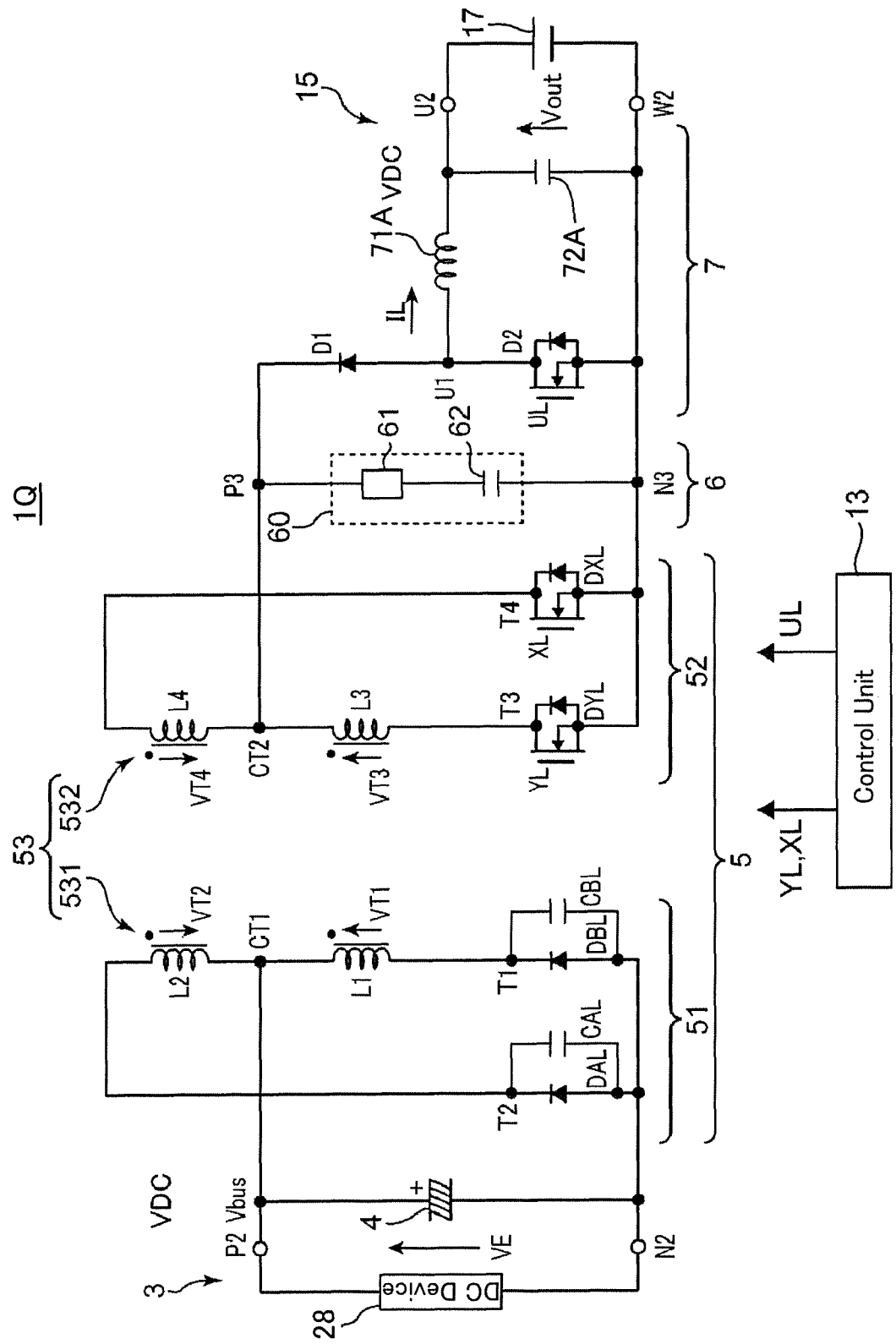
FIG. 63 is a circuit diagram of a power conversion system 1Q according to Embodiment 18.

FIG. 63 is a circuit diagram of a power conversion system 1Q according to Embodiment 18. Similarly to the power conversion system 1L according to Embodiment 14, the power conversion system 1Q according to Embodiment 18 is characterized in that the converter unit 51 and the primary winding 531 are designed as center-tapped (CNT) circuitry and the converter unit 52 and the secondary winding 532 are designed as center-tapped (CNT) circuitry (i.e., CNT-CNT). Hereinafter, components of Embodiment 18 which are common to Embodiments 13 to 17 are designated by the same references to avoid redundant explanations. The power conversion system 1Q according to Embodiment 18 is also a power conversion system for transfer of power in the second single direction similarly to Embodiment 17.

The configurations of the converter unit 51 and the primary winding 531 are CNT circuitry as already shown in FIG. 56 but are different in that the switching devices AL and BL are omitted as understood from FIG. 63. In detail, the diode DAL has the anode connected to the terminal N2 and the cathode connected to the terminal T2. The diode DBL has the anode connected to the terminal N2 and the cathode connected to the terminal T1.

The configurations of the converter unit 52 and the secondary winding 532 are CNT circuitry as already shown in FIG. 56 but are different in that the switching devices YL and XL are added as understood from FIG. 63. In detail, the switching device YL has the source connected to the terminal N3 and the drain connected to the terminal T3. The switching device XL has the source connected to the terminal N3 and the drain connected to the terminal T4.

Next, operations of the converter units 51 and 52 of the power conversion system 1Q are described. <Time Period ST1> to <Time Period ST4> described below correspond to <Time Period ST1> to <Time Period ST4> described in relation to Embodiment 17. In the following description, the voltages VT1, VT2, VT3, and VT4 shown in FIG. 63 indicate voltages of the coils L1, L2, L3, and L4 from the terminals T1, T2, T3, and T4, respectively. Note that, operation of the converter unit 7 of the power conversion system 1Q is same as that of Embodiment 17 and therefore explanation thereof is omitted.

<Time Period ST1>

The control unit 13 turns on the switching device YL and off the switching device XL. Thus, the diode DBL is turned on and the diode DAL is turned off. Accordingly, VT1 is equal to VE, VT2 is equal to −VE, VT3 is equal to VE, and VT4 is equal to −VE. Therefore, the voltage [P3–N3] is equal to VE.

<Time Period ST2>

The control unit 13 turns off the switching devices YL and XL while turning on the switching device UL to allow the current IL to circulate. Thereby, resonance caused by the excitation current of the coil L1 and the capacitors CAL and CBL causes gradual reversals of the polarities of the voltages VT1 and VT3 from positive states to negative states and also causes gradual reversals of the polarities of the voltages VT2 and VT4 from negative states to positive states. Accordingly, soft switching can be realized.

<Time Period ST3>

The control unit 13 turns on the switching device XL while turning off the switching device YL. Thus, the diode DAL is turned on and the diode DBL is turned off. Accordingly, VT1 is equal to −VE, VT2 is equal to VE, VT3 is equal to −VE, and VT4 is equal to VE. Therefore, the voltage [P3–N3] is equal to VE.

<Time Period ST4>

Similarly to the time period ST2, the control unit 13 turns off the switching devices YL and XL to reverse the polarities of the voltages VT1 to VT4.

After that, the converter units 51 and 52 repeat operations respectively associated with the time periods ST1, ST2, ST3, and ST4. Thus, the voltage [P3–N3] is kept equal to VE.

As described above, the power conversion system 1Q is constituted by CNT-CNT circuitry but can offer the same advantageous effects as the power conversion system 1P.

Embodiment 19

Figure 64:
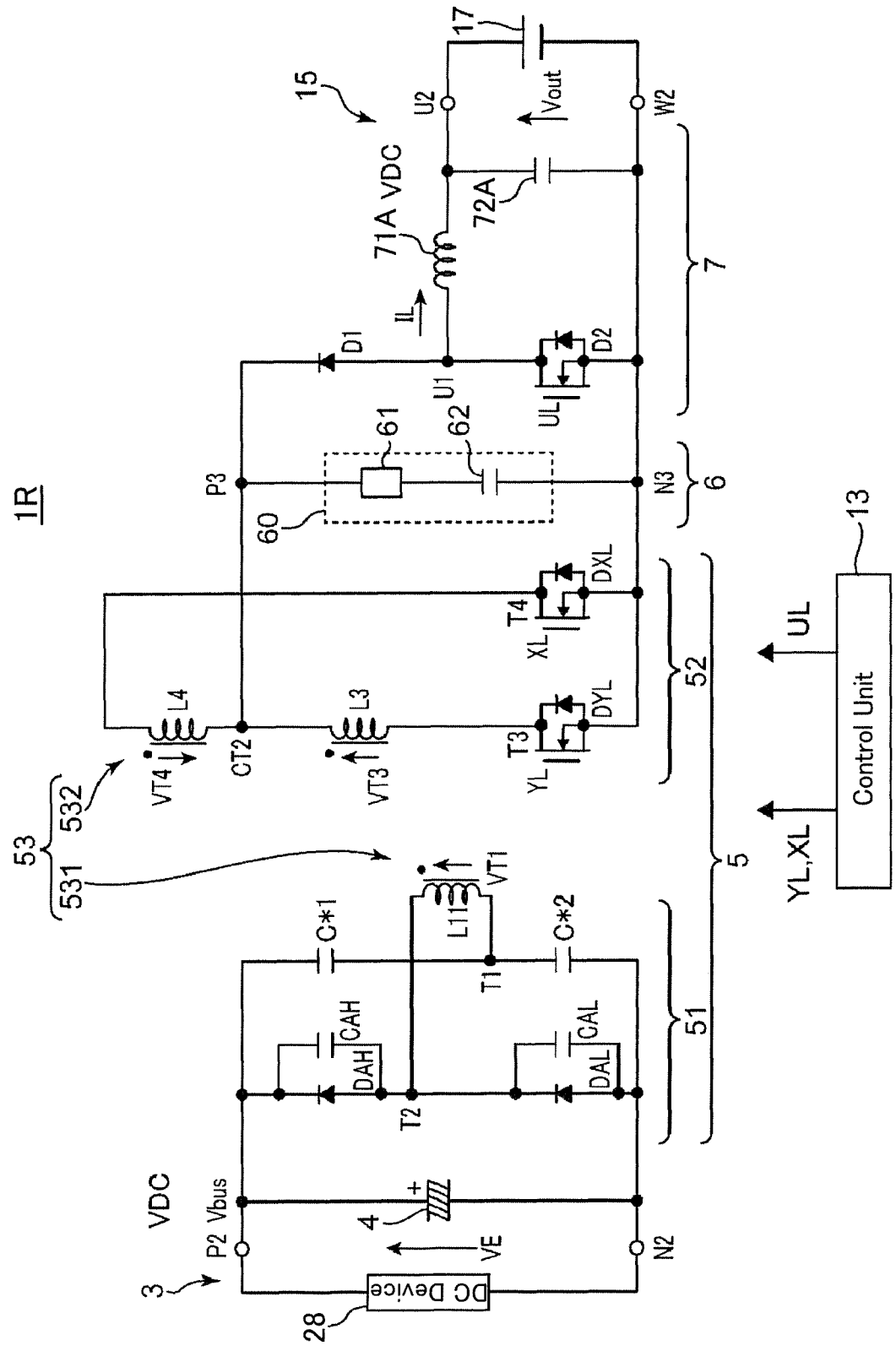
FIG. 64 is a circuit diagram of a power conversion system 1R according to Embodiment 19.

FIG. 64 is a circuit diagram of a power conversion system 1R according to Embodiment 19. The power conversion system 1R according to Embodiment 19 is characterized in that the converter unit 51 and the primary winding 531 are designed as half bridge (HB) circuitry and the converter unit 52 and the secondary winding 532 are designed as center-tapped (CNT) circuitry (i.e., HB-CNT). Hereinafter, components of Embodiment 19 which are common to Embodiments 13 to 18 are designated by the same references to avoid redundant explanations. The power conversion system 1Q according to Embodiment 19 is also a power conversion system for transfer of power in the second single direction similarly to Embodiments 17 and 18.

The configuration of the converter unit 51 is HB circuitry as already shown in FIG. 57 but is different in that the switching devices AH and AL. In detail, the diode DAH has the anode connected to the terminal T2 and the cathode connected to the terminal P2. The diode DAL has the anode connected to the terminal N2 and the cathode connected to the terminal T2.

The configurations of the converter unit 52 and the secondary winding 532 are CNT circuitry as already shown in FIG. 57 but are different in that the switching devices YL and XL are added. In detail, the switching device YL has the source connected to the terminal N3 and the drain connected to the terminal T3. The switching device XL has the source connected to the terminal N3 and the drain connected to the terminal T4.

Next, operations of the converter units 51 and 52 of the power conversion system 1R are described. <Time Period ST1> to <Time Period ST4> described below correspond to <Time Period ST1> to <Time Period ST4> described in relation to Embodiment 17. In the following description, the voltages VT1, VT3, and VT4 shown in FIG. 64 indicate voltages of the coils L11, L3, and L4 from the terminals T1, T3, and T4, respectively. Note that, operation of the converter unit 7 of the power conversion system 1R is same as that of Embodiment 17 and therefore explanation thereof is omitted.

<Time Period ST1>

The control unit 13 turns on the switching device YL and off the switching device XL. Thus, the diode DAH is turned on and the diode DAL is turned off. Accordingly, VT1 is equal to VE, VT3 is equal to VE, and VT4 is equal to −VE. Hence, the voltage [P3−N3] is equal to VE.

<Time Period ST2>

The control unit 13 turns off the switching devices YL and XL while turning on the switching device UL to allow the current IL to circulate. Thereby, resonance caused by the excitation current of the coil L11 and the capacitors CAH and CAL causes gradual reversals of the polarities of the voltages VT1 and VT3 from positive states to negative states. Accordingly, soft switching can be realized.

<Time Period ST3>

The control unit 13 turns on the switching device XL while turning off the switching device YL. In this regard, the diode DAL is turned on and the diode DAH is turned off. Thereby, VT1 is equal to −VE, VT3 is equal to −VE, and VT4 is equal to VE. Hence, the voltage [P3−N3] is equal to VE.

<Time Period ST4>

Similarly to the time period ST2, the control unit 13 turns off the switching devices YL and XL to reverse the polarities of the voltages VT1, VT3, and VT4.

After that, the converter units 51 and 52 repeat operations respectively associated with the time periods ST1, ST2, ST3, and ST4. Thus, the voltage [P3−N3] is kept equal to VE.

As described above, the power conversion system 1R is constituted by HB-CNT circuitry but can offer the same advantageous effects as the power conversion system 1P.

Embodiment 17 relates to an example in which the converter units 51 and 52 both are constituted by full bridge (FB) circuitry. Embodiment 18 relates to an example in which the converter units 51 and 52 both are constituted by center tapped (CNT) circuitry. Embodiment 19 relates to an example in which the converter unit 51 is constituted by half bridge (HB) circuitry and the converter unit 52 is constituted by center tapped circuitry. However, a combination of the converter units 51 and 52 is not limited to any of the aforementioned combinations. For example, the converter unit 51 may be constituted by center tapped circuitry and the converter unit 52 may be constituted by full bridge circuitry. Or, the converter units 51 and 52 both are constituted by half bridge circuitry.

Any of the snubber circuits 60A to 60C shown in FIG. 47 to FIG. 49 can be used instead of the snubber circuit 60.

Embodiment 20

Figure 65:
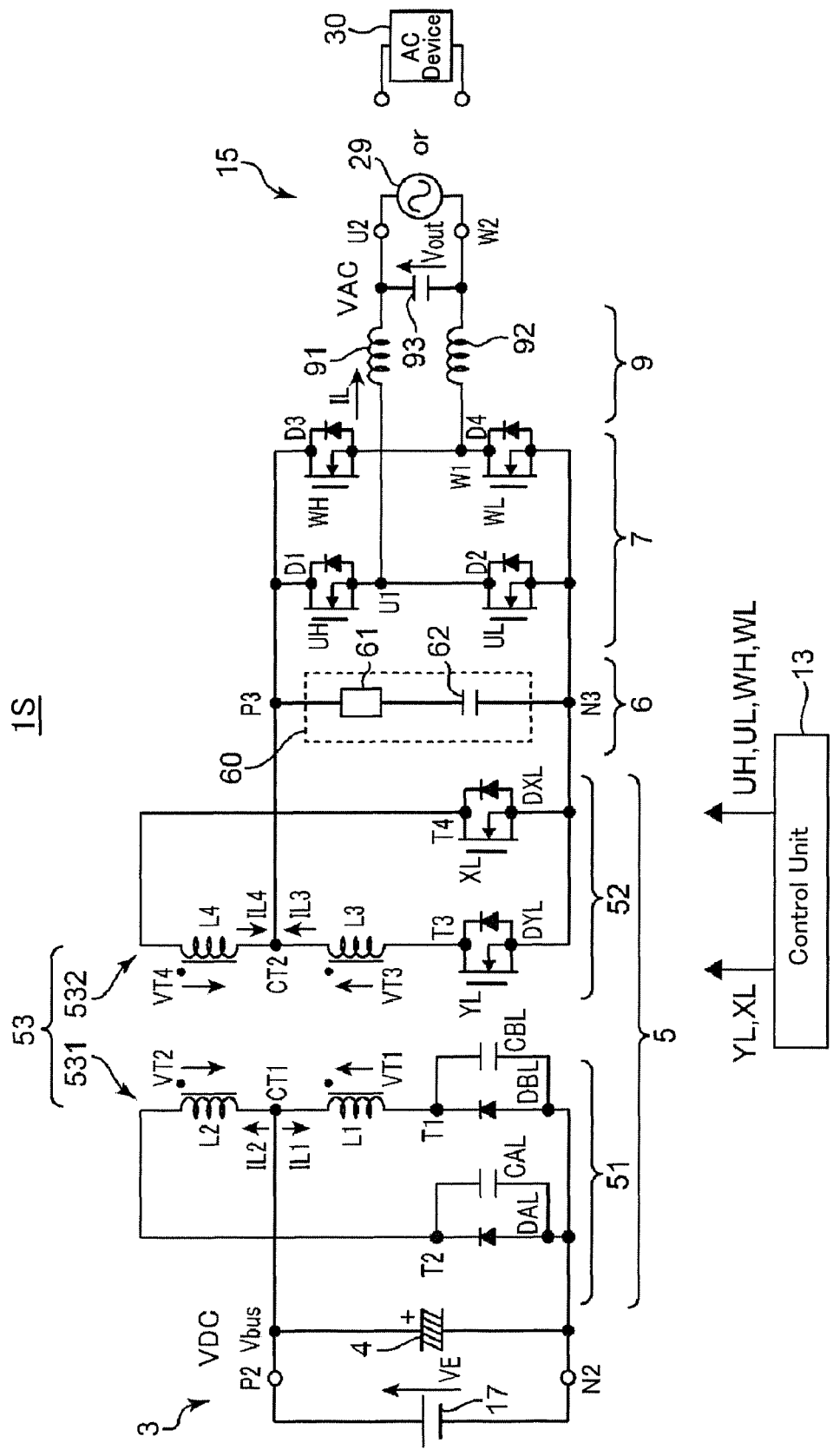
FIG. 65 is a circuit diagram of a power conversion system 1S according to Embodiment 20.

FIG. 65 is a circuit diagram of a power conversion system 1S according to Embodiment 20. The power conversion system IS according to Embodiment 20 is characterized in that the converter unit 7 is constituted by a single-phase inverter. In the present embodiment, the converter units 51 and 52 each have the same CNT circuitry as those in FIG. 63 and therefore explanation thereof is omitted. Further, the configurations of the converter unit 7 and the filter circuit 9 are same as those in FIG. 58 and detailed explanations thereof are omitted. Moreover, the power conversion system 1S according to Embodiment 20 is a power conversion system for transfer of power in the second single direction similarly to Embodiments 17, 18, and 19.

The control unit 13 controls amplitude of at least one of the voltage Vbus between the terminals P2 and U2 and the current Iout flowing through the terminal U2 by turning on or off the switching devices UH to WL. This will be described in detail below.

To charge the DC power supply 17 with power received from the AC power system 29, the terminals U2 and W2 are connected to the AC power system 29. To charge the DC power supply 17 with power received from the AC device 30, the terminals U2 and W2 are connected to the AC device 30.

The control unit 13 controls the converter units 52 and 7 so that the reversal time period and the circulation time period appear in the first time period constituting a half cycle (one example of the unit time period) of an AC voltage supplied to the primary winding 531 and the second transfer time period appears in the second time period different from the first time period.

Embodiment 20 relates to an example in which the converter unit 7 is constituted by a single-phase inverter. However, the converter unit 7 may not be limited to a single-phase inverter but may be a three-phase inverter.

Embodiment 21

(1) Overview

First, an overview of the power conversion system 1T according to Embodiment 21 is described with reference to FIG. 66.

The power conversion system IT includes the transformer circuit unit 5, the converter unit 7, and the control unit 13. The transformer circuit unit 5 performs power conversion with regard to at least one of power from the first connection target (in this embodiment, the DC power supply 17) and power to the first connection target. The converter unit 7 performs power conversion with regard to at least one of power from the second connection target (in this embodiment, the AC power system 29) and power to the second connection target. In separating the converter unit 7 and the second connection target from each other, the control unit 13 stops the converter unit 7 and operates the transformer circuit unit 5 for a predetermined time period. For example, when the terminals 15a and 15b of the connector (one example of the second external connector) 15 are open, regenerative energy of the coils 91 and 92 of the filter circuit 9 may give excessive stress on a switch unit (the switching devices XL and YL). The power conversion system IT according to the present embodiment operates the transformer circuit unit 5 while the terminals 15a and 15b are open. Therefore, stress on the switch unit (the switching devices XL and YL) can be reduced.

Figure 66:
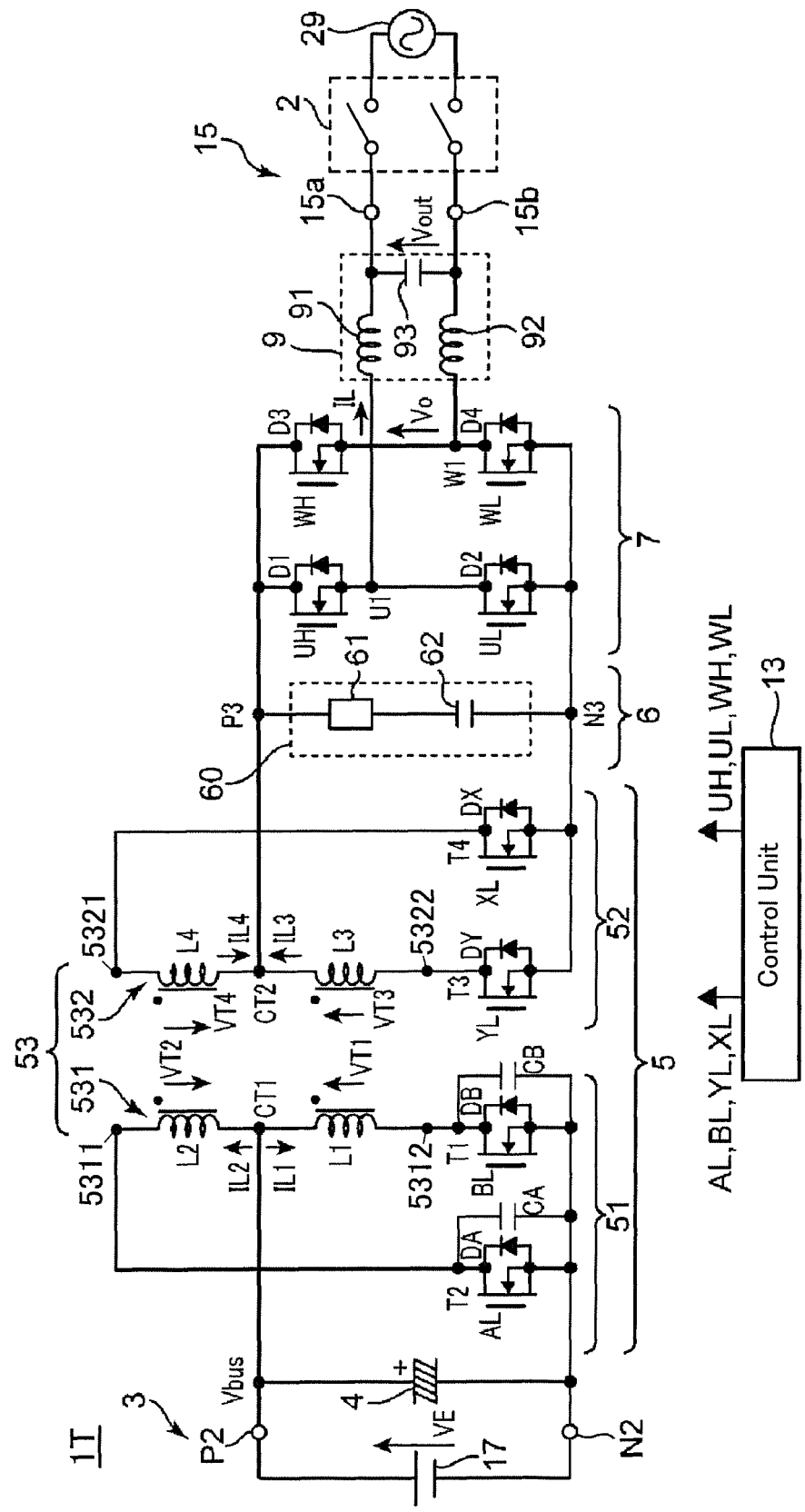
FIG. 66 is a circuit diagram of a power conversion system 1T according to Embodiment 21.

In one example, as shown in FIG. 66, the power conversion system 1T is used for power conversion between the AC power system 29 serving as the second connection target and the DC power supply (e.g., a storage cell) 17 serving as the first connection target. In the present disclosure, "AC power system" means an entire system used by power suppliers such as electric companies to supply power to power receiving equipment at customer's facilities. In the example shown in FIG. 66, the power conversion system 1T includes the connector (first external connector) 3 to be electrically connected to the DC power supply 17 and the connector (second external connector) 15 to be electrically connected to the AC power system 29. To charge the DC power supply 17, the power conversion system 1T converts AC power inputted from the AC power system 29 into DC power and supplies the DC power supply 17 with the DC power converted. In contrast, to allow the DC power supply 17 to discharge, the power conversion system 1T converts DC power inputted from the DC power supply 17 into AC power and outputs the AC power converted, to the AC power system 29.

In the present embodiment, to enable charge and discharge of the DC power supply 17 both, the power conversion system 1T is configured to perform bidirectional power conversion between a set of the terminals P2 and N2 and a set of the terminals 15a and 15b. In other words, the power conversion system IT according to the present embodiment is a bidirectional DC/AC inverter. Therefore, the power conversion system 1T is allowed to charge the DC power supply 17 and supply a load connected to the AC power system 29 with discharged power of the DC power supply 17. The present embodiment is described with reference to a supposition that a power storage system including the power conversion system IT and the DC power supply 17 is installed in nonresidential facilities such as an office building, a hospital, commercial facilities, and a school.

(2) Configurations

Hereinafter, a configuration of the power conversion system IT according to the present embodiment is described with reference to FIG. 66.

As shown in FIG. 66, the power conversion system IT according to the present embodiment includes the connector 3, the capacitor 4, the transformer circuit unit 5, the connector 6, the converter unit 7, the filter circuit 9, the control unit 13, and the connector 15. The connector 3 includes the terminal P2 and the terminal N2. The connector 6 includes the terminal P3, the terminal N3, and the snubber circuit 60. The connector 15 includes the terminal 15a and the terminal 15b.

In the example shown in FIG. 66, the DC power supply 17 is electrically connected between the two terminals P2 and N2 to allow the terminal P2 has a higher potential (positive electrode). Further, the AC power system 29 is electrically connected between the two terminals 15a and 15b. Note that, in the present disclosure, "terminal" may mean a discrete part for connecting electric cables or part of a lead of an electronic part or a conductor included in a circuit board, for example.

In the present embodiment, there is a switch unit 2 electrically connected between the AC power system 29 and the two terminals 15a and 15b (see FIG. 66). The switch unit 2 is configured to open and close according to a switching signal outputted from the control unit 13. Thus, the control unit 13 knows a switching state of the switch unit 2. The switch unit 2 is a separation relay for separating the power conversion system IT from the AC power system 29, for example.

The capacitor 4 is a capacitor for smoothing to make a DC voltage and examples thereof may include an electrolysis capacitor or a film capacitor with a desired capacitance. In the present embodiment, the capacitor 4 is an electrolysis capacitor and is electrically connected between the two terminals P2 and N2. The capacitor 4 functions to smooth a voltage between the two terminals P2 and N2.

The snubber circuit 60 includes the resistor 61 and the capacitor 62. The resistor 61 and the capacitor 62 are electrically connected in series with each other between the two terminals P3 and N3. When the power conversion system 1T operates, a DC voltage is developed between the two terminals P3 and N3.

The transformer circuit unit 5 is electrically connected between the capacitor 4 and the connector 6. The transformer circuit unit 5 includes the converter unit 51 (one example of the first converter unit), the converter unit 52 (one example of the second converter unit), and the transformer 53.

The converter unit 51 includes the two switching devices AL and BL, the two diodes DA and DB, and the two capacitors CA and CB. The switching devices AL and BL each may be constituted by a depression n channel metal-oxide-semiconductor field effect transistor (MOSFET), for example. The diode DA is a free wheel diode and has the anode connected to the source of the switching device AL and the cathode connected to the drain of the switching device AL. Further, the diode DB is a free wheel diode similarly to the diode DA and has the cathode connected to the source of the switching device BL and the anode connected to the drain of the switching device BL. The capacitor CA is connected between the source and drain of the switching device AL and the capacitor CB is connected between the source and drain of the switching device BL.

The converter unit 52 includes the two switching devices YL and XL and the two diodes DY and DX. The switching devices YL and XL each may be constituted by a depression n channel metal-oxide-semiconductor field effect transistor (MOSFET), for example. The diode DY is a free wheel diode and has the anode connected to the source of the switching device YL and the cathode connected to the drain of the switching device YL. Further, the diode DX is a free wheel diode similarly to the diode DY and has the cathode connected to the source of the switching device XL and the anode connected to the drain of the switching device XL. Note that, the diodes DA, DB, DY, and DX may be replaced with parasitic diodes of MOSFETs.

The transformer 53 includes a center-tapped high frequency insulated transformer and includes the primary winding 531 and the secondary winding 532 which are coupled magnetically. The primary winding 531 is constituted by a series circuit of two windings L1 and L2 with a primary side center tap (primary side intermediate terminal) CT1 serving as a connection point. Likewise, the secondary winding 532 is constituted by a series circuit of two windings L3 and L4 with a secondary side center tap (secondary side intermediate terminal) CT2 serving as a connection point. The primary side center tap CT1 is electrically connected to a positive terminal of the capacitor 4 (the terminal P2), that is, a first end of the DC power supply 17. The secondary side center tap CT2 is electrically connected to the terminal P3 which is one of the two terminals P3 and N3 has a higher potential than the other. In one example of the present embodiment, the winding ratio of the windings L1, L2, L3, and L4 is supposed to be 1:1:1:1.

The primary winding 531 includes a primary side first winding terminal 5311 and a primary side second winding terminal 5312. The primary side first winding terminal 5311 is provided on an opposite side of the winding L2 from the winding L1 and is electrically connected to a second end of the DC power supply 17 through the switching device AL. The primary side second winding terminal 5312 is provided on an opposite side of the winding L1 from the winding L2 and is electrically connected to the second end of the DC power supply 17 through the switching device BL.

The secondary winding 532 includes a secondary side first winding terminal 5321 and a secondary side second winding terminal 5322. The secondary side first winding terminal 5321 is provided on an opposite side of the winding L4 from the winding L3 and is electrically connected to the terminal N3 through the switching device XL. The secondary side second winding terminal 5322 is provided on an opposite side of the winding L3 from the winding L4 and is electrically connected to the terminal N3 through the switching device YL.

The switching device AL is electrically connected in series with the winding L2 between opposite ends of the capacitor 4. The switching device BL is electrically connected in series with the winding L1 between the opposite ends of the capacitor 4. In other words, a series circuit of the winding L2 and the switching device AL and a series circuit of the winding L1 and the switching device BL are electrically connected in parallel with each other between the two terminals P2 and N2. In more detail, the switching device AL has the drain electrically connected to the primary side center tap CT1 through the winding L2 and the switching device BL has the drain electrically connected to the primary side center tap CT1 through the winding L1. The switching devices AL and BL have the sources each electrically connected to a negative terminal of the capacitor 4 (the terminal N2).

The switching device YL is electrically connected in series with the winding L3 between opposite ends of the snubber circuit 60. The switching device XL is electrically connected in series with the winding L4 between the opposite ends of the snubber circuit 60. In other words, a series circuit of the winding L3 and the switching device YL and a series circuit of the winding L4 and the switching device XL are electrically connected in parallel with each other between the two terminals P3 and N3. In more detail, the switching device YL has the drain electrically connected to the secondary side center tap CT2 through the winding L3 and the switching device XL has the drain electrically connected to the secondary side center tap CT2 through the winding L4. The switching devices YL and XL have the sources each electrically connected to the terminal N3 which is one of the two terminals P3 and N3 and has a lower potential than the other.

The converter unit 7 is electrically connected between the snubber circuit 60 and a set of the two terminals 15a and 15b. The converter unit 7 includes the four switching devices UH, UL, WH, and WL. The four switching devices UH, UL, WH, and WL are connected in anti-parallel with the free wheel diodes D1 to D4, respectively. The converter unit 7 forms a DC/AC converter (inverter) for converting a DC voltage into an AC voltage or converting an AC voltage into a DC voltage between the snubber circuit 60 and the filter circuit 9. In other words, the converter unit 7 forms a single-phase inverter for converting DC power from the transformer circuit unit 5 into single-phase AC power suitable for the AC power system 29 or converting single-phase AC power from the AC power system 29 into DC power suitable for the transformer circuit unit 5. In one example of the present embodiment, the switching devices UH, UL, WH, and WL each may be constituted by a depression n channel MOSFET.

The switching devices UH, UL, WH, and WL are connected in a full bridge arrangement. In detail, the switching device UH is electrically connected in series with the switching device UL between the opposite ends of the snubber circuit 60. The switching device WH is connected in series with the switching device WL between the opposite ends of the snubber circuit 60. In other words, a series circuit of the switching devices UH and UL and a series circuit of the switching devices WH and WL are electrically connected in parallel with each other between the opposite ends of the snubber circuit 60. In more detail, the switching devices UH and WH have the drains each electrically connected to the terminal P3 which is one of the two terminals P3 and N3 and has a higher potential than the other. The switching devices UL and WL have the sources each electrically connected to the terminal N3 which is one of the two terminals P3 and N3 and has a lower potential than the other.

As shown in FIG. 66, the filter circuit 9 includes the two coils 91 and 92 and the capacitor 93. A first end of the coil 91 which is a first one of paired terminals of the filter circuit 9 directed to the converter unit 7, is electrically connected to a junction between the source of the switching device UH and the drain of the switching device UL. A first end of the coil 92 which is a second one of paired terminals of the filter circuit 9 directed to the converter unit 7, is electrically connected to a junction between the source of the switching device WH and the drain of the switching device WL. Second ends of the coils 91 and 92 which are paired terminals of the filter circuit 9 directed to the terminals 15a and 15b are electrically connected to the two terminals 15a and 15b. In other words, the converter unit 7 is electrically connected to the two terminals 15a and 15b through the filter circuit 9. Further, the capacitor 93 is electrically connected between the second end of the coil 91 and the second end of the coil 92.

The control unit 13 outputs control signals AL, BL, YL, XL, UH, UL, WH, and WL for respectively controlling the eight switching devices AL, BL, YL, XL, UH, UL, WH, and WL. The control signals AL, BL, YL, XL, UH, UL, WH, and WL are applied to the gates of the switching devices AL, BL, YL, XL, UH, UL, WH, and WL directly or through drive circuit(s) to turn on and off the switching devices AL, BL, YL, XL, UH, UL, WH, and WL, respectively. The control unit 13 controls the switching devices AL, BL, YL, XL, UH, UL, WH, and WL by pulse width modulation (PWM) adjusting a duty cycle. The control unit 13 may be constituted by a microcomputer including a central processing unit (CPU), a field programmable gate array (FPGA), an application specific integrated circuit (ASIC), or the like, for example.

(3) Operations (3.1) Basic Operation

Hereinafter, the basic operation of the power conversion system 1T is described briefly with reference to FIG. 66.

In the present embodiment, as described above, the power conversion system 1T is configured to perform bidirectional power conversion between the set of two terminals P2 and N2 and the set of two terminals 15a and 15b by way of the transformer 53. Accordingly, the power conversion system 1T includes two operation modes which are the "inverter mode" and the "converter mode". The inverter mode is an operation mode of converting DC power inputted through the set of two terminals P2 and N2 into AC power and outputting the AC power through the set of two terminals 15a and 15b. The converter mode is an operation mode of converting AC power inputted through the set of two terminals 15a and 15b into DC power and outputting the DC power through the set of two terminals P2 and N2.

First, operation of the power conversion system 1T in the inverter mode is described. In this description, a magnitude of a voltage between the two terminals P2 and N2, that is, a voltage across the capacitor 4 is represented by "E".

The control unit 13 controls the switching devices AL, BL, XL, and YL of the transformer circuit unit 5 so that a combination of the switching devices AL and XL and a combination of the switching devices BL and YL are turned on alternately. In this regard, the duty cycle of the switching devices AL and XL (or the switching devices BL and YL) is 50%. Therefore, when the switching devices AL and XL are on, a voltage "−E" is applied across the winding L4. When the switching devices BL and YL are on, a voltage "E" is applied across the winding L3. Accordingly, the winding L3 and the winding L4 apply the voltage "E" between the two terminals P3 and N3 alternately.

In a time period in which a voltage between the two terminals P3 and N3 is fixed, the control unit 13 performs PWM control on the converter unit 7 to control an output voltage of the converter unit 7. In more detail, in the supply time period in which the switching devices UH and WL (or the switching devices UL and WH) are on, a current is supplied from the winding L3 (or the winding L4) to the set of two terminals 15a and 15b through the converter unit 7. In contrast, in the circulation time period in which the switching devices UH and WH (or the switching devices UL and WL) are on, a current flows from the coils 91 and 92 through the converter unit 7 functioning as a circulation path. The control unit 13 changes a ratio of the supply time period and the circulation time period to control the output voltage of the converter unit 7. The reversal operation of the secondary winding 532 of the transformer 53 of the transformer circuit unit 5 is performed in the circulation time period.

By repeating the operation described above, the power conversion system IT converts DC power from the DC power supply (storage cell) 17 into AC power and outputs the AC power to the AC power system 29 through the set of two terminals 15a and 15b.

Additionally, in the converter mode, the power conversion system IT basically operates the transformer circuit unit 5 (the converter units 51 and 52) and the converter unit 7 in the same sequence as the aforementioned inverter mode. In detail, in the power conversion system 1T, while the output voltage of the converter unit 7 is lower than the voltage of the AC power system 29, AC power from the AC power system 29 is converted into DC power and the DC power is outputted to the DC power supply 17 through the set of two terminals P2 and N2.

In the aforementioned power storage system, when the switch unit 2 comes into the open state due to the switching signal from the control unit 13, energy stored in the coils 91 and 92 of the filter circuit 9 is returned toward the converter unit 7. In this situation, the power conversion system IT is separated from the AC power system 29 and therefore the control unit 13 stops the transformer circuit unit 5 (the converter units 51 and 52) and the converter unit 7 in ordinary circumstances. In this case, in the converter unit 7, regenerative currents from the coils 91 and 92 flow toward the secondary side center tap CT2 of the transformer circuit unit 5 by way of the diode D3, for example. However, in the transformer circuit unit 5, the switching devices AL, BL, YL, and XL are off. Therefore, a path for allowing a flow of the regenerative currents cannot be formed. Therefore, the regenerative currents may put excessive stress on the switching devices YL and XL.

(3.2) Operation when the Switch Unit is Opened

Figure 67:
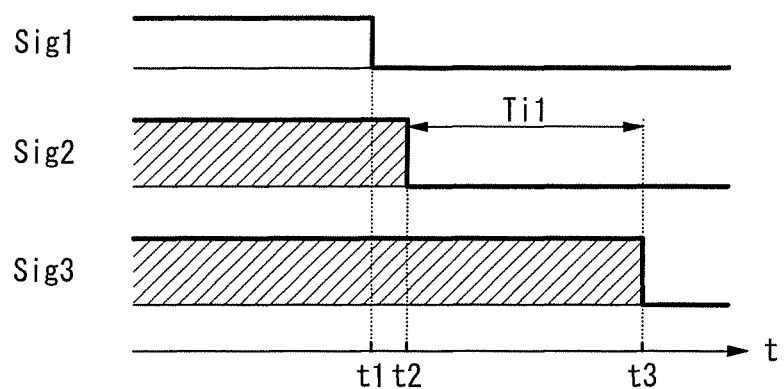
FIG. 67 is a diagram for illustration of timing charts of the power conversion system 1T.
Figure 68A:
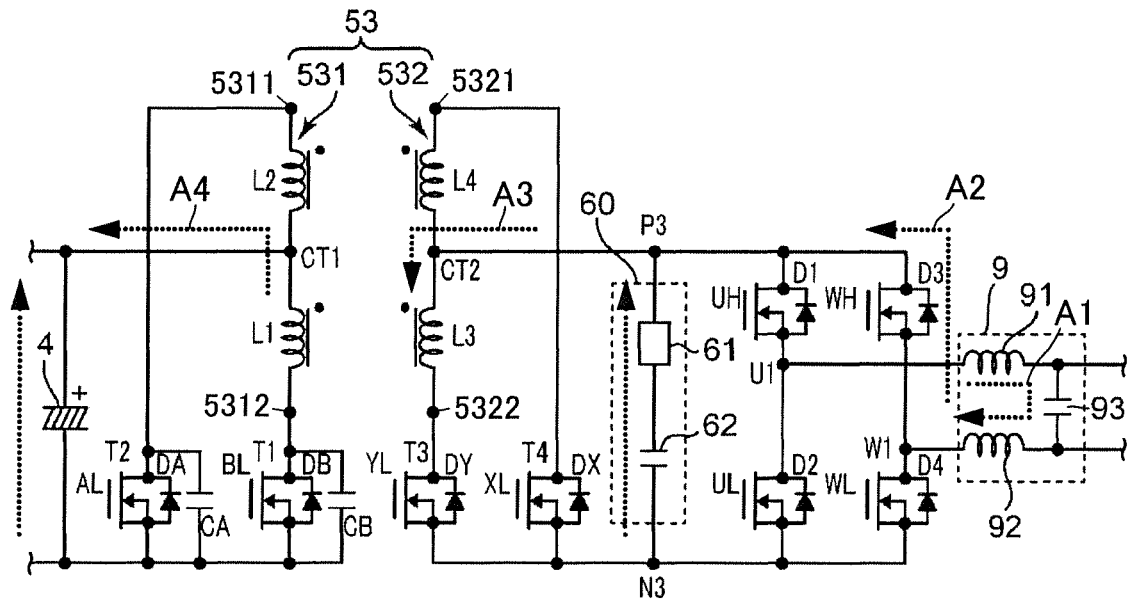
FIG. 68A and FIG. 68B are circuit diagrams for illustration of operation of the power conversion system 1T.
Figure 68B:
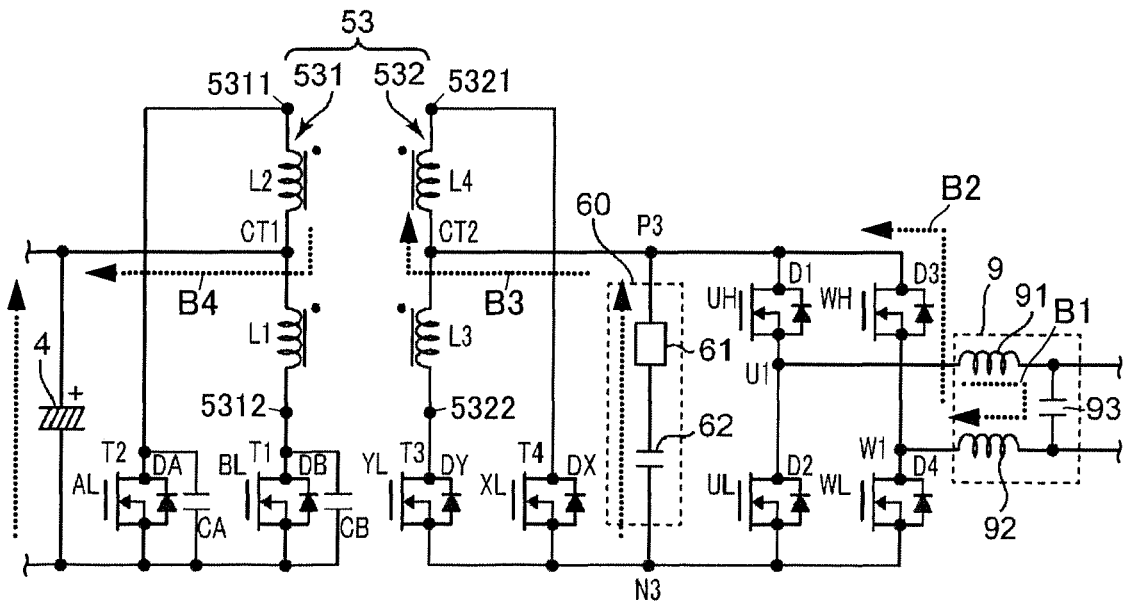

Hereinafter, explanation with reference to FIG. 67, FIG. 68A and FIG. 68B is made to operation of the power conversion system 1T when the switch unit 2 is opened, that is, operation of the power conversion system 1T in separating the converter unit 7 and the AC power system 29 from each other.

In the power conversion system 1T of the present embodiment, to separate the converter unit 7 and the AC power system 29 from each other, the control unit 13 stops the converter unit 7 and operates the transformer circuit unit 5 for a predetermined time period. In other words, to bring the switch unit 2 into the open state, the control unit 13 stops the converter unit 7 and operates the transformer circuit unit 5 for a predetermined time period. In detail, in the predetermined time period, the control unit 13 makes the transformer circuit unit 5 perform operation same as operation which the transformer circuit unit 5 performs before the switch unit 2 is made into the open state. Stated differently, the control unit 13 operates the transformer circuit unit 5 in the predetermined time period so that power is returned from the secondary winding 532 to the primary winding 531. In detail, the control unit 13 sets the duty cycle of the switching devices AL and XL (or the switching devices BL and YL) to 50% in the predetermined time period. Note that, the predetermined time period here is a time period determined in advance.

First, an overview of the operation of the power conversion system 1T when the switch unit 2 is opened is described with reference to FIG. 67. In FIG. 67, "Sig1" represents the switching signal from the control unit 13 to the switch unit 2, "Sig2" represents the control signal from the control unit 13 to the converter unit 7, and "Sig3" represents the control signal from the control unit 13 to the transformer circuit unit 5.

The control unit 13 outputs the switching signal Sig1 with a low level to the switch unit 2 at a time t1. The switch unit 2 comes into the open state due to the switching signal Sig1 from the control unit 13. The control unit 13 outputs the control signal Sig2 with a low level to the converter unit 7 at a time t2. The converter unit 7 stops its operation in accordance with the control signal Sig2 from the control unit 13. In detail, the converter unit 7 turns off the switching devices UH, UL, WH, and WL in accordance with the control signal Sig2.

Until a time t3, the control unit 13 outputs the control signal Sig3 with a high level to the transformer circuit unit 5. The transformer circuit unit 5 performs on-off operation with the duty cycle of 50% in accordance with the control signal Sig3 from the control unit 13. At the time t3, the control unit 13 outputs the control signal Sig3 with a low level to the transformer circuit unit 5. the transformer circuit unit 5 stops its operation in accordance with the control signal Sig3 from the control unit 13. In detail, the transformer circuit unit 5 turns off the switching devices AL, BL, XL, and YL in accordance with the control signal Sig3.

In the present embodiment, in a time period Ti1 from the time t2 to the time t3, the converter unit 7 is stopped and the transformer circuit unit 5 is operated. Therefore, the time period Ti1 defines the predetermined time period. By operating the transformer circuit unit 5 in the time period Ti1, energy generated in circuitry including the secondary winding 532 can be returned (transferred) to circuitry including the primary winding 531. Hereinafter, details of the regenerative operation are described with reference to FIG. 68A and FIG. 68B.

First, operation of the power conversion system 1T while the switching devices BL and YL are on is described with reference to FIG. 68A. In a condition where the switch unit 2 is in the open state and the converter unit 7 and the AC power system 29 are separated from each other, energy stored in the coils 91 and 92 is transferred (returned) toward the converter unit 7. In this situation, the energy causes a regenerative current to flow in a direction from the coil 91 toward the coil 92 via the capacitor 93 (i.e., a direction indicated by the arrow A1 in FIG. 68A), for example. This regenerative current flows into the secondary side center tap CT2 of the transformer circuit unit 5 by way of the diode D3 (see an arrow A2 in FIG. 68A), for example.

In this case, the switching device YL is on and therefore the regenerative current flows into the winding L3 in a direction from the secondary side center tap CT2 toward the secondary side second winding terminal 5322 (i.e., a direction indicated by an arrow A3 in FIG. 68A). Since the winding L1 and the winding L3 have the same winding direction, a current flows through the winding L1 on the primary side in a direction opposite to a direction of a current flowing through the winding L3. Further, since the switching device BL is on, the former current flows through a path from the winding L1 to the winding L1 by way of the capacitor 4 and the switching device BL (see an arrow A4 in FIG. 68A). In such a manner, energy stored in the coils 91 and 92 are transferred (returned) to the capacitor 4.

Next, operation of the power conversion system 1T while the switching devices AL and XL are on is described with reference to FIG. 68B. In a condition where the switch unit 2 is in the open state and the converter unit 7 and the AC power system 29 are separated from each other, energy stored in the coils 91 and 92 is transferred (returned) toward the converter unit 7. In this situation, the energy causes a regenerative current to flow in a direction from the coil 91 toward the coil 92 via the capacitor 93 (i.e., a direction indicated by the arrow B1 in FIG. 68B), for example. This regenerative current flows into the secondary side center tap CT2 of the transformer circuit unit 5 by way of the diode D3 (see an arrow B2 in FIG. 68B), for example.

In this case, the switching device XL is on and therefore the regenerative current flows into the winding L4 in a direction from the secondary side center tap CT2 toward the secondary side first winding terminal 5321 (i.e., a direction indicated by an arrow B3 in FIG. 68B). Since the winding L2 and the winding L4 have the same winding direction, a current flows through the winding L2 on the primary side in a direction opposite to a direction of a current flowing through the winding L4. Further, since the switching device AL is on, the former current flows through a path from the winding L2 to the winding L2 by way of the capacitor 4 and the switching device AL (see an arrow B4 in FIG. 68B). In such a manner, energy stored in the coils 91 and 92 are transferred (returned) to the capacitor 4.

When the predetermined time period passes, the control unit 13 stops the transformer circuit unit 5. In other words, the control unit 13 turns off the four switching devices AL, BL, XL, and YL.

The aforementioned sequence is a sequence in discharging of the DC power supply (storage cell) 17 (i.e., the inverter mode) but may be applicable mutatis mutandis to a sequence in charging of the DC power supply 17 (i.e., the converter mode) to transfer (return) energy stored in the coils 91 and 92 to the capacitor 4.

As described above, in the power conversion system 1T according to the present embodiment, when the switch unit 2 comes into the open state, the transformer circuit unit 5 is made to perform, for the predetermined time period, operation same as operation which the transformer circuit unit 5 performs before the switch unit 2 is made into the open state. In other words, the control unit 13 operates the transformer circuit unit 5 to transfer (return) power from circuitry including the secondary winding 532 toward the primary winding 531 in the predetermined time period. Therefore, energy stored in the coils 91 and 92 of the filter circuit 9 can be transferred (returned) toward the DC power supply 17, that is, the capacitor 4 connected between the opposite ends of the DC power supply 17. Consequently, stress on the switching devices YL and XL can be more reduced than in a case where the transformer circuit unit 5 is stopped in the predetermined time period. Note that, in the aforementioned working example, the switch unit 2 is made in the open state due to the switching signal Sig1 and subsequently the converter unit 7 is stopped due to the control signal Sig2. However, actually, the switch unit 2 may have response delay. Therefore, the switch unit 2 may be made in the open state after the converter unit 7 is stopped. However, there is no problem when the order of operations of the switch unit 2 and the converter unit 7 is reversed.

The aforementioned embodiment refers to the operation when the switch unit 2 is in the open state. However, to realize operation of stopping transfer of power in response to detection of abnormality such as an instance excess current, only the stop processing (gate block) of the converter unit 7 may be performed without setting the switch unit 2 in the open state. In this case, the power conversion system 1T according to the present embodiment stops operation of the output side of the converter unit 7 (gate block). In this case, when the transformer circuit unit 5 is also stopped, the regenerative current from the coils 91 and 92 may put excess stress on the switching devices XL and YL in a similar manner as the aforementioned embodiment. Therefore, also in this case, the control unit 13 may be preferably configured to stop the converter unit 7 but operate the transformer circuit unit 5 for the predetermined time period. Note that, the control unit 13 may operate in the same manner as the aforementioned embodiment and therefore no explanation is deemed necessary.

(4) Variations

The aforementioned embodiments are examples of the present disclosure, examples of the present disclosure may not be limited to the aforementioned embodiments and may include examples other than the aforementioned embodiments and the aforementioned embodiments may be modified in various ways in accordance with design or the like without deviating from technical concept according to the present disclosure. Hereinafter, variations of the aforementioned embodiments are listed.

A power storage system including the power conversion system 1T and the DC power supply (storage cell) 17 may be installed in nonresidential facilities, or may be installed in a residence, or may be applied to an electric vehicle or the like other than facilities. The power conversion system 1T is applicable to power conversion between the AC power system 29 and the DC power supply 17, or power conversion between the AC power system 29 and a power generator such as a photovoltaic power generator and a fuel cell, for example.

The power conversion system 1T may not be limited to being configured to perform bidirectional power conversion but may be configured to perform power conversion in one direction (single direction) from the two terminals P2 and N2 to the two terminals 15a and 15b, for example.

When the switching devices AL, BL, XL, YL, UH, UL, WH, and WL are MOSFETs, the free wheel diodes DA, DB, DY, DX, and D1 to D4 may be replaced with parasitic diodes of the switching devices AL, BL, XL, YL, UH, UL, WH, and WL. Each of the switching devices AL, BL, XL, YL, UH, UL, WH, and WL may not be limited to a MOSFET but may be an insulated gate bipolar transistor (IGBT), for example.

The aforementioned embodiments relate to examples using a synchronous rectification system in which two switching devices are synchronized. However, a diode rectification system (asynchronous rectification system) employing one switching device and one diode may be used instead.

Some of the aforementioned embodiments relate to examples in which the converter unit 7 is constituted by a single-phase inverter. However, the converter unit 7 may be a three-phase inverter.

The aforementioned embodiments relate to examples in which the second connection target is the AC power system 29. However, the second connection target may not be limited to the AC power system 29 but may be an AC load operating with AC power, for example.

The aforementioned embodiments relate to examples in which the first connection target is the DC power supply 17. However, the first connection target may not be limited to the DC power supply 17 but may be a DC load or a DC/DC converter performing bidirectional power conversion, for example.

The aforementioned embodiments relate to examples in which the converter units 51 and 52 each are constituted by center tapped (CNT) circuitry. However, the converter units 51 and 52 each may be constituted by full bridge (FB) circuitry or half bridge (HB) circuitry. In summary, the transformer circuit unit 5 may be constituted by any one of such combinations.

Any of the snubber circuits 60A to 60C shown in FIG. 47 to FIG. 49 can be used instead of the snubber circuit 60.

(Conclusion)

As clearly understood from the aforementioned embodiments, a power conversion system (1, 1A to 1T) according to a first aspect is a power conversion system for transferring power between a DC power supply (17) (one example of a first connection target) and an AC load (27) (one example of a second connection target) in at least one direction. The power conversion system (1, 1A to 1T) includes a connector (3) (one example of a first external connector), a connector (15) (one example of a second external connector), a transformer circuit unit (5), a converter unit (7) (one example of a third converter unit), a connector (6), and a control unit (13). The connector (3) is connectable to the DC power supply (17). The connector (15) is connectable to the AC load (27). The transformer circuit unit (5) includes a primary winding (531), a secondary winding (532), a converter unit (51) (one example of a first converter unit), and a converter unit (52) (one example of a second converter unit). The primary winding (531) is connected to the DC power supply (17). The secondary winding (532) is magnetically coupled with the primary winding (531). The converter unit (51) is connected between the connector (3) and the primary winding (531). The converter unit (52) is connected to the secondary winding (532). The converter unit (7) is connected to the connector (15). The connector (6) includes a terminal (P3) (one example of a first connection terminal) and a terminal (N3) (one example of a second connection terminal) interconnecting the converter unit (52) and the converter unit (7). The control unit (13) is configured to control at least one of the converter unit (51) and the converter unit (52) so that positive and negative voltages are applied across the primary winding (531) alternately and a voltage of the terminal (P3) from the terminal (N3) is positive. The control unit (13) is configured to control the converter unit (7) not to cause transfer of power between the transformer circuit unit (5) and the converter unit (7) in a first time period including a reversal time period in which a reversal of polarity of the voltage across the primary winding (531) occurs. The control unit (13) is configured to control the converter unit (7) to cause transfer of power in a first direction from the transformer circuit unit (5) to the converter unit (7) or a second direction opposite to the first direction in a second time period different from the first time period.

Accordingly, the first aspect does not need high capacitance capacitor for smoothing and therefore can downsize a circuit scale. The first aspect can stably perform a reversal of polarity of the voltage across the primary winding (531). Consequently, it is possible to reduce loss in and withstand voltages of switching devices (AL, BL, YL, XL, UH, UL, WH, WL).

The power conversion system (1, 1A to 1I) according to a second aspect which would be realized in combination with the first aspect, relates to any one of: a case where the first connection target is a DC power supply (17) and the second connection target is an AC power system (29); a case where the first connection target is a DC power supply (17) and the second connection target is an AC load (27); and a case where the first connection target is a DC load (28) and the second connection target is an AC power system (29). The power conversion system (1, 1A to 1I) is configured to perform bidirectional transfer of power between the first connection target and the second connection target.

Accordingly, the second aspect can perform bidirectional transfer of power between the first connection target and the second connection target.

The power conversion system (1J) according to a third aspect which would be realized in combination with the first aspect, relates to any one of: a case where the first connection target is a DC power supply (17) and the second connection target is a DC load (28); a case where the first connection target is a DC load (28) and the second connection target is a DC power supply (17); and a case where the first connection target and the second connection target both are DC power supplies (17). The power conversion system (1J) is configured to perform bidirectional transfer of DC power between the first connection target and the second connection target.

Accordingly, the third aspect can perform bidirectional transfer of DC power between the first connection target and the second connection target.

In the power conversion system (1K to 1S) according to a fourth aspect which would be realized in combination with the first aspect, the first connection target is one of a DC power supply (17) and a DC device (28) (one example of a load), and the second connection target is the other of the DC power supply (17) and the DC device (28) or an AC power system (29). The power conversion system (1K to 1S) is configured to transfer power between the DC power supply (17) and the DC device (28) or the AC power system (29) in one direction.

Accordingly, the fourth aspect can transfer power between the DC power supply (17) and the DC device (28) or the AC power system (29) in one direction.

In the power conversion system (1, 1A to 1T) according to a fifth aspect which would be realized in combination with any one of the first to fourth aspects, the connector (6) includes a snubber circuit (60) connected between the terminal (P3) and the terminal (N3).

According to the fifth aspect, ringing occurring in the power conversion system (1, 1A to 1T) can be reduced by the snubber circuit (60).

The power conversion system (1, 1A to 1I) according to a sixth aspect which would be realized in combination with any one of the first to fourth aspects, includes two or more power supply terminals (U1, W1) connected to the second connection target. The control unit (13) is configured to control the third converter unit (7) to short-circuit the two or more power supply terminals (U1, W1) in the first time period.

Accordingly, the sixth aspect can prevent transfer of power between the transformer circuit unit (5) and the converter unit (7).

In the power conversion system (1, 1A to 1I) according to a seventh aspect which would be realized in combination with the sixth aspect, the control unit (13) is configured to, in the first time period, perform either first control or second control. The first control is control of turning on two or more high side switching devices (UH, WH) and off two or more low side switching devices (UL, WL). The second control is control of turning off the two or more high side switching devices (UH, WH) and on the two or more low side switching devices (UL, WL). The two or more high side switching devices (UH, WH) each are connected to the terminal (P3) and any one of the two or more power supply terminals (U1, W1). The two or more low side switching devices (UL, WL) each are connected to the terminal (N3) and any one of the two or more power supply terminals (U1, W1).

Accordingly, the seventh aspect can prevent transfer of power between the transformer circuit unit (5) and the converter unit (7).

The power conversion system (1, 1A to 1J) according to an eighth aspect which would be realized in combination with any one of the first to third aspects, is configured to operate in any one of a first inverter mode, a second inverter mode, a first converter mode, and a second converter mode. In the first inverter mode, an output voltage outputted from the converter unit (7) to the second external connector (15) is positive. In the second inverter mode, the output voltage is negative. In the first converter mode, an input voltage inputted into the converter unit (7) through the second external connector (15) is positive. In the second converter mode, the input voltage is negative. The control unit (13) is configured to control the converter unit (7) in a same sequence in the first inverter mode and in the first converter mode and control the converter unit (7) in a same sequence in the second inverter mode and the second converter mode.

According to the eighth aspect, even if the output current or the input current of the converter unit (7) shows polarity different from desired polarity, the first inverter mode and the first converter mode can be switched continuously and the second inverter mode and the second converter mode can be switched continuously. As a result, the present aspect is applicable for stand alone devices such as an uninterruptible power system (UPS).

In the power conversion system (1K) according to a ninth aspect which would be realized in combination with the fourth aspect, the first connection target is the DC power supply (17). The second connection target is the load. The load (device) is a DC device (28) (a DC load). The connector (15) includes a terminal (U2) (one example of a first external connection terminal) and a terminal (W2) (one example of a second external connection terminal) connected to the terminal (N3). The converter unit (7) includes a chopper circuit configured to transfer DC power in the first direction. The chopper circuit includes a coil (71A), a switching device (UH), and a diode (D2). The coil (71A) has a first coil terminal connected to the terminal (U2). The switching device (UH) is connected between a second coil terminal (U1) of the coil (71A) and the terminal (P3). The diode (D2) has a cathode connected to the second coil terminal (U1) and an anode connected to the terminal (N3).

Accordingly, the ninth aspect can perform transfer of power in the first direction.

In the power conversion system (1K) according to a tenth aspect which would be realized in combination with the ninth aspect, the control unit (13) is configured to turn off the switching device (UH) in the first time period and turn on the switching device (UH) in the second time period.

Accordingly, the tenth aspect can perform transfer of power in the first direction.

In the power conversion system (1P) according to an eleventh aspect which would be realized in combination with the fourth aspect, the first connection target is the load. The second connection target is the DC power supply (17) or the AC power system (29). The load (device) is a DC device (28) (a DC load). The connector (15) includes a terminal (U2) (one example of a first external connection terminal) and a terminal (W2) (one example of a second external connection terminal) connected to the terminal (N3). The converter unit (7) includes a chopper circuit configured to transfer DC power in the second direction. The chopper circuit includes a coil (71A), a diode (D1), and a switching device (UL). The coil (71A) has a first coil terminal connected to the terminal (U2). The diode (D1) has an anode connected to the second coil terminal (U1) of the coil (71A) and a cathode connected to the terminal (P3). The switching device (UL) is connected between the second coil terminal (U1) and the terminal (N3).

Accordingly, the eleventh aspect can perform transfer of power in the second direction.

In the power conversion system (1P) according to a twelfth aspect which would be realized in combination with the eleventh aspect, the control unit (13) is configured to turn on the switching device (UL) in the first time period and turn off the switching device (UL) in the second time period.

Accordingly, the twelfth aspect can perform transfer of power in the second direction.

In the power conversion system (1K) according to a thirteenth aspect which would be realized in combination with the fourth aspect, the control unit (13) has a circulating mode of forming a closed loop in the converter unit (7) to allow a current to flow not through the transformer circuit unit (5) and circulating a current in the closed loop in the first time period.

Accordingly, the thirteenth aspect can prevent transfer of power between the transformer circuit unit (5) and the converter unit (7).

In the power conversion system (1T) according to a fourteenth aspect which would be realized in combination with any one of the first to fifth aspects, the control unit (13) is configured to stop the converter unit (7) and operate the transformer circuit unit (5) for a predetermined time period in stopping transfer of power between the converter unit (7) and the AC power system (29).

Accordingly, the fourteenth aspect operates the transformer circuit unit (5) for the predetermined time period in stopping transfer of power between the converter unit (7) and the AC power system (29). Thereby, power generated in circuitry including the secondary winding (532) can be returned to circuitry including the primary winding (531).

In the power conversion system (1T) according to a fifteenth aspect which would be realized in combination with the fourteenth aspect, the control unit (13) is configured to operate the transformer circuit unit (5) to return power from the secondary winding (532) to the primary winding (531) in the predetermined time period.

Accordingly, the fifteenth aspect can return power generated in circuitry including the secondary winding (532) to circuitry including the primary winding (531).

Features recited in the second to fifteenth aspects are optional for the power conversion systems (1, 1A to 1T) and therefore may be omitted appropriately.

INDUSTRIAL APPLICABILITY

The present disclosure would be applicable to power conditioners for stationary storage cells, V2H (Vehicle to Home) power conditioners for EV/PHV, motor drive systems, and the like.

REFERENCE SIGNS LIST

AH, AL Switching Device
BH, BL Switching Device
CA, CB Capacitor
CT1 Center Tap
CT2 Center Tap
IL Current
L1, L11, L12, L2, L3, L4 Coil
N2, N3 Terminal
P2, P3 Terminal
T1, T2, T3, T4 Terminal
U1, U2 Terminal
UH, UL Switching Device
VH, VL Switching Device
VT1, VT2, VT3, VT4 Voltage
Vo, Vout Voltage
W1, W2 Terminal
WH, WL, XH, XL, YH, YL Switching Device
1, 1A, 1B, 1C, 1D, 1E, 1F, 1G, 1H, 1I, 1J, 1K, 1L, 1M, 1N, 1P, 1Q, 1R, 1S, 1T Power Conversion System
5 Transformer Circuit Unit
6 Connector
7 Converter Unit
9 Filter Circuit
13 Control Unit
15 Connector
17 DC Power Supply
27 AC Load
29 AC Power System
51 Converter Unit
52 Converter Unit
53 Transformer
60 Snubber Circuit
531 Primary Winding
532 Secondary Winding

The invention claimed is:

1. A power conversion system for transferring power between a first connection target and a second connection target in at least one direction, the system comprising:
a first external connector connectable to the first connection target;
a second external connector connectable to the second connection target;
a transformer circuit unit including a primary winding connected to the first external connector, a secondary winding magnetically coupled with the primary winding, a first converter unit connected between the first external connector and the primary winding, and a second converter unit connected to the secondary winding;
a third converter unit connected to the second external connector;
a connector including a first connection terminal and a second connection terminal interconnecting the second converter unit and the third converter unit; and
a control unit configured to control at least one of the first converter unit and the second converter unit so that positive and negative voltages are applied across the primary winding alternately and a voltage of the first connection terminal from the second connection terminal is positive,
the control unit being configured to
control the third converter unit not to cause transfer of power between the transformer circuit unit and the third converter unit in a first time period including a reversal time period in which a reversal of polarity of the voltage across the primary winding occurs, and
control the third converter unit to cause transfer of power in a first direction from the transformer circuit unit to the third converter unit or a second direction opposite to the first direction in a second time period different from the first time period,
the power conversion system being configured to perform bidirectional transfer of power between the first connection target and the second connection target in any one of:
a case where the first connection target is a DC power supply and the second connection target is an AC power system;
a case where the first connection target is a DC power supply and the second connection target is an AC load; and
a case where the first connection target is a DC load and the second connection target is an AC power system.

2. The power conversion system according to claim 1, wherein
the connector includes a snubber circuit connected between the first connection terminal and the second connection terminal.

3. The power conversion system according to claim 1, further comprising two or more power supply terminals connected to the second connection target,
wherein the control unit is configured to control the third converter unit to short-circuit the two or more power supply terminals in the first time period.

4. The power conversion system according to claim 3, wherein
the control unit is configured to, in the first time period, perform either:
control of turning on two or more high side switching devices each connected to the first connection terminal and any one of the two or more power supply terminals, and off two or more low side switching devices each connected to the second connection terminal and any one of the two or more power supply terminals; or
control of turning off the two or more high side switching devices and on the two or more low side switching devices.

5. The power conversion system according to claim 1, wherein:
the power conversion system is configured to operate in any one of modes including a first inverter mode in which an output voltage outputted from the third converter unit to the second external connector is positive, a second inverter mode in which the output voltage is negative, a first converter mode in which an input voltage inputted into the third converter unit through the second external connector is positive, and a second converter mode in which the input voltage is negative;

the third converter includes a plurality of switching devices; and the control unit is configured to control the third converter unit so that a corresponding switching device of the plurality of switching devices is turned on/off at the same timing in the first inverter mode and in the first converter mode and control the third converter unit so that a corresponding switching device of the plurality of switching devices is turned on/off at the same timing in the second inverter mode and the second converter mode.

6. The power conversion system according to claim 1, wherein the control unit is configured to stop the third converter unit and operate the transformer circuit unit for a predetermined time period in stopping transfer of power between the third converter unit and the second connection target.

7. The power conversion system according to claim 6, wherein the control unit is configured to operate the transformer circuit unit to return power from the secondary winding to the primary winding in the predetermined time period.

8. A power conversion system for transferring power between a first connection target and a second connection target in at least one direction, the system comprising:

a first external connector connectable to the first connection target;

a second external connector connectable to the second connection target;

a transformer circuit unit including a primary winding connected to the first external connector, a secondary winding magnetically coupled with the primary winding, a first converter unit connected between the first external connector and the primary winding, and a second converter unit connected to the secondary winding;

a third converter unit connected to the second external connector;

a connector including a first connection terminal and a second connection terminal interconnecting the second converter unit and the third converter unit; and a control unit configured to control at least one of the first converter unit and the second converter unit so that positive and negative voltages are applied across the primary winding alternately and a voltage of the first connection terminal from the second connection terminal is positive, the control unit being configured to control the third converter unit not to cause transfer of power between the transformer circuit unit and the third converter unit in a first time period including a reversal time period in which a reversal of polarity of the voltage across the primary winding occurs, and control the third converter unit to cause transfer of power in a first direction from the transformer circuit unit to the third converter unit or a second direction opposite to the first direction in a second time period different from the first time period, the power conversion system being configured to perform bidirectional transfer of power between the first connection target and the second connection target in any one of:

a case where the first connection target is a DC power supply and the second connection target is a DC load;

a case where the first connection target is a DC load and the second connection target is a DC power supply; and a case where the first connection target and the second connection target both are DC power supplies.

9. The power conversion system according to claim 8, wherein the connector includes a snubber circuit connected between the first connection terminal and the second connection terminal.

10. The power conversion system according to claim 8, further comprising two or more power supply terminals connected to the second connection target, wherein the control unit is configured to control the third converter unit to short-circuit the two or more power supply terminals in the first time period.

11. The power conversion system according to claim 8, wherein:

the power conversion system is configured to operate in any one of modes including a first inverter mode in which an output voltage outputted from the third converter unit to the second external connector is positive, a second inverter mode in which the output voltage is negative, a first converter mode in which an input voltage inputted into the third converter unit through the second external connector is positive, and a second converter mode in which the input voltage is negative;

the third converter includes a plurality of switching devices; and the control unit is configured to control the third converter unit so that a corresponding switching device of the plurality of switching devices is turned on/off at the same timing in the first inverter mode and in the first converter mode and control the third converter unit so that a corresponding switching device of the plurality of switching devices is turned on/off at the same timing in the second inverter mode and the second converter mode.

12. A power conversion system for transferring power between a first connection target and a second connection target in at least one direction, the system comprising:

a first external connector connectable to the first connection target;

a second external connector connectable to the second connection target;

a transformer circuit unit including a primary winding connected to the first external connector, a secondary winding magnetically coupled with the primary winding, a first converter unit connected between the first external connector and the primary winding, and a second converter unit connected to the secondary winding;

a third converter unit connected to the second external connector;

a connector including a first connection terminal and a second connection terminal interconnecting the second converter unit and the third converter unit; and a control unit configured to control at least one of the first converter unit and the second converter unit so that positive and negative voltages are applied across the primary winding alternately and a voltage of the first connection terminal from the second connection terminal is positive, the control unit being configured to
control the third converter unit not to cause transfer of power between the transformer circuit unit and the third converter unit in a first time period including a reversal time period in which a reversal of polarity of the voltage across the primary winding occurs, and
control the third converter unit to cause transfer of power in a first direction from the transformer circuit unit to the third converter unit or a second direction opposite to the first direction in a second time period different from the first time period, the first connection target being one of a DC power supply and a load;
the second connection target being the other of the DC power supply and the load or an AC power system; and
the power conversion system being configured to transfer power between the DC power supply and the load or the AC power system in one direction.

13. The power conversion system according to claim 12, wherein:
the first connection target is the DC power supply;
the second connection target is the load;
the load is a DC load;
the second external connector includes a first external connection terminal and a second external connection terminal connected to the second connection terminal;
the third converter unit includes a chopper circuit configured to transfer DC power in the first direction;
the chopper circuit includes
a coil having a first coil terminal connected to the first external connection terminal,
a switching device connected between a second coil terminal of the coil and the first connection terminal, and
a diode having a cathode connected to the second coil terminal and an anode connected to the second connection terminal.

14. The power conversion system according to claim 13, wherein
the control unit is configured to turn off the switching device in the first time period and turn on the switching device in the second time period.

15. The power conversion system according to claim 12, wherein:
the first connection target is the load;
the second connection target is the DC power supply or the AC power system;
the load is a DC load;
the second external connector includes a first external connection terminal and a second external connection terminal connected to the second connection terminal;
the third converter unit includes a chopper circuit configured to transfer DC power in the second direction;
the chopper circuit includes
a coil having a first coil terminal connected to the first external connection terminal,
a diode having an anode connected to the second coil terminal and a cathode connected to the first connection terminal,
a switching device connected between the second coil terminal and the second connection terminal.

16. The power conversion system according to claim 15, wherein
the control unit is configured to turn on the switching device in the first time period and turn off the switching device in the second time period.

17. The power conversion system according to claim 12 wherein
the control unit has a circulating mode of forming a closed loop in the third converter unit to allow a current to flow not through the transformer circuit unit and circulating a current in the closed loop in the first time period.

18. The power conversion system according to claim 12, wherein
the connector includes a snubber circuit connected between the first connection terminal and the second connection terminal.

19. The power conversion system according to claim 12, further comprising two or more power supply terminals connected to the second connection target,
wherein the control unit is configured to control the third converter unit to short-circuit the two or more power supply terminals in the first time period.

20. The power conversion system according to claim 12, wherein:
the power conversion system is configured to operate in any one of modes including a first inverter mode in which an output voltage outputted from the third converter unit to the second external connector is positive, a second inverter mode in which the output voltage is negative, a first converter mode in which an input voltage inputted into the third converter unit through the second external connector is positive, and a second converter mode in which the input voltage is negative;
the third converter includes a plurality of switching devices; and
the control unit is configured to control the third converter unit so that a corresponding switching device of the plurality of switching devices is turned on/off at the same timing in the first inverter mode and in the first converter mode and control the third converter unit so that a corresponding switching device of the plurality of switching devices is turned on/off at the same timing in the second inverter mode and the second converter mode.

* * * * *